US011050548B2

(12) United States Patent
Takahashi et al.

(10) Patent No.: US 11,050,548 B2
(45) Date of Patent: Jun. 29, 2021

(54) IMAGE TRANSMISSION SYSTEM, IMAGING TERMINAL, DISPLAY TERMINAL, ADJUSTMENT METHOD, ADJUSTMENT ASSISTANCE METHOD, AND NON-TRANSITORY COMPUTER-READABLE RECORDING MEDIUM STORING PROGRAM

(71) Applicant: OLYMPUS CORPORATION, Hachioji (JP)

(72) Inventors: Tetsuyuki Takahashi, Tokyo (JP); Yasuhiro Hasegawa, Hanno (JP); Kiyoshi Toyoda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/722,565

(22) Filed: Dec. 20, 2019

(65) Prior Publication Data

US 2020/0127808 A1 Apr. 23, 2020

Related U.S. Application Data

(63) Continuation of application No. PCT/JP2017/023172, filed on Jun. 23, 2017.

(51) Int. Cl.
*H04L 7/04* (2006.01)
*G06F 3/14* (2006.01)
*H04N 21/242* (2011.01)

(52) U.S. Cl.
CPC ............ *H04L 7/04* (2013.01); *G06F 3/14* (2013.01); *H04N 21/242* (2013.01)

(58) Field of Classification Search
CPC ............ H04N 21/242; H04N 21/4305; H04N 21/43637; H04N 5/232; H04N 5/23225; H04L 7/04; G06F 3/14
See application file for complete search history.

(56) References Cited

U.S. PATENT DOCUMENTS 8,300,709 B2 * 10/2012 Wakutsu ............ H04N 21/2401
375/240.28
8,860,830 B2 * 10/2014 Yanagidate ........ H04N 21/4305
348/211.1

(Continued)

FOREIGN PATENT DOCUMENTS

JP 2007-49681 A 2/2007
JP 2013-121014 A 6/2013

(Continued)

OTHER PUBLICATIONS

International Search Report dated Sep. 5, 2017, issued in counterpart application No. PCT/JP2017/023172, w/English translation (3 pages).

*Primary Examiner* — Brian P Yenke
(74) *Attorney, Agent, or Firm* — Westerman, Hattori, Daniels & Adrian, LLP

(57) ABSTRACT

An image transmission system, has an imaging terminal configured to transmit image data at a cycle of imaging timing; and a display terminal configured to receive the image data and display the image data at a cycle of display timing. The image transmission system has functions of calculating communication delay time, estimating accuracy after adjusting a cycle of the imaging timing or the display timing, determining whether to perform an adjustment of the imaging timing or the display timing, and performing the adjustment of the imaging timing or the display timing which are included in either of the imaging terminal or the display terminal. The image transmission system further has a function of assisting the calculation of the communication delay time which is included in the other of the imaging terminal or the display terminal.

10 Claims, 45 Drawing Sheets

(56) References Cited

U.S. PATENT DOCUMENTS

| | | | | |
|---|---|---|---|---|
| 8,902,285 | B2* | 12/2014 | Tanaka | H04N 13/398 |
| | | | | 348/43 |
| 9,055,225 | B2* | 6/2015 | Yanagidate | H04N 21/43637 |
| 9,414,001 | B2* | 8/2016 | Yanagidate | H04N 5/0733 |
| 9,451,218 | B2* | 9/2016 | Hanabusa | H04N 21/242 |
| 9,848,225 | B2* | 12/2017 | Torikai | G06F 21/606 |
| 9,894,311 | B2* | 2/2018 | Claus | H04N 5/44 |
| 9,924,087 | B2* | 3/2018 | Fukuya | H04N 5/23206 |
| 10,205,867 | B2* | 2/2019 | Shibahara | H04N 5/232941 |
| 10,225,713 | B2* | 3/2019 | Wu | H04N 21/43637 |
| 10,542,192 | B2* | 1/2020 | Takahashi | H04N 5/12 |
| 10,587,783 | B2* | 3/2020 | Kawasaki | H04N 5/232 |
| 10,834,315 | B2* | 11/2020 | Kaneko | H04N 5/04 |
| 2007/0300272 | A1 | 12/2007 | Takanezawa | |
| 2011/0044199 | A1* | 2/2011 | Kazmi | G01S 5/0054 |
| | | | | 370/252 |
| 2012/0086814 | A1* | 4/2012 | Tsubaki | H04N 21/4305 |
| | | | | 348/192 |
| 2013/0129347 | A1* | 5/2013 | Shin | H04J 3/065 |
| | | | | 398/25 |
| 2014/0081987 | A1* | 3/2014 | Ojanpera | G06F 16/489 |
| | | | | 707/748 |
| 2016/0065435 | A1 | 3/2016 | Ito et al. | |
| 2020/0128140 | A1* | 4/2020 | Takahashi | H04N 1/00129 |

FOREIGN PATENT DOCUMENTS

| | | |
|---|---|---|
| JP | 2016-5204 A | 1/2016 |
| JP | 2016-46767 A | 4/2016 |

* cited by examiner

IMAGE TRANSMISSION SYSTEM, IMAGING TERMINAL, DISPLAY TERMINAL, ADJUSTMENT METHOD, ADJUSTMENT ASSISTANCE METHOD, AND NON-TRANSITORY COMPUTER-READABLE RECORDING MEDIUM STORING PROGRAM

This application is a continuation application based on a PCT International Application No. PCT/JP2017/023172, filed on Jun. 23, 2017. The content of the PCT International Application is incorporated herein by reference.

BACKGROUND

Field of the Technology

The present invention relates to an image transmission system, an imaging terminal, a display terminal, an adjustment method, an adjustment assistance method, a non-transitory computer-readable recording medium storing an adjustment support program, and a non-transitory computer-readable recording medium storing an adjustment assistance program.

Conventionally, an image transfer system wirelessly transferring captured image data between an imaging terminal and a display terminal using a wireless communication standard such as that of Institute Of Electrical and Electronics Engineers (IEEE) 802.11, that is, a so-called high-speed wireless communication technique represented by WiFi (registered trademark) has been put to practical use. In an image transfer system, an imaging terminal transmits captured image data captured by an imaging unit included in the imaging terminal to a display terminal. Further, in the image transfer system, the display terminal displays an image corresponding to the captured image data transmitted from the imaging terminal to a display unit included in the display terminal.

In such an image transfer system, a synchronization signal such as a vertical synchronization signal or a horizontal synchronization signal based on a reference clock signal generated by, for example, a crystal oscillation IC or the like is generated in each of the imaging terminal and the display terminal. In addition, each of the imaging terminal and the display terminal is operated in accordance with a timing of the generated synchronization signal. That is, in the imaging terminal, an image is captured by the imaging unit in accordance with a timing of the synchronization signal generated in the imaging terminal, and the captured image data is transmitted to the display terminal. Further, in the display terminal, the image corresponding to the captured image data transmitted from the imaging terminal is displayed on the display unit in accordance with a timing of the synchronization signal generated in the display terminal.

Incidentally, in an image transfer system, even when a crystal oscillation IC mounted on each of an imaging terminal and a display terminal is a crystal oscillation IC that generates clock signals having the same phase or period, a shift may occur between a synchronization signal generated by the imaging terminal and a synchronization signal generated by the display terminal. That is, a shift of a phase or a period may occur between the clock signal generated by the crystal oscillation IC mounted on the imaging terminal and the clock signal generated by the crystal oscillation IC mounted on the display terminal. This is caused by an error (for example, an error in units of 100 ppm due to temperature characteristics) of the phase or the period of an output signal of a crystal oscillator included in each of the crystal oscillation ICs, variations in a timing when power is supplied to each of the imaging terminal and the display terminal, or the like. In addition, a shift amount of a synchronization signal generated by each of the imaging terminal and the display terminal increases in proportion to the elapse of time. For this reason, even when a process of matching a timing when the imaging terminal generates a synchronization signal to a timing when the display terminal generates a synchronization signal is performed a finite number of times (for example, once, twice, or the like) after power is supplied, the synchronization signal generated by the imaging terminal and the synchronization signal generated by the display terminal may shift from each other with the elapse of time.

In addition, when the synchronization signals are shifted in the imaging terminal and the display terminal, a validity period of an image in captured image data transmitted from the imaging terminal may not fall within that of the synchronization signal generated by the display terminal. That is, a start timing or a termination timing of the validity period of the image in the captured image data transmitted from the imaging terminal may deviate from a start timing or a termination timing of a validity period of an image based on the synchronization signal generated by the display terminal. In addition, when the validity period of the image in the captured image data transmitted from the imaging terminal deviates from the validity period of the image based on the synchronization signal generated by the display terminal, the display terminal cannot correctly display an image corresponding to the captured image data transmitted from the imaging terminal.

Consequently, for example, as disclosed in Japanese Unexamined Patent Application, First Publication No. 2016-005204, a technique of a communication device that synchronizes communication timings of two communication means with each other has been proposed. In a technique disclosed in Patent Literature 1, at least any one communication means out of two communication means is controlled so that beacons transmitted by the two communication means independently performing communication with different frequencies are synchronized with each other. In this case, in the technique disclosed in Patent Literature 1, each of the communication means transmits a beacon at predetermined time intervals and then issues a predetermined signal after a predetermined period of time elapses. Further, in the technique disclosed in Patent Literature 1, communication timings of two communication means are synchronized with each other on the basis of a time difference between timings when signals issued from the respective communication means in response to beacon signals being transmitted by the respective communication means are received.

SUMMARY

According to a first aspect of the present invention, An image transmission system has an imaging terminal configured to transmit image data at a cycle of imaging timing; and a display terminal configured to receive the image data and display the image data at a cycle of display timing. The image transmission system further has a communication-delay-time calculation circuit, an accuracy estimation circuit, an adjustment-determination circuit, and a cycle adjustment circuit provided in either of the imaging terminal or the display terminal, and a communication-delay-time-calculation-assistance circuit provided in the other terminal of the imaging terminal and the display terminal. The communication-delay-time calculation circuit is configured to generate a first measurement signal and transmit the first measurement signal to the other terminal at a timing synchronized to the display timing, receive a second measurement signal transmitted from the other terminal in accordance with the first measurement signal, and calculate communication delay time according to the transmission timing of the first measurement signal, the reception timing of the second measurement signal, and lapse time data included in the second measurement signal, wherein the lapse time data indicates lapse time from reception timing of the first measurement signal by the other terminal until transmission timing of the second measurement signal. The communication-delay-time-calculation-assistance circuit is configured to receive the first measurement signal, generate the second measurement signal including the lapse time data, and transmit the second measurement signal to either of the imaging terminal or the display terminal having the communication-delay-time calculation circuit. The accuracy estimation circuit is configured to define either of the imaging timing and the display timing as an adjustment target timing and calculate an accuracy estimation value to estimate an accuracy after the adjustment of the cycle of the adjustment target timing, wherein the accuracy estimation value is calculated in accordance with a plurality of the communication delay time calculated in a predetermined period and a plurality of the transmission timing of the first measurement signal corresponding to the plurality of the communication delay time. The adjustment-determination circuit is configured to determine whether the accuracy estimation value is improved compared to the accuracy at the current adjustment target timing in accordance with the accuracy estimation value and the current accuracy at the adjustment target timing, and the adjustment-determination circuit is configured to determine whether to perform a cycle adjustment of the adjustment target timing in accordance with the determination result. The cycle adjustment circuit is configured to adjust the cycle of the adjustment target timing when it is determined to perform the cycle adjustment of the adjustment target timing.

According to a second aspect of the present invention, in the image transmission system according to the first aspect, the cycle adjustment circuit may be configured to calculate an adjustment amount for adjusting the cycle of the adjustment target timing and perform the cycle adjustment of the adjustment target timing according to the calculated adjustment amount, when it is determined to perform the cycle adjustment of the adjustment target timing, and the adjustment amount may be calculated in accordance with the accuracy estimation value, the transmission timing of the first measurement signal, and the transmission timing of the second signal.

According to a third aspect of the present invention, in the image transmission system according to the second aspect, the accuracy estimation circuit may be configured to define the plurality of the communication delay time calculated during the predetermined period as a population, extract a minimum communication delay time per each population, and calculate the accuracy estimation value in accordance with a difference between two minimum communication delay time among the plurality of the communication delay time extracted from the plurality of populations and a difference between two transmission timing of the two first measurement signals which are transmitted to calculate the two extracted minimum communication delay time. The adjustment-determination circuit may be configured to determine to perform the cycle adjustment of the adjustment target timing when the accuracy estimation value is improved compared to the accuracy at the current adjustment target timing, and the adjustment-determination circuit may be configured to not to perform the cycle adjustment of the adjustment target timing when the accuracy estimation value is not improved compared to the accuracy at the current adjustment target timing. The cycle adjustment circuit may be configured to calculate the adjustment amount according to a difference between the transmission timing of the two first measurement signals transmitted to calculate the two minimum communication delay time extracted to calculate the accuracy estimation value and a difference between the transmission timing of the tow second measurement signals corresponding to the two first measurement signals.

According to a fourth aspect of the invention, in the image transmission system according to the third aspect, the cycle adjustment circuit may be configured to calculate the adjustment amount by multiplying the accuracy estimation value by a ratio of the difference between the transmission timing of the two first measurement signals to the difference between the transmission timing of the two second measurement signals.

According to a fifth aspect of the invention, in the image transmission system according to the third aspect, the accuracy estimation circuit may be configured to calculate the accuracy estimation value by increasing a number of the communication delay time included in the population when it is determined to not perform the cycle adjustment of the adjustment target timing.

According to a sixth aspect of the present invention, in the image transmission system according to the fifth aspect, the accuracy estimation circuit may be configured to include the communication delay time included in the population before the number of the communication delay time is increased into the population in which the number of the communication delay time is increased.

According to a seventh aspect of the present invention, the image transmission system according to the third aspect may further have a phase-adjustment-determination circuit configured to determine whether to perform an adjustment of a phase shift between the imaging timing and the display timing according to the communication delay time.

According to an eighth aspect of the present invention, the image transmission system according to the third aspect may further have a phase adjustment circuit configured to calculate a phase-adjustment amount for adjusting the phase shift between the imaging timing and the display timing according to the communication delay time and adjust the phase shift between the imaging timing and the display timing according to the calculated phase-adjustment amount.

According to a ninth aspect of the present invention, an imaging terminal included in an image transmission system, wherein the image transmission system has the imaging terminal configured to transmit image data at a cycle of imaging timing; and a display terminal configured to receive the image data and display the image data at a cycle of display timing, has a communication-delay-time calculation circuit configured to generate a first measurement signal and transmit the first measurement signal to the other terminal at a timing synchronized to the display timing, receive a second measurement signal transmitted from the other terminal in accordance with the first measurement signal, and calculate communication delay time according to the transmission timing of the first measurement signal, the reception timing of the second measurement signal, and lapse time data included in the second measurement signal, wherein the lapse time data indicates lapse time from reception timing of the first measurement signal by the other terminal until transmission timing of the second measurement signal; an accuracy estimation circuit configured to calculate an accuracy estimation value to estimate an accuracy after adjusting the cycle of the imaging timing in accordance with a plurality of the communication delay time calculated in a predetermined period and a plurality of the transmission timing of the first measurement signal corresponding to the plurality of the communication delay time; an adjustment-determination circuit configured to determine whether the accuracy estimation value is improved compared to the accuracy at the current imaging timing in accordance with the accuracy estimation value and the current accuracy at the imaging timing, and the adjustment-determination circuit is configured to determine whether to perform a cycle adjustment of the imaging timing in accordance with the determination result, and a cycle adjustment circuit configured to adjust the cycle of the imaging timing when it is determined to perform the cycle adjustment of the imaging timing.

According to a tenth aspect of the present invention, an adjustment method for adjusting an imaging timing and a displaying timing in an image transmission system so as to match the imaging timing with the display imaging, wherein the image transmission system has an imaging terminal configured to transmit image data at a cycle of the imaging timing; and a display terminal configured to receive the image data and display the image data at a cycle of the display timing, has a process of generating a first measurement signal by either of the imaging terminal or the display terminal and transmitting the first measurement signal to the other terminal at a timing synchronized to the display timing; a process of receiving the first measurement signal in the other terminal; a process of generating a second measurement signal in the other terminal in accordance with the first measurement signal and transmitting the second measurement signal to either of the imaging terminal and the display terminal, wherein the second measurement signal includes lapse time data indicating lapse time from reception timing of the first measurement signal by the other terminal until transmission timing of the second measurement signal; a process of receiving the second measurement signal to calculate communication delay time according to the transmission timing of the first measurement signal, the reception timing of the second measurement signal, and lapse time data included in the second measurement signal by either of the imaging terminal and the display terminal; a process of defining either of the imaging timing and the display timing as an adjustment target timing and calculating an accuracy estimation value to estimate an accuracy after the adjustment of the cycle of the adjustment target timing by either of the imaging terminal and the display terminal, wherein the accuracy estimation value is calculated in accordance with a plurality of the communication delay time calculated in a predetermined period and a plurality of the transmission timing of the first measurement signal corresponding to the plurality of the communication delay time; a process of determining whether the accuracy estimation value is improved compared to the accuracy at the current adjustment target timing in accordance with the accuracy estimation value and the current accuracy at the adjustment target timing, and determining whether to perform a cycle adjustment of the adjustment target timing in accordance with the determination result by either of the imaging terminal and the display terminal; and a process of adjusting the cycle of the adjustment target timing by either of the imaging terminal and the display terminal, when it is determined to perform the cycle adjustment of the adjustment target timing.

According to another aspect of the present invention, an adjustment method for adjusting an imaging timing and a displaying timing in an image transmission system so as to match the imaging timing with the display imaging, wherein the image transmission system has an imaging terminal configured to transmit image data at a cycle of the imaging timing; and a display terminal configured to receive the image data and display the image data at a cycle of the display timing, has a process of generating a first measurement signal by the imaging terminal and transmitting the first measurement signal to the display terminal at a timing synchronized to the display timing; a process of receiving a second measurement signal transmitted from the display terminal in accordance with the first measurement signal, wherein the second measurement signal includes lapse time data indicating lapse time from reception timing of the first measurement signal until transmission timing of the second measurement signal; a process of calculating communication delay time according to the transmission timing of the first measurement signal, the reception timing of the second measurement signal, and the lapse time data; a process of calculating an accuracy estimation value to estimate an accuracy after the adjustment of the cycle of the imaging timing, wherein the accuracy estimation value is calculated in accordance with a plurality of the communication delay time calculated in a predetermined period and a plurality of the transmission timing of the first measurement signal corresponding to the plurality of the communication delay time; a process of determining whether the accuracy estimation value is improved compared to the accuracy at the current imaging timing in accordance with the accuracy estimation value and the current accuracy at the imaging timing, and determining whether to perform a cycle adjustment of the imaging timing in accordance with the determination result; and a process of adjusting the cycle of the imaging timing, when it is determined to perform the cycle adjustment of the imaging timing.

According to further another aspect of the present invention, a non-transitory computer-readable recording medium storing program for causing a computer to execute an adjustment method for adjusting an imaging timing and a displaying timing in an image transmission system so as to match the imaging timing with the display imaging, wherein the image transmission system has an imaging terminal configured to transmit image data at a cycle of the imaging timing; and a display terminal configured to receive the image data and display the image data at a cycle of the display timing, wherein the adjustment method has a process of generating a first measurement signal by the imaging terminal and transmitting the first measurement signal to the display terminal at a timing synchronized to the display timing; a process of receiving a second measurement signal transmitted from the display terminal in accordance with the first measurement signal, wherein the second measurement signal includes lapse time data indicating lapse time from reception timing of the first measurement signal until transmission timing of the second measurement signal; a process of calculating communication delay time according to the transmission timing of the first measurement signal, the reception timing of the second measurement signal, and the lapse time data; a process of calculating an accuracy estimation value to estimate an accuracy after the adjustment of the cycle of the imaging timing, wherein the accuracy estimation value is calculated in accordance with a plurality of the communication delay time calculated in a predetermined period and a plurality of the transmission timing of the first measurement signal corresponding to the plurality of the communication delay time; a process of determining whether the accuracy estimation value is improved compared to the accuracy at the current imaging timing in accordance with the accuracy estimation value and the current accuracy at the imaging timing, and determining whether to perform a cycle adjustment of the imaging timing in accordance with the determination result; and a process of adjusting the cycle of the imaging timing, when it is determined to perform the cycle adjustment of the imaging timing.

DETAILED DESCRIPTION OF THE EMBODIMENTS

Figure 1:
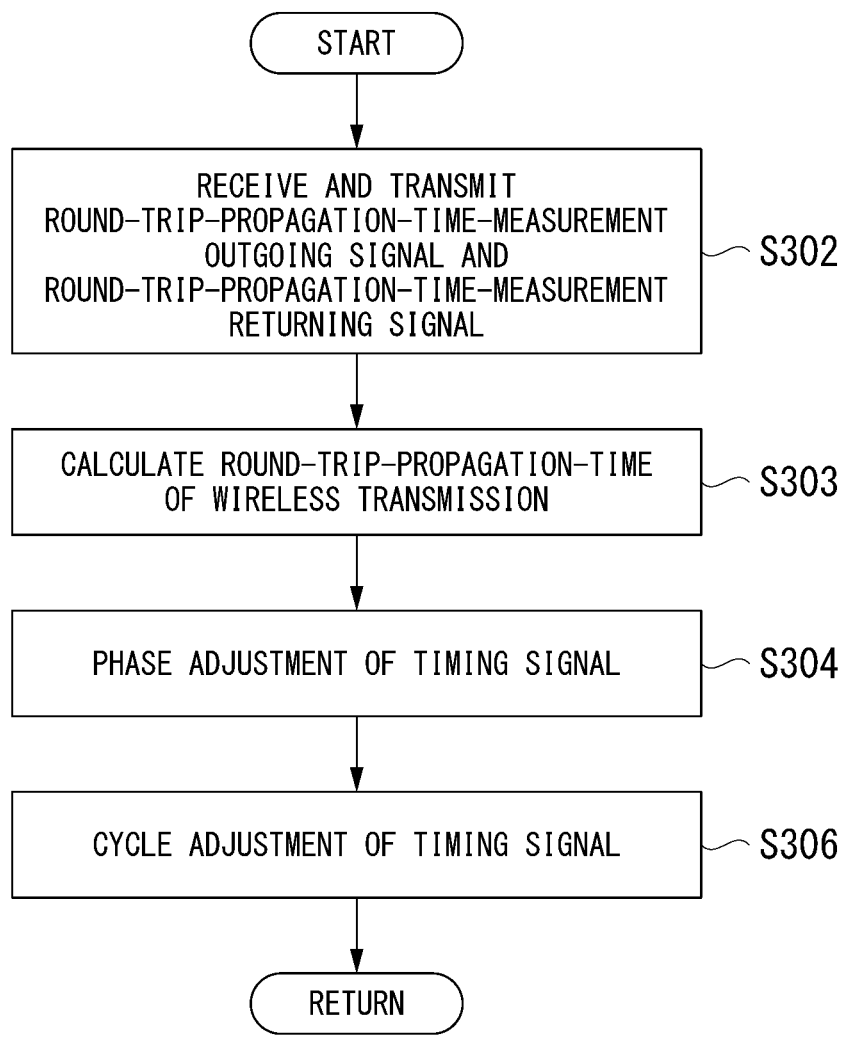
FIG. 1 is a flow chart showing schematic processing procedures in an image transmission system according to an embodiment of the present invention.

Hereinafter, embodiments of the present invention will be described with reference to the accompanying drawings. Each of image transfer systems according to the embodiments of the present invention is an image display system in which an imaging terminal wirelessly transfers (transmits) captured image data of an image captured by an imaging unit to a display terminal using a wireless communication technique, and the display terminal displays an image (display image) corresponding to the captured image data wirelessly transferred (transmitted) from the imaging terminal on a display unit. First, an outline of the overall operation in the image transfer system will be described.

In the image transfer system, when the imaging terminal and the display terminal are started up, each of the imaging terminal and the display terminal generates a reference clock signal and starts to operate. More specifically, the imaging terminal generates a reference clock signal within the imaging terminal (hereinafter, referred to as an "imaging reference clock signal") and starts to operate in accordance with a timing of the generated imaging reference clock signal. In addition, the display terminal generates a reference clock signal within the display terminal (hereinafter, referred to as a "display reference clock signal") and starts to operate in accordance with a timing of the generated display reference clock signal. Further, in the image transfer system, an operation of establishing wireless connection between the imaging terminal and the display terminal is performed.

For example, the imaging terminal transmits a connection request to the display terminal until wireless connection between the imaging terminal and the display terminal is established. When the connection request is transmitted from the imaging terminal until the wireless connection between the imaging terminal and the display terminal is established, the display terminal transmits a response signal corresponding to the connection request to the imaging terminal. The wireless connection between the imaging terminal and the display terminal is established through the transmission of the connection request by the imaging terminal and the transmission of the response signal corresponding to the connection request by the display terminal.

Meanwhile, a process performed to establish wireless connection between the imaging terminal and the display terminal can be easily conceived on the basis of existing wireless communication techniques. Therefore, a detailed description related to a process performed to establish wireless connection between the imaging terminal and the display terminal will be omitted. In addition, each of the imaging terminal and the display terminal monitors the quality of wireless communication by monitoring interference due to another wireless communication device or the like on a wireless communication channel currently being used after wireless connection is established therebetween. In addition, each of the imaging terminal and the display terminal is operated to select and switch a wireless communication channel at all times so that wireless transfer can be performed using a channel with high communication quality. Monitoring of the quality of wireless communication and a wireless transfer method using a channel with an excellent communication quality can also be easily conceived on the basis of existing wireless communication techniques. Therefore, a detailed description related to a wireless transfer method in the imaging terminal and the display terminal is also omitted.

Thereafter, in the image transfer system, after wireless connection is established between the imaging terminal and the display terminal, the imaging terminal transmits captured image data of an image captured by the imaging unit to the display terminal in accordance with a timing of a synchronization signal (hereinafter, referred to as an "imaging synchronization signal") such as a vertical synchronization signal or a horizontal synchronization signal generated on the basis of an imaging reference clock signal. On the other hand, the display terminal displays an image corresponding to the received captured image data from the imaging terminal on the display unit in accordance with a timing of a synchronization signal (hereinafter, referred to as "display synchronization signal") such as a vertical synchronization signal or a horizontal synchronization signal generated on the basis of a display reference clock signal.

Further, in the image transfer system, when wireless connection is established between the imaging terminal and the display terminal, a cycle adjustment process is performed between the imaging terminal and the display terminal. Here, a schematic processing procedure of the cycle adjustment process performed after wireless connection between the imaging terminal and the display terminal is established will be described. FIG. 1 is a flowchart showing a schematic processing procedure of processing in an image transfer system according to an embodiment of the present invention.

In the image transfer system, when a cycle adjustment process is started, first, transmission and reception of a round-trip-propagation-time-measurement outgoing signal and a round-trip-propagation-time-measurement returning signal are performed between an imaging terminal and a display terminal (step S302). More specifically, in the process of step S302, any one terminal out of the imaging terminal and the display terminal transmits a round-trip-propagation-time-measurement outgoing signal for calculating a round trip propagation-time required for transmission and reception at the time of wireless transfer to the other terminal. In addition, one terminal having received the round-trip-propagation-time-measurement outgoing signal transmits a round-trip-propagation-time-measurement returning signal corresponding to the received round-trip-propagation-time-measurement outgoing signal to the other terminal having transmitted the round-trip-propagation-time-measurement outgoing signal.

Subsequently, in the image transfer system, one terminal having received the round-trip-propagation-time-measurement returning signal calculates a round trip propagation-time required for transmission and reception in wireless transfer between the imaging terminal and the display terminal (step S303). More specifically, in the process of step S303, any one terminal out of the imaging terminal and the display terminal calculates a round trip propagation-time of a signal making a round trip through wireless transfer on the basis of a transmission time of the round-trip-propagation-time-measurement outgoing signal, a reception time of the round-trip-propagation-time-measurement returning signal transmitted from the other terminal, and information included in the round-trip-propagation-time-measurement returning signal. Here, the round trip propagation-time is a time obtained by adding up a time required for wireless communication (delay time) in wireless transfer of the round-trip-propagation-time-measurement returning signal to be transmitted from one terminal to the other terminal and a time required for wireless communication (delay time) in wireless transfer of the round-trip-propagation-time-measurement outgoing signal to be transmitted from the other terminal to one terminal.

Subsequently, in the image transfer system, one terminal having received the round-trip-propagation-time-measurement returning signal adjusts the phase of a timing signal used when the terminal operates on the basis of the calculated round trip propagation-time required for transmission and reception in wireless transfer between the imaging terminal and the display terminal (step S304). More specifically, in a case where one terminal is the imaging terminal, the imaging terminal adjusts the phase of an imaging synchronization signal by regenerating the imaging synchronization signal which is a timing signal when imaging is performed by the imaging unit or when captured image data of a captured image is transmitted to the display terminal on the basis of an imaging reference clock signal. Further, in a case where one terminal is the display terminal, the display terminal adjusts the phase of a display synchronization signal by regenerating the display synchronization signal which is a timing signal when an image corresponding to the received captured image data from the imaging terminal is displayed on the display unit on the basis of a display reference clock signal. Thereby, in the image transfer system, phases of the imaging synchronization signal and the display synchronization signal are adjusted so as not to be shifted between the imaging terminal and the display terminal.

Subsequently, in the image transfer system, subsequently to the phase adjustment process for a timing signal which is performed in step S304, the period of a timing signal is adjusted on the basis of the information used in the phase adjustment process (step S306). More specifically, in a case where one terminal is the imaging terminal, the imaging terminal adjusts the period of the imaging synchronization signal on the basis of the information used in the phase adjustment process for the imaging synchronization signal. Further, in a case where one terminal is the display terminal, the display terminal adjusts the period of the display synchronization signal on the basis of the information used in the phase adjustment process for the display synchronization signal. Thereby, in the image transfer system, periods of the imaging synchronization signal and the display synchronization signal are adjusted so as not to be shifted between the imaging terminal and the display terminal.

The processing having been performed so far is a cycle adjustment process for a timing signal which is performed between the imaging terminal and the display terminal in the image transfer system. In the image transfer system, after the cycle adjustment process for a timing signal in step S306 is terminated, the processing returns to step S302 to repeat the cycle adjustment process in steps S302 to S306. Through such a cycle adjustment process, in the image transfer system, phases or periods of the imaging synchronization signal and the display synchronization signal are adjusted so as not to be shifted with the elapse of time between the imaging terminal and the display terminal.

Here, a more detailed operation of a cycle adjustment process for a timing signal which is performed in the image transfer system will be described with a case where the imaging terminal constituting the image transfer system is set to be one terminal and the display terminal is set to be the other terminal as an example. Meanwhile, an operation in a case where the display terminal constituting the image transfer system is set to be one terminal and the imaging terminal is set to be the other terminal can be easily understood by understanding the imaging terminal and the display terminal to be interchanged in the following description.

When wireless connection between the imaging terminal and the display terminal is established, the imaging terminal generates the time of the imaging terminal itself on the basis of an imaging reference clock signal. For example, the imaging terminal sets the time when the wireless connection between the imaging terminal and the display terminal is established to be a reference time (for example, time 0) and starts to generate a time indicating an elapsed time from the reference time (hereinafter, referred to as an "imaging terminal time") on the basis of an imaging reference clock signal. Further, in step S302, the imaging terminal determines a time when a round-trip-propagation-time-measurement outgoing signal is scheduled to be transmitted to the display terminal (imaging terminal time) and generates the round-trip-propagation-time-measurement outgoing signal by the determined scheduled transmission time. In addition, the imaging terminal transmits the round-trip-propagation-time-measurement outgoing signal including information of a packet identification number to the display terminal. Thereafter, the imaging terminal waits for a round-trip-propagation-time-measurement returning signal corresponding to the transmitted round-trip-propagation-time-measurement outgoing signal to be transmitted from the display terminal.

On the other hand, when wireless connection between the display terminal and the imaging terminal is established, the display terminal generates the time of the display terminal itself on the basis of a display reference clock signal. For example, the display terminal sets the time when the wireless connection between the display terminal and the imaging terminal is established to be a reference time (for example, time 0) and starts to generate a time indicating an elapsed time from the reference time (hereinafter, referred to as a "display terminal time"). In addition, the display terminal waits for a round-trip-propagation-time-measurement outgoing signal to be transmitted from the imaging terminal. Thereafter, when the display terminal receives the round-trip-propagation-time-measurement outgoing signal transmitted from the imaging terminal, the display terminal extracts information of a packet identification number included in the received round-trip-propagation-time-measurement outgoing signal in step S302. In addition, the display terminal measures a display terminal time indicating the reception time of the round-trip-propagation-time-measurement outgoing signal. In addition, the display terminal determines a time when a round-trip-propagation-time-measurement returning signal corresponding to the received round-trip-propagation-time-measurement outgoing signal is scheduled to be transmitted to the imaging terminal (display terminal time) and generates the round-trip-propagation-time-measurement returning signal by the determined scheduled transmission time. In this case, the display terminal calculates a difference between the reception time of the round-trip-propagation-time-measurement outgoing signal and the determined scheduled transmission time of the round-trip-propagation-time-measurement returning signal as a receiver elapsed time. In addition, the display terminal transmits the round-trip-propagation-time-measurement returning signal including information of the calculated receiver elapsed time, information of the scheduled transmission time of the round-trip-propagation-time-measurement returning signal, and information of the packet identification number extracted from the round-trip-propagation-time-measurement outgoing signal to the imaging terminal.

Thereafter, when the imaging terminal receives the round-trip-propagation-time-measurement returning signal transmitted from the display terminal, the imaging terminal measures an imaging terminal time indicating the reception time of the round-trip-propagation-time-measurement returning signal. In addition, the imaging terminal extracts the information of the receiver elapsed time, the information of the scheduled transmission time of the round-trip-propagation-time-measurement returning signal, and the information of the packet identification number which are included in the received round-trip-propagation-time-measurement returning signal. Further, in step S303, the imaging terminal calculates a difference between the scheduled transmission time of the round-trip-propagation-time-measurement outgoing signal which is determined in step S302 and the reception time of the round-trip-propagation-time-measurement returning signal. In addition, the imaging terminal calculates a round trip propagation-time required for transmission and reception at the time of wireless transfer performed between the imaging terminal and the display terminal by subtracting the extracted receiver elapsed time from the calculated difference time. That is, the imaging terminal calculates a delay time of a signal making a round trip in only wireless transfer between the imaging terminal and the display terminal.

In this manner, in the image transfer system, a delay time of a signal making a round trip in only wireless transfer is calculated as a round trip propagation-time on the basis of information of the time when any one terminal out of the imaging terminal and the display terminal transmits a round-trip-propagation-time-measurement outgoing signal, information of the time when a round-trip-propagation-time-measurement returning signal transmitted from the other terminal is received, and information of a time between when the other terminal receives a round-trip-propagation-time-measurement outgoing signal and when the other terminal transmits the round-trip-propagation-time-measurement returning signal.

Thereafter, in the image transfer system, the imaging terminal performs a phase adjustment process for a timing signal which is performed in step S304. In the phase adjustment process for a timing signal which is performed by the imaging terminal, a phase is adjusted without changing the period of an imaging synchronization signal by regenerating the imaging synchronization signal (timing signal) used at the time of imaging using the imaging unit in accordance with a round trip propagation-time calculated on the basis of information of a round-trip-propagation-time-measurement returning signal corresponding to a transmitted round-trip-propagation-time-measurement outgoing signal. Here, the imaging terminal adjusts the phase of the imaging synchronization signal by regenerating the imaging synchronization signal (timing signal) when the round trip propagation-time calculated in step S303 is equal to or less than a determination value (hereinafter, referred to as a "round trip propagation-time determination value") which is a threshold value for determining a round trip propagation-time which is determined in advance. On the other hand, when the round trip propagation-time calculated in step S303 is greater than a round trip propagation-time determination value determined in advance, the imaging terminal terminates the phase adjustment process for a timing signal which is performed in step S304 by maintaining the current generation timing without regenerating an imaging synchronization signal (timing signal), that is, without adjusting the phase of the imaging synchronization signal.

Thereafter, in the image transfer system, the imaging terminal performs the cycle adjustment process for a timing signal which is performed in step S306. In the image transfer system, the imaging terminal performs the cycle adjustment process for a timing signal whenever a phase adjustment process for a timing signal (the process of step S304) is performed a number of times determined in advance, that is, whenever a period of time determined in advance elapses. In the phase adjustment process for a timing signal which is performed by the imaging terminal, the accuracy of an imaging synchronization signal in a case where a period is temporarily adjusted is estimated on the basis of a plurality of round trip propagation-time determination values equivalent to a predetermined number of times of the phase adjustment process for an imaging synchronization signal (timing signal) which is performed in step S304. Further, in a case where the imaging terminal determines that the estimated accuracy of the imaging synchronization signal has been improved, the imaging terminal adjusts the period of the imaging synchronization signal (timing signal) with a calculated cycle adjustment amount. On the other hand, in a case where the imaging terminal determines that the estimated accuracy of the imaging synchronization signal has not been improved, the imaging terminal terminates the cycle adjustment process for a timing signal which is performed in step S306 while maintaining the current period without calculating a cycle adjustment amount, that is, without adjusting the period of the imaging synchronization signal.

Hereinafter, in the image transfer system, the imaging terminal repeats the cycle adjustment process for a timing signal which is performed in steps S302 to S306.

As described above, in the image transfer system, after wireless connection between the imaging terminal and the display terminal is established, any one terminal out of the imaging terminal and the display terminal transmits a round-trip-propagation-time-measurement outgoing signal to the other terminal to start a cycle adjustment process for a timing signal. Further, in the image transfer system, phase adjustment for a timing signal is performed on the basis of a round trip propagation-time for only transmission and reception of wireless transfer between the imaging terminal and the display terminal which is calculated on the basis of information regarding a round-trip-propagation-time-measurement outgoing signal transmitted by any one terminal and information included in a round-trip-propagation-time-measurement returning signal corresponding to the transmitted round-trip-propagation-time-measurement outgoing signal. Further, in the image transfer system, cycle adjustment for a timing signal is performed on the basis of the accuracy of the timing signal which is estimated from a plurality of round trip propagation-time determination values when the phase adjustment process for the timing signal is perform a number of times determined in advance.

First Embodiment

Figure 2:
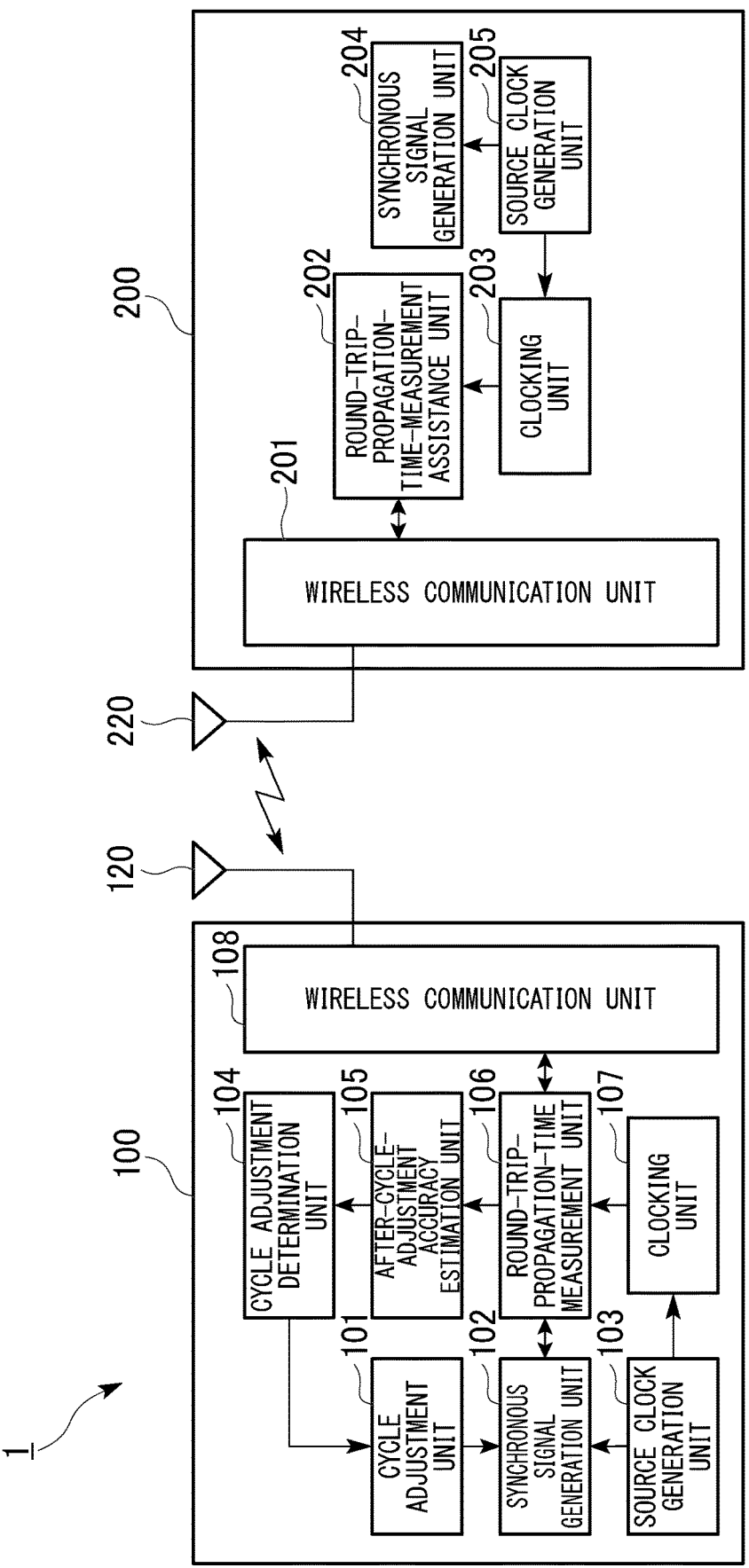
FIG. 2 is a block diagram showing a schematic configuration of an image transmission system according to a first embodiment of the present invention.

Next, a specific configuration and operation for performing phase adjustment for a timing signal in an image transfer system will be described. FIG. 2 is a block diagram showing a schematic configuration of an image transfer system in a first embodiment of the present invention. An image transfer system 1 includes an imaging terminal 100 and a display terminal 200. Meanwhile, the imaging terminal 100 starts to operate in accordance with a timing of an imaging reference clock signal generated within the imaging terminal 100. In addition, the imaging terminal 100 transmits captured image data of an image captured by an imaging unit to the display terminal 200 in accordance with a timing of an imaging synchronization signal which is a timing signal generated on the basis of the imaging reference clock signal. In addition, the display terminal 200 starts to operate in accordance with a timing of a display reference clock signal generated within the display terminal 200. In addition, the display terminal 200 displays an image corresponding to the captured image data received from the imaging terminal 100 in accordance with a timing of a display synchronization signal which is a timing signal generated on the basis of the display reference clock signal to the display unit.

In addition, the image transfer system 1 is an image transfer system configured such that the imaging terminal 100 transmits a round-trip-propagation-time-measurement outgoing signal to the display terminal 200, and cycle adjustment for a timing signal generated by the imaging terminal 100 (imaging synchronization signal) is performed on the basis of information regarding the transmitted round-trip-propagation-time-measurement outgoing signal and information included in a round-trip-propagation-time-measurement returning signal transmitted from the display terminal 200 in response to the transmitted round-trip-propagation-time-measurement outgoing signal.

The imaging terminal 100 includes a synchronization signal generation unit 102, a cycle adjustment unit 101, a source oscillation clock generation unit 103, a wireless communication unit 108, a cycle adjustment determination unit 104, an after-cycle-adjustment accuracy estimation unit 105, a round-trip-propagation-time measurement unit 106, a clocking unit 107, and an antenna 120. In addition, the display terminal 200 includes a synchronous signal generation unit 204, a source oscillation clock generation unit 205, a wireless communication unit 201, a round-trip-propagation-time-measurement assistance unit 202, a clocking unit 203, and an antenna 220.

First, each of the components included in the imaging terminal 100 will be described.

The source oscillation clock generation unit 103 generates a source oscillation clock signal which is the source of an imaging reference clock signal for operating the imaging terminal 100. The source oscillation clock generation unit 103 is a so-called clock generator which is configured to include, for example, a crystal oscillation IC or the like. The source oscillation clock generation unit 103 generates a source oscillation clock signal when the imaging terminal 100 is started up. The imaging reference clock signal is generated on the basis of the source oscillation clock signal generated by the source oscillation clock generation unit 103. Meanwhile, in the following description, for ease of description, the description will be provided on the assumption that the source oscillation clock generation unit 103 generates an imaging reference clock signal.

The clocking unit 107 measures a time in the imaging terminal 100 (imaging terminal time) on the basis of the imaging reference clock signal generated by the source oscillation clock generation unit 103. The clocking unit 107 outputs information of the clocked imaging terminal time to the round-trip-propagation-time measurement unit 106. Meanwhile, the clocking unit 107 may also output information of the clocked imaging terminal time to the wireless communication unit 108.

The synchronization signal generation unit 102 generates a synchronization signal (imaging synchronization signal) such as a vertical synchronization signal or a horizontal synchronization signal indicating the start or termination of a validity period of captured image data which is captured and output by an imaging unit not shown in the drawing and included in the imaging terminal 100 on the basis of the imaging reference clock signal generated by the source oscillation clock generation unit 103. The synchronization signal generation unit 102 outputs the generated imaging synchronization signal to each of the imaging unit not shown in the drawing and the round-trip-propagation-time measurement unit 106.

In a case where an instruction for adjusting the period of an imaging synchronization signal is input from the cycle adjustment unit 101, the synchronization signal generation unit 102 regenerates the imaging synchronization signal (that is, adjusts the period of an imaging synchronization signal to be generated) in response to the input cycle adjustment instruction. Further, in a case where an instruction for adjusting the phase of an imaging synchronization signal is input from a phase adjustment unit not shown in the drawing, the synchronization signal generation unit 102 regenerates the imaging synchronization signal (that is, adjusts the phase of an imaging synchronization signal to be generated) in response to the input phase adjustment instruction. Meanwhile, in the imaging terminal 100, it is assumed that a phase adjustment unit, not shown in the drawing, which gives an instruction for performing phase adjustment for an imaging synchronization signal is included in the round-trip-propagation-time measurement unit 106. Therefore, the synchronization signal generation unit 102 adjusts the phase of the imaging synchronization signal in accordance with the phase adjustment instruction which is output from the phase adjustment unit, not shown in the drawing, provided in the round-trip-propagation-time measurement unit 106. In addition, the synchronization signal generation unit 102 outputs a regenerated imaging synchronization signal to each of the imaging unit not shown in the drawing and the round-trip-propagation-time measurement unit 106.

The round-trip-propagation-time measurement unit 106 measures (calculates) a round trip propagation-time required for transmission and reception when wireless transfer is performed between the imaging terminal 100 and the display terminal 200, on the basis of information of the imaging terminal time which is output from the clocking unit 107. When the round-trip-propagation-time measurement unit 106 determines a round trip propagation-time in wireless transfer, first, the round-trip-propagation-time measurement unit 106 measures a scheduled transmission time which is an imaging terminal time when a round-trip-propagation-time-measurement outgoing signal for calculating a round trip propagation-time in wireless transfer is scheduled to be transmitted to the display terminal 200. In addition, the round-trip-propagation-time measurement unit 106 generates a round-trip-propagation-time-measurement outgoing signal by the determined scheduled transmission time, outputs the generated round-trip-propagation-time-measurement outgoing signal to the wireless communication unit 108, and transmits the round-trip-propagation-time-measurement outgoing signal to the display terminal 200.

Meanwhile, the round-trip-propagation-time measurement unit 106 temporarily stores information of the determined scheduled transmission time. Here, the information of the scheduled transmission time which is temporarily stored by the round-trip-propagation-time measurement unit 106 may be a scheduled transmission time determined by the round-trip-propagation-time measurement unit 106. In addition, the information of the scheduled transmission time which is temporarily stored by the round-trip-propagation-time measurement unit 106 may be information of an actual transmission time when the wireless communication unit 108 transmits the round-trip-propagation-time-measurement outgoing signal to the display terminal 200. In the following description, it is assumed that the scheduled transmission time determined by the round-trip-propagation-time measurement unit 106 and the actual transmission time when the wireless communication unit 108 transmits the round-trip-propagation-time-measurement outgoing signal to the display terminal 200 are the same time, and a description will be provided with reference to the scheduled transmission time and the actual transmission time as a "scheduled transmission time".

Thereafter, when a round-trip-propagation-time-measurement returning signal transmitted from the display terminal 200 is output from the wireless communication unit 108, the round-trip-propagation-time measurement unit 106 calculates a round trip propagation-time of a signal making a round trip through wireless transfer between the round-trip-propagation-time measurement unit 106 and the display terminal 200 on the basis of the temporarily stored information of the scheduled transmission time of the round-trip-propagation-time-measurement outgoing signal and the information of the round-trip-propagation-time-measurement returning signal which is output from the wireless communication unit 108. Here, the information of the round-trip-propagation-time-measurement returning signal includes information of a reception time when the round-trip-propagation-time-measurement outgoing signal is received, in addition to information of a receiver elapsed time included in the round-trip-propagation-time-measurement returning signal, information of a scheduled transmission time of the round-trip-propagation-time-measurement returning signal, and information of a packet identification number.

Meanwhile, the round-trip-propagation-time measurement unit 106 temporarily stores the information of the round-trip-propagation-time-measurement returning signal, inclusive of information of a reception time when the round-trip-propagation-time-measurement returning signal is received. Here, the information of the reception time which is temporarily stored by the round-trip-propagation-time measurement unit 106 may be an input time when the round-trip-propagation-time-measurement returning signal is input to the round-trip-propagation-time measurement unit 106 from the wireless communication unit 108. In addition, the information of the reception time which is temporarily stored by the round-trip-propagation-time measurement unit 106 may be information of a reception time when the wireless communication unit 108 actually receives the round-trip-propagation-time-measurement returning signal transmitted from the display terminal 200. In the following description, it is assumed that an input time when the round-trip-propagation-time-measurement returning signal is input from the wireless communication unit 108 and a reception time when the wireless communication unit 108 actually receives the round-trip-propagation-time-measurement returning signal are the same time, and a description will be provided with reference to the input time and the reception time to as a "reception time".

The round-trip-propagation-time measurement unit 106 outputs information of a calculated round trip propagation-time to the phase adjustment unit, not shown in the drawing, which is included in the round-trip-propagation-time measurement unit 106. The phase adjustment unit, not shown in the drawing, determines whether or not phase adjustment for an imaging synchronization signal is to be performed on the basis of the information of the round trip propagation-time which is output from the round-trip-propagation-time measurement unit 106.

More specifically, the phase adjustment unit, not shown in the drawing, compares the round trip propagation-time output from the round-trip-propagation-time measurement unit 106 with a round trip propagation-time determination value stored in advance. That is, the phase adjustment unit, not shown in the drawing, compares a delay time of a signal delayed due to only wireless transmission and reception between the imaging terminal 100 and the display terminal 200 with a delay time indicated by a round trip propagation-time determination value determined in advance. Further, in a case where the round trip propagation-time output from the round-trip-propagation-time measurement unit 106 is larger than the round trip propagation-time determination value determined in advance, the phase adjustment unit, not shown in the drawing, determines that phase adjustment for an imaging synchronization signal is not performed. On the other hand, in a case where the round trip propagation-time output from the round-trip-propagation-time measurement unit 106 is equal to or less than the round trip propagation-time determination value determined in advance, the phase adjustment unit, not shown in the drawing, determines that phase adjustment for an imaging synchronization signal is performed. Further, in a case where it is determined that phase adjustment for an imaging synchronization signal is performed, the phase adjustment unit, not shown in the drawing, outputs an instruction for adjusting the phase of an imaging synchronization signal to the synchronization signal generation unit 102 on the basis of the information of the round trip propagation-time which is output from the round-trip-propagation-time measurement unit 106. Here, the phase adjustment instruction which is output by the phase adjustment unit, not shown in the drawing, is an instruction for adjusting the phase of an imaging synchronization signal by causing the synchronization signal generation unit 102 to regenerate the imaging synchronization signal. More specifically, the phase adjustment unit, not shown in the drawing, adjusts the phase of an imaging synchronization signal by instructing the synchronization signal generation unit 102 to temporarily stop generating an imaging synchronization signal and to restart generating an imaging synchronization signal after waiting for a period of time shown in the information of the round trip propagation-time. In the following description, a series of instructions for causing the phase adjustment unit, not shown in the drawing, to adjust the phase of an imaging synchronization signal to be output to the synchronization signal generation unit 102 will be referred to as a "phase adjustment instruction".

Meanwhile, in a case where it is determined that phase adjustment for an imaging synchronization signal is not performed, the phase adjustment unit, not shown in the drawing, does not output a phase adjustment instruction to the synchronization signal generation unit 102. That is, in a case where phase adjustment for an imaging synchronization signal is not performed, the phase adjustment unit, not shown in the drawing, continues causing the synchronization signal generation unit 102 to generate an imaging synchronization signal without outputting a phase adjustment instruction for an imaging synchronization signal to the synchronization signal generation unit 102.

The after-cycle-adjustment accuracy estimation unit 105 estimates (calculates) an accuracy in a case where cycle adjustment for an imaging synchronization signal is temporarily executed whenever a period of time determined in advance elapses. When the accuracy of an imaging synchronization signal is estimated, first, the after-cycle-adjustment accuracy estimation unit 105 acquires information used in order for the phase adjustment unit, not shown in the drawing, included in the round-trip-propagation-time measurement unit 106 to adjust the phase of an imaging synchronization signal in a period determined in advance. More specifically, the after-cycle-adjustment accuracy estimation unit 105 acquires a plurality of round trip propagation-time determination values used to determine whether or not phase adjustment for an imaging synchronization signal is to be performed during a period determined in advance from the phase adjustment unit not shown in the drawing. Thereafter, the after-cycle-adjustment accuracy estimation unit 105 estimates (calculates) the accuracy of an imaging synchronization signal in a case where cycle adjustment is temporarily executed, on the basis of information of the plurality of round trip propagation-time determination values acquired. The after-cycle-adjustment accuracy estimation unit 105 outputs an estimation value indicating the estimated accuracy of the imaging synchronization signal (hereinafter, referred to as a "period-adjusted accuracy estimation value") to the cycle adjustment determination unit 104.

The cycle adjustment determination unit 104 determines whether or not cycle adjustment for an imaging synchronization signal is performed on the basis of the period-adjusted accuracy estimation value which is output from the after-cycle-adjustment accuracy estimation unit 105. More specifically, the cycle adjustment determination unit 104 compares the current accuracy of the imaging synchronization signal with the accuracy of an imaging synchronization signal indicated by the period-adjusted accuracy estimation value which is output from the after-cycle-adjustment accuracy estimation unit 105. That is, the cycle adjustment determination unit 104 compares an accuracy before the cycle adjustment for an imaging synchronization signal is performed with an accuracy after the cycle adjustment for an imaging synchronization signal is performed. Further, in a case where the estimated accuracy of the imaging synchronization signal is equal to the current accuracy of the imaging synchronization signal or has not been improved, the cycle adjustment determination unit 104 determines that cycle adjustment for an imaging synchronization signal is not performed. On the other hand, in a case where the estimated accuracy of the imaging synchronization signal is improved compared with the current accuracy of the imaging synchronization signal, the cycle adjustment determination unit 104 determines that cycle adjustment for an imaging synchronization signal is performed. In addition, the cycle adjustment determination unit 104 outputs information indicating a result obtained by determining whether or not cycle adjustment for an imaging synchronization signal is performed (hereinafter, referred to as a "cycle adjustment execution determination result") to the cycle adjustment unit 101.

In a case where the cycle adjustment execution determination result output from the cycle adjustment determination unit 104 indicates that cycle adjustment for an imaging synchronization signal is performed, the cycle adjustment unit 101 calculates a cycle adjustment amount for performing cycle adjustment for an imaging synchronization signal. In addition, the cycle adjustment unit 101 outputs the calculated cycle adjustment amount and an instruction for adjusting the period of an imaging synchronization signal (hereinafter, referred to as a "cycle adjustment instruction") to the synchronization signal generation unit 102.

The wireless communication unit 108 is a communication unit that transmits and receives signals and data through wireless transfer based on wireless connection established between the wireless communication unit and the display terminal 200. The wireless communication unit 108 transmits captured image data which is captured by the imaging unit not shown in the drawing and included in the imaging terminal 100 and is output to the display terminal 200 through the antenna 120 for wireless communication. In addition, the wireless communication unit 108 transmits a round-trip-propagation-time-measurement outgoing signal which is output from the round-trip-propagation-time measurement unit 106 to the display terminal 200 through the antenna 120.

In addition, the wireless communication unit 108 receives a round-trip-propagation-time-measurement returning signal transmitted from the display terminal 200 in response to the transmitted round-trip-propagation-time-measurement outgoing signal through the antenna 120. The wireless communication unit 108 outputs the received round-trip-propagation-time-measurement returning signal to the round-trip-propagation-time measurement unit 106.

The antenna 120 is an antenna for wireless communication for performing wireless communication between the imaging terminal 100 and the display terminal 200. The antenna 120 transmits a wireless signal corresponding to the captured image data or the round-trip-propagation-time-measurement outgoing signal which is output from the wireless communication unit 108 to the display terminal 200. In addition, the antenna 120 receives a wireless signal corresponding to the round-trip-propagation-time-measurement returning signal which is transmitted from the display terminal 200. In addition, the antenna 120 outputs the received round-trip-propagation-time-measurement returning signal to the wireless communication unit 108.

With such a configuration, the imaging terminal 100 adjusts the phase or period of an imaging synchronization signal (timing signal) which is used when an image is captured by the imaging unit not shown in the drawing or captured image data of the image captured by the imaging unit not shown in the drawing is transmitted to the display terminal 200. That is, the imaging terminal 100 adjusts the phase or period of an imaging synchronization signal, which is generated by the imaging terminal itself such that phases or periods of an imaging synchronization signal and a display synchronization signal are not shifted between the imaging terminal and the display terminal 200 which together constitute the image transfer system 1, so as to be matched to the phase or period of a display synchronization signal generated by the display terminal 200.

Meanwhile, a configuration may be adopted in which some or all of functions of the respective components for adjusting the phase or period of an imaging synchronization signal (for example, functions of the cycle adjustment unit 101, the cycle adjustment determination unit 104, the after-cycle-adjustment accuracy estimation unit 105, and the round-trip-propagation-time measurement unit 106 (the phase adjustment unit not shown in the drawing is included)), which are included in the imaging terminal 100, are realized as processors. In this case, a configuration in which all of the above-described functions in the imaging terminal 100 are realized by one processor may be adopted. In addition, a configuration in which the functions are realized by individual processors corresponding to the above-described respective functions in the imaging terminal 100, that is, a plurality of processors may be adopted. Meanwhile, the above-described processors can be realized by, for example, programs recorded on a general-purpose central processing unit (CPU) and a memory. In addition, a configuration in which some or all of the above-described respective functions in the imaging terminal 100 are realized by an integrated circuit such as a dedicated large scale integration (LSI), that is, a so-called application specific integrated circuit (ASIC) may be adopted.

Subsequently, the respective components included in the display terminal 200 will be described.

The source oscillation clock generation unit 205 generates a source oscillation clock signal which is the source of a display reference clock signal for operating the display terminal 200. The source oscillation clock generation unit 205 is a so-called clock generator which is configured to include, for example, a crystal oscillation IC or the like. The source oscillation clock generation unit 205 generates a source oscillation clock signal when the display terminal 200 is started up. The display reference clock signal is generated on the basis of the source oscillation clock signal generated by the source oscillation clock generation unit 205. Meanwhile, in the following description, for ease of description, a description will be provided on the assumption that the source oscillation clock generation unit 205 generates a display reference clock signal.

The clocking unit 203 measures a time in the display terminal 200 (display terminal time) on the basis of the display reference clock signal generated by the source oscillation clock generation unit 205. The clocking unit 203 outputs information of the clocked display terminal time to the round-trip-propagation-time-measurement assistance unit 202. Meanwhile, the clocking unit 203 may also output information of the clocked display terminal time to the wireless communication unit 201.

The synchronous signal generation unit 204 generates a synchronization signal (display synchronization signal) such as a vertical synchronization signal or a horizontal synchronization signal indicating the start or termination of a validity period of an image corresponding to captured image data transmitted from the imaging terminal 100 and displayed on a display unit not shown in the drawing and included in the display terminal 200 on the basis of the display reference clock signal generated by the source oscillation clock generation unit 205. The synchronous signal generation unit 204 outputs the generated display synchronization signal to a display image processing unit, not shown in the drawing, which performs a process of generating an image corresponding to captured image data transmitted from the imaging terminal 100 and displaying the generated image on a display unit, not shown in the drawing, which is configured to include a display device such as a liquid crystal display (LCD), the display unit not shown in the drawing, or the like.

The round-trip-propagation-time-measurement assistance unit 202 generates a round-trip-propagation-time-measurement returning signal corresponding to a round-trip-propagation-time-measurement outgoing signal transmitted from the imaging terminal 100, on the basis of the information of the display terminal time which is output from the clocking unit 203. In addition, the round-trip-propagation-time-measurement assistance unit 202 outputs the generated round-trip-propagation-time-measurement returning signal to the wireless communication unit 201 and transmits the round-trip-propagation-time-measurement returning signal to the imaging terminal 100. Thereby, the round-trip-propagation-time-measurement assistance unit 202 assists measurement (calculation) of a round trip propagation-time, performed in the imaging terminal 100, which is required for transmission and reception when wireless transfer is performed between the imaging terminal 100 and the display terminal 200.

When the round-trip-propagation-time-measurement assistance unit 202 generates a round-trip-propagation-time-measurement returning signal, first, the round-trip-propagation-time-measurement assistance unit 202 determines a scheduled transmission time which is a display terminal time when the round-trip-propagation-time-measurement returning signal corresponding to a received round-trip-propagation-time-measurement outgoing signal is scheduled to be transmitted to the display terminal 200. In addition, the round-trip-propagation-time-measurement assistance unit 202 calculates a difference between the determined scheduled transmission time of the round-trip-propagation-time-measurement returning signal and a reception time of the round-trip-propagation-time-measurement outgoing signal as a receiver elapsed time.

Meanwhile, the round-trip-propagation-time-measurement assistance unit 202 temporarily stores information of the reception time of the round-trip-propagation-time-measurement outgoing signal used when the receiver elapsed time is calculated. Here, the information of the reception time which is temporarily stored by the round-trip-propagation-time-measurement assistance unit 202 may be an input time when the round-trip-propagation-time-measurement outgoing signal is input to the round-trip-propagation-time-measurement assistance unit 202 from the wireless communication unit 201. In addition, the information of the reception time which is temporarily stored by the round-trip-propagation-time-measurement assistance unit 202 may be information of a reception time when the wireless communication unit 201 actually receives the round-trip-propagation-time-measurement outgoing signal transmitted from the imaging terminal 100 and output from the wireless communication unit 201. In the following description, it is assumed that the input time when the round-trip-propagation-time-measurement outgoing signal is input from the wireless communication unit 201 and the reception time when the wireless communication unit 201 actually receives the round-trip-propagation-time-measurement outgoing signal are the same, and a description will be provided with reference to the input time and the reception time as an "input time" in order to make a distinction from the reception time used in the round-trip-propagation-time measurement unit 106.

In addition, the round-trip-propagation-time-measurement assistance unit 202 generates a round-trip-propagation-time-measurement returning signal including the calculated receiver elapsed time, information of the determined scheduled transmission time of the round-trip-propagation-time-measurement returning signal, and information of a packet identification number extracted from the round-trip-propagation-time-measurement outgoing signal by the determined scheduled transmission time, outputs the generated round-trip-propagation-time-measurement returning signal to the wireless communication unit 201, and transmits the round-trip-propagation-time-measurement returning signal to the imaging terminal 100.

The wireless communication unit 201 is a communication unit that transmits and receives signals and data through wireless transfer based on wireless connection established between the wireless communication unit and the imaging terminal 100. The wireless communication unit 201 receives captured image data or a round-trip-propagation-time-measurement outgoing signal which is transmitted from the imaging terminal 100 through the antenna 220 for wireless communication. The wireless communication unit 201 outputs the received captured image data to the display image processing unit not shown in the drawing. In addition, the wireless communication unit 201 outputs the received round-trip-propagation-time-measurement outgoing signal to the round-trip-propagation-time-measurement assistance unit 202.

In addition, the wireless communication unit 201 transmits a round-trip-propagation-time-measurement returning signal which is output from the round-trip-propagation-time-measurement assistance unit 202 in response to a round-trip-propagation-time-measurement outgoing signal transmitted from the imaging terminal 100 to the imaging terminal 100 through the antenna 220.

The antenna 220 is an antenna for wireless communication for performing wireless communication between the display terminal 200 and the imaging terminal 100. The antenna 220 receives a wireless signal corresponding to captured image data or a round-trip-propagation-time-measurement outgoing signal which is transmitted from the imaging terminal 100. In addition, the antenna 220 outputs the received captured image data or round-trip-propagation-time-measurement outgoing signal to the wireless communication unit 201. In addition, the antenna 220 transmits a wireless signal corresponding to a round-trip-propagation-time-measurement returning signal which is output from the wireless communication unit 201 to the imaging terminal 100.

With such a configuration, the display terminal 200 assists adjustment of the phase or period of an imaging synchronization signal (timing signal) which is used when an image is captured by the imaging unit not shown in the drawing and included in the imaging terminal 100 or captured image data of the image captured by the imaging unit not shown in the drawing is transmitted to the display terminal 200. That is, the display terminal 200 assists a process in which the imaging terminal 100 constituting the image transfer system 1 together with the display terminal adjusts the phase or period of an imaging synchronization signal, which is generated such that the phases or periods of an imaging synchronization signal and a display synchronization signal are not shifted between the imaging terminal and the display terminal 200, so as to match the phase or period of a display synchronization signal generated by the display terminal 200 itself.

Meanwhile, a configuration may be adopted in which some or all of functions of the respective components for assisting adjustment of the phase or period of an imaging synchronization signal performed by the imaging terminal 100 (for example, the function of the round-trip-propagation-time-measurement assistance unit 202 and the function of the display image processing unit, not shown in the drawing, which performs a process of generating an image corresponding to captured image data transmitted from the imaging terminal 100 and displaying the image on the display unit not shown in the drawing), which are included in the display terminal 200, are realized as processors. In this case, a configuration in which all of the above-described functions in the display terminal 200 are realized by one processor may be adopted. In addition, a configuration in which the functions are realized by individual processors corresponding to the above-described respective functions in the display terminal 200, that is, a plurality of processors may be adopted. Meanwhile, the above-described processors can be realized by, for example, programs recorded on a general-purpose CPU and a memory. In addition, a configuration in which some or all of the above-described respective functions in the display terminal 200 are realized by an integrated circuit such as a dedicated LSI (a so-called ASIC) may be adopted.

With such a configuration, in the image transfer system 1, the imaging terminal 100 adjusts the phase or period of an imaging synchronization signal generated on the basis of an imaging reference clock signal generated by the source oscillation clock generation unit 103 included in the imaging terminal 100, on the basis of a round-trip-propagation-time-measurement outgoing signal transmitted to the display terminal 200 and a round-trip-propagation-time-measurement returning signal transmitted from the display terminal 200. That is, in the image transfer system 1, a timing when the imaging terminal 100 wirelessly transfers captured image data of an image captured by the imaging unit not shown in the drawing to the display terminal 200 is matched to a timing when the display terminal 200 displays an image corresponding to the captured image data on the display unit not shown in the drawing. Thereby, in the image transfer system 1, the display terminal 200 can stably display an image corresponding to captured image data wirelessly transferred from the imaging terminal 100 on the display unit not shown in the drawing.

Figure 3:
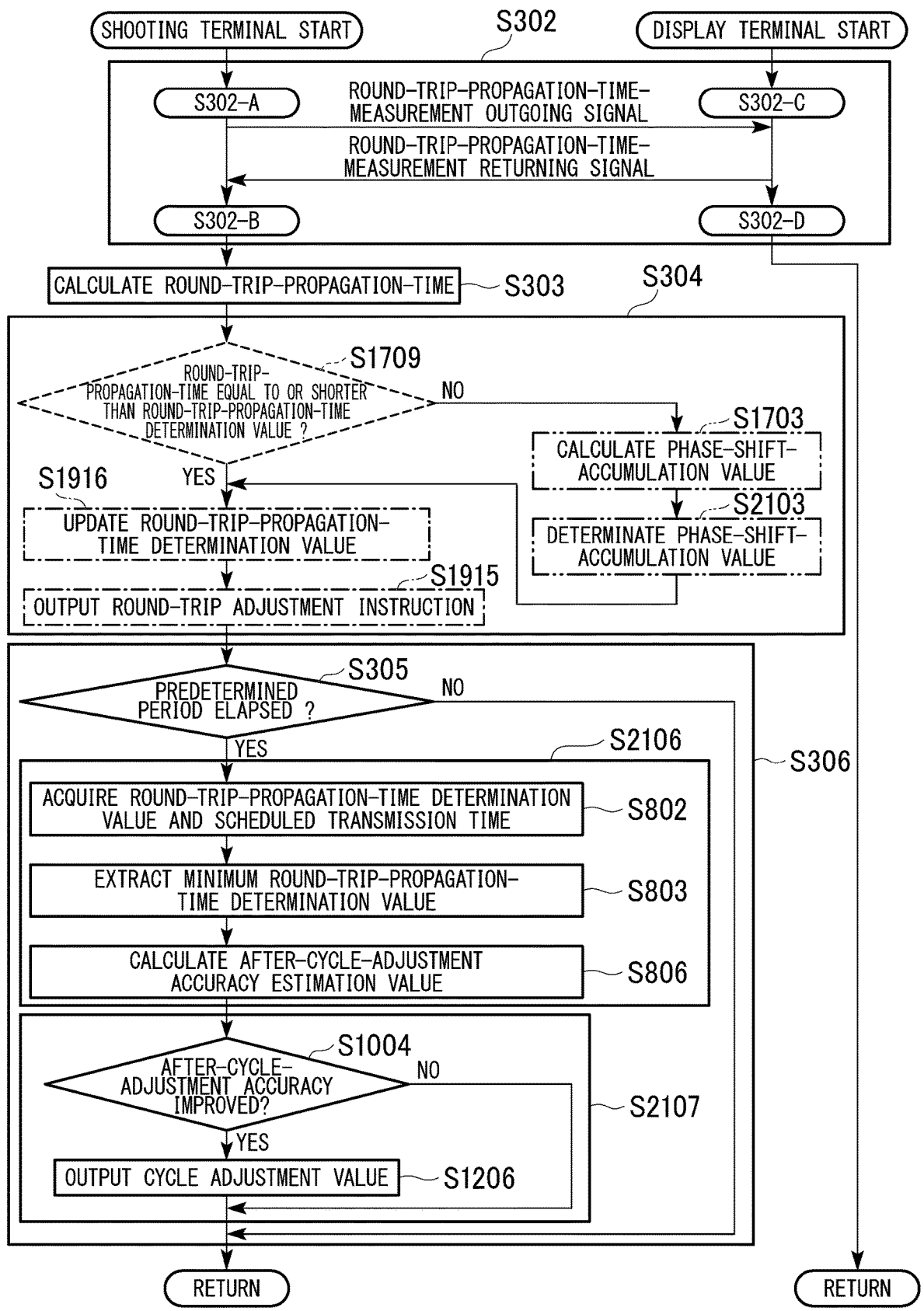
FIG. 3 is a flow chart showing processing procedures in the image transmission system according to the first embodiment of the present invention.

Next, a more specific operation of performing phase adjustment for a timing signal in the image transfer system 1 will be described. FIG. 3 is a flowchart showing a processing procedure of the image transfer system 1 in the first embodiment of the present invention.

In the image transfer system 1, when a cycle adjustment process is started, the imaging terminal 100 transmits a round-trip-propagation-time-measurement outgoing signal to the display terminal 200, and the display terminal 200 transmits a round-trip-propagation-time-measurement returning signal corresponding to the round-trip-propagation-time-measurement outgoing signal to the imaging terminal 100 in step S302. More specifically, in the imaging terminal 100, the round-trip-propagation-time measurement unit 106 transmits the round-trip-propagation-time-measurement outgoing signal to the display terminal 200 through the wireless communication unit 108, and the antenna 120 and receives the round-trip-propagation-time-measurement returning signal transmitted from the display terminal 200 in the processes of steps S302-A and S302-B included in step S302. On the other hand, in the display terminal 200, when a cycle adjustment process is started, the round-trip-propagation-time-measurement assistance unit 202 receives a round-trip-propagation-time-measurement outgoing signal transmitted from the imaging terminal 100 through the antenna 220 and the wireless communication unit 201 in the processes of steps S302-C and S302-D included in step S302 and transmits a round-trip-propagation-time-measurement returning signal corresponding to the received round-trip-propagation-time-measurement outgoing signal to the imaging terminal 100.

Thereafter, in the image transfer system 1, in step S303, the imaging terminal 100 calculates a round trip propagation-time required for transmission and reception in wireless transfer between the imaging terminal 100 and the display terminal 200. More specifically, the round-trip-propagation-time measurement unit 106 calculates a round trip propagation-time required for transmission and reception in wireless transfer between the imaging terminal 100 and the display terminal 200 on the basis of information regarding the transmitted round-trip-propagation-time-measurement outgoing signal and information included in the round-trip-propagation-time-measurement returning signal transmitted from the display terminal 200.

Thereafter, in the image transfer system 1, in step S304, the imaging terminal 100 adjusts the phase of an imaging synchronization signal on the basis of the round trip propagation-time, required for transmission and reception in wireless transfer between the imaging terminal 100 and the display terminal 200, which is calculated in step S303.

More specifically, in step S304, the phase adjustment unit, not shown in the drawing, which is included in the round-trip-propagation-time measurement unit 106 determines whether or not the round trip propagation-time calculated by the round-trip-propagation-time measurement unit 106 is equal to or less than a round trip propagation-time determination value determined in advance (step S1709). In a result of the determination in step S1709, in a case where the calculated round trip propagation-time is equal to or less than the round trip propagation-time determination value determined in advance ("YES" in step S1709), the phase adjustment unit not shown in the drawing determines that phase adjustment is performed. In this case, the phase adjustment unit not shown in the drawing updates the round trip propagation-time calculated by the round-trip-propagation-time measurement unit 106, that is, a round trip propagation-time which is a short period of time (small value) determined to be equal to or less than the round trip propagation-time determination value determined in advance, as a round trip propagation-time determination value when a round trip propagation-time calculated next by the round-trip-propagation-time measurement unit 106 is determined (step S1916). Thereafter, the phase adjustment unit not shown in the drawing outputs a phase adjustment instruction for adjusting the phase of an imaging synchronization signal to the synchronization signal generation unit 102 on the basis of the round trip propagation-time calculated by the round-trip-propagation-time measurement unit 106 (step S1915). Thereby, the synchronization signal generation unit 102 performs phase adjustment for an imaging synchronization signal to be generated, in response to the phase adjustment instruction which is output from the phase adjustment unit not shown in the drawing.

On the other hand, in a result of the determination in step S1709, in a case where the calculated round trip propagation-time is not equal to or less than the round trip propagation-time determination value determined in advance, that is, the calculated round trip propagation-time is greater than the round trip propagation-time determination value determined in advance ("NO" in step S1709), the phase adjustment unit not shown in the drawing determines that phase adjustment is not performed. In this case, the phase adjustment unit not shown in the drawing terminates the process of step S304.

Meanwhile, the flowchart of the processing procedure of the image transfer system 1 which is shown in FIG. 3 shows a case where the phase adjustment unit not shown in the drawing performs a process of updating a round trip propagation-time determination value at the time of determining a round trip propagation-time calculated next by the round-trip-propagation-time measurement unit 106 (step S1916) in step S304 even when it is determined that the round trip propagation-time calculated in step S303 is not equal to or less than the round trip propagation-time determination value determined in advance ("NO" in step S1709).

More specifically, the phase adjustment unit not shown in the drawing measures (accumulates) a period of time for which it is determined that phase adjustment for an imaging synchronization signal is not performed in step S1709 (hereinafter, referred to as a "phase-unadjusted time") and calculates a shift amount between phases of an imaging synchronization signal and a display synchronization signal (hereinafter, referred to as a "phase shift cumulative value") on the basis of the accumulated phase-unadjusted time (step S1703). In addition, the phase adjustment unit not shown in the drawing determines the calculated phase shift cumulative value on the basis of the round trip propagation-time determination value determined in advance (step S2103). In a result of the determination in step S2103, in a case where the calculated phase shift cumulative value is greater than a predetermined rate of the round trip propagation-time determination value determined in advance, the phase adjustment unit not shown in the drawing estimates that the shift amount between the phases of the imaging synchronization signal and the display synchronization signal is large. In this case, the phase adjustment unit not shown in the drawing updates the roundtrip propagation-time determination value to a short period of time (small value) in step S1916.

Meanwhile, in a case where the phase adjustment unit not shown in the drawing estimates that the shift amount between the phases of the imaging synchronization signal and the display synchronization signal is large, the phase adjustment unit may be configured to output a phase adjustment instruction based on the round trip propagation-time calculated by the round-trip-propagation-time measurement unit 106 to the synchronization signal generation unit 102 in step S1915. Thereby, even when the phase adjustment unit not shown in the drawing estimates that the shift amount between the phases of the imaging synchronization signal and the display synchronization signal is large, the synchronization signal generation unit 102 performs phase adjustment for an imaging synchronization signal to be generated. Meanwhile, in a result of the determination in step S1709, in a case where the calculated round trip propagation-time is not equal to or less than the round trip propagation-time determination value determined in advance ("NO" in step S1709), the phase adjustment unit not shown in the drawing may terminate the process of step S304 without performing the process of step S1915. That is, in a case where it is determined that phase adjustment is not performed, the phase adjustment unit not shown in the drawing may not output a phase adjustment instruction.

On the other hand, in a result of determination in step S2103, in a case where the calculated phase shift cumulative value is equal to or less than the predetermined rate of the round trip propagation-time determination value determined in advance, the phase adjustment unit not shown in the drawing estimates that the shift amount between the phases of the imaging synchronization signal and the display synchronization signal is small. In this case, the phase adjustment unit not shown in the drawing continues accumulating a phase-unadjusted time to calculate a phase shift cumulative value. Meanwhile, in a case where the phase adjustment unit not shown in the drawing determines that phase adjustment is performed ("YES" in step S1709), the phase adjustment unit initializes the phase shift cumulative value, that is, sets the phase-unadjusted time to be 0. Thereby, the phase adjustment unit not shown in the drawing measures (accumulates) again a phase-unadjusted time for which a state where phase adjustment for an imaging synchronization signal is not performed from a time when the last phase adjustment for an imaging synchronization signal was performed.

In this manner, in the image transfer system 1, the imaging terminal 100 adjusts the phases of the imaging synchronization signal and the display synchronization signal so as not to be shifted with the elapse of time in the process of step S304.

Meanwhile, in the image transfer system 1, when the after-cycle-adjustment accuracy estimation unit 105 included in the imaging terminal 100 can acquire a plurality of round trip propagation-time determination values in a period determined in advance which are used by the phase adjustment unit not shown in the drawing in order to determine whether or not phase adjustment for an imaging synchronization signal is to be performed, it is possible to estimate (calculate) an accuracy in a case where cycle adjustment for an imaging synchronization signal is temporarily executed. More specifically, in the image transfer system 1, in step S304 in the flowchart of the processing procedure of the image transfer system 1 shown in FIG. 3, when at least a process of updating the round trip propagation-time determination value in step S1916 is performed, the after-cycle-adjustment accuracy estimation unit 105 can estimate the accuracy of an imaging synchronization signal. In this case, the phase adjustment unit not shown in the drawing updates the round trip propagation-time calculated by the round-trip-propagation-time measurement unit 106 as a round trip propagation-time determination value. In other words, in the image transfer system 1, in step S304, the phase of an imaging synchronization signal does not necessarily need to be adjusted. Therefore, in the image transfer system 1, in step S304 in the flowchart of the processing procedure of the image transfer system 1 shown in FIG. 3, the processes of steps S1703, S2103, and S1916 may be performed without performing the processes of steps S1709 and S1915. Further, in the image transfer system 1, in step S304 in the flowchart of the processing procedure of the image transfer system 1 shown in FIG. 3, the processes of steps S1916 and S1915 may be performed without performing the processes of steps S1709, S1703, and S2103. Further, in the image transfer system 1, in step S304 in the flowchart of the processing procedure of the image transfer system 1 shown in FIG. 3, the processes of steps S1703, S2103, and S1916 may be performed after the process of step S1709 is performed. Further, in the image transfer system 1, in step S304 in the flowchart of the processing procedure of the image transfer system 1 shown in FIG. 3, the processes of steps S1916 and S1915 may be performed after the process of step S1709 is performed.

Thereafter, in the image transfer system 1, in step S306, the imaging terminal 100 adjusts the period of an imaging synchronization signal on the basis of the plurality of round trip propagation-time determination values updated in the process of step S1916 included in step S304.

More specifically, in step S306, the after-cycle-adjustment accuracy estimation unit 105 determines whether or not a predetermined period of time determined in advance has elapsed after the period of a previous imaging synchronization signal is adjusted (step S305). In a result of the determination in step S305, in a case where the predetermined period of time determined in advance has not elapsed after the period of the previous imaging synchronization signal is adjusted ("NO" in step S305), the after-cycle-adjustment accuracy estimation unit 105 determines that cycle adjustment is not performed. In this case, the after-cycle-adjustment accuracy estimation unit 105 terminates the process of step S305.

On the other hand, in a result of the determination in step S305, in a case where the predetermined period of time determined in advance has elapsed after the period of the previous imaging synchronization signal is adjusted ("YES" in step S305), the after-cycle-adjustment accuracy estimation unit 105 determines that cycle adjustment is performed. In this case, the after-cycle-adjustment accuracy estimation unit 105 acquires a combination of a plurality of round trip propagation-time determination values equivalent to a predetermined number of times per unit time determined in advance, scheduled transmission times of corresponding outward path signals for round trip propagation-time measurement, and scheduled transmission times of corresponding return path signals for round trip propagation-time measurement from the phase adjustment unit, not shown in the drawing, which is provided in the round-trip-propagation-time measurement unit 106 (step S802).

Meanwhile, in the flowchart of the processing procedure of the image transfer system 1 which is shown in FIG. 3, in step S304, the phase adjustment unit not shown in the drawing performs a phase adjustment process for an imaging synchronization signal. For this reason, in step S802, the after-cycle-adjustment accuracy estimation unit 105 finally performs phase adjustment for an imaging synchronization signal and acquires a combination of the plurality of round trip propagation-time determination values equivalent to the predetermined number of times per unit time determined in advance which are used to determine a round trip propagation-time in a period in which is determined that phase adjustment is not performed, the scheduled transmission times of the corresponding outward path signals for round trip propagation-time measurement transmitted to calculate the respective round trip propagation-times, and the scheduled transmission times of the corresponding return path signals for round trip propagation-time measurement from the phase adjustment unit, not shown in the drawing.

Subsequently, the after-cycle-adjustment accuracy estimation unit 105 extracts a minimum round trip propagation-time determination value for each unit time from the plurality of roundtrip propagation-time determination values acquired (step S803). That is, the after-cycle-adjustment accuracy estimation unit 105 extracts a minimum round trip propagation-time determination value of a predetermined number of times (hereinafter, referred to as a "minimum determination value").

Thereafter, the after-cycle-adjustment accuracy estimation unit 105 calculates an estimation value of the accuracy of an imaging synchronization signal (period-adjusted accuracy estimation value) in a case where cycle adjustment is performed by temporarily waiting for the generation of an imaging synchronization signal for a period of time represented by a round trip propagation-time determination value of a minimum determination value, on the basis of information of the extracted minimum determination value of the predetermined number of times (step S806). In addition, the after-cycle-adjustment accuracy estimation unit 105 outputs the calculated period-adjusted accuracy estimation value and information of a combination of a round trip propagation-time determination value, a scheduled transmission time of a round-trip-propagation-time-measurement outgoing signal, and a scheduled transmission time of a round-trip-propagation-time-measurement returning signal which are acquired this time from the phase adjustment unit not shown in the drawing to the cycle adjustment determination unit 104.

Subsequently, the cycle adjustment determination unit 104 determines whether or not the period-adjusted accuracy estimation value output from the after-cycle-adjustment accuracy estimation unit 105 is a value indicating that the accuracy of the period of an imaging synchronization signal has been improved (step S1004). In the result of the determination in step S1004, in a case where cycle adjustment determination unit 104 determines that the accuracy of the period of an imaging synchronization signal has not been improved ("NO" in step S1004), the process of step S305 is terminated. That is, the imaging terminal 100 does not perform cycle adjustment to the period of an imaging synchronization signal which is temporarily estimated by the after-cycle-adjustment accuracy estimation unit 105 on the basis of a combination of a round trip propagation-time determination value, a scheduled transmission time of a round-trip-propagation-time-measurement outgoing signal, and a scheduled transmission time of a round-trip-propagation-time-measurement returning signal which are acquired this time from the phase adjustment unit not shown in the drawing.

On the other hand, in a result of the determination in step S1004, in a case where the cycle adjustment determination unit 104 determines that the accuracy of the period of an imaging synchronization signal has been improved ("YES" in step S1004), the cycle adjustment determination unit 104 outputs information of the cycle adjustment execution determination result indicating that the accuracy has been improved to the cycle adjustment unit 101. Here, the information of the cycle adjustment execution determination result which is output to the cycle adjustment unit 101 by the cycle adjustment determination unit 104 includes a period-adjusted accuracy estimation value which is output from the after-cycle-adjustment accuracy estimation unit 105, and information of a combination of a round trip propagation-time determination value, a scheduled transmission time of a round-trip-propagation-time-measurement outgoing signal, and a scheduled transmission time of a round-trip-propagation-time-measurement returning signal which are acquired this time from the phase adjustment unit not shown in the drawing.

Thereby, the cycle adjustment unit 101 calculates a cycle adjustment amount for performing cycle adjustment for an imaging synchronization signal on the basis of a period-adjusted accuracy estimation value which is output from the cycle adjustment determination unit 104, and a combination of a round trip propagation-time determination value, a scheduled transmission time of a round-trip-propagation-time-measurement outgoing signal, and a scheduled transmission time of a round-trip-propagation-time-measurement returning signal (step S1206). In addition, the cycle adjustment unit 101 outputs the calculated cycle adjustment amount to the synchronization signal generation unit 102 together with a cycle adjustment instruction. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 101.

In this manner, in the image transfer system 1, the imaging terminal 100 performs adjustment so that the periods of the imaging synchronization signal and the display synchronization signal are not shifted with the elapse of time in the process of step S306.

Meanwhile, in step S306 in the flowchart of the processing procedure of the image transfer system 1 which is shown in FIG. 3, a process in which the after-cycle-adjustment accuracy estimation unit 105 calculates a period-adjusted accuracy estimation value in steps S802 to S806 is collectively shown as step S2106. Further, in step S306 in the flowchart of the processing procedure of the image transfer system 1 which is shown in FIG. 3, a process in which the cycle adjustment determination unit 104 determines whether or not the accuracy of the period of an imaging synchronization signal has been improved in step S1004 and a process in which the cycle adjustment unit 101 calculates a cycle adjustment amount in step S1206 are collectively shown as step S2107.

Figure 4:
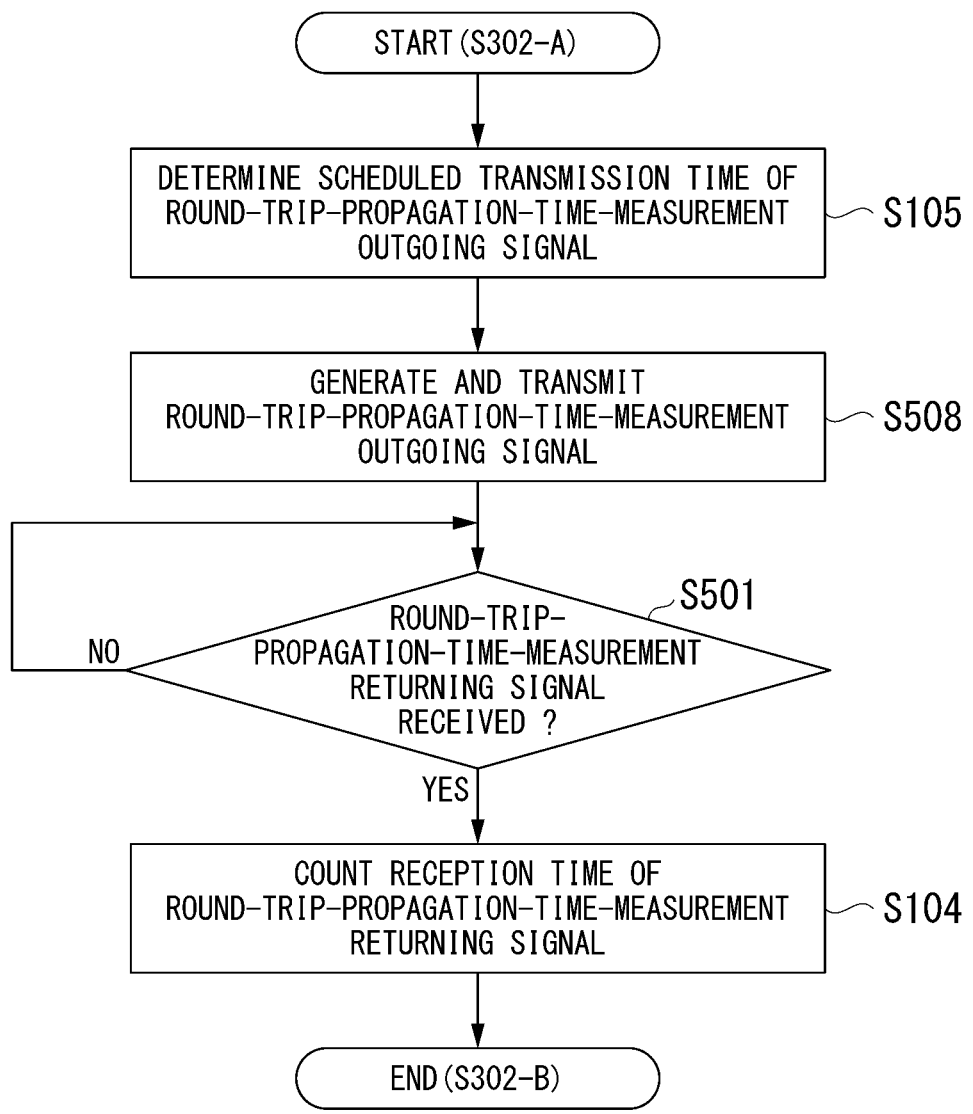
FIG. 4 is a flow chart showing processing procedures of transmission and reception processing of a round-trip-propagation-time-measurement outgoing signal and a round-trip-propagation-time-measurement returning signal in an imaging terminal configuring the image transmission system according to the first embodiment of the present invention.
Figure 5:
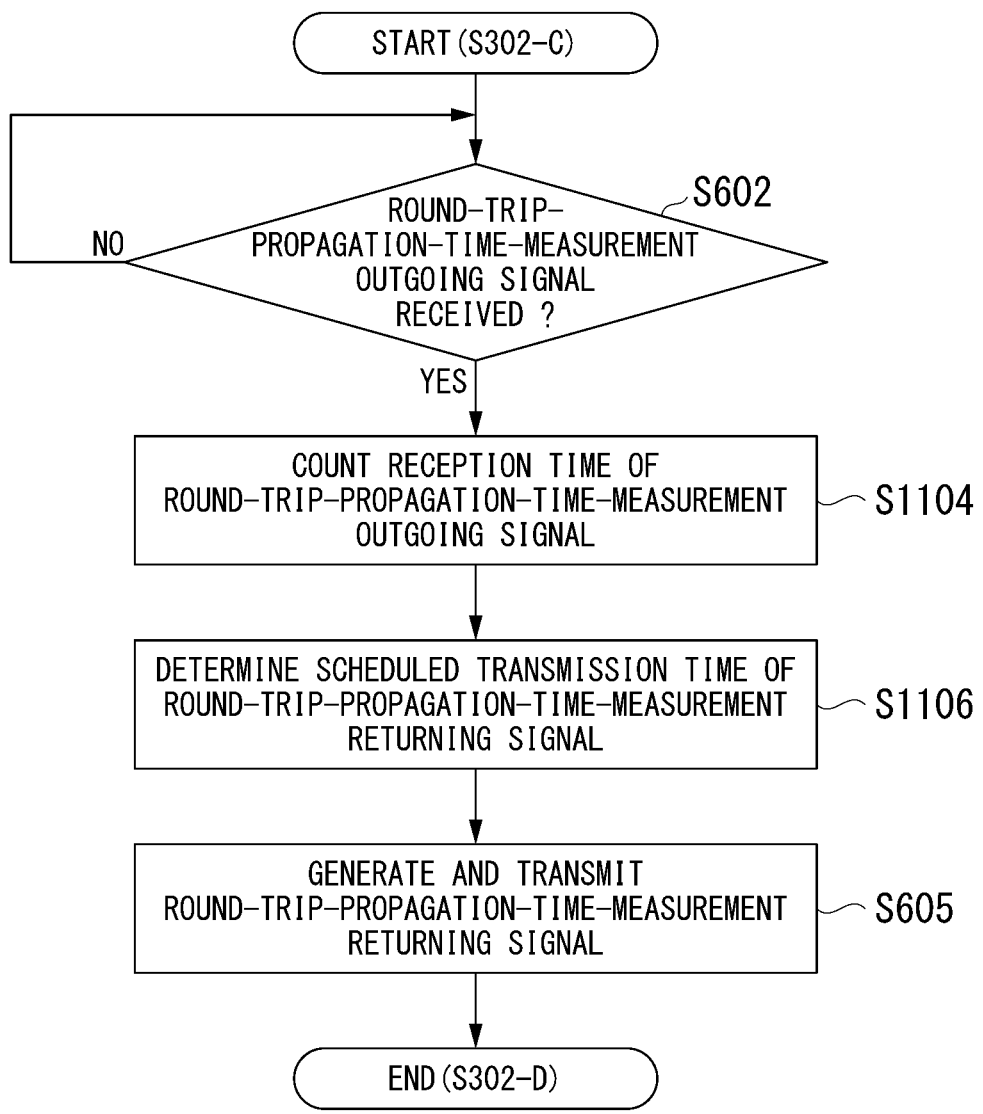
FIG. 5 is a flow chart showing processing procedures of transmission and reception processing of the round-trip-propagation-time-measurement outgoing signal and the round-trip-propagation-time-measurement returning signal in a display terminal configuring the image transmission system according to the first embodiment of the present invention.

Hereinafter, each of processes in the image transfer system 1 will be described in more detail. First, a process of transmitting and receiving a round-trip-propagation-time-measurement outgoing signal and a round-trip-propagation-time-measurement returning signal in the image transfer system 1 (step S302) will be described in more detail. FIG. 4 is a flowchart showing a procedure of a process of transmitting and receiving a round-trip-propagation-time-measurement outgoing signal and a round-trip-propagation-time-measurement returning signal by the imaging terminal 100 constituting the image transfer system 1 in the first embodiment of the present invention. In addition, FIG. 5 is a flowchart showing a procedure of a process of transmitting and receiving a round-trip-propagation-time-measurement outgoing signal and a round-trip-propagation-time-measurement returning signal by the display terminal 200 constituting the image transfer system 1 in the first embodiment of the present invention.

First, a procedure of a process of transmitting and receiving a round-trip-propagation-time-measurement outgoing signal and a round-trip-propagation-time-measurement returning signal by the imaging terminal 100 will be described with reference to FIG. 4. When a cycle adjustment process is started in the imaging terminal 100, the round-trip-propagation-time measurement unit 106 determines a scheduled transmission time when a round-trip-propagation-time-measurement outgoing signal is scheduled to be transmitted to the display terminal 200 (step S105). In addition, the round-trip-propagation-time measurement unit 106 generates a round-trip-propagation-time-measurement outgoing signal by the determined scheduled transmission time, outputs the generated round-trip-propagation-time-measurement outgoing signal to the wireless communication unit 108, and transmits the round-trip-propagation-time-measurement outgoing signal to the display terminal 200 (step S508).

Thereafter, the round-trip-propagation-time measurement unit 106 confirms whether or not the wireless communication unit 108 has received a round-trip-propagation-time-measurement returning signal transmitted from the display terminal 200 in response to the transmitted round-trip-propagation-time-measurement outgoing signal (step S501). Meanwhile, the process of step S501 in which the round-trip-propagation-time measurement unit 106 confirms whether or not the wireless communication unit 108 has received a round-trip-propagation-time-measurement returning signal transmitted from the display terminal 200 can be performed according to whether or not the round-trip-propagation-time-measurement returning signal transmitted from the display terminal 200 has been output from the wireless communication unit 108.

As a result of the confirmation in step S501, in a case where the wireless communication unit 108 has not received the round-trip-propagation-time-measurement returning signal transmitted from the display terminal 200 ("NO" in step S501), the round-trip-propagation-time measurement unit 106 repeats the process of step S501 to wait for the round-trip-propagation-time-measurement returning signal to be transmitted from the display terminal 200. On the other hand, as a result of the confirmation in step S501, in a case where the wireless communication unit 108 has received the round-trip-propagation-time-measurement returning signal transmitted from the display terminal 200 ("YES" in step S501), the round-trip-propagation-time measurement unit 106 measures a reception time of the round-trip-propagation-time-measurement returning signal on the basis of the round-trip-propagation-time-measurement returning signal which is output from the wireless communication unit 108 (step S104).

Subsequently, a procedure of a process of transmitting and receiving a round-trip-propagation-time-measurement outgoing signal and a round-trip-propagation-time-measurement returning signal by the display terminal 200 will be described with reference to FIG. 5. When a cycle adjustment process is started in the display terminal 200, the round-trip-propagation-time-measurement assistance unit 202 confirms whether or not the wireless communication unit 201 has received a round-trip-propagation-time-measurement outgoing signal which is transmitted from the imaging terminal 100 (step S602). Meanwhile, the process of step S602 in which the round-trip-propagation-time-measurement assistance unit 202 confirms whether or not the wireless communication unit 201 has received a round-trip-propagation-time-measurement outgoing signal transmitted from the imaging terminal 100 can be performed according to whether or not the round-trip-propagation-time-measurement outgoing signal transmitted from the imaging terminal 100 has been output from the wireless communication unit 201.

As a result of the confirmation in step S602, in a case where the wireless communication unit 201 has not received the round-trip-propagation-time-measurement outgoing signal transmitted from the imaging terminal 100 ("NO" in step S602), the round-trip-propagation-time-measurement assistance unit 202 repeats the process of step S602 to wait for the round-trip-propagation-time-measurement outgoing signal to be transmitted from the imaging terminal 100. On the other hand, as a result of the confirmation in step S602, in a case where the wireless communication unit 201 has received the round-trip-propagation-time-measurement outgoing signal transmitted from the imaging terminal 100 ("YES" in step S602), the round-trip-propagation-time-measurement assistance unit 202 measures an input time which is a reception time of the round-trip-propagation-time-measurement outgoing signal on the basis of the round-trip-propagation-time-measurement outgoing signal which is output from the wireless communication unit 201 (step S1104).

Thereafter, the round-trip-propagation-time-measurement assistance unit 202 determines a scheduled transmission time when a round-trip-propagation-time-measurement returning signal corresponding to a round-trip-propagation-time-measurement outgoing signal transmitted from the imaging terminal 100 is scheduled to be transmitted to the imaging terminal 100 (step S1106). In addition, the round-trip-propagation-time-measurement assistance unit 202 generates a round-trip-propagation-time-measurement returning signal by the determined scheduled transmission time, outputs the generated round-trip-propagation-time-measurement returning signal to the wireless communication unit 201, and transmits the round-trip-propagation-time-measurement returning signal to the imaging terminal 100 (step S605).

In this manner, in the imaging terminal 100 of the image transfer system 1, the round-trip-propagation-time measurement unit 106 transmits a round-trip-propagation-time-measurement outgoing signal to the display terminal 200, and measures a reception time of a round-trip-propagation-time-measurement returning signal transmitted from the display terminal 200 in response to the transmitted round-trip-propagation-time-measurement outgoing signal. Further, in the display terminal 200 of the image transfer system 1, the round-trip-propagation-time-measurement assistance unit 202 measures an input time of a round-trip-propagation-time-measurement outgoing signal transmitted from the imaging terminal 100 and transmits a round-trip-propagation-time-measurement returning signal corresponding to the round-trip-propagation-time-measurement outgoing signal to the imaging terminal 100. That is, in the image transfer system 1, the display terminal 200 returns the round-trip-propagation-time-measurement returning signal in response to the round-trip-propagation-time-measurement outgoing signal transmitted from the imaging terminal 100.

Meanwhile, in the image transfer system 1, captured image data is wirelessly transferred from the imaging terminal 100 to the display terminal 200. For this reason, transmission and reception of a round-trip-propagation-time-measurement outgoing signal and a round-trip-propagation-time-measurement returning signal between the round-trip-propagation-time measurement unit 106 and the round-trip-propagation-time-measurement assistance unit 202 are performed in a period in which the captured image data is not wirelessly transferred. That is, in the image transfer system 1, each of the round-trip-propagation-time measurement unit 106 and the round-trip-propagation-time-measurement assistance unit 202 performs transmission and reception of a round-trip-propagation-time-measurement outgoing signal and a round-trip-propagation-time-measurement returning signal at a timing when wireless transfer of captured image data from the imaging terminal 100 to the display terminal 200 is not disturbed. Here, an example of a timing when transmission and reception of a round-trip-propagation-time-measurement outgoing signal and a round-trip-propagation-time-measurement returning signal are performed between the round-trip-propagation-time measurement unit 106 and the round-trip-propagation-time-measurement assistance unit 202 will be described.

Figure 6:
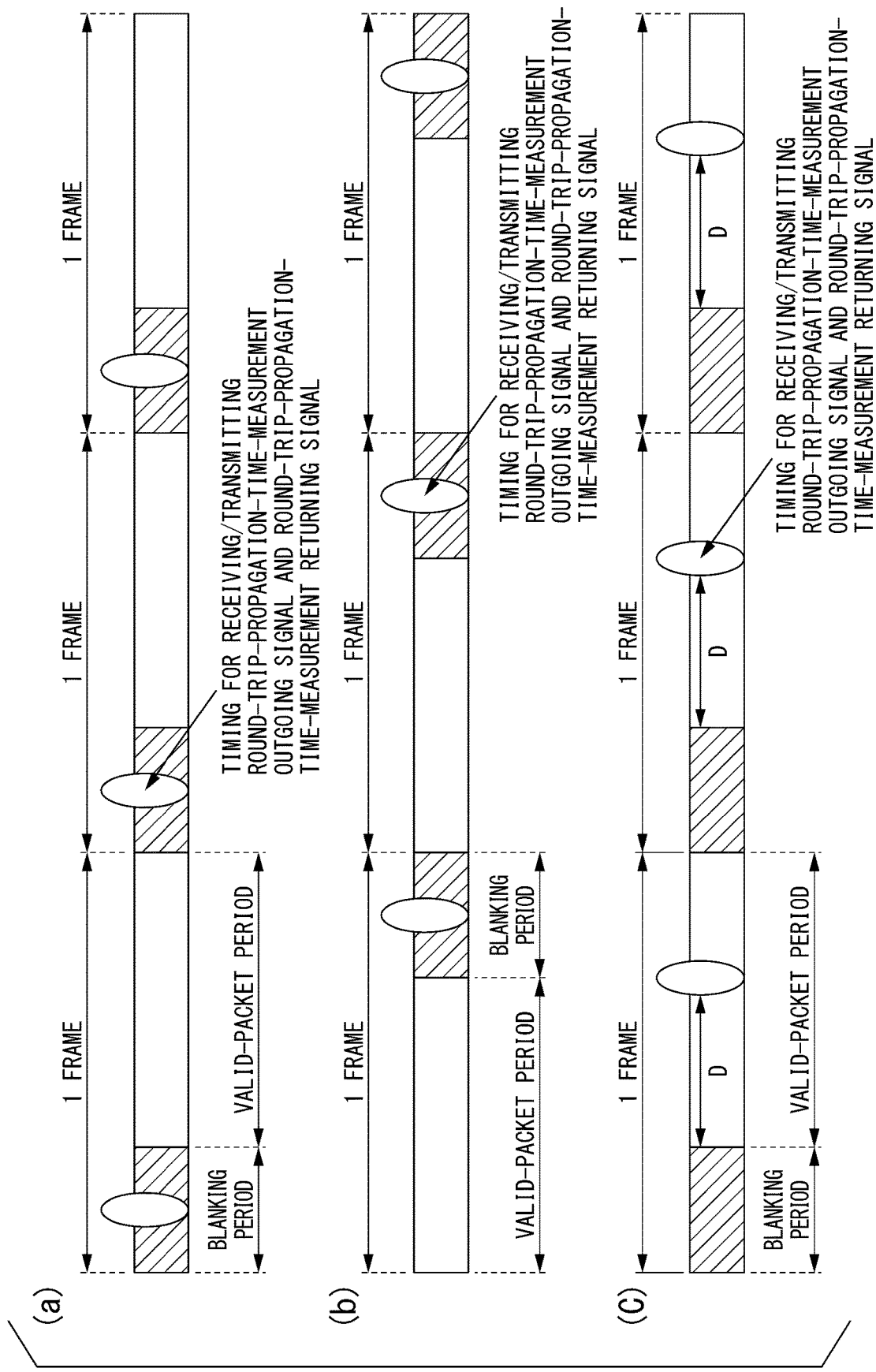
FIG. 6 is a view showing an example of the timing when the transmission and reception of the round-trip-propagation-time-measurement outgoing signal and the round-trip-propagation-time-measurement returning signal are performed.

FIG. 6 is a diagram showing an example of a timing when transmission and reception of a round-trip-propagation-time-measurement outgoing signal and a round-trip-propagation-time-measurement returning signal are performed in the image transfer system 1 according to the first embodiment of the present invention. FIG. 6 shows an example of a case where transmission and reception of a round-trip-propagation-time-measurement outgoing signal and a round-trip-propagation-time-measurement returning signal are performed between the round-trip-propagation-time measurement unit 106 and the round-trip-propagation-time-measurement assistance unit 202 at a timing determined in advance in each of frames of an image in which captured image data is wirelessly transferred from the imaging terminal 100 to the display terminal 200. The round-trip-propagation-time measurement unit 106 and the round-trip-propagation-time-measurement assistance unit 202 transmit and receive a round-trip-propagation-time-measurement outgoing signal and a round-trip-propagation-time-measurement returning signal in a period in which a packet of captured image data in a validity period in an image of one frame (hereinafter, referred to as a "valid packet") is not wirelessly transferred.

An example shown in (a) of FIG. 6 shows a case where a round-trip-propagation-time-measurement outgoing signal and a round-trip-propagation-time-measurement returning signal are transmitted and received in a period until a valid packet is wirelessly transferred, in response to a timing of an imaging synchronization signal indicating the start of a validity period of an image in each of frames wirelessly transferred from the imaging terminal 100 to the display terminal 200. More specifically, in the example shown in (a) of FIG. 6, the round-trip-propagation-time measurement unit 106 transmits a round-trip-propagation-time-measurement outgoing signal to the round-trip-propagation-time-measurement assistance unit 202, and the round-trip-propagation-time-measurement assistance unit 202 transmits (returns) a round-trip-propagation-time-measurement returning signal corresponding to the round-trip-propagation-time-measurement outgoing signal to the round-trip-propagation-time measurement unit 106 in a period until the period of a valid packet is started (here, referred to as a "blanking period") in wireless transfer of captured image data of each of the frames.

Meanwhile, in the example shown in (a) of FIG. 6, a timing when the round-trip-propagation-time measurement unit 106 and the round-trip-propagation-time-measurement assistance unit 202 transmit and receive a round-trip-propagation-time-measurement outgoing signal and a round-trip-propagation-time-measurement returning signal may be a timing when a header packet, including information such as the size of an image represented by captured image data, which is considered to be transferred during a blanking period is wirelessly transferred.

Further, an example shown in (b) of FIG. 6 shows a case where a round-trip-propagation-time-measurement outgoing signal and a round-trip-propagation-time-measurement returning signal are transmitted and received in a period until wireless transfer of the next frame is started, in response to a timing of an imaging synchronization signal indicating the termination of a validity period of an image in each of frames wirelessly transferred from the imaging terminal 100 to the display terminal 200. More specifically, in the example shown in (b) of FIG. 6, the round-trip-propagation-time measurement unit 106 transmits a round-trip-propagation-time-measurement outgoing signal to the round-trip-propagation-time-measurement assistance unit 202, and the round-trip-propagation-time-measurement assistance unit 202 transmits (returns) a round-trip-propagation-time-measurement returning signal to the round-trip-propagation-time measurement unit 106 in a period from a time when the period of a valid packet is terminated in wireless transfer of captured image data of each of the frames to a time when the period of the valid packet is started (here, also referred to as a "blanking period") in wireless transfer of the next frame.

Meanwhile, in the example shown in (b) of FIG. 6, a timing when the round-trip-propagation-time measurement unit 106 and the round-trip-propagation-time-measurement assistance unit 202 transmit and receive a round-trip-propagation-time-measurement outgoing signal and a round-trip-propagation-time-measurement returning signal may be a timing when a header packet related to captured image data which is transferred during a blanking period is transmitted and received.

An example shown in (c) of FIG. 6 shows a case where a round-trip-propagation-time-measurement outgoing signal and a round-trip-propagation-time-measurement returning signal are transmitted and received during a period in which a valid packet is wirelessly transferred, in response to a timing of an imaging synchronization signal indicating one point in time determined in advance from a timing of an imaging synchronization signal indicating the start of a validity period of an image in each of the frames wirelessly transferred from the imaging terminal 100 to the display terminal 200. More specifically, in the example shown in (c) of FIG. 6, the round-trip-propagation-time measurement unit 106 transmits a round-trip-propagation-time-measurement outgoing signal to the round-trip-propagation-time-measurement assistance unit 202, and the round-trip-propagation-time-measurement assistance unit 202 transmits (returns) a round-trip-propagation-time-measurement returning signal to the round-trip-propagation-time measurement unit 106 at a timing of an imaging synchronization signal indicating that a delay period D determined in advance has elapsed after the period of a valid packet is started in wireless transfer of captured image data of each of the frames.

Meanwhile, also in the example shown in (c) of FIG. 6, the fact that the round-trip-propagation-time measurement unit 106 and the round-trip-propagation-time-measurement assistance unit 202 transmit and receive a round-trip-propagation-time-measurement outgoing signal and a round-trip-propagation-time-measurement returning signal so that wireless transfer of valid captured image data in an image of one frame is not disturbed is not changed. Therefore, also in the example shown in (c) of FIG. 6, the round-trip-propagation-time measurement unit 106 and the round-trip-propagation-time-measurement assistance unit 202 transmit and receive a round-trip-propagation-time-measurement outgoing signal and a round-trip-propagation-time-measurement returning signal in a period between any two valid packets in which captured image data is divided into a plurality of parts and wirelessly transferred during a period of a valid packet. For this reason, an imaging synchronization signal indicating one point in time determined in advance in the example shown in (c) of FIG. 6 is an imaging synchronization signal indicating one point in time between any two valid packets after a delay period D has elapsed from the start of a period of a valid packet. Meanwhile, the imaging synchronization signal indicating one point in time determined in advance may be a synchronized packet indicating one point in time between any two valid packets after a delay period D has elapsed from the start of a period of a valid packet.

Meanwhile, a timing when the round-trip-propagation-time measurement unit 106 and the round-trip-propagation-time-measurement assistance unit 202 transmit and receive a round-trip-propagation-time-measurement outgoing signal and a round-trip-propagation-time-measurement returning signal is not limited to the timings shown in (a) to (c) of FIG. 6. That is, the round-trip-propagation-time measurement unit 106 and the round-trip-propagation-time-measurement assistance unit 202 may transmit and receive a round-trip-propagation-time-measurement outgoing signal and a round-trip-propagation-time-measurement returning signal at any timing as long as the timing is a timing when wireless transfer of valid captured image data in an image of one frame is not disturbed.

Figure 7:
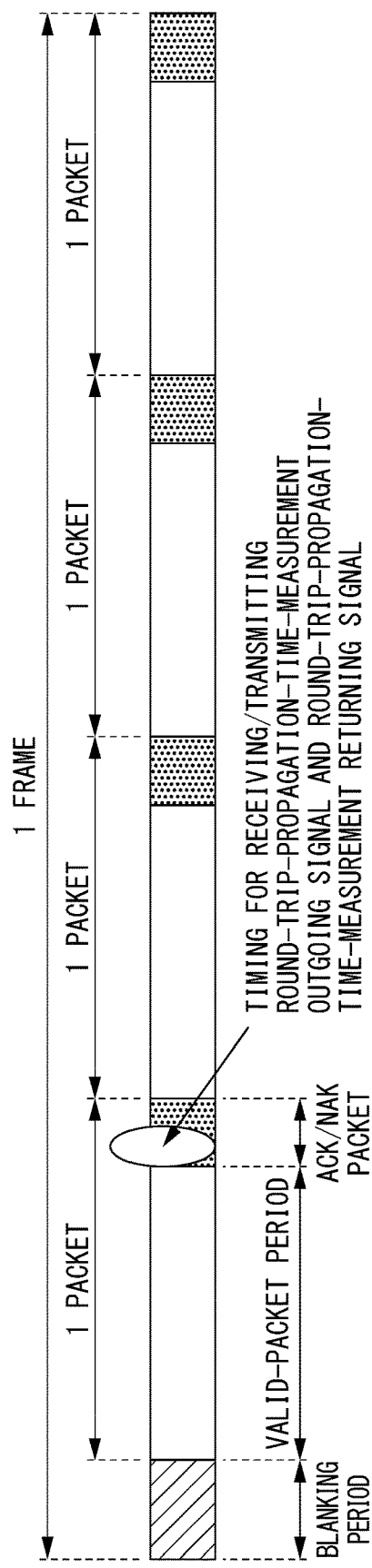
FIG. 7 is a view showing another example of the timing when the transmission and reception of the round-trip-propagation-time-measurement outgoing signal and the round-trip-propagation-time-measurement returning signal are performed.

Here, an example of another timing when a round-trip-propagation-time-measurement outgoing signal and a round-trip-propagation-time-measurement returning signal are transmitted and received between the round-trip-propagation-time measurement unit 106 and the round-trip-propagation-time-measurement assistance unit 202 will be described. FIG. 7 is a diagram showing an example of another timing when a round-trip-propagation-time-measurement outgoing signal and a round-trip-propagation-time-measurement returning signal are transmitted and received in the image transfer system 1 according to the first embodiment of the present invention. FIG. 7 shows an example of a case where a round-trip-propagation-time-measurement outgoing signal and a round-trip-propagation-time-measurement returning signal which are included in a packet of an acknowledge (ACK) signal or a negative acknowledge (NAK) signal indicating the state of wireless transfer of a valid packet are transmitted and received when captured image data of an image of one frame is divided into a plurality of parts and wirelessly transferred from the imaging terminal 100 to the display terminal 200. The round-trip-propagation-time measurement unit 106 and the round-trip-propagation-time-measurement assistance unit 202 transmit and receive a round-trip-propagation-time-measurement outgoing signal and a round-trip-propagation-time-measurement returning signal using a packet of an acknowledge (ACK) signal or a negative acknowledge (NAK) signal (hereinafter, referred to as an "ACK/NAK packet") in any valid packet.

The example shown in FIG. 7 shows a case where a round-trip-propagation-time-measurement outgoing signal and a round-trip-propagation-time-measurement returning signal which are included in an ACK/NAK packet corresponding to a first valid packet wirelessly transferred after an imaging synchronization signal indicating the start of a validity period of an image, among validity periods equivalent to one frame wirelessly transferred from the imaging terminal 100 to the display terminal 200, are transmitted and received. More specifically, in the example shown in FIG. 7, the round-trip-propagation-time measurement unit 106 transmits a round-trip-propagation-time-measurement outgoing signal to the round-trip-propagation-time-measurement assistance unit 202 by including the round-trip-propagation-time-measurement outgoing signal in an ACK/NAK packet indicating a state where a first valid packet has been wirelessly transferred, and the round-trip-propagation-time-measurement assistance unit 202 transmits (returns) a round-trip-propagation-time-measurement returning signal to the round-trip-propagation-time measurement unit 106 after a period until the period of a valid packet is started (here, also referred to as a "blanking period") in wireless transfer of captured image data of one frame.

Meanwhile, the example shown in FIG. 7 shows a case where a round-trip-propagation-time-measurement outgoing signal and a round-trip-propagation-time-measurement returning signal which are included in an ACK/NAK packet corresponding to a first valid packet are transmitted and received, but the ACK/NAK packet for transmitting and receiving a round-trip-propagation-time-measurement outgoing signal and a round-trip-propagation-time-measurement returning signal may be an ACK/NAK packet corresponding to a valid packet with a specific order (for example, a fifth valid packet or the like) which is counted after a blanking period. Further, the example shown in FIG. 7 shows a case where outward path signals for round trip propagation-time measurement and return path signals for round trip propagation-time measurement which are included in ACK/NAK packets corresponding to the same valid packet are transmitted and received, but an ACK/NAK packet for transmitting a round-trip-propagation-time-measurement outgoing signal and an ACK/NAK packet for transmitting a round-trip-propagation-time-measurement returning signal may be ACK/NAK packets corresponding to specific valid packet with different orders.

In this manner, in the image transfer system 1, each of the round-trip-propagation-time measurement unit 106 and the round-trip-propagation-time-measurement assistance unit 202 transmits and receives a round-trip-propagation-time-measurement outgoing signal and a round-trip-propagation-time-measurement returning signal at a timing when wireless transfer of captured image data from the imaging terminal 100 to the display terminal 200 is not disturbed. Meanwhile, in the examples of a timing when a round-trip-propagation-time-measurement outgoing signal and a round-trip-propagation-time-measurement returning signal are transmitted and received shown in FIGS. 6 and 7, a case where a round-trip-propagation-time-measurement outgoing signal and a round-trip-propagation-time-measurement returning signal which are included in any one packet at the timing of wirelessly transferring captured image data are transmitted and received has been described. However, the present invention is not limited to a configuration in which a round-trip-propagation-time-measurement outgoing signal and a round-trip-propagation-time-measurement returning signal which are included in a packet related to wireless transfer of captured image data are transmitted and received. For example, a configuration in which a round-trip-propagation-time-measurement outgoing signal and a round-trip-propagation-time-measurement returning signal which are included in another packet wirelessly transferred between the imaging terminal 100 and the display terminal 200 are transmitted and received may be adopted. In addition, for example, a configuration in which a dedicated packet indicating each of a round-trip-propagation-time-measurement outgoing signal and a round-trip-propagation-time-measurement returning signal is wirelessly transferred between the imaging terminal 100 and the display terminal 200 may be adopted.

Thereafter, in the image transfer system 1, times when each of a round-trip-propagation-time-measurement outgoing signal and a round-trip-propagation-time-measurement returning signal is transmitted and received are clocked. Further, in the image transfer system 1, a round trip propagation-time required for transmission and reception at the time of performing wireless transfer between the imaging terminal 100 and the display terminal 200 is calculated on the basis of information of the clocked times.

In the image transfer system 1, the imaging terminal 100 calculates a round trip propagation-time required for transmission and reception at the time of performing wireless transfer between the imaging terminal 100 and the display terminal 200 through the process of step S303. In the process of calculating a round trip propagation-time in step S303, first, the round-trip-propagation-time measurement unit 106 calculates a difference between the scheduled transmission time of a round-trip-propagation-time-measurement outgoing signal which is determined in step S105 and the reception time of a round-trip-propagation-time-measurement returning signal which is clocked in step S104. In addition, the round-trip-propagation-time measurement unit 106 calculates a round trip propagation-time of a signal making a round trip in only wireless transfer between the imaging terminal 100 and the display terminal 200 by subtracting a receiver elapsed time extracted from the received round-trip-propagation-time-measurement returning signal from the time of the calculated difference. That is, the round-trip-propagation-time measurement unit 106 calculates a period of time required for the transmission of a round-trip-propagation-time-measurement outgoing signal and the reception of a round-trip-propagation-time-measurement returning signal in the process of calculating a round trip propagation-time in step S303, as a round trip propagation-time in wireless transfer.

Figure 8:
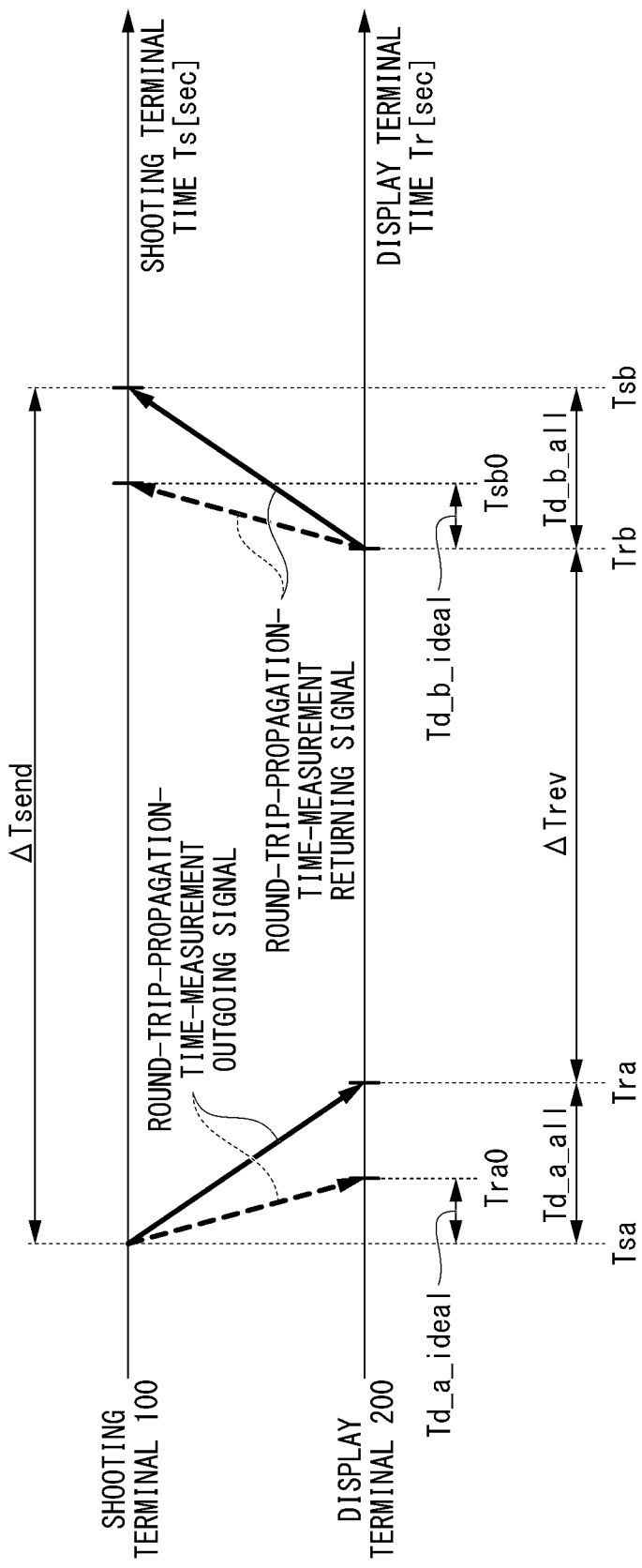
FIG. 8 is a view showing an example of a calculation method for calculating round-trip-propagation time of wireless transmission by the imaging terminal configuring the image transmission system according to the first embodiment of the present invention.

Here, an example of a method of calculating a round trip propagation-time which is performed by the round-trip-propagation-time measurement unit 106 in step 3303 will be described. FIG. 8 is a diagram showing an example of a method in which the imaging terminal 100 constituting the image transfer system 1 according to the first embodiment of the present invention calculates a round trip propagation-time of wireless transfer. FIG. 8 shows a temporal relationship between a round-trip-propagation-time-measurement outgoing signal to be transmitted from the imaging terminal 100 to the display terminal 200 and a round-trip-propagation-time-measurement returning signal to be transmitted from the display terminal 200 to the imaging terminal 100.

When the imaging terminal 100 transmits a round-trip-propagation-time-measurement outgoing signal to the display terminal 200 in a case of an imaging terminal time=time Tsa (scheduled transmission time Tsa), the display terminal 200 can receive the round-trip-propagation-time-measurement outgoing signal when a display terminal time is time Tra0 (input time Tra0) in an ideal state with less delay time in wireless transfer. However, the round-trip-propagation-time-measurement outgoing signal transmitted by the imaging terminal 100 at the scheduled transmission time Tsa is received by the display terminal 200 when the display terminal time=time Tra (input time Tra) due to a delay of wireless transfer. On the other hand, when the display terminal 200 transmits a round-trip-propagation-time-measurement returning signal corresponding to a round-trip-propagation-time-measurement outgoing signal to the imaging terminal 100 in a case of a display terminal time=time Trb (scheduled transmission time Trb), the imaging terminal 100 can receive the round-trip-propagation-time-measurement returning signal when an imaging terminal time=time Tsb0 (reception time Tsb0) in an ideal state with less delay time in wireless transfer. However, the round-trip-propagation-time-measurement returning signal transmitted by the display terminal 200 at the scheduled transmission time Trb is received by the imaging terminal 100 when an imaging terminal time=time Tsb (reception time Tsb) due to a delay of wireless transfer. In addition, the round-trip-propagation-time measurement unit 106 calculates a round trip propagation-time in only wireless transfer between the imaging terminal 100 and the display terminal 200 in consideration of the state of wireless transfer shown in FIG. 8.

Here, in FIG. 8, a period of time between the scheduled transmission time Tsa and the input time Tra0 is set to be a transmission time Td_a_ideal, and a period of time between the scheduled transmission time Trb and the reception time Tsb0 is set to be a reception time Td_b_ideal. The transmission time Td_a_ideal and the reception time Td_b_ideal are stored in the round-trip-propagation-time measurement unit 106 in advance as components of an antenna passing time Td_ideal when a round trip propagation-time=0. In addition, in FIG. 8, a period of time between the scheduled transmission time Tsa and the input time Tra is set to be a transmission time Td_a_all, and a period of time between the scheduled transmission time Trb and the reception time Tsb is set to be a reception time Td_b_all. The transmission time Td_a_all and the reception time Td_b_all are calculated by the round-trip-propagation-time measurement unit 106 as components of an antenna passing time Td_all when a round trip propagation-time>0.

In addition, in FIG. 8, a period of time between the scheduled transmission time Tsa when the round-trip-propagation-time-measurement outgoing signal is transmitted and the reception time Tsb when the imaging terminal 100 has received the round-trip-propagation-time-measurement returning signal, which can be clocked by the imaging terminal 100 on the basis of an imaging terminal time Ts, is set to be a total required time=send. In addition, in FIG. 8, a period of time between the input time Tra when the round-trip-propagation-time-measurement outgoing signal is received and the scheduled transmission time Trb when the display terminal 200 transmits the round-trip-propagation-time-measurement returning signal, that is, a receiver elapsed time which can be clocked by the display terminal 200 on the basis of a display terminal time Tr is set to be a receiver elapsed time ΔTrev. The receiver elapsed time=rev is calculated by the round-trip-propagation-time-measurement assistance unit 202. More specifically, the round-trip-propagation-time-measurement assistance unit 202 calculates the receiver elapsed time ΔTrev by the following Math (1) in the state of wireless transfer shown in FIG. 8.

[Math 1]

$$\Delta Trev = Trb - Tra \quad (1)$$

In addition, the round-trip-propagation-time measurement unit 106 calculates a round trip propagation-time Td in only wireless transfer between the imaging terminal 100 and the display terminal 200 on the basis of the following Maths (2) to (6) which are established according to the state of wireless transfer shown in FIG. 8 and the above-described definition.

[Math 2]

$$\Delta Tsend = Tsb - Tsa \quad (2)$$

[Math 3]

$$Td\_all = \Delta Tsend - \Delta Trev \quad (3)$$

[Math 4]

$$Td\_all = Td\_a\_all + Td\_b\_all \quad (4)$$

[Math 5]

$$Td\_ideal = Td\_a\_ideal + Td\_b\_ideal \quad (5)$$

[Math 6]

$$Td = Td\_\text{all} - Td\_\text{ideal} \qquad (6)$$

Meanwhile, the round-trip-propagation-time measurement unit 106 may calculate the round trip propagation-time Td without using the antenna passing time Td_ideal when a round trip propagation-time=0 and components thereof (a transmission time Td_a_ideal, a reception time Td_b_ideal). That is, the round-trip-propagation-time measurement unit 106 may calculates the round trip propagation-time Td by setting each of the antenna passing time Td_ideal, the transmission time Td_a_ideal, and the reception time Td_b_ideal to be "0". The round trip propagation-time Td in this case can be calculated on the basis of the above-described Math (3). That is, the round trip propagation-time is set to be the same time (Td=Td_all) as the antenna passing time Td_all when a round trip propagation-time>0.

The round-trip-propagation-time measurement unit 106 outputs information of the calculated round trip propagation-time Td to the phase adjustment unit not shown in the drawing. Thereby, in the image transfer system 1, the phase of an imaging synchronization signal generated by the synchronization signal generation unit 102 is adjusted on the basis of a determination result for the round trip propagation-time Td calculated by the round-trip-propagation-time measurement unit 106 through the process of step S304.

In the process of step S304, in step S1709, in a case where the phase adjustment unit not shown in the drawing determines that the round trip propagation-time calculated by the round-trip-propagation-time measurement unit 106 is equal to or less than a round trip propagation-time determination value determined in advance ("YES" in step S1709), the phase adjustment unit determines that phase adjustment for an imaging synchronization signal generated by the synchronization signal generation unit 102 is performed. For example, in a case where the round trip propagation-time determination value determined in advance is set to be a round trip propagation-time determination value Td_th, the phase adjustment unit not shown in the drawing compares the round trip propagation-time determination value with the round trip propagation-time Td calculated by the round-trip-propagation-time measurement unit 106 in step S303. Further, in a case where the compared round trip propagation-time Td is equal to or less than the round trip propagation-time determination value Td_th, the phase adjustment unit not shown in the drawing determines that phase adjustment for an imaging synchronization signal generated by the synchronization signal generation unit 102 is performed. In this case, the phase adjustment unit not shown in the drawing updates the round trip propagation-time Td which is equal to or less than the round trip propagation-time determination value Td_th, that is, a round trip propagation-time Td which is a shorter period of time (smaller value) than the round trip propagation-time determination value Td_th as a new round trip propagation-time determination value Td_th in step S1916.

Meanwhile, the new round trip propagation-time determination value Td_th updated in step S1916 may be, for example, an average value between a current round trip propagation-time Td used for determination and a current round trip propagation-time determination value Td_th. In addition, the new round trip propagation-time determination value Td_th updated in step S1916 may be, for example, a value obtained by statistical computation, such as a most frequent value of the current round trip propagation-time Td used for determination and a plurality of round trip propagation-times Td determined in the past. In addition, the new round trip propagation-time determination value Td_th updated in step S1916 may be a fixed value determined in advance instead of a value obtained using a round trip propagation-time Td.

In a case where the round trip propagation-time determination value Td_th is updated in step S1916, the phase adjustment unit not shown in the drawing combines a previous round trip propagation-time determination value Td_th with a scheduled transmission time of the corresponding round-trip-propagation-time-measurement outgoing signal and a scheduled transmission time of the corresponding round-trip-propagation-time-measurement returning signal and stores the combination for a period determined in advance. Here, information of the combination of the round trip propagation-time determination value Td_th, the scheduled transmission time of the round-trip-propagation-time-measurement outgoing signal, and the scheduled transmission time of the round-trip-propagation-time-measurement returning signal, which is stored in the phase adjustment unit not shown in the drawing, is used when the after-cycle-adjustment accuracy estimation unit 105 calculates a period-adjusted accuracy estimation value later.

Further, in step S1915, the phase adjustment unit not shown in the drawing outputs a phase adjustment instruction for adjusting the phase of an imaging synchronization signal to the synchronization signal generation unit 102. More specifically, the phase adjustment unit not shown in the drawing outputs a phase adjustment instruction which is regenerated after waiting for an imaging synchronization signal to be generated for the round trip propagation-time Td calculated by the round-trip-propagation-time measurement unit 106 in step S303 to the synchronization signal generation unit 102. Thereby, the synchronization signal generation unit 102 performs phase adjustment for an imaging synchronization signal to be generated, in response to the phase adjustment instruction which is output from the phase adjustment unit not shown in the drawing.

Meanwhile, the flowchart of the processing procedure of the image transfer system 1 which is shown in FIG. 3 shows a case where the phase adjustment unit not shown in the drawing performs a process of updating a round trip propagation-time determination value (step S1916) even when it is determined in step S1709 that phase adjustment for an imaging synchronization signal to be generated by the synchronization signal generation unit 102 is not performed ("NO" in step S1709) because the round trip propagation-time calculated by the round-trip-propagation-time measurement unit 106 is not equal to or less than the round trip propagation-time determination value determined in advance. In this case, the phase adjustment unit not shown in the drawing estimates a shift amount between phases of an imaging synchronization signal and a display synchronization signal by calculating a phase shift cumulative value. In addition, the phase adjustment unit not shown in the drawing updates a roundtrip propagation-time determination value determined in advance which is used to determine whether or not phase adjustment for an imaging synchronization signal is to be performed, on the basis of a result of the estimation of the shift amount between the phases of the imaging synchronization signal and the display synchronization signal. Here, a process in which the phase adjustment unit not shown in the drawing estimates a shift amount between phases of an imaging synchronization signal and a display synchronization signal to update a round trip propagation-time determination value (steps S1703 to S1916) will be described in more detail.

Figure 9:
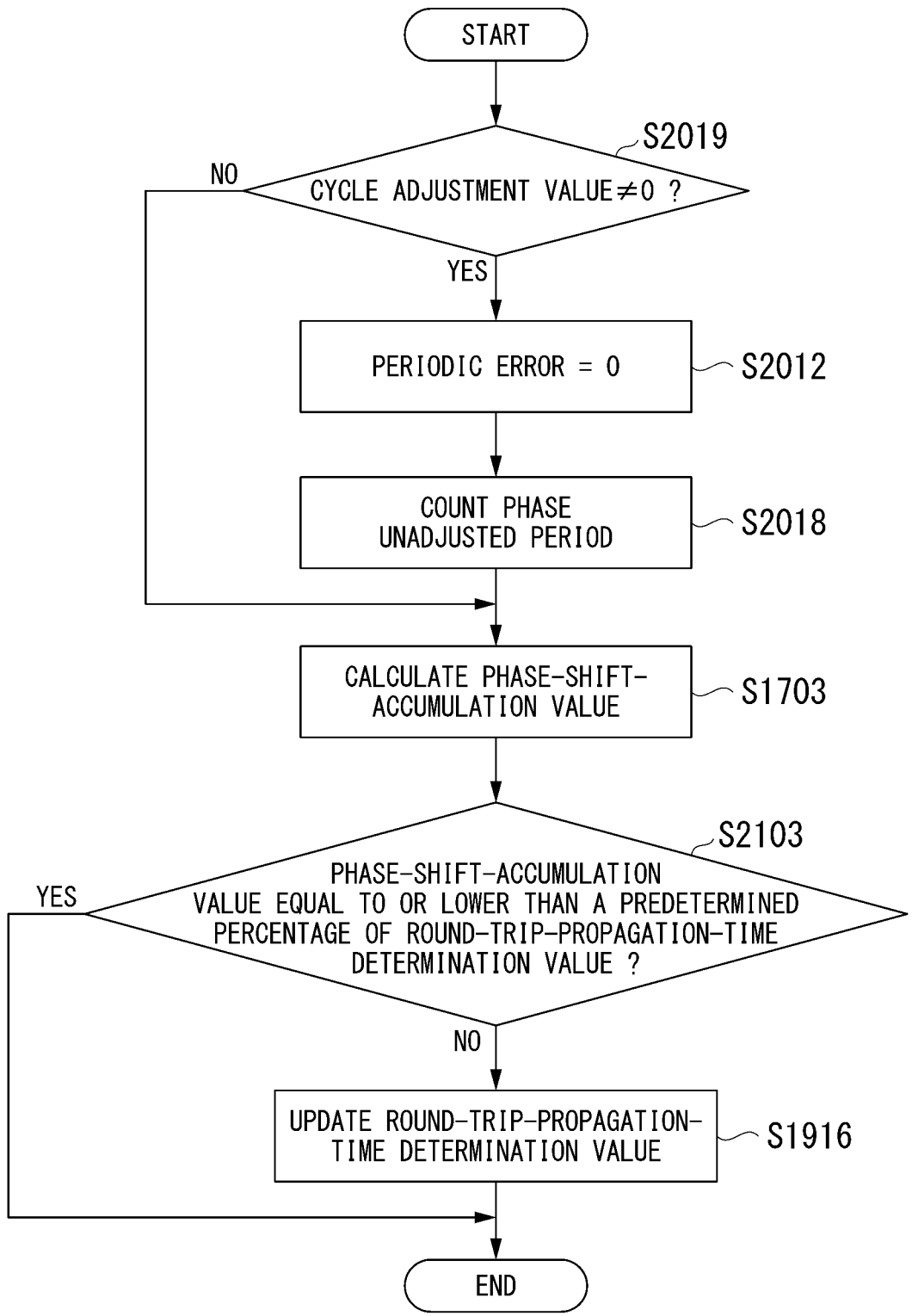
FIG. 9 is a flow chart showing processing procedures of updating a determination value by the imaging terminal configuring the image transmission system according to the first embodiment of the present invention.

FIG. 9 is a flowchart showing a processing procedure of a process of updating a determination value of a round trip propagation-time (round trip propagation-time determination value) by the imaging terminal 100 constituting the image transfer system 1 according to the first embodiment of the present invention.

When the phase adjustment unit not shown in the drawing starts a process of updating a round trip propagation-time determination value, first, information of a cycle adjustment amount when the period of an imaging synchronization signal is adjusted in response to the cycle adjustment instruction output from the cycle adjustment unit 101 is acquired from the synchronization signal generation unit 102. In addition, the phase adjustment unit not shown in the drawing determines whether or not the acquired cycle adjustment amount is a value other than "0" (the cycle adjustment amount≠0) (step S2019). That is, the phase adjustment unit not shown in the drawing determines whether or not the synchronization signal generation unit 102 has performed cycle adjustment for an imaging synchronization signal in step S2019.

In a result of the determination in step S2019, in a case where the cycle adjustment amount is not a value other than "0", that is, the cycle adjustment amount is "0" ("NO" in step S2019), the phase adjustment unit not shown in the drawing causes the processing to proceed to step S1703. On the other hand, in a result of the determination in step S2019, in a case where the cycle adjustment amount is a value other than "0" ("YES" in step S2019), the phase adjustment unit not shown in the drawing replaces the cycle adjustment amount with a periodic error (step S2012). Here, the periodic error is defined as a predetermined value based on an output error in a source oscillation clock signal which is generated in the source oscillation clock generation unit 103 generating the source oscillation clock signal. Meanwhile, even when the source oscillation clock generation unit 103 and the source oscillation clock generation unit 205 are clock generators having the same specifications, the periodic error is an error which occurs in units of 100 ppm due to, for example, temperature characteristics according to the accuracy of the clock generators. For this reason, the periodic error may be set on the basis of information of specifications representing the accuracy of the clock generator, instead of replacing the cycle adjustment amount.

Thereafter, the phase adjustment unit not shown in the drawing measures an elapsed time in a state where phase adjustment for an imaging synchronization signal is not performed, that is, a period of time for which it is continuously determined that phase adjustment for an imaging synchronization signal is not performed (phase-unadjusted time) from a time when the last phase adjustment for an imaging synchronization signal was performed (step S2018).

In addition, the phase adjustment unit not shown in the drawing calculates a phase shift cumulative value on the basis of the periodic error and the clocked phase-unadjusted time (step S1703). For example, in a case where the cycle adjustment amount acquired from the synchronization signal generation unit 102 in step S2019 is set to be a cycle adjustment amount E and the cycle adjustment amount E is a value other than "0", it is assumed that the cycle adjustment amount is replaced with a periodic error E' in step S2012. In addition, a case where the phase adjustment unit not shown in the drawing measures a phase-unadjusted time T' in step S2018 will be considered. In this case, the phase adjustment unit not shown in the drawing calculates a phase shift cumulative value V by multiplying the phase-unadjusted time T' by the periodic error E' as in the following Math (7).

[Math 7]

$$V = T' \times E' \qquad (7)$$

Meanwhile, in a result of the determination in step S2019, in a case where the cycle adjustment amount E is not a value other than "0", that is, the cycle adjustment amount E=0 ("NO" in step S2019), the phase adjustment unit not shown in the drawing considers the cycle adjustment amount E=periodic error E'=0 and calculates the phase shift cumulative value V as the phase shift cumulative value V=0.

Subsequently, the phase adjustment unit not shown in the drawing determines whether or not the calculated phase shift cumulative value is equal to or less than a predetermined rate of the roundtrip propagation-time determination value determined in advance (step S2103). In a result of the determination in step S2103, in a case where the calculated phase shift cumulative value is equal to or less than a predetermined rate of the round trip propagation-time determination value determined in advance ("YES" in step S2103), the phase adjustment unit not shown in the drawing determines that the round trip propagation-time determination value is not updated and terminates the process of updating the round trip propagation-time determination value.

On the other hand, in a result of the determination in step S2103, in a case where the calculated phase shift cumulative value is not equal to or less than a predetermined rate of the round trip propagation-time determination value determined in advance, that is, the calculated phase shift cumulative value is greater than the predetermined rate of the round trip propagation-time determination value determined in advance ("NO" in step S2103), the phase adjustment unit not shown in the drawing determines that the round trip propagation-time determination value is updated. In addition, the phase adjustment unit not shown in the drawing updates the round trip propagation-time determination value to a short period of time (small value) (step S1916). For example, the phase adjustment unit not shown in the drawing updates a round trip propagation-time determination value Td_newth set to be a short period of time (small value) by multiplying the current round trip propagation-time determination value Td_th by a constant ε determined in advance (ε is a real number satisfying 1<ε) as a new determination value Td_th as in the following Math (8).

[Math 8]

$$Td\_\text{newth} = Td\_th \times \varepsilon \qquad (8)$$

Meanwhile, the new round trip propagation-time determination value updated by the phase adjustment unit not shown in the drawing in step S1916 may be a value obtained by the same approach as that at the time of updating the round trip propagation-time determination value in step S1916 in a case where it is determined that phase adjustment for an imaging synchronization signal is performed. That is, also in a case where the round trip propagation-time determination value is updated on the basis of a result of the estimation of a shift amount between phases of an imaging synchronization signal and a display synchronization signal, the phase adjustment unit not shown in the drawing may update a value on which statistical computation has been performed, such as an average value between the current round trip propagation-time Td used for the determination in step S1709 and the current round trip propagation-time determination value Td_th or a most frequent value of a plurality of round trip propagation-times Td, a fixed value determined in advance, or the like as the new round trip propagation-time determination value Td_th in step S1916.

Further, in the image transfer system 1, subsequently to phase adjustment for an imaging synchronization signal, cycle adjustment for an imaging synchronization signal is performed in step S306 whenever a period of time determined in advance elapses. In the image transfer system 1, first, when the after-cycle-adjustment accuracy estimation unit 105 determines that cycle adjustment for an imaging synchronization signal is performed due to the elapse of a predetermined period of time determined in advance (for example, one minute, five minutes, or several tens of minutes) in step S305 included in step S306 (YES in step S305), the period-adjusted accuracy estimation unit calculates a period-adjusted accuracy estimation value in step S2106 included in step S306.

More specifically, in step S802 included in step S2106, the after-cycle-adjustment accuracy estimation unit 105 acquires a combination of a plurality of round trip propagation-time determination values equivalent to a predetermined number of times per unit time determined in advance (for example, 10 seconds), scheduled transmission times of corresponding outward path signals for round trip propagation-time measurement, and scheduled transmission times of corresponding return path signals for round trip propagation-time measurement from the phase adjustment unit not shown in the drawing.

Meanwhile, in step S802, the after-cycle-adjustment accuracy estimation unit 105 may acquire, for example, a combination of a plurality of round trip propagation-time determination values equivalent to a predetermined number of frames per unit time determined in advance, scheduled transmission times of corresponding outward path signals for round trip propagation-time measurement, and scheduled transmission times of corresponding return path signals for round trip propagation-time measurement from the phase adjustment unit not shown in the drawing.

Further, in step S803 included in step S2106, the after-cycle-adjustment accuracy estimation unit 105 extracts a minimum round trip propagation-time determination value (minimum determination value) for each unit time from the plurality of round trip propagation-time determination values acquired. For example, in a case where a unit time B is 10 seconds and a predetermined number of times is six, the after-cycle-adjustment accuracy estimation unit 105 acquires a combination of roundtrip propagation-time determination values equivalent to 60 seconds (one minute), scheduled transmission times of outward path signals for round trip propagation-time measurement, and scheduled transmission times of return path signals for round trip propagation-time measurement from the phase adjustment unit not shown in the drawing in step S802. In this case, the after-cycle-adjustment accuracy estimation unit 105 extracts six minimum determination values.

Meanwhile, in step S803, the after-cycle-adjustment accuracy estimation unit 105 may extract, for example, an average value of a plurality of round trip propagation-time determination values acquired for each unit time. Further, in step S803, the after-cycle-adjustment accuracy estimation unit 105 may extract, for example, a maximum round trip propagation-time determination value for each unit time from the plurality of round trip propagation-time determination values acquired.

Further, in a case where the after-cycle-adjustment accuracy estimation unit 105 acquires each of pieces of information equivalent to a predetermined number of frames per unit time determined in advance in step S802, for example, an average value of the round trip propagation-time determination values equivalent to a predetermined number of times per unit time determined in advance which are obtained for each of the frames may be extracted in step S803. In this case, the after-cycle-adjustment accuracy estimation unit 105 also sets each of the scheduled transmission times of the corresponding outward path signals for round trip propagation-time measurement and the scheduled transmission time of the corresponding round-trip-propagation-time-measurement returning signal to be an average value, similar to the obtained average value of the round trip propagation-time determination values. Further, in a case where the after-cycle-adjustment accuracy estimation unit 105 acquires each of the pieces of information equivalent to the predetermined number of frames per unit time determined in advance in step S802, the period-adjusted accuracy estimation unit may extract, for example, a minimum value of the round trip propagation-time determination values equivalent to the predetermined number of times per unit time determined in advance which are obtained for each of the frames in step S803. In this case, the after-cycle-adjustment accuracy estimation unit 105 also sets each of the scheduled transmission times of the corresponding outward path signals for round trip propagation-time measurement and the scheduled transmission time of the corresponding round-trip-propagation-time-measurement returning signal to be a minimum value, similar to the obtained minimum value of the round trip propagation-time determination values. Further, in a case where the after-cycle-adjustment accuracy estimation unit 105 acquires each of the pieces of information equivalent to the predetermined number of frames per unit time determined in advance in step S802, the period-adjusted accuracy estimation unit may extract, for example, a maximum value of the round trip propagation-time determination values equivalent to the predetermined number of times per unit time determined in advance which are obtained for each of the frames in step S803. In this case, the after-cycle-adjustment accuracy estimation unit 105 also sets each of the scheduled transmission times of the corresponding outward path signals for round trip propagation-time measurement and the scheduled transmission times of the corresponding return path signals for round trip propagation-time measurement to be a maximum value, similar to the obtained maximum value of the round trip propagation-time determination values.

Thereafter, in step S806 included in step S2106, the after-cycle-adjustment accuracy estimation unit 105 calculates a period-adjusted accuracy estimation value in a case where the period of an imaging synchronization signal is temporarily adjusted, on the basis of the extracted minimum determination value equivalent to a predetermined number of times.

Here, an example of the process of step S2106 in which the after-cycle-adjustment accuracy estimation unit 105 calculates a period-adjusted accuracy estimation value will be described.

Figure 10:
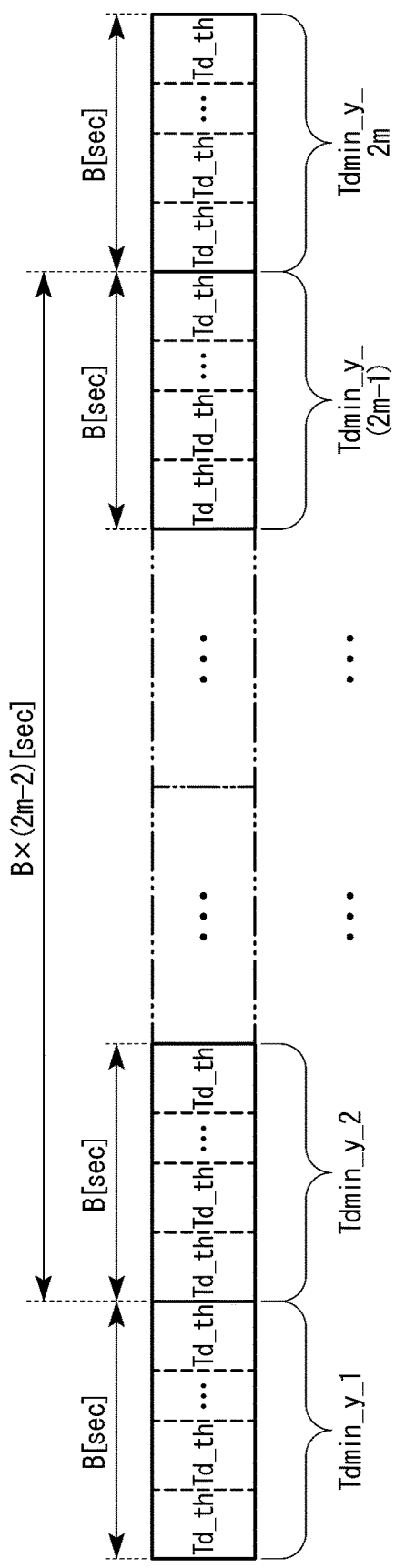
FIG. 10 is a view showing a processing example to calculate an after-cycle-adjustment accuracy value in the image transmission system according to the first embodiment of the present invention.

FIG. 10 is a diagram showing an example of a process of calculating a period-adjusted accuracy estimation value in the image transfer system 1 according to the first embodiment of the present invention. FIG. 10 shows a case where the after-cycle-adjustment accuracy estimation unit 105 acquires a plurality of round trip propagation-time determination values for each unit time and extracts a minimum determination value from the plurality of round trip propagation-time determination values acquired for each unit time. More specifically, the drawing shows a case where a minimum determination value Tdmin_y_1 to a minimum determination value Tdmin_y_2 m equivalent to 2m times by setting a plurality of round trip propagation-time determination values Td_th included in a unit time B to be a population, acquiring the population 2m times (m is a natural number of 2 or greater, a positive integer) to acquire a plurality of round trip propagation-time determination values Td_th, and extract a minimum determination value for each of the populations (unit time B).

The after-cycle-adjustment accuracy estimation unit 105 calculates an accuracy error of the period of an imaging synchronization signal in a case where a generation timing is waited for a period of time represented in a minimum determination value so as to be delayed as a period-adjusted accuracy estimation value, on the basis of information regarding a minimum determination value extracted first and information regarding a minimum determination value extracted last, among the extracted minimum determination values equivalent to a predetermined number of times. In other words, the after-cycle-adjustment accuracy estimation unit 105 calculates a period-adjusted accuracy estimation value on the basis of information regarding a minimum determination value separated by a period equivalent to a unit time B×(2m−2) times. More specifically, the after-cycle-adjustment accuracy estimation unit 105 performs phase adjustment for an imaging synchronization signal lastly and then calculates a period-adjusted accuracy estimation value on the basis of a difference between a scheduled transmission time of a round-trip-propagation-time-measurement outgoing signal transmitted to calculate a round trip propagation-time for which it is first determined that phase adjustment is not performed and a scheduled transmission time of a round-trip-propagation-time-measurement outgoing signal transmitted to calculate a round trip propagation-time for which it is lastly determined that phase adjustment is not performed.

Here, a method of estimating an accuracy error of the period of an imaging synchronization signal (period-adjusted accuracy estimation value) will be described in more detail with reference to FIG. 10. As shown in FIG. 10, it is assumed that the after-cycle-adjustment accuracy estimation unit 105 acquires round trip propagation-time determination values equivalent to a predetermined number of times=2m times for each unit time B [seconds (sec)], and minimum determination values extracted in the respective unit times B are a minimum determination value Tdmin_y_1 [seconds (sec)] to a minimum determination value Tdmin_y_2m [seconds (sec)].

The after-cycle-adjustment accuracy estimation unit 105 calculates (estimates) a period-adjusted accuracy estimation value Er [ppm] on the basis of the following Math (9) because a ratio of a value, obtained by subtracting a difference between a scheduled transmission time and a minimum determination value in a first unit time B from a difference between a scheduled transmission time and a minimum determination value in a last unit time B, to a difference between the scheduled transmission time in the last unit time B and the scheduled transmission time in the first unit time B is an accuracy error occurring in cycle adjustment for an imaging synchronization signal.

[Math 9]

$$1 + Er = \frac{(TS\_y\_2m - Td\min\_y\_2m) - (TS\_y\_1 - Td\min\_y\_1)}{TS\_y\_2m - TS\_y\_1} \quad (9)$$

$$\therefore Er = \frac{Td\min\_y\_1 - Td\min\_y\_2m}{TS\_y\_2m - TS\_y\_1}$$

In the above-described Math (9), TS_y_1 [seconds (sec)] is a scheduled transmission time of a round-trip-propagation-time-measurement outgoing signal transmitted to calculate the minimum determination value Tdmin_y_1 [seconds (sec)] extracted in the first unit time B. Further, in the above-described Math (9), TS_y_2m[seconds (sec)] is a scheduled transmission time of a round-trip-propagation-time-measurement outgoing signal transmitted to calculate the minimum determination value Tdmin_y_2m [seconds (sec)] extracted in the last unit time B.

Meanwhile, the after-cycle-adjustment accuracy estimation unit 105 may acquire a larger number of round trip propagation-time determination values to calculate a period-adjusted accuracy estimation value in a case where the cycle adjustment determination unit 104 determines that the period-adjusted accuracy estimation value calculated on the basis of the above-described Math (9) is a value indicating that the accuracy of the period of an imaging synchronization signal has not been improved ("NO" in step S1004) and the cycle adjustment unit 101 has not output a cycle adjustment instruction to the synchronization signal generation unit 102. Here, a description will be provided of an example of the process of step S2106 in a case where the after-cycle-adjustment accuracy estimation unit 105 acquires a larger number of round trip propagation-time determination values to calculate a period-adjusted accuracy estimation value when the cycle adjustment determination unit 104 determines that the accuracy of the period of an imaging synchronization signal has not been improved.

Figure 11:
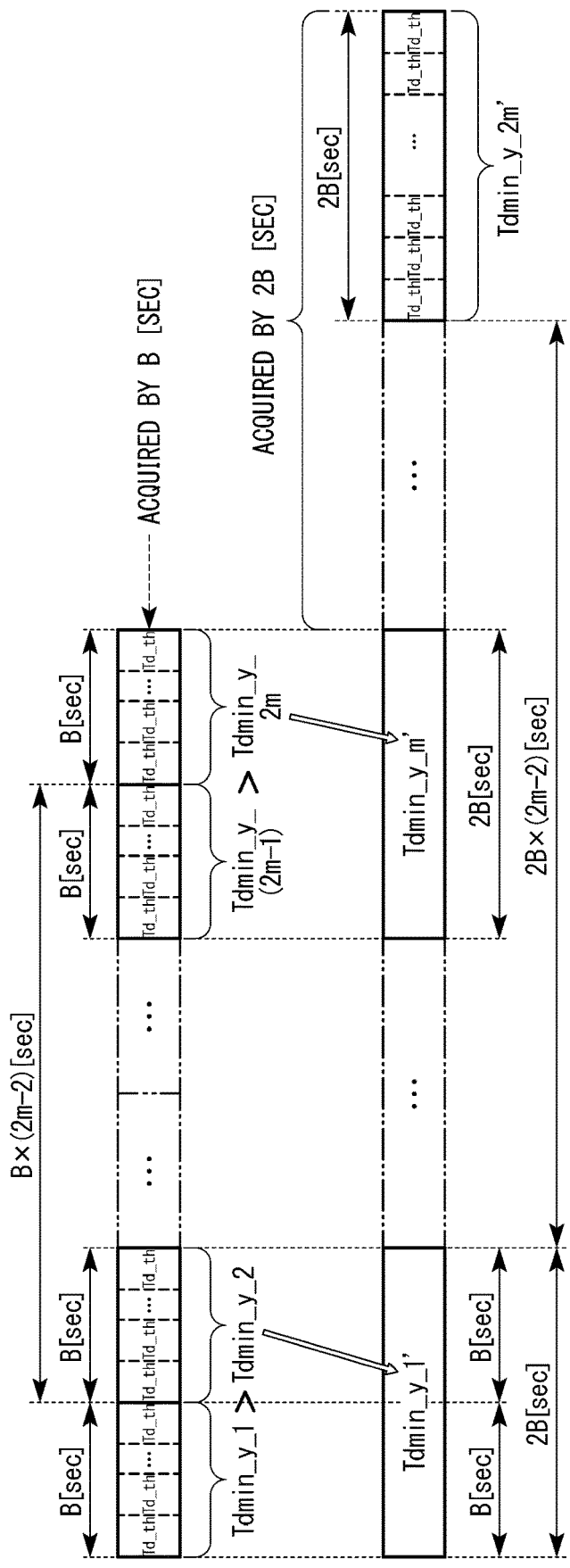
FIG. 11 is a view showing another processing example to calculate the after-cycle-adjustment accuracy value in the image transmission system according to the first embodiment of the present invention.

FIG. 11 is a diagram showing another example of a process of calculating a period-adjusted accuracy estimation value in the image transfer system 1 according to the first embodiment of the present invention. The example shown in FIG. 11 shows a case where the after-cycle-adjustment accuracy estimation unit 105 increases a unit time for acquiring a round trip propagation-time determination value to extract a minimum determination value from a plurality of round trip propagation-time determination values acquired in respective unit times. More specifically, the example shown in FIG. 10 shows a case where the same number of minimum determination values as that in the example shown in FIG. 10, that is, a minimum determination value Tdmin_y_1' to a minimum determination value Tdmin_y_2m' equivalent to 2m times are extracted by setting a population of round trip propagation-time determination values Td_th acquired in units of unit times B [seconds (sec)] to be twice, that is, by doubling the unit time B (unit time 2B [seconds (sec)]) and acquiring the population m times to extract a minimum determination value.

In this case, the after-cycle-adjustment accuracy estimation unit 105 does not acquire around trip propagation-time determination value Td_th, which is already acquired before the cycle adjustment determination unit 104 determines that the accuracy of the period of an imaging synchronization signal has not been improved, again at the time of extracting a minimum determination value for each unit time 2B [seconds (sec)]. In addition, the after-cycle-adjustment accuracy estimation unit 105 compares minimum determination values of two adjacent unit times B, which are already extracted for each unit time B [seconds (sec)], with each other and selects a smaller minimum determination value as shown in an upper stage of FIG. 11 to extract a minimum determination value Tdmin_y_1' to a minimum determination value Tdmin_y_m' equivalent to m times for each unit time 2B as shown in a lower stage of FIG. 11.

More specifically, in the example shown in FIG. 11, a minimum determination value Tdmin_y_1 extracted in a first unit time B [seconds (sec)] is compared with a minimum determination value Tdmin_y_2 extracted in a second unit time B [seconds (sec)], and the minimum determination value Tdmin_y_2 smaller than the minimum determination value Tdmin_y_1 is selected and set to be a minimum determination value Tdmin_y_1'. Further, in the example shown in FIG. 11, a minimum determination value Tdmin_y_(2m−1) extracted in a (2m−1)-th unit time B [seconds (sec)] is compared with a minimum determination value Tdmin_y_2m extracted in a 2m-th unit time B [seconds (sec)], and the minimum determination value Tdmin_y_2m smaller than the minimum determination value Tdmin_y_(2m−1) is selected and set to be a minimum determination value Tdmin_y_m'.

In the example shown in FIG. 11, a case where minimum determination values of two adjacent unit times B, which are already extracted for each unit time B, are compared with each other and a smaller minimum determination value is selected has been described, but a minimum determination value selected by the after-cycle-adjustment accuracy estimation unit 105 may be, for example, a larger minimum determination value when minimum determination values of two adjacent unit times B are compared with each other. In addition, a minimum determination value selected by the after-cycle-adjustment accuracy estimation unit 105 may be, for example, an average value of minimum determination values of two adjacent unit times B.

In addition, the after-cycle-adjustment accuracy estimation unit 105 further acquires round trip propagation-time determination values Td_th equivalent to m times for each unit time 2B [seconds (sec)] and extracts a minimum determination value for each unit time 2B. Meanwhile, also in the example shown in FIG. 11, a method of extracting a minimum determination value for each unit time 2B is the same as a method of extracting a minimum determination value for each unit time B in the example shown in FIG. 10 except that the number of round trip propagation-time determination values Td_th included in a unit time 2B (population) is different. The example shown in FIG. 11 shows a case where a minimum round trip propagation-time determination value Td_th is extracted as a minimum determination value Tdmin_y_2m' from a plurality of round trip propagation-time determination values Td_th included in a last unit time 2B [seconds (sec)].

Thereafter, similarly to the example shown in FIG. 10, the after-cycle-adjustment accuracy estimation unit 105 calculates a period-adjusted accuracy estimation value on the basis of information regarding a minimum determination value separated by a period equivalent to a unit time 2B×(2m−2) times. More specifically, the after-cycle-adjustment accuracy estimation unit 105 applies each of a set including a minimum determination value Tdmin_y_1' [seconds (sec)] extracted first and a scheduled transmission time TS_y_1' [seconds (sec)] of a corresponding round-trip-propagation-time-measurement outgoing signal and a set including a minimum determination value Tdmin_y_2m' [seconds (sec)] extracted last and a scheduled transmission time TS_y_2m' [seconds (sec)] of a corresponding round-trip-propagation-time-measurement outgoing signal to the above-described Math (9) to calculate (estimate) a period-adjusted accuracy estimation value Er' [ppm].

Meanwhile, the after-cycle-adjustment accuracy estimation unit 105 may acquire a round trip propagation-time determination value in another period in the same unit time to calculate a period-adjusted accuracy estimation value in a case where the cycle adjustment determination unit 104 determines that the period-adjusted accuracy estimation value calculated on the basis of the above-described Math (9) is a value indicating that the accuracy of the period of an imaging synchronization signal has not been improved ("NO" in step S1004) and the cycle adjustment unit 101 has not output a cycle adjustment instruction to the synchronization signal generation unit 102. Here, a description will be provided of an example of the process of step S2106 in a case where the after-cycle-adjustment accuracy estimation unit 105 acquires a round trip propagation-time determination value in another period in the same unit time to calculate a period-adjusted accuracy estimation value when the cycle adjustment determination unit 104 determines that the accuracy of the period of an imaging synchronization signal has not been improved.

Figure 12:
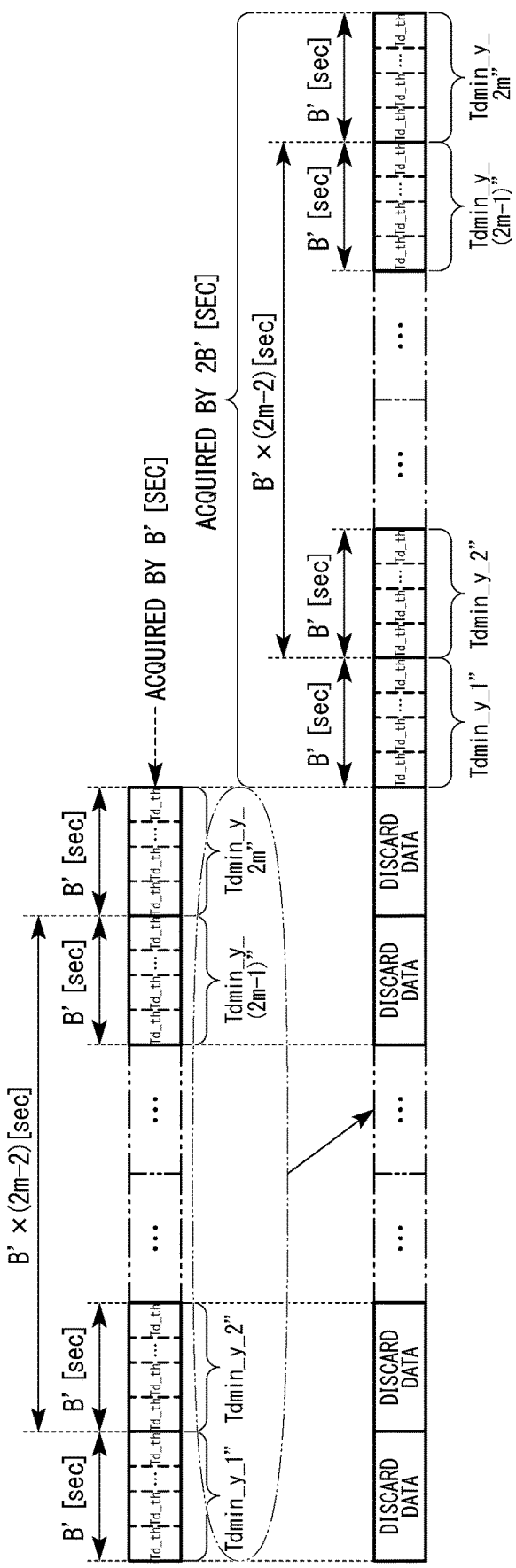
FIG. 12 is a view showing further another processing example to calculate the after-cycle-adjustment accuracy value in the image transmission system according to the first embodiment of the present invention.

FIG. 12 is a diagram showing still another example of a process of calculating a period-adjusted accuracy estimation value in the image transfer system 1 according to the first embodiment of the present invention. The example shown in FIG. 12 shows a case where the after-cycle-adjustment accuracy estimation unit 105 discards a minimum determination value extracted in each of the previous unit times and newly acquires a plurality of round trip propagation-time determination values equivalent to a predetermined number of times in the same unit time in a period different from the previous period to extract a minimum determination value for each unit time. More specifically, the drawing shows a case where the same number of minimum determination values as the previous number, that is, a minimum determination value Tdmin_y_1" to a minimum determination value Tdmin_y_2m" equivalent to 2m times are extracted by discarding a population of round trip propagation-time determination values Td_th acquired in units of unit times B' [seconds (sec)] similar to the previous example shown in FIG. 10 and setting round trip propagation-time determination values Td_th acquired in units of unit times B' [seconds (sec)] in a period different from the previous period as a new population to extract a minimum determination value. Meanwhile, the unit time B' [seconds (sec)] in the example shown in FIG. 12 may be the unit time in the example shown FIG. 10 or FIG. 12, that is, the unit time B [seconds (sec)] or the unit time 2B [seconds (sec)], but may be different from the unit time in the example shown in FIG. 10 or FIG. 12.

In the example shown in FIG. 12, as shown in an upper stage of FIG. 12, the minimum determination value Tdmin_y_1" to the minimum determination value Tdmin_y_2m" extracted from the round trip propagation-time determination values Td_th acquired before in each unit time B' [seconds (sec)] are discarded. In addition, as shown in a lower stage of FIG. 12, a plurality of round trip propagation-time determination values Td_th are acquired in a new period, and a new minimum determination value Tdmin_y_1" to minimum determination value Tdmin_y_2m" are extracted in each of unit times B' [seconds (sec)]. Meanwhile, also in the example shown in FIG. 12, a method of extracting a minimum determination value for each unit time B' is the same as the method of extracting a minimum determination value for each unit time in the example shown in FIG. 10 or FIG. 12. However, as described above, the number of round trip propagation-time determination values Td_th included in a unit time B' (population) may be different from the number of round trip propagation-time determination values Td_th included in the unit time B (population) or the unit time 2B (population) in the example shown in FIG. 10 or FIG. 12.

Thereafter, similarly to the example shown in FIG. 10 or FIG. 12, the after-cycle-adjustment accuracy estimation unit 105 calculates a period-adjusted accuracy estimation value on the basis of information regarding a minimum determination value separated by a period equivalent to a unit time B'×(2m−2) times. More specifically, the after-cycle-adjustment accuracy estimation unit 105 applies each of a set including a new minimum determination value Tdmin_y_1" [seconds (sec)] extracted first and a scheduled transmission time TS_y_1" [seconds (sec)] of a corresponding round-trip-propagation-time-measurement outgoing signal and a set including a new minimum determination value Tdmin_y_2m" [seconds (sec)] extracted last and a scheduled transmission time TS_y_2m" [seconds (sec)] of a corresponding round-trip-propagation-time-measurement outgoing signal to the above-described Math (9) to calculate (estimate) a period-adjusted accuracy estimation value Er" [ppm].

Meanwhile, the examples shown in FIGS. 10 to 12 show a case where the after-cycle-adjustment accuracy estimation unit 105 calculates a period-adjusted accuracy estimation value according to the above-described Math (9) on the basis of information regarding a minimum determination value extracted first and information regarding a minimum determination value extracted last. However, the minimum determination values used when the after-cycle-adjustment accuracy estimation unit 105 calculates a period-adjusted accuracy estimation value according to the above-described Math (9) are not limited to minimum determination values extracted first and last. For example, the after-cycle-adjustment accuracy estimation unit 105 may calculate a period-adjusted accuracy estimation value according to the above-described Math (9) by using minimum determination values extracted in any two unit times in specific orders among extracted minimum determination values equivalent to a predetermined number of times.

Meanwhile, the after-cycle-adjustment accuracy estimation unit 105 executes the above-described process of calculating a period-adjusted accuracy estimation value (step S2106) in a case where it is determined in step S305 that cycle adjustment for an imaging synchronization signal is performed with the elapse of a predetermined period of time determined in advance (for example, one minute, five minutes, or several tens of minutes) ("YES" in step S305). However, also in a case where the after-cycle-adjustment accuracy estimation unit 105 determines that cycle adjustment for an imaging synchronization signal is not performed in step S305 ("NO" in step S305), the period-adjusted accuracy estimation unit may perform a process of calculating a period-adjusted accuracy estimation value. That is, the after-cycle-adjustment accuracy estimation unit 105 may perform a process of calculating a period-adjusted accuracy estimation value in step S2106 in parallel with a phase adjustment process for an imaging synchronization signal which is performed by the phase adjustment unit not shown in the drawing. In this case, for example, the after-cycle-adjustment accuracy estimation unit 105 may acquire a round trip propagation-time determination value from the phase adjustment unit not shown in the drawing for each predetermined period of time (for example, one minute or five minutes) which is shorter than a predetermined period of time (for example, several tens of minutes) for determining whether or not cycle adjustment for an imaging synchronization signal is performed, and may calculate a period-adjusted accuracy estimation value. In addition, the after-cycle-adjustment accuracy estimation unit 105 may repeat a process of calculating a period-adjusted accuracy estimation value in step S2106 using the same method as in the examples shown in FIGS. 10 to 12 on the assumption that the cycle adjustment determination unit 104 determines that the calculated period-adjusted accuracy estimation value is a value indicating that the accuracy of the period of an imaging synchronization signal has not been improved ("NO" in step S1004) and the cycle adjustment unit 101 has not output a cycle adjustment instruction to the synchronization signal generation unit 102.

More specifically, when a predetermined period of time (for example, one minute or five minutes) which is shorter than a predetermined period of time (for example, several tens of minutes) for determining whether or not cycle adjustment for an imaging synchronization signal is performed has elapsed first, the after-cycle-adjustment accuracy estimation unit 105 first extracts a minimum determination value for each unit time B to calculate a period-adjusted accuracy estimation value using the same method as that in the example shown in FIG. 10. Thereafter, when a predetermined period of time (for example, one minute or five minutes) which is shorter than a predetermined period of time (for example, several tens of minutes) for determining whether or not cycle adjustment for an imaging synchronization signal is performed has further elapsed, the period-adjusted accuracy estimation unit extracts a minimum determination value for each unit time 2B obtained by lengthening the unit time B to calculate a period-adjusted accuracy estimation value using the same method as that in the example shown in FIG. 11. Thereafter, when a predetermined period of time (for example, one minute or five minutes) which is shorter than a predetermined period of time (for example, several tens of minutes) for determining whether or not cycle adjustment for an imaging synchronization signal is performed has further elapsed, the period-adjusted accuracy estimation unit extracts a minimum determination value for each unit time B' (unit time 2B=unit time B') which is the same as the unit time 2B in a period different from a period in which a period-adjusted accuracy estimation value is previously calculated to calculate a period-adjusted accuracy estimation value using the same method as that in the example shown in FIG. 12. Thereby, the after-cycle-adjustment accuracy estimation unit 105 can also estimate the accuracy of an imaging synchronization signal when cycle adjustment for an imaging synchronization signal is not performed.

Meanwhile, in a case where the after-cycle-adjustment accuracy estimation unit 105 calculates a period-adjusted accuracy estimation value using the same method as that in the example shown in FIG. 12, the number of times a period-adjusted accuracy estimation value is calculated using the same method as that in the example shown in FIG. 11 before that may be one or two or more. For example, the after-cycle-adjustment accuracy estimation unit 105 may calculate a period-adjusted accuracy estimation value twice using the same method as that in the example shown in FIG. 11 and then calculate a period-adjusted accuracy estimation value using the same method as that in the example shown in FIG. 12 by setting the unit time 2B×2=a unit time 4B to be a unit time B' (unit time 4B=unit time B'). However, the number of times the after-cycle-adjustment accuracy estimation unit 105 calculates a period-adjusted accuracy estimation value using the same method as that in the example shown in FIG. 11 before calculating a period-adjusted accuracy estimation value using the same method as that in the example shown in FIG. 12 may be set to be the number of times falling within a range in which the period of the unit time 2B equivalent to a predetermined number of times=2m times does not exceed a predetermined period of time (for example, several tens of minutes) for determining whether or not cycle adjustment for an imaging synchronization signal is performed, Thereafter, in the image transfer system 1, when the after-cycle-adjustment accuracy estimation unit 105 calculates a period-adjusted accuracy estimation value in step S2106, the cycle adjustment determination unit 104 determines the period-adjusted accuracy estimation value in step S2107 of step S306, and the cycle adjustment unit 101 calculates a cycle adjustment amount for performing cycle adjustment for an imaging synchronization signal.

More specifically, in step S1004 included in step S2107, the cycle adjustment determination unit 104 determines whether or not the period-adjusted accuracy estimation value calculated (estimated) by the after-cycle-adjustment accuracy estimation unit 105 is a value indicating that the accuracy of the period of an imaging synchronization signal has been improved.

Here, an example of the process of step S1004 in which the cycle adjustment determination unit 104 determines a period-adjusted accuracy estimation value will be described. In the determination of a period-adjusted accuracy estimation value by the cycle adjustment determination unit 104, first, a range in which a period-adjusted accuracy estimation value can be taken is obtained, and an absolute maximum value in the obtained range in which a period-adjusted accuracy estimation value can be taken is obtained. In addition, the cycle adjustment determination unit 104 determines whether or not a period-adjusted accuracy estimation value has been improved by comparing a past absolute maximum value with a current absolute maximum value.

For example, when a minimum value of a period-adjusted accuracy estimation value Er calculated (estimated) by the after-cycle-adjustment accuracy estimation unit 105 is set to be a minimum value Er_min and a maximum value of the period-adjusted accuracy estimation value Er is set to be a maximum value Er_max, a case where it is assumed that the current period-adjusted accuracy estimation value Er is in a relationship of Er_min≤Er≤Er_max is considered. In this case, the cycle adjustment determination unit 104 determines that the current period-adjusted accuracy estimation value Er has been improved when an absolute value |Er_min| of a minimum value Er_min at the present point in time is smaller than an absolute value |Er_min| at a past point in time, and an absolute value |Er_max| of a maximum value Er_max at the present point in time is smaller than an absolute value |Er_max| at a past point in time.

Here, assuming that the cycle adjustment unit 101 has already performed cycle adjustment that has been performed once or more on the basis of a maximum value Er_max until the present time, an accuracy error of the period of an imaging synchronization signal (period-adjusted accuracy estimation value Er) is increased to become a maximum value Er_max when the minimum determination value Tdmin_y_1>0 [seconds (sec)] and the minimum determination value Tdmin_y_2m=0 [seconds (sec)] in the above-described Math (9). For example, in a case where the after-cycle-adjustment accuracy estimation unit 105 extracts a minimum determination value in each unit time B to calculate (estimate) a period-adjusted accuracy estimation value Er as in the example shown in FIG. 10, the period-adjusted accuracy estimation value Er is set to be a maximum value Er_max when a minimum determination value Tdmin_y_1 extracted in a first unit time B is larger than 0 seconds and a minimum determination value Tdmin_y_2m extracted in a 2m-th unit time B is 0 seconds. From this, the cycle adjustment determination unit 104 calculates a maximum value Er_max[ppm] of a period-adjusted accuracy estimation value Er on the basis of the following Math (10) in which each of a set including a minimum determination value Tdmin_y_1>0 [seconds (sec)] and a corresponding scheduled transmission time TS_y_1 [seconds (sec)] and a set including a minimum determination value Tdmin_y_2m=0 [seconds (sec)] and a corresponding scheduled transmission time TS_y_2m [seconds (sec)] is applied to the above-described Math (9).

[Math 10]

$$1 + \text{Er\_max} = \frac{\text{TS\_y\_2m} - (\text{TS\_y\_1} - Td\text{min\_y\_1})}{\text{TS\_y\_2m} - \text{TS\_y\_1}} \quad (10)$$

$$\therefore \text{Er\_max} = \frac{Td\text{min\_y\_1}}{\text{TS\_y\_2m} - \text{TS\_y\_1}}$$

On the other hand, assuming that the cycle adjustment unit 101 has already performed cycle adjustment that has been performed once or more on the basis of a minimum value Er_min until the present time, a period-adjusted accuracy estimation value Er is decreased to become a minimum value Er_min when the minimum determination value Tdmin_y_1=0 [seconds (sec)] and the minimum determination value Tdmin_y_2m>0 [seconds (sec)] in the above-described Math (9). For example, in a case where the after-cycle-adjustment accuracy estimation unit 105 extracts a minimum determination value in each unit time B to calculate (estimate) a period-adjusted accuracy estimation value Er as in the example shown in FIG. 10, the period-adjusted accuracy estimation value Er is set to be a minimum value Er_min when a minimum determination value Tdmin_y_1 extracted in a first unit time B is 0 seconds and a minimum determination value Tdmin_y_2m extracted in a 2m-th unit time B is larger than 0 seconds. From this, the cycle adjustment determination unit 104 calculates a minimum value Er_min[ppm] of a period-adjusted accuracy estimation value Er on the basis of the following Math (11) in which each of a set including a minimum determination value Tdmin_y_1=0 [seconds (sec)] and a corresponding scheduled transmission time TS_y_1 [seconds (sec)] and a set including a minimum determination value Tdmin_y_2m>0 [seconds (sec)] and a corresponding scheduled transmission time TS_y_2m [seconds (sec)] is applied to the above-described Math (9).

[Math 11]

$$1 + \text{Er\_min} = \frac{(\text{TS\_y\_2m} - Td\text{min\_y\_2m}) - \text{TS\_y\_1}}{\text{TS\_y\_2m} - \text{TS\_y\_1}} \quad (11)$$

$$\therefore \text{Er\_min} = \frac{-Td\text{min\_y\_2m}}{\text{TS\_y\_2m} - \text{TS\_y\_1}}$$

In addition, the cycle adjustment determination unit 104 determines whether or not a current period-adjusted accuracy estimation value Er is a value indicating that the accuracy of the period of an imaging synchronization signal has been improved according to whether or not a relationship of Er_min≤Er≤Er_max is smaller than that in a past point in time, on the basis of the maximum value Er_max calculated on the basis of the above-described Math (10) and the minimum value Er_min calculated on the basis of the above-described Math (11).

Meanwhile, for example, similarly to a case where the after-cycle-adjustment accuracy estimation unit 105 extracts a minimum determination value in each unit time 2B to calculate (estimate) a period-adjusted accuracy estimation value Er' as in the example shown in FIG. 11, the cycle adjustment determination unit 104 determines whether or not the period-adjusted accuracy estimation value Er' is a value indicating that the accuracy of the period of an imaging synchronization signal has been improved. More specifically, the cycle adjustment determination unit 104 applies each of a set including a minimum determination value Tdmin_y_1' and a corresponding scheduled transmission time TS_y_1' and a set including a minimum determination value Tdmin_y_2m' and a corresponding scheduled transmission time TS_y_2m' to the above-described Math (9) to calculate a maximum value Er_max' and a minimum value Er_min' similar to the above-described Math (10) and the above-described Math (11). In addition, the cycle adjustment determination unit 104 determines whether or not a current period-adjusted accuracy estimation value Er' is a value indicating that the accuracy of the period of an imaging synchronization signal has been improved according to whether or not a relationship of Er_min'≤Er'≤Er_max' is smaller than that in a past point in time, on the basis of the calculated maximum value Er_max' and minimum value Er_min'.

In addition, for example, similarly to a case where the after-cycle-adjustment accuracy estimation unit 105 extracts a minimum determination value in each unit time B' to calculate (estimate) a period-adjusted accuracy estimation value Er" as in the example shown in FIG. 12, the cycle adjustment determination unit 104 determines whether or not the period-adjusted accuracy estimation value Er" is a value indicating that the accuracy of the period of an imaging synchronization signal has been improved. More specifically, the cycle adjustment determination unit 104 applies each of a set including a minimum determination value Tdmin_y_1" and a corresponding scheduled transmission time TS_y_1" and a set including a minimum determination value Tdmin_y_2m" and a corresponding scheduled transmission time TS_y_2m" to the above-described Math (9) to calculate a maximum value Er_max" and a minimum value Er_min" similar to the above-described Math (10) and the above-described Math (11). In addition, the cycle adjustment determination unit 104 determines whether or not a current period-adjusted accuracy estimation value Er" is a value indicating that the accuracy of the period of an imaging synchronization signal has been improved according to whether or not a relationship of Er_min"≤Er"≤Er_max" is smaller than that in a past point in time, on the basis of the calculated maximum value Er_max" and minimum value Er_min".

Meanwhile, as described above, the after-cycle-adjustment accuracy estimation unit 105 may perform a process of calculating a period-adjusted accuracy estimation value even when it is determined that cycle adjustment for an imaging synchronization signal is not performed. For this reason, the cycle adjustment determination unit 104 may determine whether or not a current period-adjusted accuracy estimation value Er has been improved even when the cycle adjustment unit 101 has not performed cycle adjustment until the present time. In this case, for example, when the above-described relationship of Er_min≤Er≤Er_max is established, the cycle adjustment determination unit 104 defines a minimum value Er_min as a minimum value of a periodic error in an imaging reference clock signal generated by the source oscillation clock generation unit 103 and defines a maximum value Er_max as a maximum value of a periodic error in an imaging reference clock signal generated by the source oscillation clock generation unit 103. In addition, the cycle adjustment determination unit 104 determines whether or not a current period-adjusted accuracy estimation value Er is a value indicating that the accuracy of the period of an imaging synchronization signal has been improved according to whether or not a relationship of Er_min≤Er≤Er_max is smaller than that in a past point in time, on the basis of the defined maximum value Er_max and minimum value Er_min. Meanwhile, a minimum value and a maximum value of a periodic error in an imaging reference clock signal generated by the source oscillation clock generation unit 103 may be defined on the basis of information of specifications representing the accuracy of a clock generator.

Further, in the image transfer system 1, in a case where the cycle adjustment determination unit 104 determines that the accuracy of the period of an imaging synchronization signal has been improved in step S1004 ("YES" in step S1004), the cycle adjustment unit 101 calculates a cycle adjustment amount for performing cycle adjustment for an imaging synchronization signal.

More specifically, in step S1206 included in step S2107, the cycle adjustment unit 101 calculates a cycle adjustment amount on the basis of a period-adjusted accuracy estimation value output from the cycle adjustment determination unit 104, a combination of a round trip propagation-time determination value, a scheduled transmission time of a round-trip-propagation-time-measurement outgoing signal, and a scheduled transmission time of a round-trip-propagation-time-measurement returning signal.

Here, an example of the process of step S1206 in which the cycle adjustment unit 101 calculates a cycle adjustment amount will be described. For example, a case where the after-cycle-adjustment accuracy estimation unit 105 calculates (estimates) a period-adjusted accuracy estimation value Er [ppm] will be considered. In this case, a scheduled transmission time of a round-trip-propagation-time-measurement outgoing signal corresponding to a minimum determination value Tdmin_y_1 extracted in a first unit time is set to be a scheduled transmission time TS_y_1 [seconds (sec)], and a scheduled transmission time of a round-trip-propagation-time-measurement outgoing signal corresponding to a minimum determination value Tdmin_y_n extracted in an n-th (n is a natural number of 2 or greater, a positive integer) unit time is set to be a scheduled transmission time TS_y_n [seconds (sec)]. In addition, a scheduled transmission time of a round-trip-propagation-time-measurement returning signal corresponding to a minimum determination value Tdmin_y_1 extracted in a first unit time is set to be a scheduled transmission time Tr_y_1 [seconds (sec)], and a scheduled transmission time of a round-trip-propagation-time-measurement returning signal corresponding to a minimum determination value Tdmin_y_n extracted in an n-th unit time is set to be a scheduled transmission time Tr_y_n [seconds (sec)]. In addition, a correction factor for cycle adjustment when the cycle adjustment unit 101 calculates a cycle adjustment amount is set to be a correction factor for cycle adjustment β.

The cycle adjustment unit 101 calculates a cycle adjustment amount E indicating a change in a round trip propagation-time with respect to a scheduled transmission time of a round-trip-propagation-time-measurement returning signal transmitted by the display terminal 200 by multiplying a period-adjusted accuracy estimation value Er indicating a round trip propagation-time with respect to a scheduled transmission time of a round-trip-propagation-time-measurement outgoing signal transmitted from the imaging terminal 100 by the correction factor for cycle adjustment β on the basis of the following Math (12) and the following Math (13).

[Math 12]

$$\beta = \frac{TS\_y\_n - TS\_y\_1}{TR\_y\_n - TR\_y\_1} \tag{12}$$

[Math 13]

$$E = Er \times \beta \tag{13}$$

In addition, the cycle adjustment unit 101 outputs the calculated cycle adjustment amount to the synchronization signal generation unit 102 together with a cycle adjustment instruction. Thereby, the synchronization signal generation unit 102 performs cycle adjustment for adjusting the period of an imaging synchronization signal to be generated by an amount corresponding to the cycle adjustment amount, in response to the cycle adjustment instruction which is output from the cycle adjustment unit 101.

Figure 13:
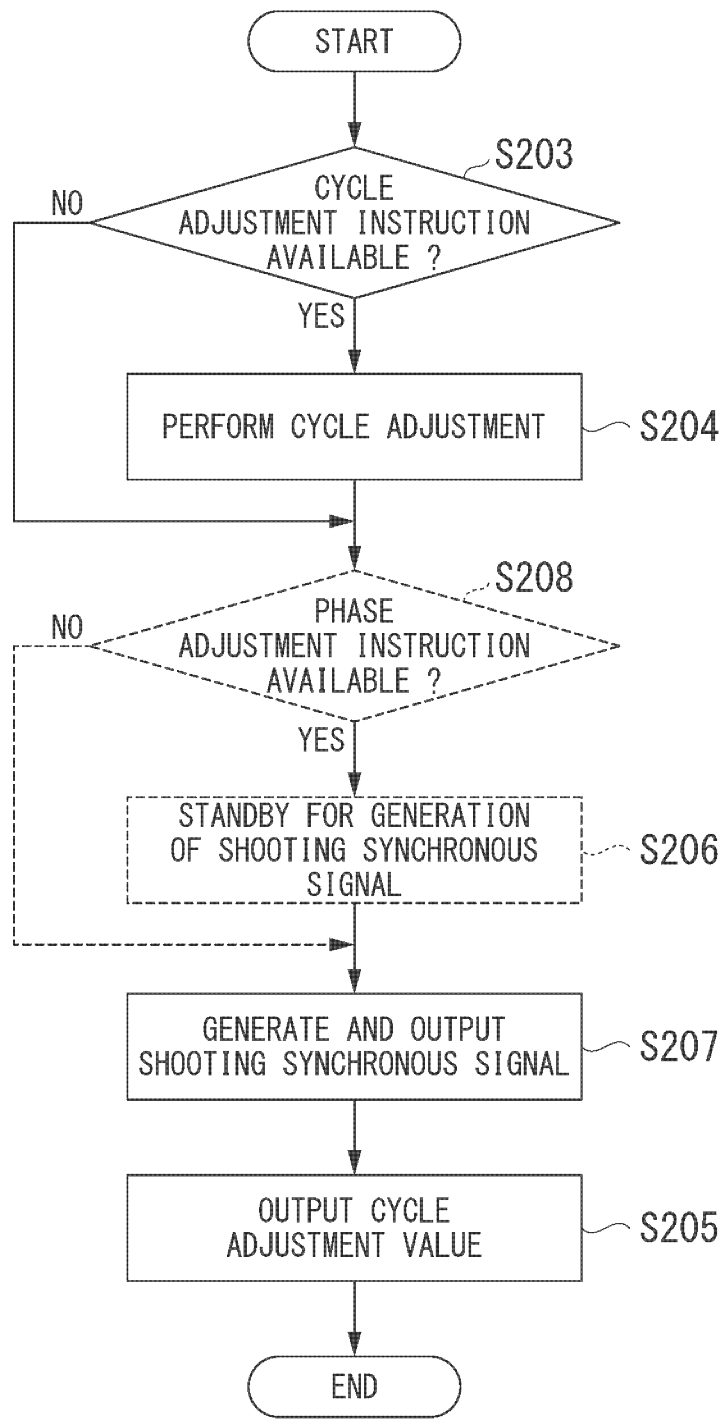
FIG. 13 is a flow chart showing processing procedures of adjustment processing for a shooting synchronous signal by the imaging terminal configuring the image transmission system according to the first embodiment of the present invention.

Here, an example of processing in which the synchronization signal generation unit 102 adjusts the period of an imaging synchronization signal to be generated will be described. FIG. 13 is a flowchart showing a processing procedure of a process of adjusting an imaging synchronization signal by the imaging terminal 100 constituting the image transfer system 1 according to the first embodiment of the present invention.

The synchronization signal generation unit 102 starts an operation of generating an imaging synchronization signal when the imaging terminal 100 is started up and an imaging reference clock signal is input from the source oscillation clock generation unit 103. In addition, the synchronization signal generation unit 102 confirms whether or not a cycle adjustment instruction has been output from the cycle adjustment unit 101 (step S203).

As a result of the confirmation in step S203, in a case where a cycle adjustment instruction has not been output from the cycle adjustment unit 101 ("NO" in step S203), the synchronization signal generation unit 102 causes the processing to proceed to step S207. On the other hand, as a result of the confirmation in step S203, in a case where a cycle adjustment instruction has been output from the cycle adjustment unit 101 ("YES" in step S203), the synchronization signal generation unit 102 performs cycle adjustment for an imaging synchronization signal in accordance with a cycle adjustment amount which is output from the cycle adjustment unit 101 together with the cycle adjustment instruction (step S204).

For example, when the period of an imaging synchronization signal before cycle adjustment is performed is set to be a period A and a cycle adjustment amount output from the cycle adjustment unit 101 is set to be a cycle adjustment amount E, the synchronization signal generation unit 102 calculates a period A' of an imaging synchronization signal on which cycle adjustment has been performed according to the following Math (14) to perform cycle adjustment in step S204.

[Math 14]

$$A' = A \times (1+E) \tag{14}$$

In addition, the synchronization signal generation unit 102 causes the processing to proceed to step S207. In addition, the synchronization signal generation unit 102 generates an imaging synchronization signal on which cycle adjustment has been performed, and outputs the generated imaging synchronization signal to each of the components (the imaging unit not shown in the drawing and the round-trip-propagation-time measurement unit 106) included in the imaging terminal 100 (step S207).

Thereafter, in a case where a cycle adjustment instruction has been output from the cycle adjustment unit 101 ("YES" in step S203) and cycle adjustment for an imaging synchronization signal has been performed in accordance with the cycle adjustment amount output from the cycle adjustment unit 101 together with the cycle adjustment instruction in step S204, the synchronization signal generation unit 102 outputs information of a cycle adjustment amount for an imaging synchronization signal which is adjusted in the performed cycle adjustment to the round-trip-propagation-time measurement unit 106 (step S205). That is, in step S205, the synchronization signal generation unit 102 outputs the information of the cycle adjustment amount which is output from the cycle adjustment unit 101 together with the cycle adjustment instruction to the phase adjustment unit, not shown in the drawing, which is included in the round-trip-propagation-time measurement unit 106.

Meanwhile, in the image transfer system 1, as described above, when the after-cycle-adjustment accuracy estimation unit 105 included in the imaging terminal 100 can acquire a plurality of round trip propagation-time determination values in a period determined in advance from the phase adjustment unit not shown in the drawing, a period-adjusted accuracy estimation value can be calculated (estimated). That is, in the image transfer system 1, the phase of the imaging synchronization signal has not necessarily be adjusted by the synchronization signal generation unit 102. However, in the image transfer system 1, an example of processing in which the phase adjustment unit not shown in the drawing performs phase adjustment for an imaging synchronization signal has been described using FIG. 3 or FIG. 9. In the synchronization signal generation unit 102, phase adjustment for an imaging synchronization signal is performed before an imaging synchronization signal is generated in step S207 after cycle adjustment for an imaging synchronization signal is performed in step S204.

In a phase adjustment process for an imaging synchronization signal performed in the synchronization signal generation unit 102, first, it is confirmed whether or not a phase adjustment instruction has been output from the phase adjustment unit not shown in the drawing (step S208). As a result of the confirmation in step S208, in a case where a phase adjustment instruction has not been output from the phase adjustment unit not shown in the drawing ("NO" in step S208), the synchronization signal generation unit 102 causes the processing to proceed to step S207. On the other hand, as a result of the confirmation in step S208, in a case where a phase adjustment instruction has been output from the phase adjustment unit not shown in the drawing ("YES" in step S208), the synchronization signal generation unit 102 temporarily stops generating an imaging synchronization signal in response to a phase adjustment instruction. In addition, the synchronization signal generation unit 102 waits until a period of time represented in a round trip propagation-time which is output from the phase adjustment unit not shown in the drawing together with the phase adjustment instruction elapses (step S206). Thereafter, the synchronization signal generation unit 102 causes the processing to proceed to step S207.

According to such a processing procedure, the synchronization signal generation unit 102 generates and outputs an imaging synchronization signal of which the phase or period is adjusted, in response to the phase adjustment instruction which is output by the phase adjustment unit not shown in the drawing or the cycle adjustment instruction which is output by the cycle adjustment unit 101. Thereby, in the image transfer system 1, it is possible to perform adjustment so that the phase or period (at least a period) of an imaging synchronization signal generated in the imaging terminal 100 matches the phase or period (at least a period) of a display synchronization signal generated by the display terminal 200.

Figure 14:
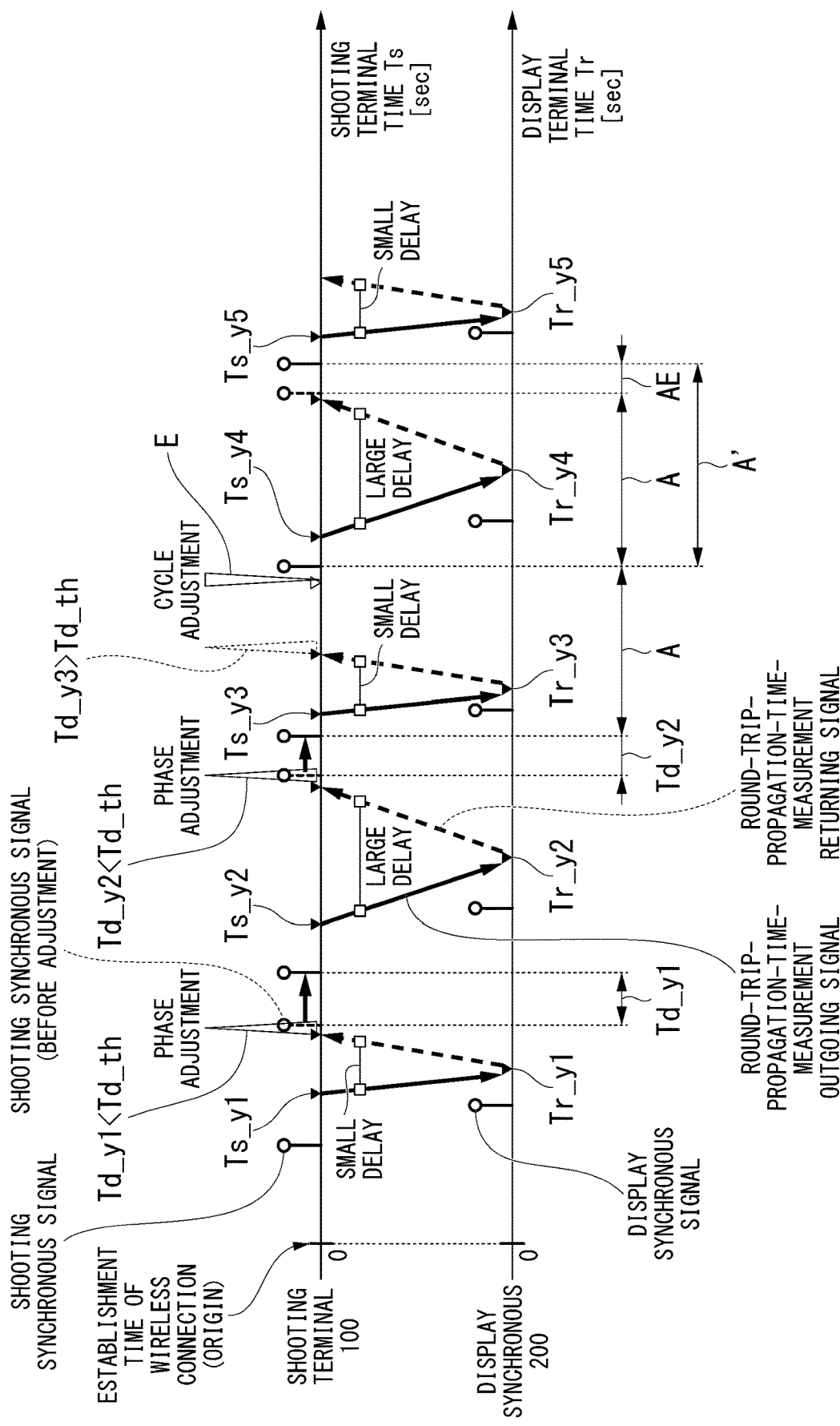
FIG. 14 is a timing chart showing an example of transmission and reception of shooting image data via wireless transmission in the image transmission system according to the first embodiment of the present invention.
Figure 15:
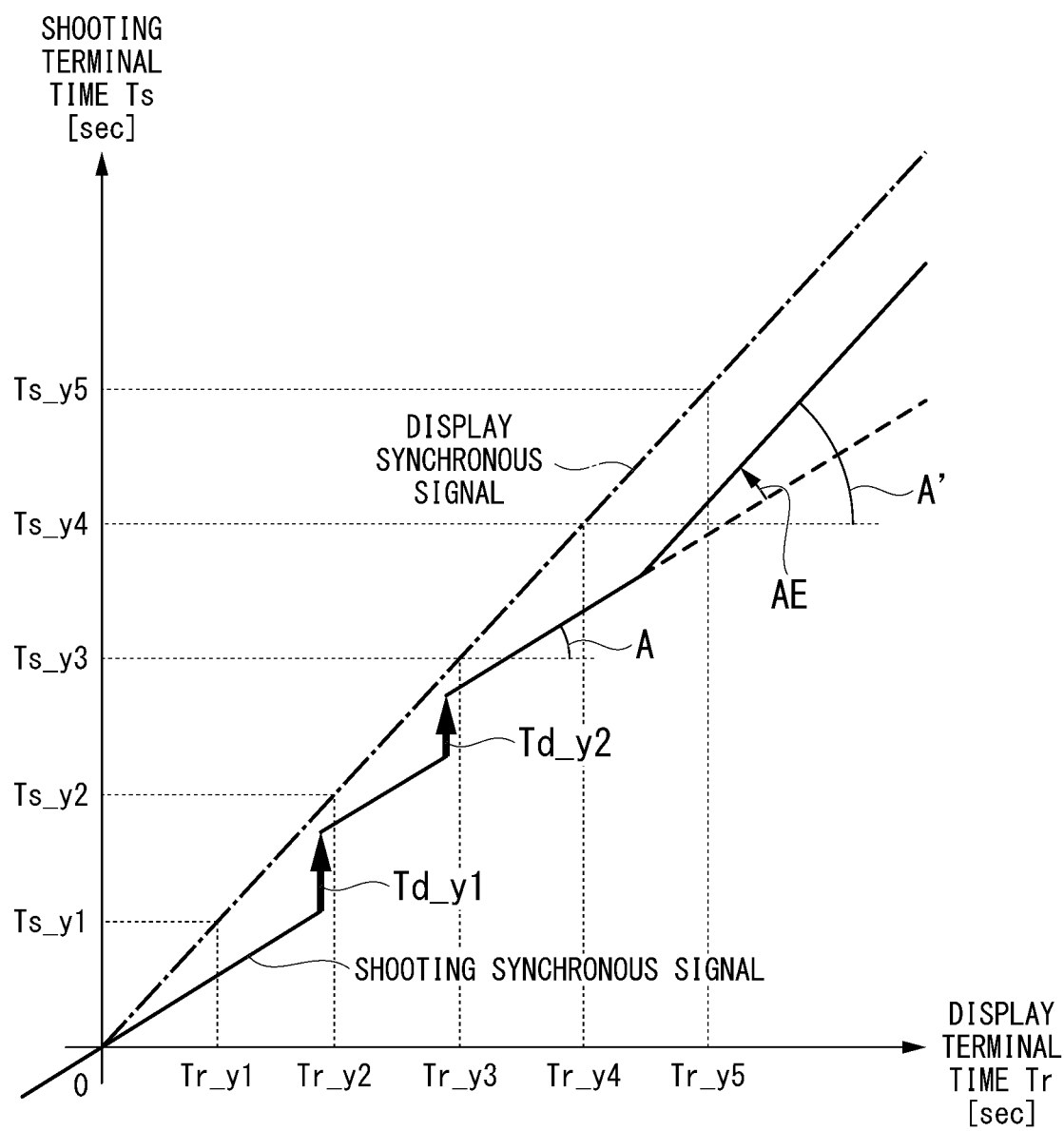
FIG. 15 is a view showing relationship between the synchronous signal and time during wireless transmission of the shooting image data in the image transmission system according to the first embodiment of the present invention.

Here, an example of a case where the phase or period of an imaging synchronization signal is adjusted in the image transfer system 1 will be described. FIG. 14 is a timing chart showing an example of transmission and reception of captured image data to be wirelessly transferred in the image transfer system 1 according to the first embodiment of the present invention. In addition, FIG. 15 is a diagram showing an example of a relationship between a synchronization signal (an imaging synchronization signal and a display synchronization signal) and a time (an imaging terminal time and a display terminal time) when captured image data is wirelessly transferred in the image transfer system 1 according to the first embodiment of the present invention.

FIG. 14 shows an example of a timing when the synchronization signal generation unit 102 generates an imaging synchronization signal on a time axis of an imaging terminal time in the imaging terminal 100. In addition, FIG. 14 shows an example of a timing when the synchronous signal generation unit 204 generates a display synchronization signal on a time axis of a display terminal time in the display terminal 200. In addition, FIG. 14 shows an example of timings of a round-trip-propagation-time-measurement outgoing signal and a round-trip-propagation-time-measurement returning signal which are wirelessly transferred between the imaging terminal 100 and the display terminal 200. In addition, FIG. 15 shows an example of a relationship between the phase or period of an imaging synchronization signal or period of a display synchronization signal changing with the elapse of time and the phase when an imaging terminal time in the imaging terminal 100 is set to be an X axis and a display terminal time in the display terminal 200 is set to be a Y axis. FIGS. 14 and 15 schematically show a case where the phase or period of an imaging synchronization signal generated by the synchronization signal generation unit 102 are adjusted so as to match the phase or period of a display synchronization signal generated by the synchronous signal generation unit 204 on the basis of a round trip propagation-time calculated in the imaging terminal 100.

In the image transfer system 1, the imaging terminal 100 starts generating an imaging synchronization signal by setting a point in time when wireless connection is established to be a reference imaging terminal time=0 as described above, and transmits a round-trip-propagation-time-measurement outgoing signal to the display terminal 200 for each scheduled transmission time. Further, in the image transfer system 1, the display terminal 200 starts generating a display synchronization signal by setting a point in time when wireless connection is established to be a reference display terminal time=0 as described above, and waits for a round-trip-propagation-time-measurement outgoing signal to be transmitted from the imaging terminal 100. In addition, when the display terminal 200 receives the round-trip-propagation-time-measurement outgoing signal transmitted from the imaging terminal 100, the display terminal transmits a round-trip-propagation-time-measurement returning signal corresponding to the received round-trip-propagation-time-measurement outgoing signal to the imaging terminal 100 for each scheduled transmission time. Thereby, the imaging terminal 100 adjusts the phase or period of an imaging synchronization signal on the basis of the transmitted round-trip-propagation-time-measurement outgoing signal and the received round-trip-propagation-time-measurement returning signal.

The example shown in FIG. 14 shows a state where the imaging terminal 100 (more specifically, the round-trip-propagation-time measurement unit 106) sets respective times of an imaging terminal time=Ts_y1 to Ts_y5 to be scheduled transmission times and transmits a round-trip-propagation-time-measurement outgoing signal to the display terminal 200 at each of the scheduled transmission times. In addition, the example shown in FIG. 14 shows a state where the display terminal 200 (more specifically, the round-trip-propagation-time-measurement assistance unit 202) sets respective times of a display terminal time=Tr_y1 to Tr_y5 after a round-trip-propagation-time-measurement outgoing signal transmitted from the imaging terminal 100 is received to be scheduled transmission times, and transmits a round-trip-propagation-time-measurement returning signal corresponding to the received round-trip-propagation-time-measurement outgoing signal to the imaging terminal 100 at each of the scheduled transmission times. Meanwhile, in the example shown in FIG. 14, for ease of description, a receiver elapsed time from an input time when the display terminal 200 receives a round-trip-propagation-time-measurement outgoing signal to a scheduled transmission time when the display terminal transmits a round-trip-propagation-time-measurement returning signal is set to be a receiver elapsed time $\Delta Trev=0$. In addition, respective times of the imaging terminal time=Ts_y1 to Ts_y5 and the display terminal time=Tr_y1 to Tr_y5 shown in FIG. 15 corresponds to the respective times in the example shown in FIG. 14.

More specifically, in the example shown in FIG. 14, the imaging terminal 100 (the round-trip-propagation-time measurement unit 106) transmits a first round-trip-propagation-time-measurement outgoing signal to the display terminal 200 when an imaging terminal time=Ts_y1 and receives a first round-trip-propagation-time-measurement returning signal transmitted from the display terminal 200 (the round-trip-propagation-time-measurement assistance unit 202) when a display terminal time=Tr_y1. Thereby, the round-trip-propagation-time measurement unit 106 calculates a first round trip propagation-time Td_y1 on the basis of a round-trip-propagation-time-measurement outgoing signal which is transmitted first and a round-trip-propagation-time-measurement returning signal which is received first. In the example shown in FIG. 14, the first round trip propagation-time Td_y1 calculated by the round-trip-propagation-time measurement unit 106 is a round trip propagation-time which is smaller than a round trip propagation-time determination value Td_th (Td_y1<Td_th). For this reason, the phase adjustment unit not shown in the drawing determines that phase adjustment for an imaging synchronization signal is performed, and outputs a phase adjustment instruction, indicating that the phase of an imaging synchronization signal is adjusted by waiting for the generation of an imaging synchronization signal until a period of time represented in the first round trip propagation-time Td_y1 elapses, to the synchronization signal generation unit 102. Thereby, the synchronization signal generation unit 102 regenerates an imaging synchronization signal after waiting for the generation of an imaging synchronization signal for the first round trip propagation-time Td_y1 instructed by the phase adjustment unit not shown in the drawing to adjust the phase of an imaging synchronization signal to be generated. As a result, the phase of an imaging synchronization signal generated by the synchronization signal generation unit 102 approaches the phase of a display synchronization signal generated by the synchronous signal generation unit 204 as in the example shown in FIG. 15.

Hereinafter, similarly, the imaging terminal 100 (the round-trip-propagation-time measurement unit 106) repeats phase adjustment for an imaging synchronization signal. In the example shown in FIG. 14, the imaging terminal 100 (the round-trip-propagation-time measurement unit 106) transmits a second round-trip-propagation-time-measurement outgoing signal to the display terminal 200 when an imaging terminal time=Ts_y2, and receives a second round-trip-propagation-time-measurement returning signal transmitted from the display terminal 200 (the round-trip-propagation-time-measurement assistance unit 202) when a display terminal time=Tr_y2. Thereby, the round-trip-propagation-time measurement unit 106 calculates a second round trip propagation-time Td_y2 on the basis of a round-trip-propagation-time-measurement outgoing signal which is transmitted second and a round-trip-propagation-time-measurement returning signal which is received second. In the example shown in FIG. 14, the second round trip propagation-time Td_y2 calculated by the round-trip-propagation-time measurement unit 106 is also a round trip propagation-time which is smaller than a round trip propagation-time determination value Td_th (Td_y2<Td_th). For this reason, the phase adjustment unit not shown in the drawing determines that phase adjustment for an imaging synchronization signal is performed, and outputs a phase adjustment instruction, indicating that the phase of an imaging synchronization signal is adjusted by waiting for the generation of an imaging synchronization signal until a period of time represented in the second round trip propagation-time Td_y2 elapses, to the synchronization signal generation unit 102. Thereby, the synchronization signal generation unit 102 regenerates an imaging synchronization signal after waiting for the generation of an imaging synchronization signal for a period of time represented in the second round trip propagation-time Td_y2 instructed by the phase adjustment unit not shown in the drawing to adjust the phase of an imaging synchronization signal to be generated. As a result, the phase of an imaging synchronization signal generated by the synchronization signal generation unit 102 approaches the phase of a display synchronization signal generated by the synchronous signal generation unit 204 as in the example shown in FIG. 15.

Meanwhile, in the example shown in FIG. 14, the imaging terminal 100 (the round-trip-propagation-time measurement unit 106) transmits a third round-trip-propagation-time-measurement outgoing signal to the display terminal 200 when an imaging terminal time=Ts_y3, and receives a third round-trip-propagation-time-measurement returning signal transmitted from the display terminal 200 (the round-trip-propagation-time-measurement assistance unit 202) when a display terminal time=Tr_y3. In this case, a third round trip propagation-time Td_y3 calculated by the round-trip-propagation-time measurement unit 106 is a round trip propagation-time which is larger than a round trip propagation-time determination value Td_th (Td_y3>Td_th). For this reason, the phase adjustment unit not shown in the drawing determines that phase adjustment for an imaging synchronization signal is not performed. In this case, the phase adjustment unit not shown in the drawing does not output a phase adjustment instruction to the synchronization signal generation unit 102. That is, the phase adjustment unit not shown in the drawing causes the synchronization signal generation unit 102 to continue generating an imaging synchronization signal without performing phase adjustment for an imaging synchronization signal. Thereby, the synchronization signal generation unit 102 continues generating an imaging synchronization signal at a phase adjusted in accordance with the second round trip propagation-time Td_y2, that is, a timing adjusted previously.

Further, in the example shown in FIG. 14, a period of time determined in advance elapses, the period of time being required for the imaging terminal 100 (the round-trip-propagation-time measurement unit 106) to receive the third round-trip-propagation-time-measurement returning signal transmitted from the display terminal 200 (the round-trip-propagation-time-measurement assistance unit 202) when a display terminal time=Tr_y3 and then determine whether or not cycle adjustment is performed. For this reason, the after-cycle-adjustment accuracy estimation unit 105 acquires a plurality of round trip propagation-time determination values used to determine whether or not phase adjustment for an imaging synchronization signal is to be performed during a period determined in advance from the phase adjustment unit not shown in the drawing, and calculates (estimates) a period-adjusted accuracy estimation value of an imaging synchronization signal in a case where cycle adjustment is temporarily executed, on the basis of information of the plurality of round trip propagation-time determination values acquired. In addition, the cycle adjustment determination unit 104 determines whether or not cycle adjustment for an imaging synchronization signal is performed, on the basis of the period-adjusted accuracy estimation value calculated (estimated) by the after-cycle-adjustment accuracy estimation unit 105. In the example shown in FIG. 14, the cycle adjustment determination unit 104 determines that cycle adjustment for an imaging synchronization signal is performed. For this reason, the cycle adjustment unit 101 calculates a cycle adjustment amount for performing cycle adjustment for an imaging synchronization signal in accordance with a determination result indicating that cycle adjustment for an imaging synchronization signal is performed which is obtained by the cycle adjustment determination unit 104, and outputs the calculated cycle adjustment amount to the synchronization signal generation unit 102 together with a cycle adjustment instruction. In the example shown in FIG. 14, the cycle adjustment unit 101 outputs a cycle adjustment amount E to the synchronization signal generation unit 102 together with a cycle adjustment instruction. Thereby, the synchronization signal generation unit 102 adjusts the period of an imaging synchronization signal to be generated, in accordance with the cycle adjustment amount E which is output from the cycle adjustment unit 101. The example shown in FIG. 14 shows a state where a period A of an imaging synchronization signal before cycle adjustment is performed is adjusted to a period A' which is increased by an adjustment amount ΔE according to the cycle adjustment amount E. As a result, the period of an imaging synchronization signal generated by the synchronization signal generation unit 102 becomes similar to the period of a display synchronization signal generated by the synchronous signal generation unit 204 as in the example shown in FIG. 15.

In this manner, in the image transfer system 1, the imaging terminal 100 (more specifically, the synchronization signal generation unit 102) adjusts the phase or period of an imaging synchronization signal to be generated. Thereby, in the image transfer system 1, adjustment is performed so that the phase or period (at least a period) of an imaging synchronization signal generated by the synchronization signal generation unit 102 matches the phase or period (at least a period) of a display synchronization signal generated by the display terminal 200 (more specifically, the synchronous signal generation unit 204). That is, in the image transfer system 1, even when the phase or period of each of an imaging synchronization signal and a display synchronization signal is shifted with the elapse of time due to an error of the phase or period between an imaging reference clock signal generated by the source oscillation clock generation unit 103 and a display reference clock signal generated by the source oscillation clock generation unit 205, the phase or period (at least a period) of the imaging synchronization signal is adjusted so as to match the phase or period (at least a period) of the display synchronization signal in the imaging terminal 100.

As described above, in the image transfer system 1 of the first embodiment, after wireless connection between the imaging terminal 100 and the display terminal 200 is established, transmission and reception of a round-trip-propagation-time-measurement outgoing signal and a round-trip-propagation-time-measurement returning signal are performed between the round-trip-propagation-time measurement unit 106 included in the imaging terminal 100 and the round-trip-propagation-time-measurement assistance unit 202 included in the display terminal 200. Further, in the image transfer system 1 of the first embodiment, the round-trip-propagation-time measurement unit 106 calculates a round trip propagation-time required for transmission and reception in wireless transfer between the imaging terminal 100 and the display terminal 200, on the basis of a scheduled transmission time of a round-trip-propagation-time-measurement outgoing signal and a reception time of a round-trip-propagation-time-measurement returning signal corresponding to the round-trip-propagation-time-measurement outgoing signal transmitted from the round-trip-propagation-time-measurement assistance unit 202. Further, in the image transfer system 1 of the first embodiment, the after-cycle-adjustment accuracy estimation unit 105 included in the imaging terminal 100 acquires a plurality of round trip propagation-time determination values based on the round trip propagation-time calculated by the round-trip-propagation-time measurement unit 106 to calculate (estimate) a period-adjusted accuracy estimation value of an imaging synchronization signal in a case where cycle adjustment is temporarily executed. Further, in the image transfer system 1 of the first embodiment, the cycle adjustment determination unit 104 included in the imaging terminal 100 determines whether or not cycle adjustment for an imaging synchronization signal is performed, on the basis of a period-adjusted accuracy estimation value calculated (estimated) by the after-cycle-adjustment accuracy estimation unit 105. Further, in the image transfer system 1 of the first embodiment, in a case where the cycle adjustment determination unit 104 determines that cycle adjustment for an imaging synchronization signal is performed, the cycle adjustment unit 101 included in the imaging terminal 100 calculates a cycle adjustment amount for performing cycle adjustment for an imaging synchronization signal and outputs the calculated cycle adjustment amount to the synchronization signal generation unit 102 together with a cycle adjustment instruction. Thereby, in the image transfer system 1 of the first embodiment, the synchronization signal generation unit 102 adjusts the period of an imaging synchronization signal to be generated by an amount corresponding to the cycle adjustment amount, in response to the cycle adjustment instruction which is output from the cycle adjustment unit 101. That is, in the image transfer system 1 of the first embodiment, the imaging terminal 100 adjusts the period of an imaging synchronization signal to be generated so as to match the period of a display synchronization signal to be generated by the display terminal 200.

Thereby, in the image transfer system 1 of the first embodiment, even when the phase of each of an imaging synchronization signal and a display synchronization signal is shifted with the elapse of time due to an error of the phase or period between an imaging reference clock signal generated by the source oscillation clock generation unit 103 included in the imaging terminal 100 and a display reference clock signal generated by the source oscillation clock generation unit 205 included in the display terminal 200, the period of the imaging synchronization signal can be matched to the period of the display synchronization signal. Thus, in the image transfer system 1 of the first embodiment, even when wireless transfer between the imaging terminal 100 and the display terminal 200 is in an unstable communication situation in which the quality of communication suddenly deteriorates due to frequent retransmission of packet transmission and reception or a decrease in a communication rate and thus wireless transfer with variations exceeding a predetermined range is delayed, wireless transfer can be performed in a state where a delay of wireless transfer exceeding the predetermined range is excluded. Thus, in the image transfer system 1 of the first embodiment, it is possible to wirelessly transfer captured image data from the imaging terminal 100 to the display terminal 200 without exceeding a validity period of a display image and to stably display a display image corresponding to the captured image data transmitted from the imaging terminal 100 in the display terminal 200.

Further, in the image transfer system 1 of the first embodiment, it is possible to adjust the phase of an imaging synchronization signal in addition to the period of an imaging synchronization signal. More specifically, in the image transfer system 1 of the first embodiment, the phase adjustment unit, not shown in the drawing, which is included in the imaging terminal 100 can determine whether or not the synchronization signal generation unit 102 included in the imaging terminal 100 performs phase adjustment for an imaging synchronization signal to be generated, on the basis of a round trip propagation-time calculated by the round-trip-propagation-time measurement unit 106. Further, in the image transfer system 1 of the first embodiment, in a case where the phase adjustment unit not shown in the drawing determines that phase adjustment for an imaging synchronization signal is performed, a phase adjustment instruction for adjusting the phase of an imaging synchronization signal can be output to the synchronization signal generation unit 102. In this case, in the image transfer system 1 of the first embodiment, the synchronization signal generation unit 102 adjusts the phase of an imaging synchronization signal to be generated, in response to a phase adjustment instruction which is output from the phase adjustment unit not shown in the drawing. That is, in the image transfer system 1 of the first embodiment, the imaging terminal 100 adjusts the phase of an imaging synchronization signal to be generated so as to match the phase of a display synchronization signal which is generated by the display terminal 200. Thereby, in the image transfer system 1 of the first embodiment, a display image corresponding to captured image data transmitted from the imaging terminal 100 can be displayed more stably in the display terminal 200.

Meanwhile, in the image transfer system 1 of the first embodiment, a description has been provided of a configuration in which the round-trip-propagation-time measurement unit 106, the after-cycle-adjustment accuracy estimation unit 105, the cycle adjustment determination unit 104, and the cycle adjustment unit 101 which are components for adjusting the period of an imaging synchronization signal generated by the imaging terminal 100 are included in the imaging terminal 100, and the round-trip-propagation-time-measurement assistance unit 202 is included in the display terminal 200. In other words, in the image transfer system 1 of the first embodiment, a description has been provided of a configuration in which a round trip propagation-time is calculated by the imaging terminal 100 transmitting a round-trip-propagation-time-measurement outgoing signal to the display terminal 200 and receiving a round-trip-propagation-time-measurement returning signal transmitted from the display terminal 200. However, in the image transfer system of the present invention, even in a configuration in which components for adjusting the period of an imaging synchronization signal which is generated by an imaging terminal are included in either one of the imaging terminal or a display terminal, a function of adjusting the period of an imaging synchronization signal which is generated by the imaging terminal can be realized similarly. For example, contrary to the image transfer system 1 of the first embodiment, even in a configuration in which a round trip propagation-time is calculated by a display terminal transmitting a round-trip-propagation-time-measurement outgoing signal to an imaging terminal and receiving a round-trip-propagation-time-measurement returning signal transmitted from the imaging terminal, a function of adjusting the period of an imaging synchronization signal which is generated by the imaging terminal can be realized similarly.

Second Embodiment

Figure 16:
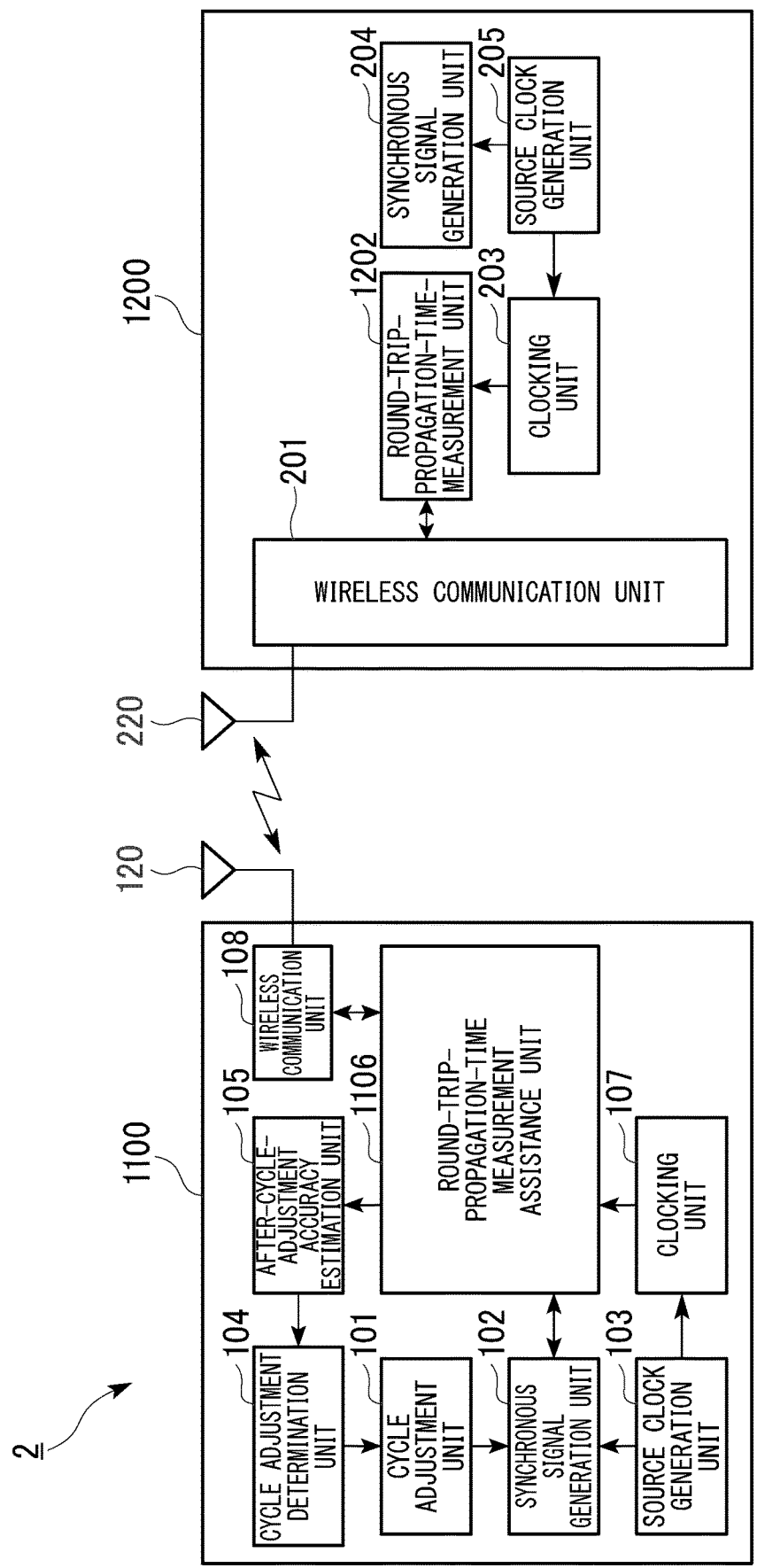
FIG. 16 is a block diagram showing a schematic configuration of an image transmission system according to a second embodiment of the present invention.

Hereinafter, an image transfer system of a second embodiment of the present invention will be described. FIG. 16 is a block diagram showing a schematic configuration of the image transfer system in the second embodiment of the present invention. An image transfer system 2 includes an imaging terminal 1100 and a display terminal 1200. The imaging terminal 1100 includes a synchronization signal generation unit 102, a cycle adjustment unit 101, a source oscillation clock generation unit 103, a wireless communication unit 108, a cycle adjustment determination unit 104, an after-cycle-adjustment accuracy estimation unit 105, a round trip propagation-time measurement assistance unit 1106, a clocking unit 107, and an antenna 120. In addition, the display terminal 1200 includes a synchronous signal generation unit 204, a source oscillation clock generation unit 205, a wireless communication unit 201, a round trip propagation-time measurement unit 1202, a clocking unit 203, and an antenna 220.

Meanwhile, in FIG. 16, in components of the image transfer system 2, the same components as the components included in the image transfer system 1 of the first embodiment shown in FIG. 2 are denoted by the same reference numerals and signs.

Similarly to the image transfer system 1 of the first embodiment, the image transfer system 2 is also an image transfer system configured such that transmission and reception of a round-trip-propagation-time-measurement outgoing signal and a round-trip-propagation-time-measurement returning signal are performed between the imaging terminal 1100 and the display terminal 1200, and the imaging terminal 1100 adjusts the phase or period (at least a period) of an imaging synchronization signal to be generated so as to match the phase or period (at least a period) of a display synchronization signal which is generated by the display terminal 1200.

However, in the image transfer system 2, the disposition of some components included in the imaging terminal 100 or the display terminal 200 in the image transfer system 1 of the first embodiment is replaced. More specifically, in the image transfer system 2, the display terminal 1200 includes a round trip propagation-time measurement unit 1202 that replaces the round-trip-propagation-time measurement unit 106 included in the imaging terminal 100 in the image transfer system 1 of the first embodiment. Further, in the image transfer system 2, the imaging terminal 1100 includes a round trip propagation-time measurement assistance unit 1106 that replaces the round-trip-propagation-time-measurement assistance unit 202 included in the display terminal 200 in the image transfer system 1 of the first embodiment.

For this reason, in the image transfer system 2, the display terminal 1200 transmits a round-trip-propagation-time-measurement outgoing signal to the imaging terminal 1100, and the imaging terminal 1100 transmits a round-trip-propagation-time-measurement returning signal corresponding to the round-trip-propagation-time-measurement outgoing signal transmitted from the display terminal 1200 to the display terminal 1200. Further, in the image transfer system 2, the display terminal 1200 calculates a round trip propagation-time required for transmission and reception in wireless transfer between the imaging terminal 1100 and the display terminal 1200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the imaging terminal 1100.

However, in the image transfer system 2, although there is a process of exchanging signals through wireless transfer in association with a change in the disposition of components, functions and operations of the components are the same as the functions and operations of the corresponding components in the image transfer system 1 of the first embodiment. That is, the functions and operations of the components included in the imaging terminal 1100 and the display terminal 1200 in the image transfer system 2 can be easily understood from the above description of the components included in the imaging terminal 100 and the display terminal 200 in the image transfer system 1 of the first embodiment. Therefore, a detailed description related to the components included in the image transfer system 2 will be omitted.

Figure 17:
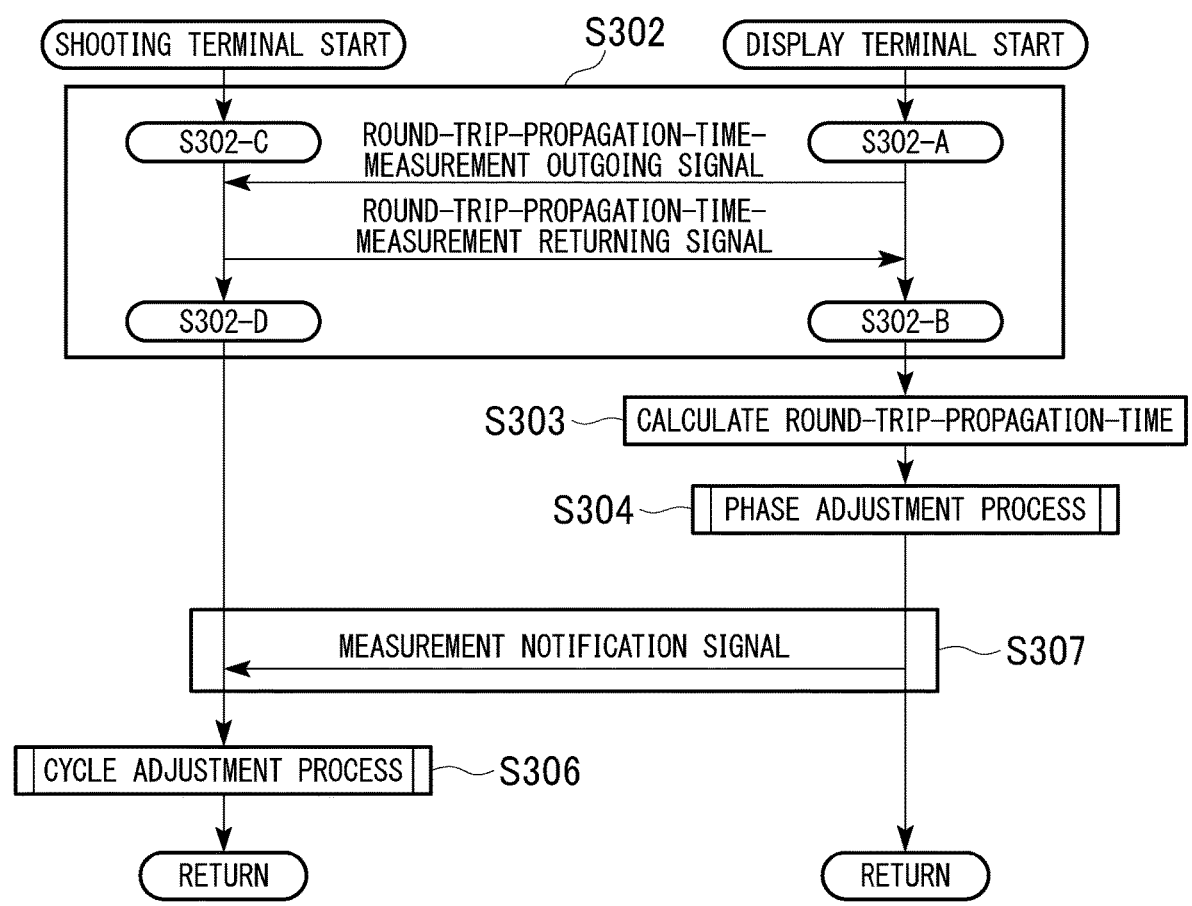
FIG. 17 is a flow chart showing processing procedures of the image transmission system according to the second embodiment of the present invention.

Next, operations of processing in the image transfer system 2 will be described. Meanwhile, in the image transfer system 2, it is assumed that the phase adjustment unit, not shown in the drawing, which is provided in the round-trip-propagation-time measurement unit 106 included in the imaging terminal 100 in the image transfer system 1 of the first embodiment is included in the round trip propagation-time measurement unit 1202. FIG. 17 is a flowchart showing a processing procedure of the image transfer system 2 in the second embodiment of the present invention.

In the image transfer system 2, a process of transmitting information used to adjust the period of an imaging synchronization signal which is generated by the synchronization signal generation unit 102 to the imaging terminal 1100 is added, in association with a change to a configuration in which the display terminal 1200 transmits a round-trip-propagation-time-measurement outgoing signal. For this reason, in the image transfer system 2, information such as a round trip propagation-time determination value which is used to adjust the period of an imaging synchronization signal is transmitted to the imaging terminal 1100. However, an outline of the overall operation in the image transfer system 2 is the same as that of the image transfer system 1 of the first embodiment. Therefore, in the image transfer system 2, a description of an outline of the overall operation will be omitted, and a more specific operation of performing cycle adjustment for an imaging synchronization signal in the image transfer system 2 will be described.

In the image transfer system 2, when a cycle adjustment process is started, the display terminal 1200 transmits a round-trip-propagation-time-measurement outgoing signal to the imaging terminal 1100, and the imaging terminal 1100 transmits a round-trip-propagation-time-measurement returning signal corresponding to the round-trip-propagation-time-measurement outgoing signal to the display terminal 1200 in step S302. More specifically, in the display terminal 1200, the round trip propagation-time measurement unit 1202 transmits a round-trip-propagation-time-measurement outgoing signal to the imaging terminal 1100 through the wireless communication unit 201 and the antenna 220 and receives a round-trip-propagation-time-measurement returning signal transmitted from the imaging terminal 1100 in the processes of steps S302-A to S302-B included in step S302. On the other hand, in the imaging terminal 1100, when a cycle adjustment process is started, the round trip propagation-time measurement assistance unit 1106 receives a round-trip-propagation-time-measurement outgoing signal transmitted from the display terminal 1200 through the antenna 120 and the wireless communication unit 108 and transmits a round-trip-propagation-time-measurement returning signal corresponding to the received round-trip-propagation-time-measurement outgoing signal to the display terminal 1200 in the processes of steps S302-C to S302-D included in step S302.

Meanwhile, in the image transfer system 2, the process of step S302 in which a round-trip-propagation-time-measurement outgoing signal and a round-trip-propagation-time-measurement returning signal are transmitted and received between the imaging terminal 1100 and the display terminal 1200 can be easily understood by inversely considering the imaging terminal 100 and the display terminal 200 which perform the process of step S302 in the image transfer system 1 of the first embodiment. More specifically, the processes of transmitting and receiving a round-trip-propagation-time-measurement outgoing signal and a round-trip-propagation-time-measurement returning signal by the imaging terminal 100 constituting the image transfer system 1 of the first embodiment (the processes of steps S302-A to S302-B), shown in FIG. 4, can be easily understood by considering that the processes are performed by the display terminal 1200 (more specifically, the round trip propagation-time measurement unit 1202). In addition, the processes of transmitting and receiving a round-trip-propagation-time-measurement outgoing signal and a round-trip-propagation-time-measurement returning signal by the display terminal 200 constituting the image transfer system 1 of the first embodiment (the processes of steps S302-C to S302-D), shown in FIG. 5, can be easily understood by considering that the processes are performed by the imaging terminal 1100 (more specifically, the round trip propagation-time measurement assistance unit 1106). Therefore, a detailed description related to the process of step S302 in the image transfer system 2 will be omitted.

Thereafter, in the image transfer system 2, in step S303, the display terminal 1200 calculates a round trip propagation-time required for transmission and reception in wireless transfer between the imaging terminal 1100 and the display terminal 1200. More specifically, the round trip propagation-time measurement unit 1202 calculates a round trip propagation-time required for transmission and reception in wireless transfer between the imaging terminal 1100 and the display terminal 1200, on the basis of information regarding a transmitted round-trip-propagation-time-measurement outgoing signal and information included in a round-trip-propagation-time-measurement returning signal transmitted from the imaging terminal 1100.

Thereafter, in the image transfer system 2, in step S304, the display terminal 1200 adjusts the phase of an imaging synchronization signal, on the basis of the round trip propagation-time required for transmission and reception in wireless transfer between the imaging terminal 1100 and the display terminal 1200 which is calculated in step S303. More specifically, in step S304, the phase adjustment unit, not shown in the drawing, which is provided in the round trip propagation-time measurement unit 1202 included in the display terminal 1200 generates a phase adjustment instruction on the basis of the round trip propagation-time calculated by the round trip propagation-time measurement unit 1202 and updates a round trip propagation-time determination value. Meanwhile, the process of adjusting the phase of an imaging synchronization signal in step S304 is the same as the process of step S304 in the image transfer system 1 of the first embodiment. Therefore, a detailed description related to the process of step S304 in the image transfer system 2 will be omitted.

Thereafter, in the image transfer system 2, in step S307, the display terminal 1200 generates a measurement notification signal including information of the calculated round trip propagation-time and transmits the generated measurement notification signal to the imaging terminal 1100. More specifically, the round trip propagation-time measurement unit 1202 generates a measurement notification signal including information of the calculated round trip propagation-time, information of a scheduled transmission time of a round-trip-propagation-time-measurement outgoing signal, information of a scheduled transmission time included in a received round-trip-propagation-time-measurement returning signal, a phase adjustment instruction generated by the phase adjustment unit not shown in the drawing, and information of a plurality of round trip propagation-time determination values updated by the phase adjustment unit not shown in the drawing. In addition, the round trip propagation-time measurement unit 1202 outputs the generated measurement notification signal to the wireless communication unit 201 and transmits the measurement notification signal to the imaging terminal 1100 through the wireless communication unit 201 and the antenna 220. Thereby, the imaging terminal 1100 acquires information of the round trip propagation-time determination values from the display terminal 1200. More specifically, the wireless communication unit 108 receives the measurement notification signal transmitted from the display terminal 1200 through the antenna 120. In addition, the wireless communication unit 108 outputs each of the information of the round trip propagation-time included in the received measurement notification signal, the information of the scheduled transmission time of the round-trip-propagation-time-measurement outgoing signal, the information of the scheduled transmission time of the round-trip-propagation-time-measurement returning signal, the information of the phase adjustment instruction, and the information of the plurality of round trip propagation-time determination values to the round trip propagation-time measurement assistance unit 1106.

Thereafter, in the image transfer system 2, in step S306, the imaging terminal 1100 adjusts the period of an imaging synchronization signal on the basis of information transmitted from the display terminal 1200, that is, information of the plurality of round trip propagation-time determination values updated in step S304 by the display terminal 1200, similar to the processes in step S306 in the image transfer system 1 of the first embodiment. In this case, the round trip propagation-time measurement assistance unit 1106 outputs each of the information of the round trip propagation-time included in the measurement notification signal output from the wireless communication unit 108, the information of the scheduled transmission time of the round-trip-propagation-time-measurement outgoing signal, the information of the scheduled transmission time of the round-trip-propagation-time-measurement returning signal, and the information of the plurality of round trip propagation-time determination values to each of the after-cycle-adjustment accuracy estimation unit 105, the cycle adjustment determination unit 104, and the cycle adjustment unit 101. Thereby, the after-cycle-adjustment accuracy estimation unit 105 estimates (calculates) a period-adjusted accuracy estimation value of an imaging synchronization signal in a case where cycle adjustment is temporarily executed on the basis of the information of the plurality of round trip propagation-time determination values transmitted from the display terminal 1200 and outputs the estimated period-adjusted accuracy estimation value to the cycle adjustment determination unit 104 (step S2106). In addition, the cycle adjustment determination unit 104 determines whether or not cycle adjustment for an imaging synchronization signal is performed, on the basis of the period-adjusted accuracy estimation value which is output from the after-cycle-adjustment accuracy estimation unit 105 (step S1004). Further, in a case where the cycle adjustment determination unit 104 determines that cycle adjustment for an imaging synchronization signal is performed, the cycle adjustment unit 101 calculates a cycle adjustment amount for performing cycle adjustment for an imaging synchronization signal and outputs the calculated cycle adjustment amount to the synchronization signal generation unit 102 together with a cycle adjustment instruction (step S1206). Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 101.

Meanwhile, the round trip propagation-time measurement assistance unit 1106 outputs a phase adjustment instruction which is output from the wireless communication unit 108 to the synchronization signal generation unit 102. Thereby, the synchronization signal generation unit 102 performs phase adjustment for an imaging synchronization signal to be generated, in response to the phase adjustment instruction which is output from the round trip propagation-time measurement assistance unit 1106, that is, a phase adjustment instruction which is transmitted from the phase adjustment unit, not shown in the drawing, which is provided in the round trip propagation-time measurement unit 1202 included in the display terminal 1200.

In this manner, in the image transfer system 2, the display terminal 1200 transmits a round-trip-propagation-time-measurement outgoing signal and calculates a round trip propagation-time in wireless transfer between the imaging terminal 1100 and the display terminal 1200. Further, in the image transfer system 2, the display terminal 1200 performs a process of updating a round trip propagation-time determination value and transmits information of a plurality of round trip propagation-time determination values updated, information of a round trip propagation-time, information of a scheduled transmission time of a round-trip-propagation-time-measurement outgoing signal, information of a scheduled transmission time of a round-trip-propagation-time-measurement returning signal, and a phase adjustment instruction to the imaging terminal 1100. Thereby, in the image transfer system 2, the imaging terminal 1100 estimates (calculates) a period-adjusted accuracy estimation value in a case where cycle adjustment for an imaging synchronization signal is temporarily executed on the basis of the pieces of information transmitted from the display terminal 1200, determines whether or not the period of an imaging synchronization signal is adjusted, and adjusts the periods of an imaging synchronization signal and a display synchronization signal so as not to be shifted with the elapse of time.

Meanwhile, similarly to the image transfer system 1 of the first embodiment, also in the image transfer system 2, when at least a process of updating a round trip propagation-time determination value is performed in step S304, the after-cycle-adjustment accuracy estimation unit 105 included in the imaging terminal 1100 can estimate the accuracy of an imaging synchronization signal. That is, when the phase adjustment unit 105, not shown in the drawing, which is provided in the round trip propagation-time measurement unit 1202 included in the display terminal 1200 can acquire a combination of a plurality of round trip propagation-time determination values used to adjust the phase of an imaging synchronization signal, scheduled transmission times of corresponding outward path signals for round trip propagation-time measurement, and scheduled transmission times of corresponding return path signals for round trip propagation-time measurement, the period-adjusted accuracy estimation unit can calculate (estimate) a period-adjusted accuracy estimation value. Therefore, similarly to the image transfer system 1 of the first embodiment, also in the image transfer system 2, in step S304, the phase adjustment unit not shown in the drawing does not necessarily need to adjust the phase of an imaging synchronization signal. In this case, the phase adjustment unit not shown in the drawing updates a round trip propagation-time calculated by the round trip propagation-time measurement unit 1202 as a round trip propagation-time determination value.

With such a configuration and processing procedure, in the image transfer system 2, the display terminal 1200 transmits a round-trip-propagation-time-measurement outgoing signal and measures (calculates) a round trip propagation-time in wireless transfer between the imaging terminal 1100 and the display terminal 1200 to update a round trip propagation-time determination value. Further, in the image transfer system 2, the imaging terminal 1100 adjusts the phase or period (at least a period) of an imaging synchronization signal to be generated, on the basis of the round trip propagation-time determination value updated by the display terminal 1200. Thereby, similarly to the image transfer system 1 of the first embodiment, also in the image transfer system 2, the phase or period (at least a period) of an imaging synchronization signal generated by the imaging terminal 1100 (more specifically, the synchronization signal generation unit 102) is adjusted so as to match the phase or period (at least a period) of a display synchronization signal generated by the display terminal 1200. That is, similarly to the image transfer system 1 of the first embodiment, also in the image transfer system 2, a timing when the imaging terminal 1100 wirelessly transfers captured image data of an image captured by an imaging unit not shown in the drawing to the display terminal 1200 is matched to a timing when the display terminal 1200 displays an image corresponding to the captured image data on a display unit not shown in the drawing. Thereby, similarly to the image transfer system 1 of the first embodiment, also in the image transfer system 2, the display terminal 1200 can stably display an image corresponding to the captured image data wirelessly transferred from the imaging terminal 1100 on the display unit not shown.

As described above, the image transfer system 2 of the second embodiment performs transmission and reception of a round-trip-propagation-time-measurement outgoing signal and a round-trip-propagation-time-measurement returning signal between the round trip propagation-time measurement unit 1202 included in the display terminal 1200 and the round trip propagation-time measurement assistance unit 1106 included in the imaging terminal 1100 after wireless connection between the imaging terminal 1100 and the display terminal 1200 is established. Further, in the image transfer system 2 of the second embodiment, the round trip propagation-time measurement unit 1202 calculates a round trip propagation-time required for transmission and reception in wireless transfer between the imaging terminal 1100 and the display terminal 1200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round trip propagation-time measurement assistance unit 1106. Further, in the image transfer system 2 of the second embodiment, the round trip propagation-time measurement unit 1202 (more specifically, the phase adjustment unit not shown in the drawing) updates the round trip propagation-time calculated by the round trip propagation-time measurement unit 1202 as a round trip propagation-time determination value. Further, in the image transfer system 2 of the second embodiment, the round trip propagation-time measurement unit 1202 transmits information for adjusting the period of an imaging synchronization signal in the imaging terminal 1100 to the imaging terminal 1100. Further, in the image transfer system 2 of the second embodiment, the after-cycle-adjustment accuracy estimation unit 105 included in the imaging terminal 1100 estimates (calculates) a period-adjusted accuracy estimation value of an imaging synchronization signal in a case where cycle adjustment is temporarily executed. Further, in the image transfer system 2 of the second embodiment, the cycle adjustment determination unit 104 included in the imaging terminal 1100 determines whether or not cycle adjustment for an imaging synchronization signal which is generated by the synchronization signal generation unit 102 included in the imaging terminal 1100 is performed, on the basis of the period-adjusted accuracy estimation value. Further, in the image transfer system 2 of the second embodiment, in a case where the cycle adjustment determination unit 104 determines that cycle adjustment for an imaging synchronization signal is performed, the cycle adjustment unit 101 included in the imaging terminal 1100 calculates a cycle adjustment amount for performing cycle adjustment for an imaging synchronization signal and outputs the calculated cycle adjustment amount to the synchronization signal generation unit 102 together with a cycle adjustment instruction. Thereby, in the image transfer system 2 of the second embodiment, the synchronization signal generation unit 102 adjusts the period of an imaging synchronization signal to be generated by an amount of cycle adjustment, in response to the cycle adjustment instruction which is output from the cycle adjustment unit 101.

Thereby, similarly to the image transfer system 1 of the first embodiment, also in the image transfer system 2 of the second embodiment, the phase or period (at least a period) of an imaging synchronization signal can be matched to the phase or period (at least a period) of a display synchronization signal. That is, also in the image transfer system 2 of the second embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 2 of the second embodiment, the same effects as those in the image transfer system 1 of the first embodiment can be obtained. That is, similarly to the image transfer system 1 of the first embodiment, also in the image transfer system 2 of the second embodiment, it is possible to wirelessly transfer captured image data from the imaging terminal 1100 to the display terminal 1200 without exceeding a validity period of a display image and to stably display a display image corresponding to the captured image data transmitted from the imaging terminal 1100 in the display terminal 1200.

Moreover, in the image transfer system 2 of the second embodiment, the display terminal 1200 calculates a round trip propagation-time required for transmission and reception in wireless transfer between the imaging terminal 1100 and the display terminal 1200. Thereby, in the image transfer system 2 of the second embodiment, it is not necessary to calculate a round trip propagation-time in the imaging terminal 1100, and thus it is possible to reduce a load of processing performed in the imaging terminal 1100.

Meanwhile, as described above, in the image transfer system of the present invention, even in a configuration in which components for adjusting the period of an imaging synchronization signal which is generated by an imaging terminal are included in either one of the imaging terminal or a display terminal, a function of adjusting the period of an imaging synchronization signal which is generated by the imaging terminal can be realized similarly.

Third Embodiment

Figure 18:
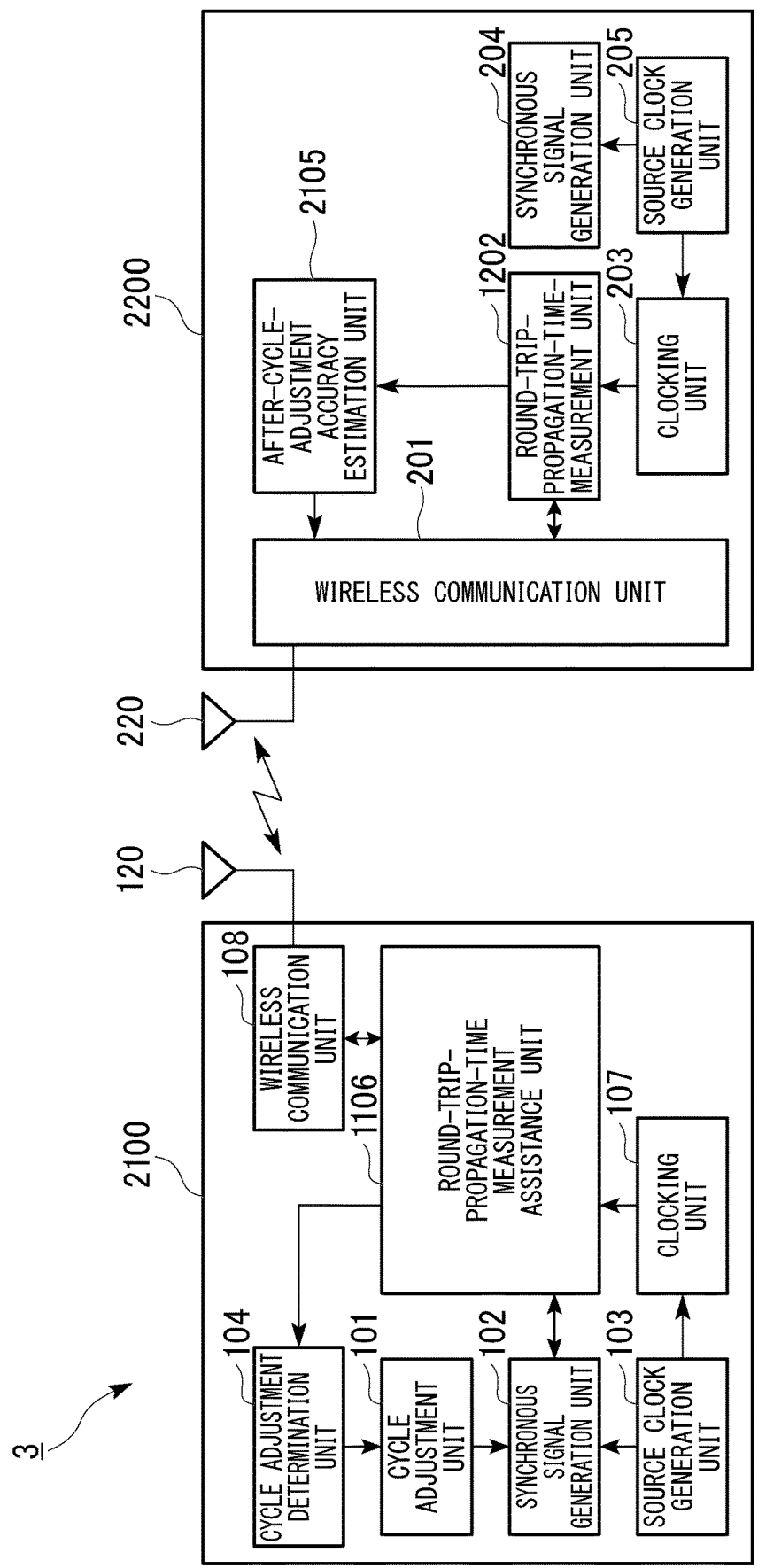
FIG. 18 is a block diagram showing a schematic configuration of an image transmission system according to a third embodiment of the present invention.

Hereinafter, an image transfer system of a third embodiment of the present invention will be described. FIG. 18 is a block diagram showing a schematic configuration of the image transfer system in the third embodiment of the present invention. An image transfer system 3 includes an imaging terminal 2100 and a display terminal 2200. The imaging terminal 2100 includes a synchronization signal generation unit 102, a cycle adjustment unit 101, a source oscillation clock generation unit 103, a wireless communication unit 108, a cycle adjustment determination unit 104, a round trip propagation-time measurement assistance unit 1106, a clocking unit 107, and an antenna 120. In addition, the display terminal 2200 includes a synchronous signal generation unit 204, a source oscillation clock generation unit 205, a wireless communication unit 201, a round trip propagation-time measurement unit 1202, a clocking unit 203, an after-cycle-adjustment accuracy estimation unit 2105, and an antenna 220.

Meanwhile, also in FIG. 18, in components of the image transfer system 3, the same components as the components included in the image transfer system 1 of the first embodiment shown in FIG. 2 and the image transfer system 2 of the second embodiment shown in FIG. 16 are denoted by the same reference numerals and signs.

Similarly to the image transfer system 1 of the first embodiment and the image transfer system 2 of the second embodiment, the image transfer system 3 is also an image transfer system configured such that transmission and reception of a round-trip-propagation-time-measurement outgoing signal and a round-trip-propagation-time-measurement returning signal are performed between the imaging terminal 2100 and the display terminal 2200, and the imaging terminal 2100 adjusts the phase or period (at least a period) of an imaging synchronization signal to be generated so as to match the phase or period (at least a period) of a display synchronization signal which is generated by the display terminal 2200. Meanwhile, similarly to the image transfer system 2 of the second embodiment, the image transfer system 3 is an image transfer system in which the display terminal 2200 transmits a round-trip-propagation-time-measurement outgoing signal to the imaging terminal 2100 to calculate a round trip propagation-time in wireless transfer between the imaging terminal 2100 and the display terminal 2200, and the imaging terminal 2100 adjusts the phase or period (at least a period) of an imaging synchronization signal to be generated.

However, in the image transfer system 3, some components included in the imaging terminal 1100 in the image transfer system 2 of the second embodiment are moved to the display terminal 2200. More specifically, in the image transfer system 3, the after-cycle-adjustment accuracy estimation unit 2105 that replaces the after-cycle-adjustment accuracy estimation unit 105 included in the imaging terminal 1100 in the image transfer system 2 of the second embodiment is included in the display terminal 2200.

For this reason, in the image transfer system 3, the display terminal 2200 estimates (calculates) a period-adjusted accuracy estimation value in a case where the period of an imaging synchronization signal which is generated by the synchronization signal generation unit 102 included in the imaging terminal 2100 is temporarily adjusted, and transmits the estimated period-adjusted accuracy estimation value to the imaging terminal 2100. Further, in the image transfer system 3, the imaging terminal 2100 determines whether or not cycle adjustment for an imaging synchronization signal is performed on the basis of the period-adjusted accuracy estimation value transmitted from the display terminal 2200, and adjusts the period of an imaging synchronization signal to be generated.

However, also in the image transfer system 3, although there is a process of exchanging signals through wireless transfer in association with a change in the disposition of components, functions and operations of the components are the same as the functions and operations of the corresponding components in the image transfer system 1 of the first embodiment and the image transfer system 2 of the second embodiment. That is, the functions and operations of the components included in the imaging terminal 2100 and the display terminal 2200 in the image transfer system 3 can be easily understood from the above description of the components included in the imaging terminal and the display terminal in each of the image transfer system 1 of the first embodiment and the image transfer system 2 of the second embodiment. Therefore, a detailed description related to the components included in the image transfer system 3 will be omitted.

Figure 19:
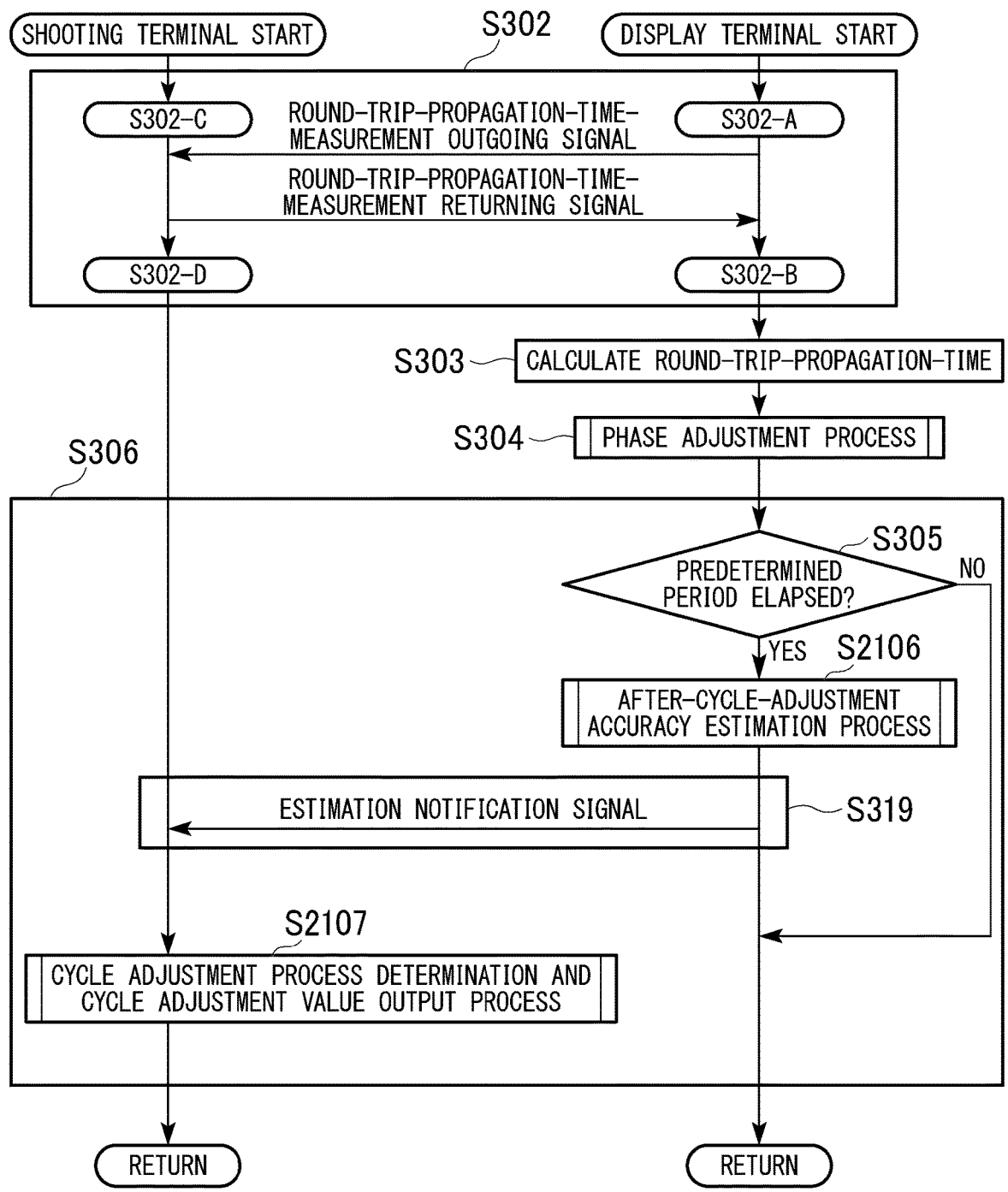
FIG. 19 is a flow chart showing processing procedures of the image transmission system according to the third embodiment of the present invention.

Next, operations of processing in the image transfer system 3 will be described. Meanwhile, in the image transfer system 3, it is assumed that a phase adjustment unit, not shown in the drawing, which is provided in the round-trip-propagation-time measurement unit 106 included in the imaging terminal 100 in the image transfer system 1 of the first embodiment is included in the round trip propagation-time measurement unit 1202. That is, in the image transfer system 3, a configuration in which the phase adjustment unit not shown in the drawing is disposed at the same position as that in the image transfer system 2 of the second embodiment is adopted. FIG. 19 is a flowchart showing a processing procedure of the image transfer system 3 in the third embodiment of the present invention.

In the image transfer system 3, a process of transmitting information of a period-adjusted accuracy estimation value to the imaging terminal 2100 as information used to adjust the period of an imaging synchronization signal which is generated by the synchronization signal generation unit 102 is added, in association with a change to a configuration in which the after-cycle-adjustment accuracy estimation unit 2105 is included in the display terminal 2200. However, an outline of the overall operation in the image transfer system 3 is the same as those of the image transfer system 1 of the first embodiment and the image transfer system 2 of the second embodiment. Therefore, also in the image transfer system 3, a description of an outline of the overall operation will be omitted, and a more specific operation of performing cycle adjustment for an imaging synchronization signal in the image transfer system 3 will be described.

Also in the image transfer system 3, when a cycle adjustment process is started, the display terminal 2200 transmits a round-trip-propagation-time-measurement outgoing signal to the imaging terminal 2100, and the imaging terminal 2100 transmits a round-trip-propagation-time-measurement returning signal corresponding to the round-trip-propagation-time-measurement outgoing signal to the display terminal 2200 in step S302. Meanwhile, the process of step S302 in the image transfer system 3 is the same as the process of step S302 in the image transfer system 2 of the second embodiment.

Thereafter, also in the image transfer system 3, in step S303, the display terminal 2200 calculates a round trip propagation-time required for transmission and reception in wireless transfer between the imaging terminal 2100 and the display terminal 2200. Meanwhile, the process of step S303 in the image transfer system 3 is also the same as the process of step S303 in the image transfer system 2 of the second embodiment.

Thereafter, also in the image transfer system 3, in step S304, the display terminal 2200 generates a phase adjustment instruction for the phase adjustment unit, not shown in the drawing, which is provided in the round trip propagation-time measurement unit 1202 to adjust the phase of an imaging synchronization signal, on the basis of the round trip propagation-time required for transmission and reception in wireless transfer between the imaging terminal 2100 and the display terminal 2200 which is calculated in step S303, and updates a round trip propagation-time determination value. Meanwhile, the process of step S304 in the image transfer system 3 is also the same as the process of step S304 in the image transfer system 2 of the second embodiment.

Thereafter, in the image transfer system 3, in step S306, the period of an imaging synchronization signal is adjusted on the basis of the information of the plurality of round trip propagation-time determination values updated in step S304. However, in the image transfer system 3, the display terminal 2200 estimates (calculates) a period-adjusted accuracy estimation value of an imaging synchronization signal in a case where cycle adjustment is temporarily executed. Further, in the image transfer system 3, the imaging terminal 2100 determines whether or not cycle adjustment for an imaging synchronization signal is performed on the basis of the period-adjusted accuracy estimation value, calculates a cycle adjustment amount, and outputs a cycle adjustment instruction to the synchronization signal generation unit 102.

For this reason, in the image transfer system 3, in step S305 included in step S306, the after-cycle-adjustment accuracy estimation unit 2105 included in the display terminal 2200 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 2105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 2105 determines that cycle adjustment is performed. In this case, similarly to the process of step S2106 included in step S306 in the image transfer system 1 of the first embodiment, the after-cycle-adjustment accuracy estimation unit 2105 calculates a period-adjusted accuracy estimation value in step S2106 included in step S306. More specifically, the after-cycle-adjustment accuracy estimation unit 2105 acquires a combination of a plurality of round trip propagation-time determination values equivalent to a predetermined number of times per unit time determined in advance, scheduled transmission times of corresponding outward path signals for round trip propagation-time measurement, and scheduled transmission times of corresponding return path signals for round trip propagation-time measurement from the phase adjustment unit, not shown in the drawing, which is provided in the round trip propagation-time measurement unit 1202 (step S802). In addition, the after-cycle-adjustment accuracy estimation unit 2105 extracts a minimum determination value for each unit time from the plurality of roundtrip propagation-time determination values acquired (step S803). In addition, the after-cycle-adjustment accuracy estimation unit 2105 calculates a period-adjusted accuracy estimation value on the basis of information of the extracted minimum determination values equivalent to a predetermined number of times (step S806).

Thereafter, in the image transfer system 3, in step S319 included in step S306, the display terminal 2200 generates an estimation notification signal including information of the period-adjusted accuracy estimation value calculated by the after-cycle-adjustment accuracy estimation unit 2105 and transmits the generated estimation notification signal to the imaging terminal 2100. More specifically, the after-cycle-adjustment accuracy estimation unit 2105 generates an estimation notification signal including information of a calculated period-adjusted accuracy estimation value, information of a round trip propagation-time calculated by the round trip propagation-time measurement unit 1202, information of a scheduled transmission time of a round-trip-propagation-time-measurement outgoing signal, information of a scheduled transmission time included in a received round-trip-propagation-time-measurement returning signal, a phase adjustment instruction generated by the phase adjustment unit not shown in the drawing, and information of a plurality of round trip propagation-time determination values updated by the phase adjustment unit not shown in the drawing. In addition, the after-cycle-adjustment accuracy estimation unit 2105 outputs the generated estimation notification signal to the wireless communication unit 201 and transmits the estimation notification signal to the cycle adjustment determination unit 104 provided in the imaging terminal 2100 through the wireless communication unit 201 and the antenna 220. Thereby, the cycle adjustment determination unit 104 acquires information such as a round trip propagation-time determination value used to adjust the period of an imaging synchronization signal from the after-cycle-adjustment accuracy estimation unit 2105 provided in the display terminal 2200. More specifically, the wireless communication unit 108 receives an estimation notification signal transmitted from the display terminal 2200 through the antenna 120. In addition, the wireless communication unit 108 outputs each of information of a period-adjusted accuracy estimation value included in the received estimation notification signal, information of a round trip propagation-time, information of a scheduled transmission time of a round-trip-propagation-time-measurement outgoing signal, information of a scheduled transmission time of a round-trip-propagation-time-measurement returning signal, information of a phase adjustment instruction, and information of a plurality of round trip propagation-time determination values to the round trip propagation-time measurement assistance unit 1106.

Further, in the image transfer system 3, in step S2107 included in step S306, the imaging terminal 2100 determines whether or not cycle adjustment for an imaging synchronization signal is performed on the basis of information such as a round trip propagation-time determination value transmitted from the display terminal 2200 similar to the process of step S2107 included in step S306 in the image transfer system 1 of the first embodiment, and outputs a calculated cycle adjustment amount to the synchronization signal generation unit 102 together with a cycle adjustment instruction. In this case, the round trip propagation-time measurement assistance unit 1106 outputs each of information of a period-adjusted accuracy estimation value included in the estimation notification signal output from the wireless communication unit 108, information of a round trip propagation-time, information of a scheduled transmission time of a round-trip-propagation-time-measurement outgoing signal, information of a scheduled transmission time of a round-trip-propagation-time-measurement returning signal, information of a phase adjustment instruction, and information of a plurality of round trip propagation-time determination values to each of the cycle adjustment determination unit 104 and the cycle adjustment unit 101. Thereby, the cycle adjustment determination unit 104 determines whether or not cycle adjustment for an imaging synchronization signal is performed, on the basis of a period-adjusted accuracy estimation value calculated and transmitted by the after-cycle-adjustment accuracy estimation unit 2105 provided in the display terminal 2200 (step S1004). Further, in a case where the cycle adjustment determination unit 104 determines that cycle adjustment for an imaging synchronization signal is performed, the cycle adjustment unit 101 calculates a cycle adjustment amount for performing cycle adjustment for an imaging synchronization signal and outputs the calculated cycle adjustment amount to the synchronization signal generation unit 102 together with a cycle adjustment instruction (step S1206). Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 101.

Meanwhile, the round trip propagation-time measurement assistance unit 1106 outputs a phase adjustment instruction which is output from the wireless communication unit 108 to the synchronization signal generation unit 102. Thereby, the synchronization signal generation unit 102 performs phase adjustment for an imaging synchronization signal to be generated, in response to a phase adjustment instruction which is output from the round trip propagation-time measurement assistance unit 1106, that is, a phase adjustment instruction transmitted from the phase adjustment unit, not shown in the drawing, which is provided in the round trip propagation-time measurement unit 1202 included in the display terminal 2200.

In this manner, in the image transfer system 3, the display terminal 2200 transmits a round-trip-propagation-time-measurement outgoing signal and calculates a round trip propagation-time in wireless transfer between the imaging terminal 2100 and the display terminal 2200. Further, in the image transfer system 3, the display terminal 2200 performs a process of updating a round trip propagation-time determination value and a process of estimating (calculating) a period-adjusted accuracy estimation value in a case where cycle adjustment for an imaging synchronization signal is temporarily executed. Further, in the image transfer system 3, the display terminal 2200 transmits information of the calculated period-adjusted accuracy estimation value, information of the plurality of round trip propagation-time determination values updated, information of a scheduled transmission time of a round-trip-propagation-time-measurement outgoing signal, information of a scheduled transmission time of a round-trip-propagation-time-measurement returning signal, and a phase adjustment instruction to the imaging terminal 2100. Thereby, in the image transfer system 3, the imaging terminal 2100 determines whether or not the period of an imaging synchronization signal is adjusted, on the basis of the pieces of information transmitted from the display terminal 2200, and adjusts the periods of an imaging synchronization signal and a display synchronization signal so as not to be shifted with the elapse of time.

Meanwhile, similarly to the image transfer system 1 of the first embodiment and the image transfer system 2 of the second embodiment, also in the image transfer system 3, when at least a process of updating a round trip propagation-time determination value is performed in step S304, the after-cycle-adjustment accuracy estimation unit 2105 included in the display terminal 2200 can estimate the accuracy of an imaging synchronization signal (that is, calculate a period-adjusted accuracy estimation value). Therefore, similarly to the image transfer system 1 of the first embodiment and the image transfer system 2 of the second embodiment, also in the image transfer system 3, the phase adjustment unit not shown in the drawing does not necessarily need to adjust the phase of an imaging synchronization signal in step S304 and may be able to update a round trip propagation-time calculated by the round trip propagation-time measurement unit 1202 as a round trip propagation-time determination value.

With such a configuration and processing procedure, in the image transfer system 3, the display terminal 2200 transmits a round-trip-propagation-time-measurement outgoing signal and measures (calculates) a round trip propagation-time in wireless transfer between the imaging terminal 2100 and the display terminal 2200 to update a round trip propagation-time determination value. Further, in the image transfer system 3, the display terminal 2200 estimates (calculates) a period-adjusted accuracy estimation value in a case where cycle adjustment for an imaging synchronization signal is temporarily executed. Further, in the image transfer system 3, the imaging terminal 2100 adjusts the phase or period (at least a period) of an imaging synchronization signal to be generated, on the basis of the round trip propagation-time determination value updated by the display terminal 2200 and the estimated (calculated) period-adjusted accuracy estimation value. Thereby, similarly to the image transfer system 1 of the first embodiment and the image transfer system 2 of the second embodiment, also in the image transfer system 3, the phase or period (at least a period) of an imaging synchronization signal which is generated by the imaging terminal 2100 (more specifically, the synchronization signal generation unit 102) is adjusted so as to match the phase or period (at least a period) of a display synchronization signal which is generated by the display terminal 2200. That is, similarly to the image transfer system 1 of the first embodiment and the image transfer system 2 of the second embodiment, also in the image transfer system 3, a timing when the imaging terminal 2100 wirelessly transfers captured image data of an image captured by the imaging unit not shown in the drawing to the display terminal 2200 is matched to a timing when the display terminal 2200 displays an image corresponding to the captured image data on the display unit not shown in the drawing. Thereby, similarly to the image transfer system 1 of the first embodiment and the image transfer system 2 of the second embodiment, also in the image transfer system 3, the display terminal 2200 can stably display an image corresponding to captured image data wirelessly transferred from the imaging terminal 2100 on the display unit not shown in the drawing.

As described above, the image transfer system 3 of the third embodiment performs transmission and reception of a round-trip-propagation-time-measurement outgoing signal and a round-trip-propagation-time-measurement returning signal between the round trip propagation-time measurement unit 1202 included in the display terminal 2200 and the round trip propagation-time measurement assistance unit 1106 included in the imaging terminal 2100 after wireless connection between the imaging terminal 2100 and the display terminal 2200 is established. Further, in the image transfer system 3 of the third embodiment, the round trip propagation-time measurement unit 1202 calculates a round trip propagation-time required for transmission and reception in wireless transfer between the imaging terminal 2100 and the display terminal 2200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round trip propagation-time measurement assistance unit 1106. Further, in the image transfer system 3 of the third embodiment, the round trip propagation-time measurement unit 1202 (more specifically, the phase adjustment unit not shown in the drawing) updates the round trip propagation-time calculated by the round trip propagation-time measurement unit 1202 as a round trip propagation-time determination value. Further, in the image transfer system 3 of the third embodiment, the after-cycle-adjustment accuracy estimation unit 2105 included in the display terminal 2200 estimates (calculates) a period-adjusted accuracy estimation value of an imaging synchronization signal in a case where cycle adjustment is temporarily executed. Further, in the image transfer system 3 of the third embodiment, the after-cycle-adjustment accuracy estimation unit 2105 transmits information for adjusting the period of an imaging synchronization signal in the imaging terminal 2100 to the imaging terminal 2100, inclusive of a period-adjusted accuracy estimation value. Further, in the image transfer system 3 of the third embodiment, the cycle adjustment determination unit 104 included in the imaging terminal 2100 determines whether or not cycle adjustment for an imaging synchronization signal generated by the synchronization signal generation unit 102 included in the imaging terminal 2100 is performed, on the basis of a period-adjusted accuracy estimation value. Further, in the image transfer system 3 of the third embodiment, in a case where the cycle adjustment determination unit 104 determines that cycle adjustment for an imaging synchronization signal is performed, the cycle adjustment unit 101 included in the imaging terminal 2100 calculates a cycle adjustment amount for performing cycle adjustment for an imaging synchronization signal and outputs the calculated cycle adjustment amount to the synchronization signal generation unit 102 together with a cycle adjustment instruction. Thereby, in the image transfer system 3 of the third embodiment, the synchronization signal generation unit 102 adjusts the period of an imaging synchronization signal to be generated by an amount of cycle adjustment, in response to the cycle adjustment instruction which is output from the cycle adjustment unit 101.

Thereby, similarly to the image transfer system 1 of the first embodiment and the image transfer system 2 of the second embodiment, also in the image transfer system 3 of the third embodiment, the phase or period (at least a period) of an imaging synchronization signal can be matched to the phase or period (at least a period) of a display synchronization signal. That is, also in the image transfer system 3 of the third embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 3 of the third embodiment, the same effects as those in the image transfer system 1 of the first embodiment and the image transfer system 2 of the second embodiment can be obtained. That is, similarly to the image transfer system 1 of the first embodiment and the image transfer system 2 of the second embodiment, also in the image transfer system 3 of the third embodiment, it is possible to wirelessly transfer captured image data from the imaging terminal 2100 to the display terminal 2200 without exceeding a validity period of a display image and to stably display a display image corresponding to the captured image data transmitted from the imaging terminal 2100 in the display terminal 2200.

Moreover, in the image transfer system 3 of the third embodiment, the display terminal 2200 estimates (calculates) a period-adjusted accuracy estimation value, in addition to calculating a round trip propagation-time required for transmission and reception in wireless transfer between the imaging terminal 2100 and the display terminal 2200. Thereby, in the image transfer system 3 of the third embodiment, it is not necessary to calculate a round trip propagation-time in the imaging terminal 2100 and estimate (calculate) a period-adjusted accuracy estimation value in the imaging terminal 2100, and thus it is possible to reduce a load of processing performed in the imaging terminal 2100.

Fourth Embodiment

Figure 20:
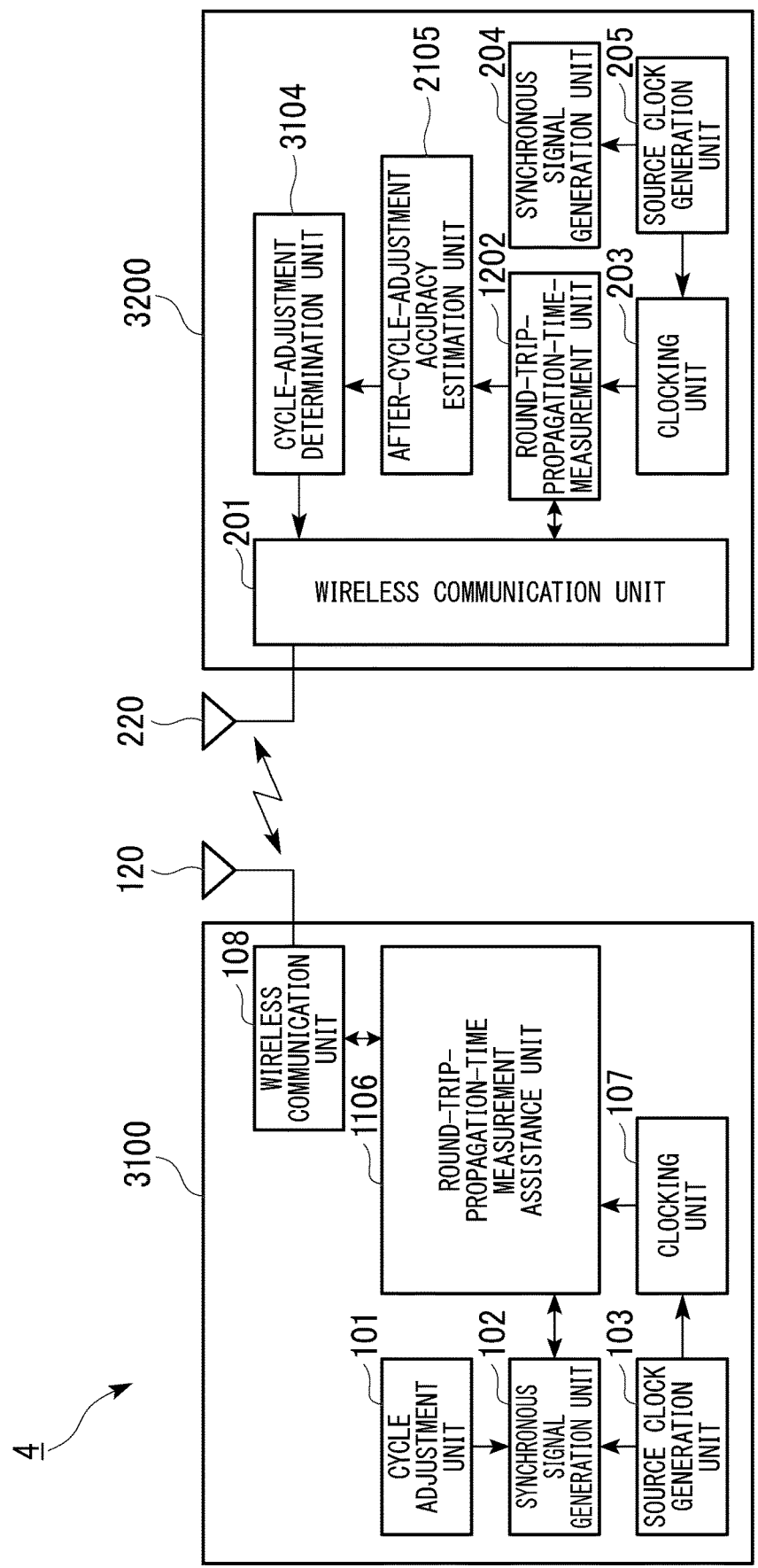
FIG. 20 is a block diagram showing a schematic configuration of an image transmission system according to a fourth embodiment of the present invention.

Hereinafter, an image transfer system of a fourth embodiment of the present invention will be described. FIG. 20 is a block diagram showing a schematic configuration of the image transfer system in the fourth embodiment of the present invention. An image transfer system 4 includes an imaging terminal 3100 and a display terminal 3200. The imaging terminal 3100 includes a synchronization signal generation unit 102, a cycle adjustment unit 101, a source oscillation clock generation unit 103, a wireless communication unit 108, a round trip propagation-time measurement assistance unit 1106, a clocking unit 107, and an antenna 120. In addition, the display terminal 3200 includes a synchronous signal generation unit 204, a source oscillation clock generation unit 205, a wireless communication unit 201, a round trip propagation-time measurement unit 1202, a clocking unit 203, an after-cycle-adjustment accuracy estimation unit 2105, a cycle-adjustment determination unit 3104, and an antenna 220.

Meanwhile, also in FIG. 20, in components of the image transfer system 4, the same components as the components included in the image transfer system 1 of the first embodiment to the image transfer system 3 of the third embodiment are denoted by the same reference numerals and signs.

Similarly to the image transfer system 1 of the first embodiment to the image transfer system 3 of the third embodiment, the image transfer system 4 is also an image transfer system configured such that transmission and reception of a round-trip-propagation-time-measurement outgoing signal and a round-trip-propagation-time-measurement returning signal are performed between the imaging terminal 3100 and the display terminal 3200, and the imaging terminal 3100 adjusts the phase or period (at least a period) of an imaging synchronization signal to be generated so as to match the phase or period (at least a period) of a display synchronization signal which is generated by the display terminal 3200. Meanwhile, similarly to the image transfer system 2 of the second embodiment and the image transfer system 3 of the third embodiment, the image transfer system 4 is an image transfer system in which the display terminal 3200 transmits a round-trip-propagation-time-measurement outgoing signal to the imaging terminal 3100 to calculate a round trip propagation-time in wireless transfer between the imaging terminal 3100 and the display terminal 3200, and the imaging terminal 3100 adjusts the phase or period (at least a period) of an imaging synchronization signal to be generated.

However, in the image transfer system 4, some components included in the imaging terminal 2100 in the image transfer system 3 of the third embodiment are moved to the display terminal 3200. More specifically, in the image transfer system 4, the cycle-adjustment determination unit 3104 that replaces the cycle adjustment determination unit 104 included in the imaging terminal 2100 in the image transfer system 3 of the third embodiment is included in the display terminal 3200.

For this reason, in the image transfer system 4, the display terminal 3200 estimates (calculates) a period-adjusted accuracy estimation value in a case where the period of an imaging synchronization signal which is generated by the synchronization signal generation unit 102 included in the imaging terminal 3100 is temporarily adjusted, and transmits a cycle adjustment execution determination result indicating a result obtained by determining whether or not cycle adjustment for an imaging synchronization signal is performed on the basis of the period-adjusted accuracy estimation value to the imaging terminal 3100. Further, in the image transfer system 4, in a case where the cycle adjustment execution determination result transmitted from the display terminal 3200 indicates that cycle adjustment for an imaging synchronization signal is performed, the imaging terminal 3100 adjusts the period of an imaging synchronization signal to be generated.

However, also in the image transfer system 4, although there is a process of exchanging signals through wireless transfer in association with a change in the disposition of components, functions and operations of the components are the same as the functions and operations of the corresponding components in the image transfer system 1 of the first embodiment to the image transfer system 3 of the third embodiment. That is, the functions and operations of the components included in the imaging terminal 3100 and the display terminal 3200 in the image transfer system 4 can be easily understood from the above description of the components included in the imaging terminal and the display terminal in each of the image transfer system 1 of the first embodiment to the image transfer system 3 of the third embodiment. Therefore, a detailed description related to the components included in the image transfer system 4 will be omitted.

Figure 21:
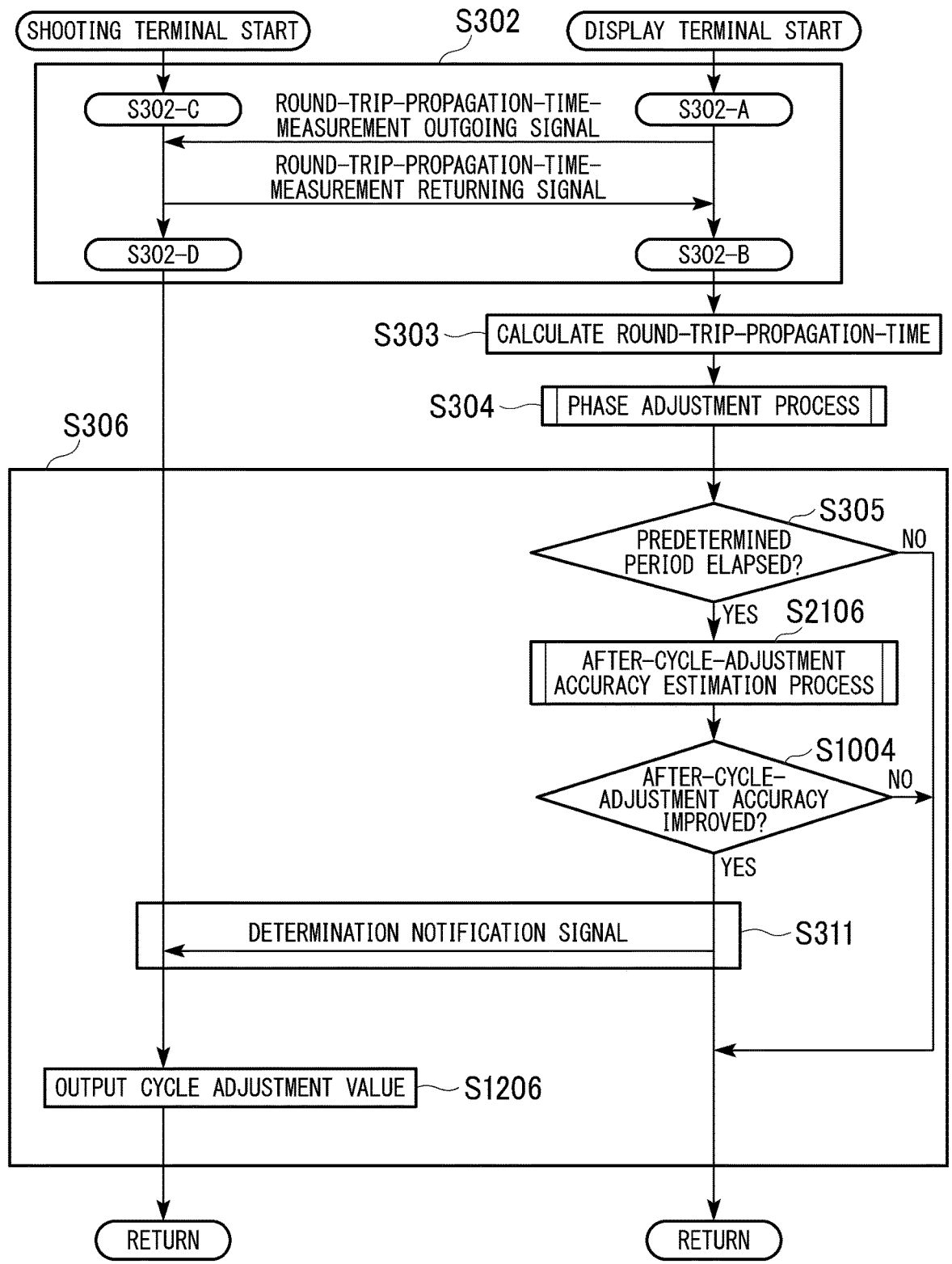
FIG. 21 is a flow chart showing processing procedures of the image transmission system according to the fourth embodiment of the present invention.

Next, operations of processing in the image transfer system 4 will be described. Meanwhile, in the image transfer system 4, it is assumed that a phase adjustment unit, not shown in the drawing, which is provided in the round-trip-propagation-time measurement unit 106 included in the imaging terminal 100 in the image transfer system 1 of the first embodiment is included in the round trip propagation-time measurement unit 1202. That is, in the image transfer system 4, a configuration in which the phase adjustment unit not shown in the drawing is disposed at the same position as those in the image transfer system 2 of the second embodiment and the image transfer system 3 of the third embodiment is adopted. FIG. 21 is a flowchart showing a processing procedure of the image transfer system 4 in the fourth embodiment of the present invention.

In the image transfer system 4, a process of transmitting information of a period-adjusted accuracy estimation value and information of a cycle adjustment execution determination result to the imaging terminal 3100 as information used to adjust the period of an imaging synchronization signal which is generated by the synchronization signal generation unit 102 is added, in association with a change to a configuration in which the after-cycle-adjustment accuracy estimation unit 2105 and the cycle-adjustment determination unit 3104 are included in the display terminal 3200. However, an outline of the overall operation in the image transfer system 4 is the same as those of the image transfer system 1 of the first embodiment to the image transfer system 3 of the third embodiment. Therefore, also in the image transfer system 4, a description of an outline of the overall operation will be omitted, and a more specific operation of performing cycle adjustment for an imaging synchronization signal in the image transfer system 4 will be described.

Also in the image transfer system 4, when a cycle adjustment process is started, the display terminal 3200 transmits a round-trip-propagation-time-measurement outgoing signal to the imaging terminal 3100, and the imaging terminal 3100 transmits a round-trip-propagation-time-measurement returning signal corresponding to the round-trip-propagation-time-measurement outgoing signal to the display terminal 3200 in step S302. Meanwhile, the process of step S302 in the image transfer system 4 is the same as the process of step S302 in the image transfer system 2 of the second embodiment and the image transfer system 3 of the third embodiment.

Thereafter, also in the image transfer system 4, in step S303, the display terminal 3200 calculates a round trip propagation-time required for transmission and reception in wireless transfer between the imaging terminal 3100 and the display terminal 3200. Meanwhile, the process of step S303 in the image transfer system 4 is also the same as the process of step S303 in the image transfer system 2 of the second embodiment and the image transfer system 3 of the third embodiment.

Thereafter, also in the image transfer system 4, in step S304, the display terminal 3200 generates a phase adjustment instruction for the phase adjustment unit, not shown in the drawing, which is provided in the round trip propagation-time measurement unit 1202 to adjust the phase of an imaging synchronization signal, on the basis of the round trip propagation-time required for transmission and reception in wireless transfer between the imaging terminal 3100 and the display terminal 3200 which is calculated in step S303, and updates a round trip propagation-time determination value. Meanwhile, the process of step S304 in the image transfer system 4 is also the same as the process of step S304 in each of the image transfer system 2 of the second embodiment and the image transfer system 3 of the third embodiment.

Thereafter, in the image transfer system 4, in step S306, the period of an imaging synchronization signal is adjusted on the basis of the information of the plurality of round trip propagation-time determination values updated in step S304. However, in the image transfer system 4, the display terminal 3200 estimates (calculates) a period-adjusted accuracy estimation value of an imaging synchronization signal in a case where cycle adjustment is temporarily executed, and determines whether or not cycle adjustment for an imaging synchronization signal is performed on the basis of the estimated (calculated) period-adjusted accuracy estimation value. Further, in the image transfer system 4, the imaging terminal 3100 calculates a cycle adjustment amount and outputs a cycle adjustment instruction to the synchronization signal generation unit 102.

For this reason, in the image transfer system 4, in step S305 included in step S306, the after-cycle-adjustment accuracy estimation unit 2105 included in the display terminal 3200 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 2105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 2105 determines that cycle adjustment is performed and calculates a period-adjusted accuracy estimation value in step S2106 included in step S306. Meanwhile, the process of step S305 and the process of step S2106 which are included in step S306 in the image transfer system 4 are the same as the process of step S305 and the process of step S2106 which are included in step S306 in the image transfer system 3 of the third embodiment.

Further, in the image transfer system 4, in step S1004 included in step S306, the display terminal 3200 determines whether or not cycle adjustment for an imaging synchronization signal is performed on the basis of the calculated period-adjusted accuracy estimation value, similar to the process of step S1004 included in step S306 in the image transfer system 1 of the first embodiment. More specifically, the cycle-adjustment determination unit 3104 included in the display terminal 3200 compares the accuracy of an imaging synchronization signal indicated by the period-adjusted accuracy estimation value calculated by the after-cycle-adjustment accuracy estimation unit 2105 with the current accuracy of the imaging synchronization signal, determines that cycle adjustment for an imaging synchronization signal is not performed in a case where the estimated accuracy of the imaging synchronization signal is equal to the current accuracy of the imaging synchronization signal or has not been improved, and terminates the process of step S1004.

On the other hand, in a case where the estimated accuracy of the imaging synchronization signal has been improved compared with the current accuracy of the imaging synchronization signal, the cycle-adjustment determination unit 3104 determines that cycle adjustment for an imaging synchronization signal is performed, and generates a cycle adjustment execution determination result indicating a determination result.

Thereafter, in the image transfer system 4, in step S311 in step S306, the display terminal 3200 generates a determination notification signal including information of the period-adjusted accuracy estimation value calculated by the after-cycle-adjustment accuracy estimation unit 2105 and information of the cycle adjustment execution determination result obtained by the cycle-adjustment determination unit 3104, and transmits the generated determination notification signal to the imaging terminal 3100. More specifically, the cycle-adjustment determination unit 3104 generates a determination notification signal including the information of the obtained cycle adjustment execution determination result, information of the period-adjusted accuracy estimation value calculated by the after-cycle-adjustment accuracy estimation unit 2105, information of a round trip propagation-time calculated by the round trip propagation-time measurement unit 1202, information of a scheduled transmission time of a round-trip-propagation-time-measurement outgoing signal, information of a scheduled transmission time included in a received round-trip-propagation-time-measurement returning signal, a phase adjustment instruction generated by the phase adjustment unit not shown in the drawing, and information of a plurality of round trip propagation-time determination values updated by the phase adjustment unit not shown in the drawing. In addition, the cycle-adjustment determination unit 3104 outputs the generated determination notification signal to the wireless communication unit 201 and transmits the determination notification signal to the cycle adjustment unit 101 in the imaging terminal 3100 through the wireless communication unit 201 and the antenna 220. Thereby, the cycle adjustment unit 101 acquires information such as a round trip propagation-time determination value used to adjust the period of an imaging synchronization signal from the cycle-adjustment determination unit 3104 provided in the display terminal 3200. More specifically, the wireless communication unit 108 receives the determination notification signal transmitted from the display terminal 3200 through the antenna 120. In addition, the wireless communication unit 108 outputs each of the information of the cycle adjustment execution determination result, the information of the period-adjusted accuracy estimation value, the information of the round trip propagation-time, the information of the scheduled transmission time of the round-trip-propagation-time-measurement outgoing signal, the information of the scheduled transmission time of the round-trip-propagation-time-measurement returning signal, the information of the phase adjustment instruction, and the information of the plurality of round trip propagation-time determination values which are included in the received determination notification signal to the round trip propagation-time measurement assistance unit 1106.

Further, in the image transfer system 4, in step S1206 included in step S306, the imaging terminal 3100 calculates a cycle adjustment amount on the basis of information such as a round trip propagation-time determination value transmitted from the display terminal 3200 similar to the process of step S1206 included in step S306 in the image transfer system 1 of the first embodiment, and outputs the calculated cycle adjustment amount to the synchronization signal generation unit 102 together with a cycle adjustment instruction. In this case, the round trip propagation-time measurement assistance unit 1106 outputs each of the information of the cycle adjustment execution determination result, the information of the period-adjusted accuracy estimation value, the information of the round trip propagation-time, the information of the scheduled transmission time of the round-trip-propagation-time-measurement outgoing signal, the information of the scheduled transmission time of the round-trip-propagation-time-measurement returning signal, the information of the phase adjustment instruction, and the information of the plurality of round trip propagation-time determination values which are included in the determination notification signal output from the wireless communication unit 108 to the cycle adjustment unit 101. Thereby, the cycle adjustment unit 101 calculates a cycle adjustment amount for performing cycle adjustment for an imaging synchronization signal on the basis of the period-adjusted accuracy estimation value transmitted by the cycle-adjustment determination unit 3104 provided in the display terminal 3200 and a combination of the round trip propagation-time determination value, the scheduled transmission time of the round-trip-propagation-time-measurement outgoing signal, and the scheduled transmission time of the round-trip-propagation-time-measurement returning signal, and outputs the calculated cycle adjustment amount to the synchronization signal generation unit 102 together with a cycle adjustment instruction. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 101.

Meanwhile, the round trip propagation-time measurement assistance unit 1106 outputs a phase adjustment instruction which is output from the wireless communication unit 108 to the synchronization signal generation unit 102. Thereby, the synchronization signal generation unit 102 performs phase adjustment for an imaging synchronization signal to be generated, in response to the phase adjustment instruction which is output from the round trip propagation-time measurement assistance unit 1106, that is, a phase adjustment instruction which is transmitted from the phase adjustment unit, not shown in the drawing, which is provided in the round trip propagation-time measurement unit 1202 included in the display terminal 3200.

In this manner, in the image transfer system 4, the display terminal 3200 transmits a round-trip-propagation-time-measurement outgoing signal and calculates a round trip propagation-time in wireless transfer between the imaging terminal 3100 and the display terminal 3200. Further, in the image transfer system 4, the display terminal 3200 performs a process of updating a round trip propagation-time determination value, a process of estimating (calculating) a period-adjusted accuracy estimation value in a case where cycle adjustment for an imaging synchronization signal is temporarily executed, and a process of determining whether or not cycle adjustment for an imaging synchronization signal which is generated by the synchronization signal generation unit 102 included in the imaging terminal 3100 is performed. Further, in the image transfer system 4, the display terminal 3200 transmits the information of the obtained cycle adjustment execution determination result, the information of the calculated period-adjusted accuracy estimation value, the information of the plurality of roundtrip propagation-time determination values updated, the information of the round trip propagation-time, the information of the scheduled transmission time of the round-trip-propagation-time-measurement outgoing signal, the information of the scheduled transmission time of the round-trip-propagation-time-measurement returning signal, and the phase adjustment instruction to the imaging terminal 3100. Thereby, in the image transfer system 4, the imaging terminal 3100 calculates a cycle adjustment amount on the basis of the pieces of information transmitted from the display terminal 3200, and adjusts the periods of an imaging synchronization signal and a display synchronization signal so as not to be shifted with the elapse of time.

Meanwhile, similarly to the image transfer system 1 of the first embodiment to the image transfer system 3 of the third embodiment, also in the image transfer system 4, when at least a process of updating around trip propagation-time determination value is performed in step S304, the after-cycle-adjustment accuracy estimation unit 2105 included in the display terminal 3200 can estimate the accuracy of an imaging synchronization signal (that is, calculate a period-adjusted accuracy estimation value). Therefore, similarly to the image transfer system 1 of the first embodiment to the image transfer system 3 of the third embodiment, also in the image transfer system 4, the phase adjustment unit not shown in the drawing does not necessarily need to adjust the phase of an imaging synchronization signal in step S304 and may be able to update a round trip propagation-time calculated by the round trip propagation-time measurement unit 1202 as a round trip propagation-time determination value.

With such a configuration and processing procedure, in the image transfer system 4, the display terminal 3200 transmits a round-trip-propagation-time-measurement outgoing signal and measures (calculates) a round trip propagation-time in wireless transfer between the imaging terminal 3100 and the display terminal 3200 to update a round trip propagation-time determination value. Further, in the image transfer system 4, the display terminal 3200 further estimates (calculates) a period-adjusted accuracy estimation value in a case where cycle adjustment for an imaging synchronization signal is temporarily executed and determines whether or not cycle adjustment for an imaging synchronization signal is performed in the imaging terminal 3100. Further, in the image transfer system 4, the imaging terminal 3100 adjusts the phase or period (at least a period) of an imaging synchronization signal to be generated, in accordance with a cycle adjustment execution determination result obtained by determining whether or not the display terminal 3200 performs cycle adjustment for an imaging synchronization signal. Thereby, similarly to the image transfer system 1 of the first embodiment to the image transfer system 3 of the third embodiment, also in the image transfer system 4, the phase or period (at least a period) of an imaging synchronization signal which is generated by the imaging terminal 3100 (more specifically, the synchronization signal generation unit 102) is adjusted so as to match the phase or period (at least a period) of a display synchronization signal which is generated by the display terminal 3200. That is, similarly to the image transfer system 1 of the first embodiment to the image transfer system 3 of the third embodiment, also in the image transfer system 4, a timing when the imaging terminal 3100 wirelessly transfers captured image data of an image captured by an imaging unit not shown in the drawing to the display terminal 3200 is matched to a timing when the display terminal 3200 displays an image corresponding to the captured image data on a display unit not shown in the drawing. Thereby, similarly to the image transfer system 1 of the first embodiment to the image transfer system 3 of the third embodiment, also in the image transfer system 4, the display terminal 3200 can stably display an image corresponding to captured image data wirelessly transferred from the imaging terminal 3100 on the display unit not shown in the drawing.

As described above, the image transfer system 4 of the fourth embodiment performs transmission and reception of a round-trip-propagation-time-measurement outgoing signal and a round-trip-propagation-time-measurement returning signal between the round trip propagation-time measurement unit 1202 included in the display terminal 3200 and the round trip propagation-time measurement assistance unit 1106 included in the imaging terminal 3100 after wireless connection between the imaging terminal 3100 and the display terminal 3200 is established. Further, in the image transfer system 4 of the fourth embodiment, the round trip propagation-time measurement unit 1202 calculates a round trip propagation-time required for transmission and reception in wireless transfer between the imaging terminal 3100 and the display terminal 3200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round trip propagation-time measurement assistance unit 1106. Further, in the image transfer system 4 of the fourth embodiment, the round trip propagation-time measurement unit 1202 (more specifically, the phase adjustment unit not shown in the drawing) updates the round trip propagation-time calculated by the round trip propagation-time measurement unit 1202 as a round trip propagation-time determination value. Further, in the image transfer system 4 of the fourth embodiment, the after-cycle-adjustment accuracy estimation unit 2105 included in the display terminal 3200 estimates (calculates) a period-adjusted accuracy estimation value of an imaging synchronization signal in a case where cycle adjustment is temporarily executed. Further, in the image transfer system 4 of the fourth embodiment, the cycle-adjustment determination unit 3104 included in the display terminal 3200 determines whether or not cycle adjustment for an imaging synchronization signal which is generated by the synchronization signal generation unit 102 included in the imaging terminal 3100 is performed, on the basis of the period-adjusted accuracy estimation value calculated by the after-cycle-adjustment accuracy estimation unit 2105. Further, in the image transfer system 4 of the fourth embodiment, the cycle-adjustment determination unit 3104 transmits information for adjusting the period of an imaging synchronization signal in the imaging terminal 3100 to the imaging terminal 3100, inclusive of a cycle adjustment execution determination result and a period-adjusted accuracy estimation value calculated by the after-cycle-adjustment accuracy estimation unit 2105. Further, in the image transfer system 4 of the fourth embodiment, the cycle adjustment unit 101 included in the imaging terminal 3100 calculates a cycle adjustment amount for performing cycle adjustment for an imaging synchronization signal in a case where the cycle adjustment execution determination result indicates that cycle adjustment for an imaging synchronization signal is performed, and outputs the calculated cycle adjustment amount to the synchronization signal generation unit 102 together with a cycle adjustment instruction. Thereby, in the image transfer system 4 of the fourth embodiment, the synchronization signal generation unit 102 adjusts the period of an imaging synchronization signal to be generated by an amount of cycle adjustment, in response to the cycle adjustment instruction which is output from the cycle adjustment unit 101.

Thereby, similarly to the image transfer system 1 of the first embodiment to the image transfer system 3 of the third embodiment, also in the image transfer system 4 of the fourth embodiment, the phase or period (at least a period) of an imaging synchronization signal can be matched to the phase or period (at least a period) of a display synchronization signal. That is, also in the image transfer system 4 of the fourth embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 4 of the fourth embodiment, the same effects as those in the image transfer system 1 of the first embodiment to the image transfer system 3 of the third embodiment can be obtained. That is, similarly to the image transfer system 1 of the first embodiment to the image transfer system 3 of the third embodiment, also in the image transfer system 4 of the fourth embodiment, it is possible to wirelessly transfer captured image data from the imaging terminal 3100 to the display terminal 3200 without exceeding a validity period of a display image and to stably display a display image corresponding to the captured image data transmitted from the imaging terminal 3100 in the display terminal 3200.

Moreover, in the image transfer system 4 of the fourth embodiment, the display terminal 3200 calculates a round trip propagation-time required for transmission and reception in wireless transfer between the imaging terminal 3100 and the display terminal 3200, estimates (calculates) a period-adjusted accuracy estimation value, and determines whether or not cycle adjustment for an imaging synchronization signal is performed. Thereby, in the image transfer system 4 of the fourth embodiment, the imaging terminal 3100 may only calculate a cycle adjustment amount. That is, in the image transfer system 4 of the fourth embodiment, it is not necessary to calculate a round trip propagation-time, estimate (calculate) a period-adjusted accuracy estimation value, and determine whether or not cycle adjustment for an imaging synchronization signal is performed in the imaging terminal 3100, and thus it is possible to reduce a load of processing performed in the imaging terminal 3100.

Fifth Embodiment

Figure 22:
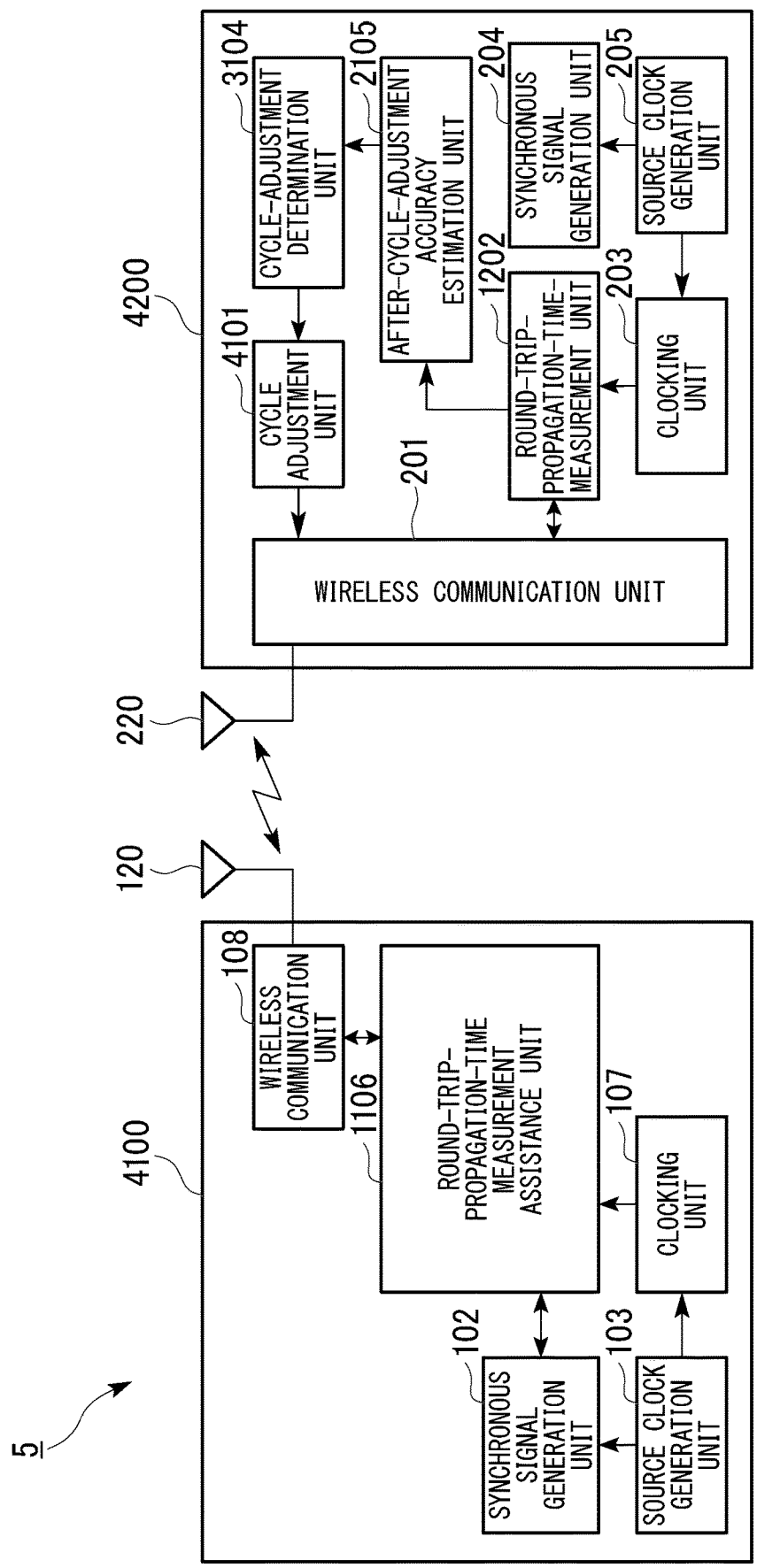
FIG. 22 is a block diagram showing a schematic configuration of an image transmission system according to a fifth embodiment of the present invention.

Hereinafter, an image transfer system of a fifth embodiment of the present invention will be described. FIG. 22 is a block diagram showing a schematic configuration of the image transfer system in the fifth embodiment of the present invention. An image transfer system 5 includes an imaging terminal 4100 and a display terminal 4200. The imaging terminal 4100 includes a synchronization signal generation unit 102, a source oscillation clock generation unit 103, a wireless communication unit 108, a round trip propagation-time measurement assistance unit 1106, a clocking unit 107, and an antenna 120. In addition, the display terminal 4200 includes a synchronous signal generation unit 204, a source oscillation clock generation unit 205, a wireless communication unit 201, a round trip propagation-time measurement unit 1202, a clocking unit 203, an after-cycle-adjustment accuracy estimation unit 2105, a cycle-adjustment determination unit 3104, a cycle adjustment unit 4101, and an antenna 220.

Meanwhile, also in FIG. 22, in components of the image transfer system 5, the same components as the components included in the image transfer system 1 of the first embodiment to the image transfer system 4 of the fourth embodiment are denoted by the same reference numerals and signs.

Similarly to the image transfer system 1 of the first embodiment to the image transfer system 4 of the fourth embodiment, the image transfer system 5 is also an image transfer system configured such that transmission and reception of a round-trip-propagation-time-measurement outgoing signal and a round-trip-propagation-time-measurement returning signal are performed between the imaging terminal 4100 and the display terminal 4200, and the imaging terminal 4100 adjusts the phase or period (at least a period) of an imaging synchronization signal to be generated so as to match the phase or period (at least a period) of a display synchronization signal which is generated by the display terminal 4200. Meanwhile, similarly to the image transfer system 2 of the second embodiment to the image transfer system 4 of the fourth embodiment, the image transfer system 5 is an image transfer system in which the display terminal 4200 transmits a round-trip-propagation-time-measurement outgoing signal to the imaging terminal 4100 to calculate a round trip propagation-time in wireless transfer between the imaging terminal 4100 and the display terminal

4200, and the imaging terminal 4100 adjusts the phase or period (at least a period) of an imaging synchronization signal to be generated.

However, in the image transfer system 5, some components included in the imaging terminal 3100 in the image transfer system 4 of the fourth embodiment are moved to the display terminal 4200. More specifically, in the image transfer system 5, the cycle adjustment unit 4101 that replaces the cycle adjustment unit 101 included in the imaging terminal 3100 in the image transfer system 4 of the fourth embodiment is included in the display terminal 4200.

For this reason, in the image transfer system 5, the display terminal 4200 estimates (calculates) a period-adjusted accuracy estimation value in a case where the period of an imaging synchronization signal which is generated by the synchronization signal generation unit 102 included in the imaging terminal 4100 is temporarily adjusted, determines whether or not cycle adjustment for an imaging synchronization signal is performed on the basis of the period-adjusted accuracy estimation value, calculates a cycle adjustment amount in a case where it is determined that cycle adjustment for an imaging synchronization signal is performed, and transmits the calculated cycle adjustment amount to the imaging terminal 4100 together with a cycle adjustment instruction. Further, in the image transfer system 5, the imaging terminal 4100 adjusts the period of an imaging synchronization signal to be generated, in response to the cycle adjustment instruction transmitted from the display terminal 4200.

However, also in the image transfer system 5, although there is a process of exchanging signals through wireless transfer in association with a change in the disposition of components, functions and operations of the components are the same as the functions and operations of the corresponding components in the image transfer system 1 of the first embodiment to the image transfer system 4 of the fourth embodiment. That is, the functions and operations of the components included in the imaging terminal 4100 and the display terminal 4200 in the image transfer system 5 can be easily understood from the above description of the components included in the imaging terminal and the display terminal in each of the image transfer system 1 of the first embodiment to the image transfer system 4 of the fourth embodiment. Therefore, a detailed description related to the components included in the image transfer system 5 will be omitted.

Figure 23:
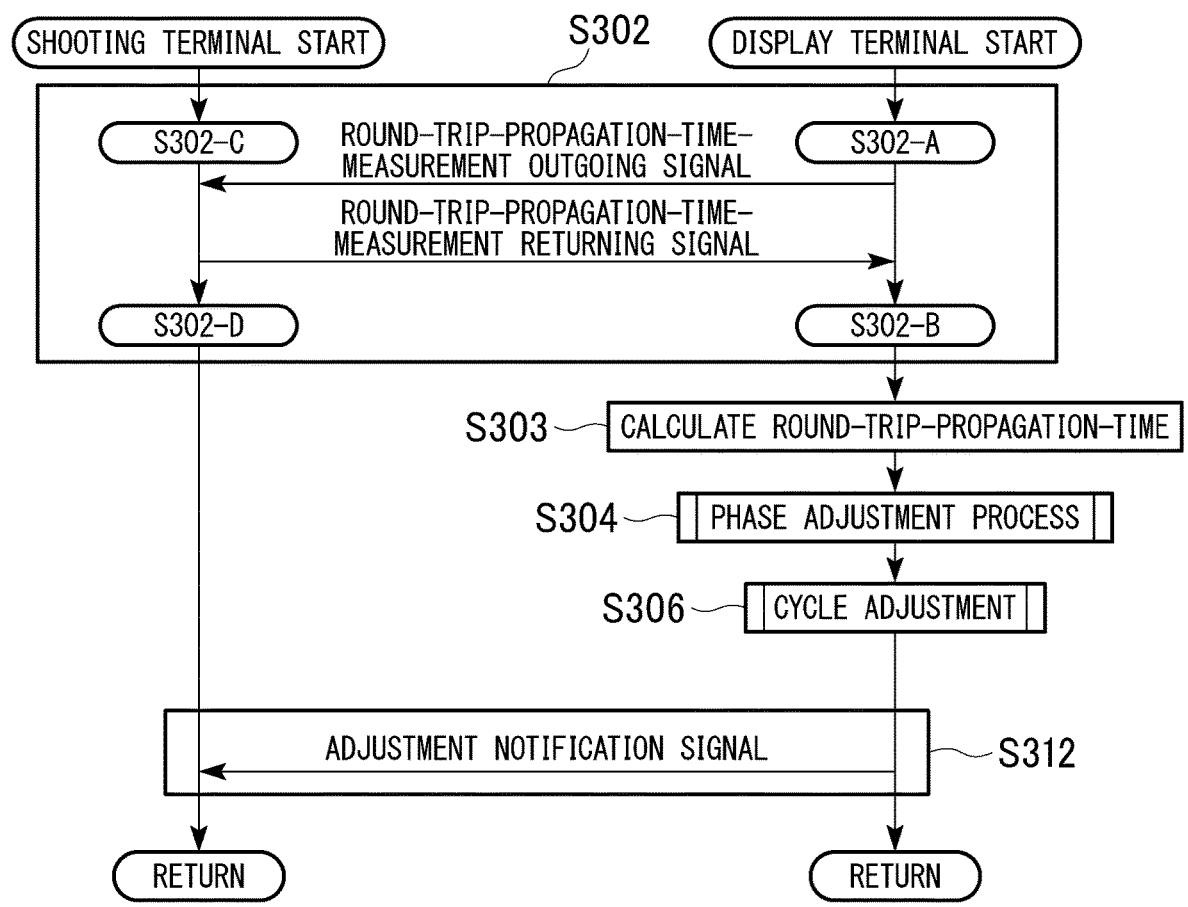
FIG. 23 is a flow chart showing processing procedures of the image transmission system according to the fifth embodiment of the present invention.

Next, operations of processing in the image transfer system 5 will be described. Meanwhile, in the image transfer system 5, it is assumed that a phase adjustment unit, not shown in the drawing, which is provided in the round-trip-propagation-time measurement unit 106 included in the imaging terminal 100 in the image transfer system 1 of the first embodiment is included in the round trip propagation-time measurement unit 1202. That is, in the image transfer system 5, a configuration in which the phase adjustment unit not shown in the drawing is disposed at the same position as those in the image transfer system 2 of the second embodiment to the image transfer system 4 of the fourth embodiment is adopted. FIG. 23 is a flowchart showing a processing procedure of the image transfer system 5 in the fifth embodiment of the present invention.

In the image transfer system 5, a process of transmitting a cycle adjustment instruction including a cycle adjustment amount to the imaging terminal 4100 as information used to adjust the period of an imaging synchronization signal which is generated by the synchronization signal generation unit 102 is added, in association with a change to a configuration in which the after-cycle-adjustment accuracy estimation unit 2105, the cycle-adjustment determination unit 3104, and the cycle adjustment unit 4101 are included in the display terminal 4200. However, an outline of the overall operation in the image transfer system 5 is the same as those of the image transfer system 1 of the first embodiment to the image transfer system 4 of the fourth embodiment. Therefore, also in the image transfer system 5, a description of an outline of the overall operation will be omitted, and a more specific operation of performing cycle adjustment for an imaging synchronization signal in the image transfer system 5 will be described.

Also in the image transfer system 5, when a cycle adjustment process is started, the display terminal 4200 transmits a round-trip-propagation-time-measurement outgoing signal to the imaging terminal 4100, and the imaging terminal 4100 transmits a round-trip-propagation-time-measurement returning signal corresponding to the round-trip-propagation-time-measurement outgoing signal to the display terminal 4200 in step S302. Meanwhile, the process of step S302 in the image transfer system 5 is the same as the process of step S302 in the image transfer system 2 of the second embodiment to the image transfer system 4 of the fourth embodiment.

Thereafter, also in the image transfer system 5, in step S303, the display terminal 4200 calculates a round trip propagation-time required for transmission and reception in wireless transfer between the imaging terminal 4100 and the display terminal 4200. Meanwhile, the process of step S303 in the image transfer system 5 is also the same as the process of step S303 in the image transfer system 2 of the second embodiment to the image transfer system 4 of the fourth embodiment.

Thereafter, also in the image transfer system 5, in step S304, the display terminal 4200 generates a phase adjustment instruction for the phase adjustment unit, not shown in the drawing, which is provided in the round trip propagation-time measurement unit 1202 to adjust the phase of an imaging synchronization signal, on the basis of the round trip propagation-time required for transmission and reception in wireless transfer between the imaging terminal 4100 and the display terminal 4200 which is calculated in step S303, and updates a round trip propagation-time determination value. Meanwhile, the process of step S304 in the image transfer system 5 is also the same as the process of step S304 in each of the image transfer system 2 of the second embodiment to the image transfer system 4 of the fourth embodiment.

Thereafter, in the image transfer system 5, in step S306, the display terminal 4200 adjusts the period of an imaging synchronization signal on the basis of information of a plurality of round trip propagation-time determination values updated in step S304. More specifically, the after-cycle-adjustment accuracy estimation unit 2105 included in the display terminal 4200 estimates (calculates) a period-adjusted accuracy estimation value of an imaging synchronization signal in a case where cycle adjustment is temporarily executed. In addition, the cycle-adjustment determination unit 3104 included in the display terminal 4200 determines whether or not cycle adjustment for an imaging synchronization signal is performed on the basis of the period-adjusted accuracy estimation value estimated (calculated) by the after-cycle-adjustment accuracy estimation unit 2105. Further, in a case where the cycle-adjustment determination unit 3104 determines that cycle adjustment for an imaging synchronization signal is performed, the cycle adjustment unit 4101 included in the display terminal 4200 calculates a cycle adjustment amount for performing cycle adjustment for an imaging synchronization signal which is generated by the synchronization signal generation unit 102 included in the imaging terminal 4100 and generates a cycle adjustment instruction.

Thereafter, in the image transfer system 5, in step S312, the display terminal 4200 generates an adjustment notification signal including information of the cycle adjustment instruction including the cycle adjustment amount calculated by the cycle adjustment unit 4101 and transmits the generated adjustment notification signal to the imaging terminal 4100. More specifically, the cycle adjustment unit 4101 generates an adjustment notification signal including information of the cycle adjustment instruction including the calculated cycle adjustment amount and a phase adjustment instruction generated by the phase adjustment unit not shown in the drawing. In addition, the cycle adjustment unit 4101 outputs the generated adjustment notification signal to the wireless communication unit 201 and transmits the adjustment notification signal to the synchronization signal generation unit 102 provided in the imaging terminal 4100 through the wireless communication unit 201 and the antenna 220. Thereby, the synchronization signal generation unit 102 acquires the information of the cycle adjustment instruction including the cycle adjustment amount from the cycle adjustment unit 4101 provided in the display terminal 4200. More specifically, the wireless communication unit 108 receives the adjustment notification signal transmitted from the display terminal 4200 through the antenna 120. In addition, the wireless communication unit 108 outputs each of the information of the cycle adjustment instruction and the information of the phase adjustment instruction which are included in the received adjustment notification signal to the round trip propagation-time measurement assistance unit 1106. In addition, the round trip propagation-time measurement assistance unit 1106 outputs the information of the cycle adjustment instruction included in the adjustment notification signal which is output from the wireless communication unit 108 to the synchronization signal generation unit 102. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 4101.

Meanwhile, the round trip propagation-time measurement assistance unit 1106 outputs the phase adjustment instruction, which is output from the wireless communication unit 108, to the synchronization signal generation unit 102. Thereby, the synchronization signal generation unit 102 performs phase adjustment for an imaging synchronization signal to be generated, in response to the phase adjustment instruction which is output from the round trip propagation-time measurement assistance unit 1106, that is, the phase adjustment instruction transmitted from the phase adjustment unit, not shown in the drawing, which is provided in the round trip propagation-time measurement unit 1202 included in the display terminal 4200.

In this manner, in the image transfer system 5, the display terminal 4200 transmits a round-trip-propagation-time-measurement outgoing signal and calculates a round trip propagation-time in wireless transfer between the imaging terminal 4100 and the display terminal 4200. Further, in the image transfer system 5, the display terminal 4200 performs a process of updating a round trip propagation-time determination value, a process of estimating (calculating) a period-adjusted accuracy estimation value in a case where cycle adjustment for an imaging synchronization signal is temporarily executed, a process of determining whether or not cycle adjustment for an imaging synchronization signal which is generated by the synchronization signal generation unit 102 included in the imaging terminal 4100 is performed, and a process of calculating a cycle adjustment amount for performing cycle adjustment for an imaging synchronization signal to generate a cycle adjustment instruction. Further, in the image transfer system 5, the display terminal 4200 transmits information of the cycle adjustment instruction, including the calculated cycle adjustment amount, and a phase adjustment instruction to the imaging terminal 4100. Thereby, in the image transfer system 5, the imaging terminal 4100 adjusts the periods of an imaging synchronization signal and a display synchronization signal so as not to be shifted with the elapse of time, in response to the cycle adjustment instruction transmitted from the display terminal 4200.

Meanwhile, similarly to the image transfer system 1 of the first embodiment to the image transfer system 4 of the fourth embodiment, also in the image transfer system 5, when at least a process of updating a round trip propagation-time determination value is performed in step S304, the after-cycle-adjustment accuracy estimation unit 2105 included in the display terminal 4200 can estimate the accuracy of an imaging synchronization signal (that is, calculate a period-adjusted accuracy estimation value). Therefore, similarly to the image transfer system 1 of the first embodiment to the image transfer system 4 of the fourth embodiment, also in the image transfer system 5, the phase adjustment unit not shown in the drawing does not necessarily need to adjust the phase of an imaging synchronization signal in step S304 and may be able to update a round trip propagation-time calculated by the round trip propagation-time measurement unit 1202 as a round trip propagation-time determination value.

With such a configuration and processing procedure, in the image transfer system 5, the display terminal 4200 transmits a round-trip-propagation-time-measurement outgoing signal and measures (calculates) a round trip propagation-time in wireless transfer between the imaging terminal 4100 and the display terminal 4200 to update a round trip propagation-time determination value. Further, in the image transfer system 5, the display terminal 4200 further estimates (calculates) a period-adjusted accuracy estimation value in a case where cycle adjustment for an imaging synchronization signal is temporarily executed, determines whether or not cycle adjustment for an imaging synchronization signal is performed in the imaging terminal 4100, and calculates a cycle adjustment amount for adjusting the period of an imaging synchronization signal to generate a cycle adjustment instruction. Further, in the image transfer system 5, the imaging terminal 4100 adjusts the phase or period (at least a period) of an imaging synchronization signal to be generated, in response to the phase adjustment instruction generated by the display terminal 4200. Thereby, similarly to the image transfer system 1 of the first embodiment to the image transfer system 4 of the fourth embodiment, also in the image transfer system 5, the phase or period (at least a period) of an imaging synchronization signal which is generated by the imaging terminal 4100 (more specifically, the synchronization signal generation unit 102) is adjusted so as to match the phase or period (at least a period) of a display synchronization signal which is generated by the display terminal 4200. That is, similarly to the image transfer system 1 of the first embodiment to the image transfer system 4 of the fourth embodiment, also in the image transfer system 5, a timing when the imaging terminal 4100 wirelessly transfers captured image data of an image captured by an imaging unit not shown in the drawing to the display terminal 4200 is matched to a timing when the display terminal 4200 displays an image corresponding to the captured image data on a display unit not shown in the drawing. Thereby, similarly to the image transfer system 1 of the first embodiment to the image transfer system 4 of the fourth embodiment, also in the image transfer system 5, the display terminal 4200 can stably display an image corresponding to captured image data wirelessly transferred from the imaging terminal 4100 on the display unit not shown in the drawing.

As described above, the image transfer system 5 of the fifth embodiment performs transmission and reception of a round-trip-propagation-time-measurement outgoing signal and a round-trip-propagation-time-measurement returning signal between the round trip propagation-time measurement unit 1202 included in the display terminal 4200 and the round trip propagation-time measurement assistance unit 1106 included in the imaging terminal 4100 after wireless connection between the imaging terminal 4100 and the display terminal 4200 is established. Further, in the image transfer system 5 of the fifth embodiment, the round trip propagation-time measurement unit 1202 calculates a round trip propagation-time required for transmission and reception in wireless transfer between the imaging terminal 4100 and the display terminal 4200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round trip propagation-time measurement assistance unit 1106. Further, in the image transfer system 5 of the fifth embodiment, the round trip propagation-time measurement unit 1202 (more specifically, the phase adjustment unit not shown in the drawing) updates the round trip propagation-time calculated by the round trip propagation-time measurement unit 1202 as a round trip propagation-time determination value. Further, in the image transfer system 5 of the fifth embodiment, the after-cycle-adjustment accuracy estimation unit 2105 included in the display terminal 4200 estimates (calculates) a period-adjusted accuracy estimation value of an imaging synchronization signal in a case where cycle adjustment is temporarily executed. Further, in the image transfer system 5 of the fifth embodiment, the cycle-adjustment determination unit 3104 included in the display terminal 4200 determines whether or not cycle adjustment for an imaging synchronization signal which is generated by the synchronization signal generation unit 102 included in the imaging terminal 4100 is performed, on the basis of the period-adjusted accuracy estimation value calculated by the after-cycle-adjustment accuracy estimation unit 2105. Further, in the image transfer system 5 of the fifth embodiment, in a case where a cycle adjustment execution determination result indicates that cycle adjustment for an imaging synchronization signal which is generated by the synchronization signal generation unit 102 included in the imaging terminal 4100 is performed, the cycle adjustment unit 4101 included in the display terminal 4200 calculates a cycle adjustment amount for performing cycle adjustment for an imaging synchronization signal to generate a cycle adjustment instruction. Further, in the image transfer system. 5 of the fifth embodiment, the cycle adjustment unit 4101 transmits information of a cycle adjustment instruction including a cycle adjustment amount for adjusting the period of an imaging synchronization signal in the imaging terminal 4100 to the imaging terminal 4100. Thereby, in the image transfer system 5 of the fifth embodiment, the synchronization signal generation unit 102 adjusts the period of an imaging synchronization signal to be generated by an amount of cycle adjustment, in response to the cycle adjustment instruction which is transmitted from the cycle adjustment unit 4101.

Thereby, similarly to the image transfer system 1 of the first embodiment to the image transfer system 4 of the fourth embodiment, also in the image transfer system 5 of the fifth embodiment, the phase or period (at least a period) of an imaging synchronization signal can be matched to the phase or period (at least a period) of a display synchronization signal. That is, also in the image transfer system 5 of the fifth embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 5 of the fifth embodiment, the same effects as those in the image transfer system 1 of the first embodiment to the image transfer system 4 of the fourth embodiment can be obtained. That is, similarly to the image transfer system 1 of the first embodiment to the image transfer system 4 of the fourth embodiment, also in the image transfer system 5 of the fifth embodiment, it is possible to wirelessly transfer captured image data from the imaging terminal 4100 to the display terminal 4200 without exceeding a validity period of a display image and to stably display a display image corresponding to the captured image data transmitted from the imaging terminal 4100 in the display terminal 4200.

Moreover, in the image transfer system 5 of the fifth embodiment, the display terminal 4200 calculates a round trip propagation-time required for transmission and reception in wireless transfer between the imaging terminal 4100 and the display terminal 4200, estimates (calculates) a period-adjusted accuracy estimation value, determines whether or not cycle adjustment for an imaging synchronization signal is performed, calculates a cycle adjustment amount, and generates a cycle adjustment instruction. Thereby, in the image transfer system 5 of the fifth embodiment, the imaging terminal 4100 may only perform cycle adjustment for an imaging synchronization signal in response to the cycle adjustment instruction. That is, in the image transfer system 5 of the fifth embodiment, it is not necessary to calculate a round trip propagation-time, estimate (calculate) a period-adjusted accuracy estimation value, determine whether or not cycle adjustment for an imaging synchronization signal is performed, calculate a cycle adjustment amount, and generate a cycle adjustment instruction in the imaging terminal 4100, and thus it is possible to reduce a load of processing performed in the imaging terminal 4100.

Sixth Embodiment

Figure 24:
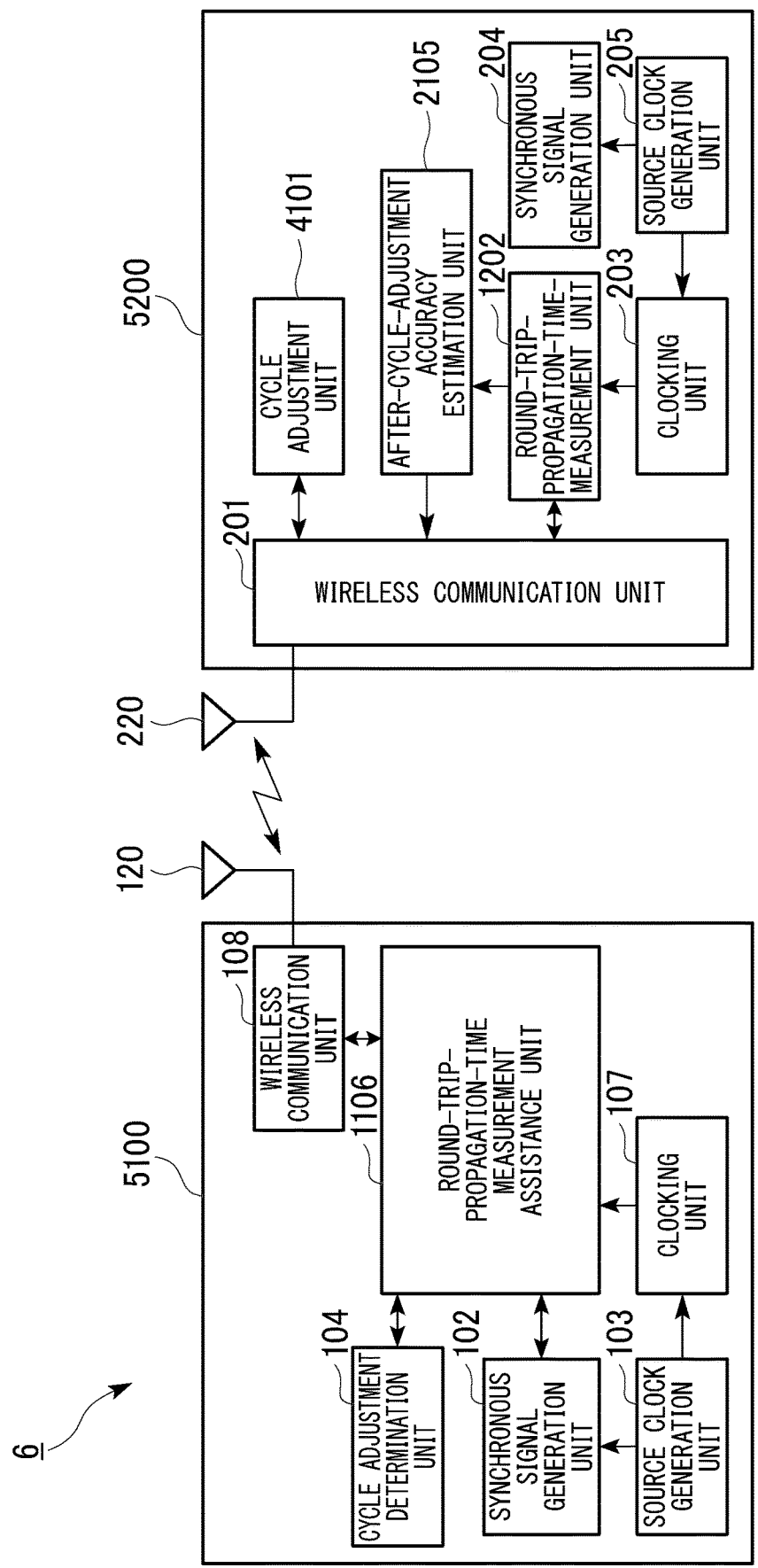
FIG. 24 is a block diagram showing a schematic configuration of an image transmission system according to a sixth embodiment of the present invention.

Hereinafter, an image transfer system of a sixth embodiment of the present invention will be described. FIG. 24 is a block diagram showing a schematic configuration of the image transfer system in the sixth embodiment of the present invention. An image transfer system 6 includes an imaging terminal 5100 and a display terminal 5200. The imaging terminal 5100 includes a synchronization signal generation unit 102, a source oscillation clock generation unit 103, a wireless communication unit 108, a cycle adjustment determination unit 104, a round trip propagation-time measurement assistance unit 1106, a clocking unit 107, and an antenna 120. In addition, the display terminal 5200 includes a synchronous signal generation unit 204, a source oscillation clock generation unit 205, a wireless communication unit 201, a round trip propagation-time measurement unit 1202, a clocking unit 203, an after-cycle-adjustment accuracy estimation unit 2105, a cycle adjustment unit 4101, and an antenna 220.

Meanwhile, also in FIG. 24, in components of the image transfer system 6, the same components as the components included in the image transfer system 1 of the first embodiment to the image transfer system 5 of the fifth embodiment are denoted by the same reference numerals and signs.

Similarly to the image transfer system 1 of the first embodiment to the image transfer system 5 of the fifth embodiment, the image transfer system 6 is also an image transfer system configured such that transmission and reception of a round-trip-propagation-time-measurement outgoing signal and a round-trip-propagation-time-measurement returning signal are performed between the imaging terminal 5100 and the display terminal 5200, and the imaging terminal 5100 adjusts the phase or period (at least a period) of an imaging synchronization signal to be generated so as to match the phase or period (at least a period) of a display synchronization signal which is generated by the display terminal 5200. Meanwhile, similarly the image transfer system 2 of the second embodiment to the image transfer system 5 of the fifth embodiment, the image transfer system 6 is an image transfer system in which the display terminal 5200 transmits a round-trip-propagation-time-measurement outgoing signal to the imaging terminal 5100 to calculate a round trip propagation-time in wireless transfer between the imaging terminal 5100 and the display terminal 5200, and the imaging terminal 5100 adjusts the phase or period (at least a period) of an imaging synchronization signal to be generated.

However, in the image transfer system 6, some components included in the imaging terminal 2100 in the image transfer system 3 of the third embodiment are moved to the display terminal 5200. More specifically, in the image transfer system 6, the cycle adjustment unit 4101 that replaces the cycle adjustment unit 101 included in the imaging terminal 2100 in the image transfer system 3 of the third embodiment is included in the display terminal 5200. Meanwhile, it can be said that a configuration of the image transfer system 6 is a configuration in which the cycle-adjustment determination unit 3104 included in the display terminal 4200 in the image transfer system 5 of the fifth embodiment is returned to the imaging terminal 4100 as the cycle adjustment determination unit 104.

For this reason, in the image transfer system 6, the display terminal 5200 estimates (calculates) a period-adjusted accuracy estimation value in a case where the period of an imaging synchronization signal which is generated by the synchronization signal generation unit 102 included in the imaging terminal 5100 is temporarily adjusted, and transmits the estimated period-adjusted accuracy estimation value to the imaging terminal 5100. Further, in the image transfer system 6, the imaging terminal 5100 determines whether or not cycle adjustment for an imaging synchronization signal is performed on the basis of the period-adjusted accuracy estimation value transmitted from the display terminal 5200, and transmits a cycle adjustment execution determination result indicating a determination result to the display terminal 5200. Further, in the image transfer system 6, in a case where the cycle adjustment execution determination result transmitted from the imaging terminal 5100 indicates that cycle adjustment for an imaging synchronization signal is performed, the display terminal 5200 calculates a cycle adjustment amount and transmits the calculated cycle adjustment amount to the imaging terminal 5100 together with a cycle adjustment instruction. Further, in the image transfer system 6, the imaging terminal 5100 adjusts the period of an imaging synchronization signal to be generated, in response to the cycle adjustment instruction transmitted from the display terminal 5200.

However, also in the image transfer system 6, although there is a process of exchanging signals through wireless transfer in association with a change in the disposition of components, functions and operations of the components are the same as the functions and operations of the corresponding components in the image transfer system 1 of the first embodiment to the image transfer system 5 of the fifth embodiment. That is, the functions and operations of the components included in the imaging terminal 5100 and the display terminal 5200 in the image transfer system 6 can be easily understood from the above description of the components included in the imaging terminal and the display terminal in each of the image transfer system 1 of the first embodiment to the image transfer system 5 of the fifth embodiment. Therefore, a detailed description related to the components included in the image transfer system 6 will be omitted.

Figure 25:
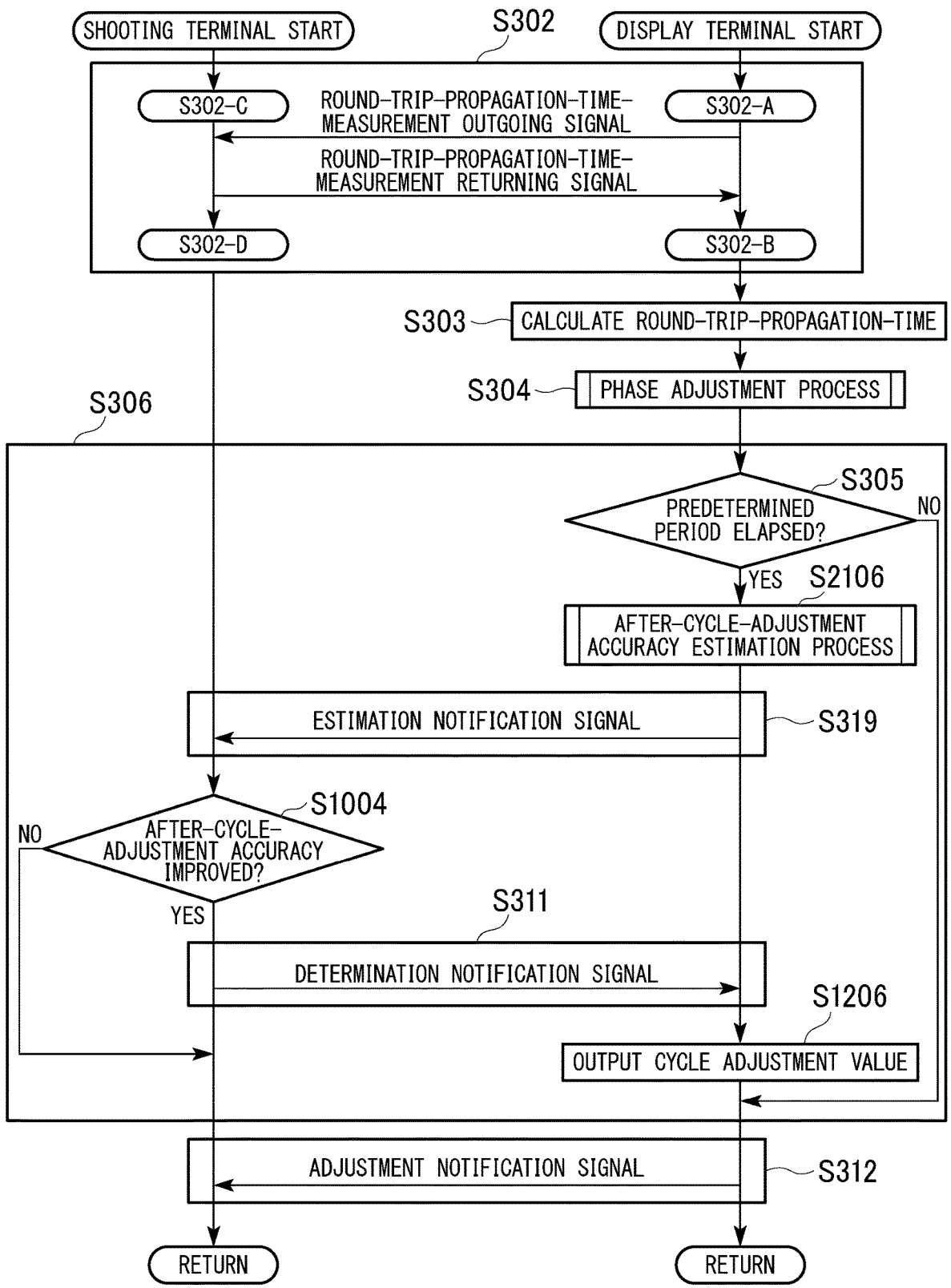
FIG. 25 is a flow chart showing processing procedures of the image transmission system according to the sixth embodiment of the present invention.

Next, operations of processing in the image transfer system 6 will be described. Meanwhile, in the image transfer system 6, it is assumed that a phase adjustment unit, not shown in the drawing, which is provided in the round-trip-propagation-time measurement unit 106 included in the imaging terminal 100 in the image transfer system 1 of the first embodiment is included in the round trip propagation-time measurement unit 1202. That is, in the image transfer system 6, a configuration in which the phase adjustment unit not shown in the drawing is disposed at the same position as those in the image transfer system 2 of the second embodiment to the image transfer system 5 of the fifth embodiment is adopted. FIG. 25 is a flowchart showing a processing procedure of the image transfer system 6 in the sixth embodiment of the present invention.

In the image transfer system 6, a process of transmitting information of a period-adjusted accuracy estimation value to the imaging terminal 5100 as information used to adjust the period of an imaging synchronization signal which is generated by the synchronization signal generation unit 102, a process of transmitting information of a cycle adjustment execution determination result to the display terminal 5200, and a process of transmitting a cycle adjustment instruction including a cycle adjustment amount to the imaging terminal 5100 are added, in association with a change to a configuration in which the after-cycle-adjustment accuracy estimation unit 2105 and the cycle adjustment unit 4101 are included in the display terminal 5200. However, an outline of the overall operation in the image transfer system 6 is the same as those of the image transfer system 1 of the first embodiment to the image transfer system 5 of the fifth embodiment. Therefore, also in the image transfer system 6, a description of an outline of the overall operation will be omitted, and a more specific operation of performing cycle adjustment for an imaging synchronization signal in the image transfer system 6 will be described.

Also in the image transfer system 6, when a cycle adjustment process is started, the display terminal 5200 transmits a round-trip-propagation-time-measurement outgoing signal to the imaging terminal 5100, and the imaging terminal 5100 transmits a round-trip-propagation-time-measurement returning signal corresponding to the round-trip-propagation-time-measurement outgoing signal to the display terminal 5200 in step S302. Meanwhile, the process of step S302 in the image transfer system 6 is the same as the process of step S302 in each of the image transfer system 2 of the second embodiment to the image transfer system 5 of the fifth embodiment.

Thereafter, also in the image transfer system 6, in step S303, the display terminal 5200 calculates a round trip propagation-time required for transmission and reception in wireless transfer between the imaging terminal 5100 and the display terminal 5200. Meanwhile, the process of step S303 in the image transfer system 6 is also the same as the process of step S303 in each of the image transfer system 2 of the second embodiment to the image transfer system 5 of the fifth embodiment.

Thereafter, also in the image transfer system 6, in step S304, the display terminal 5200 generates a phase adjustment instruction for the phase adjustment unit, not shown in the drawing, which is provided in the round trip propagation-time measurement unit 1202 to adjust the phase of an imaging synchronization signal, on the basis of the round trip propagation-time required for transmission and reception in wireless transfer between the imaging terminal 5100 and the display terminal 5200 which is calculated in step S303, and updates a round trip propagation-time determination value. Meanwhile, the process of step S304 in the image transfer system 6 is also the same as the process of step S304 in each of the image transfer system 2 of the second embodiment to the image transfer system 5 of the fifth embodiment.

Thereafter, in the image transfer system 6, in step S306, the period of an imaging synchronization signal is adjusted on the basis of the information of the plurality of round trip propagation-time determination values updated in step S304. However, in the image transfer system 6, the display terminal 5200 estimates (calculates) a period-adjusted accuracy estimation value of an imaging synchronization signal in a case where cycle adjustment is temporarily executed. Further, in the image transfer system 6, the imaging terminal 5100 determines whether or not cycle adjustment for an imaging synchronization signal is performed on the basis of the period-adjusted accuracy estimation value. Further, in the image transfer system 6, the display terminal 5200 calculates a cycle adjustment amount for performing cycle adjustment for an imaging synchronization signal and generates a cycle adjustment instruction.

For this reason, in the image transfer system 6, in step S305 included in step S306, the after-cycle-adjustment accuracy estimation unit 2105 included in the display terminal 5200 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 2105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 2105 determines that cycle adjustment is performed and calculates a period-adjusted accuracy estimation value in step S2106 included in step S306. Meanwhile, the process of step S305 and the process of step S2106 which are included in step S306 in the image transfer system 6 are the same as the process of step S305 in step S306 and the process of step S2106 in the image transfer system 3 of the third embodiment and the image transfer system 4 of the fourth embodiment.

Thereafter, in the image transfer system 6, in step S319 included in step S306, the display terminal 5200 generates an estimation notification signal including information of the period-adjusted accuracy estimation value calculated by the after-cycle-adjustment accuracy estimation unit 2105 and transmits the generated estimation notification signal to the imaging terminal 5100. Meanwhile, the process of step S319 included in step S306 in the image transfer system 6 and the estimation notification signal generated in the process of step S319 and transmitted to the imaging terminal 5100 are the same as the process of step S319 included in step S306 and the estimation notification signal in the image transfer system 3 of the third embodiment. Thereby, the cycle adjustment determination unit 104 provided in the imaging terminal 5100 acquires information of the period-adjusted accuracy estimation value calculated by the after-cycle-adjustment accuracy estimation unit 2105 provided in the display terminal 5200 through the round trip propagation-time measurement assistance unit 1106.

Further, in the image transfer system 6, in step S1004 included in step S306, the imaging terminal 5100 determines whether or not cycle adjustment for an imaging synchronization signal is performed on the basis of the period-adjusted accuracy estimation value transmitted from the display terminal 5200. More specifically, the cycle adjustment determination unit 104 included in the imaging terminal 5100 determines that cycle adjustment for an imaging synchronization signal is not performed in a case where the accuracy of an imaging synchronization signal indicated by the period-adjusted accuracy estimation value transmitted from the display terminal 5200, that is, calculated by the after-cycle-adjustment accuracy estimation unit 2105 included in the display terminal 5200 is equal to the current accuracy of the imaging synchronization signal or has not been improved, and terminates the process of step S1004. On the other hand, in a case where the estimated accuracy of the imaging synchronization signal has been improved compared with the current accuracy of the imaging synchronization signal, the cycle adjustment determination unit 104 determines that cycle adjustment for an imaging synchronization signal is performed, and generates a cycle adjustment execution determination result indicating a determination result. Meanwhile, the process of step S1004 included in step S306 in the image transfer system 6 is the same as the process of step S1004 included in step S306 in the image transfer system 1 of the first embodiment.

Thereafter, in the image transfer system 6, in step S311 included in step S306, the imaging terminal 5100 generates a determination notification signal including information of the cycle adjustment execution determination result obtained by the cycle adjustment determination unit 104 and transmits the generated determination notification signal to the display terminal 5200. More specifically, the cycle adjustment determination unit 104 generates a determination notification signal including the information of the obtained cycle adjustment execution determination result and outputs the generated determination notification signal to the round trip propagation-time measurement assistance unit 1106.

Thereby, the round trip propagation-time measurement assistance unit 1106 outputs the determination notification signal output from the cycle adjustment determination unit 104 to the wireless communication unit 108 and transmits the determination notification signal to the cycle adjustment unit 4101 provided in the display terminal 5200 through the wireless communication unit 108 and the antenna 120. Thereby, the cycle adjustment unit 4101 acquires information of the cycle adjustment execution determination result obtained by the cycle adjustment determination unit 104 provided in the imaging terminal 5100. More specifically, the wireless communication unit 201 receives the determination notification signal transmitted from the imaging terminal 5100 through the antenna 220. In addition, the wireless communication unit 201 outputs the information of the cycle adjustment execution determination result included in the received determination notification signal to the cycle adjustment unit 4101.

Further, in the image transfer system 6, in step S1206 included in step S306, the display terminal 5200 calculates a cycle adjustment amount for performing cycle adjustment for an imaging synchronization signal in accordance with the cycle adjustment execution determination result transmitted from the imaging terminal 5100, and generates a cycle adjustment instruction. More specifically, in a case where the information of the cycle adjustment execution determination result transmitted from the imaging terminal 5100 indicates that cycle adjustment for an imaging synchronization signal is performed, the cycle adjustment unit 4101 included in the display terminal 5200 calculates a cycle adjustment amount for performing cycle adjustment for an imaging synchronization signal which is generated by the synchronization signal generation unit 102 included in the imaging terminal 5100 and generates a cycle adjustment instruction. Meanwhile, the process of step S1206 included in step S306 in the image transfer system 6 is the same as the process of step S1206 included in step S306 in the image transfer system 3 of the third embodiment.

Thereafter, in the image transfer system 6, in step S312, the display terminal 5200 generates an adjustment notification signal including information of the cycle adjustment instruction including the cycle adjustment amount calculated by the cycle adjustment unit 4101 and a phase adjustment instruction generated by the phase adjustment unit not shown in the drawing, and transmit s the generated adjustment notification signal to the imaging terminal 5100. Meanwhile, the process of step S312 in the image transfer system 6 and the adjustment notification signal generated in the process of step S312 and transmitted to the imaging terminal 5100 are the same as the process of step S312 and the adjustment notification signal in the image transfer system 5 of the fifth embodiment. Thereby, the synchronization signal generation unit 102 provided in the imaging terminal 5100 acquires information of the cycle adjustment instruction including the cycle adjustment amount transmitted from the cycle adjustment unit 4101 provided in the display terminal 5200 through the round trip propagation-time measurement assistance unit 1106. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 4101.

Meanwhile, the phase adjustment instruction transmitted from the cycle adjustment unit 4101 provided in the display terminal 5200 is also output to the synchronization signal generation unit 102 from the round trip propagation-time measurement assistance unit 1106. Thereby, the synchronization signal generation unit 102 performs phase adjustment for an imaging synchronization signal to be generated in response to the phase adjustment instruction which is output from the round trip propagation-time measurement assistance unit 1106, that is, the phase adjustment instruction generated by the phase adjustment unit, not shown in the drawing, which is provided in the round trip propagation-time measurement unit 1202 included in the display terminal 5200.

In this manner, in the image transfer system 6, the display terminal 5200 transmits a round-trip-propagation-time-measurement outgoing signal and calculates a round trip propagation-time in wireless transfer between the imaging terminal 5100 and the display terminal 5200. Further, in the image transfer system 6, the display terminal 5200 performs a process of updating a round trip propagation-time determination value and a process of estimating (calculating) a period-adjusted accuracy estimation value in a case where cycle adjustment for an imaging synchronization signal is temporarily executed. Further, in the image transfer system 6, the display terminal 5200 transmits information of a calculated period-adjusted accuracy estimation value, information of a plurality of round trip propagation-time determination values updated, information of a round trip propagation-time, information of a scheduled transmission time of a round-trip-propagation-time-measurement outgoing signal, information of a scheduled transmission time included in a received round-trip-propagation-time-measurement returning signal, and a phase adjustment instruction to the imaging terminal 5100. Thereby, in the image transfer system 6, the imaging terminal 5100 performs a process of determining whether or not cycle adjustment for an imaging synchronization signal which is generated by the synchronization signal generation unit 102 included in the imaging terminal 5100 is performed, on the basis of the pieces of information transmitted from the display terminal 5200. Further, in the image transfer system 6, the imaging terminal 5100 transmits information of a cycle adjustment execution determination result which is a determination result to the display terminal 5200. Thereby, in the image transfer system 6, the display terminal 5200 performs a process of calculating a cycle adjustment amount for performing cycle adjustment for an imaging synchronization signal to generate a cycle adjustment instruction in accordance with the information of the cycle adjustment execution determination result transmitted from the imaging terminal 5100. Further, in the image transfer system 6, the display terminal 5200 transmits information of the cycle adjustment instruction, including the calculated cycle adjustment amount, and a phase adjustment instruction to the imaging terminal 5100. Thereby, in the image transfer system 6, the imaging terminal 5100 adjusts the periods of an imaging synchronization signal and a display synchronization signal so as not to be shifted with the elapse of time, in response to the cycle adjustment instruction transmitted from the display terminal 5200.

Meanwhile, similarly to the image transfer system 1 of the first embodiment to the image transfer system 5 of the fifth embodiment, also in the image transfer system 6, when at least a process of updating a round trip propagation-time determination value is performed in step S304, the after-cycle-adjustment accuracy estimation unit 2105 included in the display terminal 5200 can estimate the accuracy of an imaging synchronization signal (that is, calculate a period-adjusted accuracy estimation value). Therefore, similarly to the image transfer system 1 of the first embodiment to the image transfer system 5 of the fifth embodiment, also in the image transfer system 6, the phase adjustment unit not shown in the drawing does not necessarily need to adjust the phase of an imaging synchronization signal in step S304 and may be able to update a round trip propagation-time calculated by the round trip propagation-time measurement unit 1202 as a round trip propagation-time determination value.

With such a configuration and processing procedure, in the image transfer system 6, the display terminal 5200 transmits a round-trip-propagation-time-measurement outgoing signal and measures (calculates) a round trip propagation-time in wireless transfer between the imaging terminal 5100 and the display terminal 5200 to update a round trip propagation-time determination value. Further, in the image transfer system 6, the display terminal 5200 further estimates (calculates) a period-adjusted accuracy estimation value in a case where cycle adjustment for an imaging synchronization signal is temporarily executed. Further, in the image transfer system 6, the imaging terminal 5100 determines whether or not cycle adjustment for an imaging synchronization signal is performed, on the basis of the period-adjusted accuracy estimation value estimated (calculated) by the display terminal 5200. Further, in the image transfer system 6, the display terminal 5200 calculates a cycle adjustment amount for adjusting the period of an imaging synchronization signal to generate a cycle adjustment instruction in accordance with the cycle adjustment execution determination result obtained by the imaging terminal 5100. Further, in the image transfer system 6, the imaging terminal 5100 adjusts the phase or period (at least a period) of an imaging synchronization signal to be generated, in response to the phase adjustment instruction generated by the display terminal 5200. Thereby, similarly to the image transfer system 1 of the first embodiment to the image transfer system 5 of the fifth embodiment, also in the image transfer system 6, the phase or period (at least a period) of an imaging synchronization signal generated by the imaging terminal 5100 (more specifically, the synchronization signal generation unit 102) is adjusted so as to match the phase or period (at least a period) of a display synchronization signal generated by the display terminal 5200. That is, similarly to the image transfer system 1 of the first embodiment to the image transfer system 5 of the fifth embodiment, also in the image transfer system 6, a timing when the imaging terminal 5100 wirelessly transfers captured image data of an image captured by an imaging unit not shown in the drawing to the display terminal 5200 is matched to a timing when the display terminal 5200 displays an image corresponding to the captured image data on a display unit not shown in the drawing. Thereby, similarly to the image transfer system 1 of the first embodiment to the image transfer system 5 of the fifth embodiment, also in the image transfer system 6, the display terminal 5200 can stably display an image corresponding to captured image data wirelessly transferred from the imaging terminal 5100 on the display unit not shown in the drawing.

As described above, the image transfer system 6 of the sixth embodiment performs transmission and reception of a round-trip-propagation-time-measurement outgoing signal and a round-trip-propagation-time-measurement returning signal between the round trip propagation-time measurement unit 1202 included in the display terminal 5200 and the round trip propagation-time measurement assistance unit 1106 included in the imaging terminal 5100 after wireless connection between the imaging terminal 5100 and the display terminal 5200 is established. Further, in the image transfer system 6 of the sixth embodiment, the round trip propagation-time measurement unit 1202 calculates a round trip propagation-time required for transmission and reception in wireless transfer between the imaging terminal 5100 and the display terminal 5200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round trip propagation-time measurement assistance unit 1106. Further, in the image transfer system 6 of the sixth embodiment, the round trip propagation-time measurement unit 1202 (more specifically, the phase adjustment unit not shown in the drawing) updates the round trip propagation-time calculated by the round trip propagation-time measurement unit 1202 as a round trip propagation-time determination value. Further, in the image transfer system 6 of the sixth embodiment, the after-cycle-adjustment accuracy estimation unit 2105 included in the display terminal 5200 estimates (calculates) a period-adjusted accuracy estimation value of an imaging synchronization signal in a case where cycle adjustment is temporarily executed. Further, in the image transfer system 6 of the sixth embodiment, the after-cycle-adjustment accuracy estimation unit 2105 transmits information for determining whether or not the period of an imaging synchronization signal is adjusted in the imaging terminal 5100 to the imaging terminal 5100, inclusive of the period-adjusted accuracy estimation value. Further, in the image transfer system 6 of the sixth embodiment, the cycle adjustment determination unit 104 included in the imaging terminal 5100 determines whether or not cycle adjustment for an imaging synchronization signal which is generated by the synchronization signal generation unit 102 is performed, on the basis of the period-adjusted accuracy estimation value calculated by the after-cycle-adjustment accuracy estimation unit 2105. Further, in the image transfer system 6 of the sixth embodiment, the cycle adjustment determination unit 104 transmits information of a cycle adjustment execution determination result which is a result obtained by determining whether or not the period of an imaging synchronization signal is adjusted to the display terminal 5200. Further, in the image transfer system 6 of the sixth embodiment, in a case where the cycle adjustment execution determination result indicates that cycle adjustment for an imaging synchronization signal which is generated by the synchronization signal generation unit 102 included in the imaging terminal 5100 is performed, the cycle adjustment unit 4101 included in the display terminal 5200 calculates a cycle adjustment amount for performing cycle adjustment for an imaging synchronization signal to generate a cycle adjustment instruction. Further, in the image transfer system 6 of the sixth embodiment, the cycle adjustment unit 4101 transmits information of a cycle adjustment instruction including a cycle adjustment amount for adjusting the period of an imaging synchronization signal in the imaging terminal 5100 to the imaging terminal 5100. Thereby, in the image transfer system 6 of the sixth embodiment, the synchronization signal generation unit 102 adjusts the period of an imaging synchronization signal to be generated by an amount of cycle adjustment, in response to the cycle adjustment instruction which is transmitted from the cycle adjustment unit 4101.

Thereby, similarly to the image transfer system 1 of the first embodiment to the image transfer system 5 of the fifth embodiment, also in the image transfer system 6 of the sixth embodiment, the phase or period (at least a period) of an imaging synchronization signal can be matched to the phase or period (at least a period) of a display synchronization signal. That is, also in the image transfer system 6 of the sixth embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 6 of the sixth embodiment, the same effects as those in the image transfer system 1 of the first embodiment to the image transfer system 5 of the fifth embodiment can be obtained. That is, similarly to the image transfer system 1 of the first embodiment to the image transfer system 5 of the fifth embodiment, also in the image transfer system 6 of the sixth embodiment, it is possible to wirelessly transfer captured image data from the imaging terminal 5100 to the display terminal 5200 without exceeding a validity period of a display image and to stably display a display image corresponding to the captured image data transmitted from the imaging terminal 5100 in the display terminal 5200.

Moreover, in the image transfer system 6 of the sixth embodiment, the display terminal 5200 calculates a round trip propagation-time required for transmission and reception in wireless transfer between the imaging terminal 5100 and the display terminal 5200, estimates (calculates) a period-adjusted accuracy estimation value, calculates a cycle adjustment amount, and generates a cycle adjustment instruction. Thereby, in the image transfer system 6 of the sixth embodiment, the imaging terminal 5100 may only determine whether or not cycle adjustment for an imaging synchronization signal is performed and perform cycle adjustment for an imaging synchronization signal in response to the cycle adjustment instruction. That is, in the image transfer system 6 of the sixth embodiment, it is not necessary to calculate a round trip propagation-time, estimate (calculate) a period-adjusted accuracy estimation value, calculate a cycle adjustment amount, and generate a cycle adjustment instruction in the imaging terminal 5100, and thus it is possible to reduce a load of processing performed in the imaging terminal 5100.

Seventh Embodiment

Figure 26:
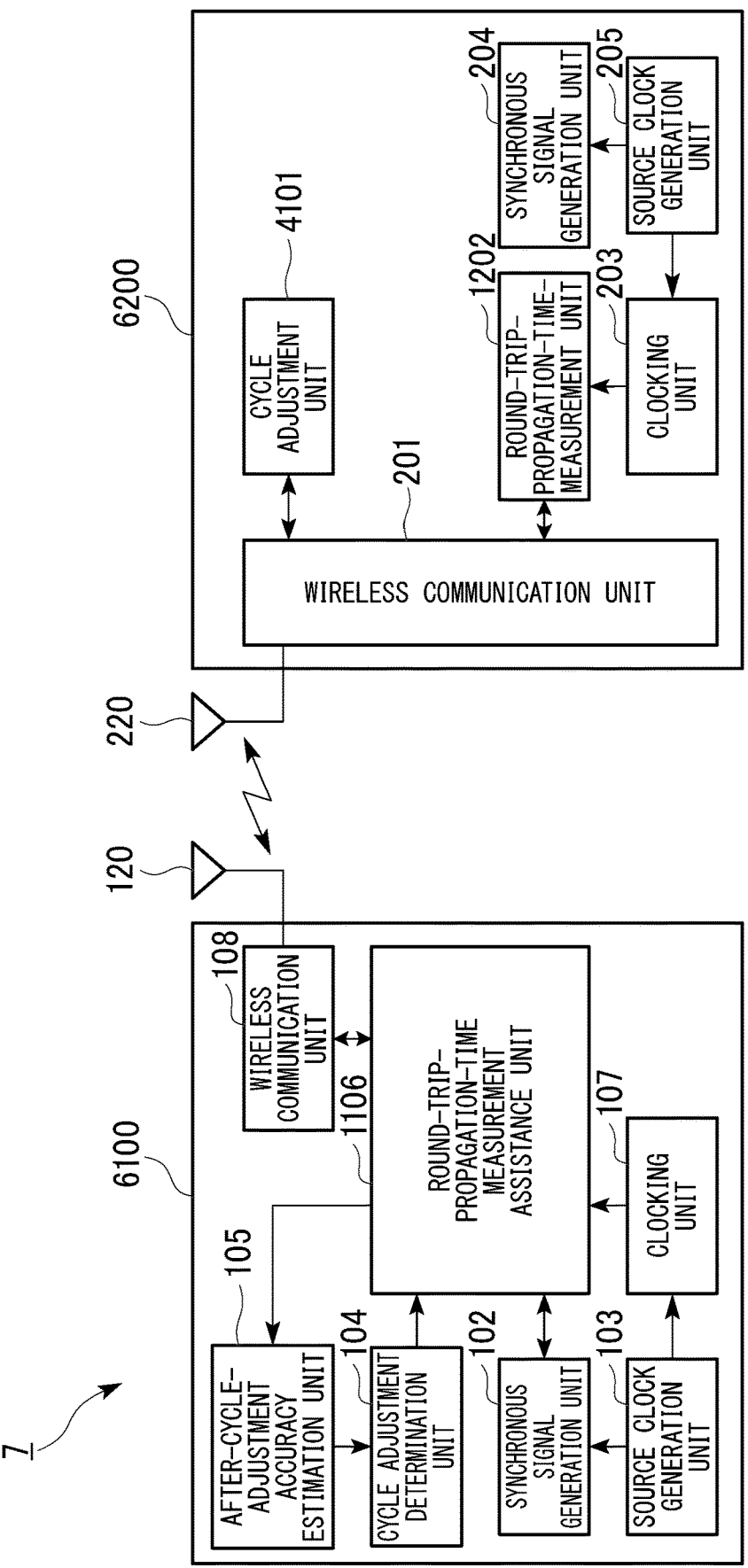
FIG. 26 is a block diagram showing a schematic configuration of an image transmission system according to a seventh embodiment of the present invention.

Hereinafter, an image transfer system of a seventh embodiment of the present invention will be described. FIG. 26 is a block diagram showing a schematic configuration of the image transfer system in the seventh embodiment of the present invention. The image transfer system 7 includes an imaging terminal 6100 and a display terminal 6200. The imaging terminal 6100 includes a synchronization signal generation unit 102, a source oscillation clock generation unit 103, a wireless communication unit 108, a cycle adjustment determination unit 104, an after-cycle-adjustment accuracy estimation unit 105, a round trip propagation-time measurement assistance unit 1106, a clocking unit 107, and an antenna 120. In addition, the display terminal 6200 includes a synchronous signal generation unit 204, a source oscillation clock generation unit 205, a wireless communication unit 201, a round trip propagation-time measurement unit 1202, a clocking unit 203, a cycle adjustment unit 4101, and an antenna 220.

Meanwhile, also in FIG. 26, in components of the image transfer system 7, the same components as the components included in the image transfer system 1 of the first embodiment to the image transfer system 6 of the sixth embodiment are denoted by the same reference numerals and signs.

Similarly to the image transfer system 1 of the first embodiment to the image transfer system 6 of the sixth embodiment, the image transfer system 7 is also an image transfer system configured such that transmission and reception of a round-trip-propagation-time-measurement outgoing signal and a round-trip-propagation-time-measurement returning signal are performed between the imaging terminal 6100 and the display terminal 6200, and the imaging terminal 6100 adjusts the phase or period (at least a period) of an imaging synchronization signal to be generated so as to match the phase or period (at least a period) of a display synchronization signal which is generated by the display terminal 6200. Meanwhile, similarly to the image transfer system 2 of the second embodiment to the image transfer system 6 of the sixth embodiment, the image transfer system 7 is an image transfer system in which the display terminal 6200 transmits a round-trip-propagation-time-measurement outgoing signal to the imaging terminal 6100 to calculate a round trip propagation-time in wireless transfer between the imaging terminal 6100 and the display terminal 6200, and the imaging terminal 6100 adjusts the phase or period (at least a period) of an imaging synchronization signal to be generated.

However, in the image transfer system 7, some components included in the imaging terminal 1100 in the image transfer system 2 of the second embodiment are moved to the display terminal 6200. More specifically, in the image transfer system 7, the cycle adjustment unit 4101 that replaces the cycle adjustment unit 101 included in the imaging terminal 1100 in the image transfer system 2 of the second embodiment is included in the display terminal 6200. Meanwhile, it can be said that a configuration of the image transfer system 7 is a configuration in which the after-cycle-adjustment accuracy estimation unit 2105 included in the display terminal 5200 in the image transfer system 6 of the sixth embodiment is returned to the imaging terminal 5100 as the after-cycle-adjustment accuracy estimation unit 105.

For this reason, in the image transfer system 7, the display terminal 6200 measures (calculates) around trip propagation-time required for transmission and reception at the time of performing wireless transfer between the display terminal 6200 and the imaging terminal 6100 and transmits the measured round trip propagation-time to the imaging terminal 6100. Further, in the image transfer system 7, the imaging terminal 6100 estimates (calculates) a period-adjusted accuracy estimation value in a case where the period of an imaging synchronization signal which is generated by the synchronization signal generation unit 102 is temporarily adjusted, and transmits a cycle adjustment execution determination result indicating a result obtained by determining whether or not cycle adjustment for an imaging synchronization signal is performed on the basis of the period-adjusted accuracy estimation value to the imaging terminal 6100. Further, in the image transfer system 7, in a case where the cycle adjustment execution determination result transmitted from the imaging terminal 6100 indicates that cycle adjustment for an imaging synchronization signal is performed, the display terminal 6200 calculates a cycle adjustment amount and transmits the calculated cycle adjustment amount to the imaging terminal 6100 together with a cycle adjustment instruction. Further, in the image transfer system 7, the imaging terminal 6100 adjusts the period of an imaging synchronization signal to be generated, in response to the cycle adjustment instruction transmitted from the display terminal 6200.

However, also in the image transfer system 7, although there is a process of exchanging signals through wireless transfer in association with a change in the disposition of components, functions and operations of the components are the same as the functions and operations of the corresponding components in the image transfer system 1 of the first embodiment to the image transfer system 6 of the sixth embodiment. That is, the functions and operations of the components included in the imaging terminal 6100 and the display terminal 6200 in the image transfer system 7 can be easily understood from the above description of the components included in the imaging terminal and the display terminal in each of the image transfer system 1 of the first embodiment to the image transfer system 6 of the sixth embodiment. Therefore, a detailed description related to the components included in the image transfer system 7 will be omitted.

Figure 27:
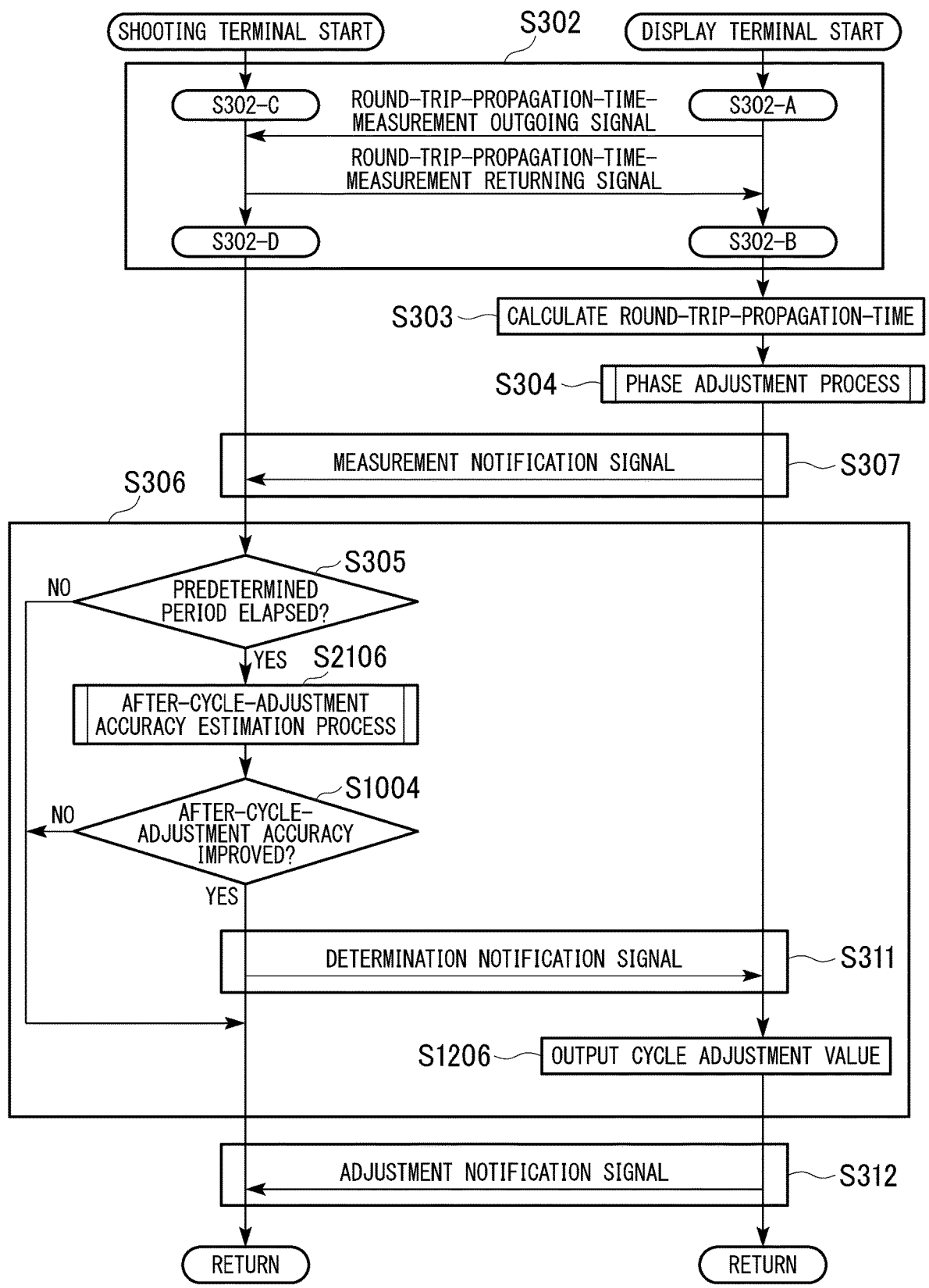
FIG. 27 is a flow chart showing processing procedures of the image transmission system according to the seventh embodiment of the present invention.

Next, operations of processing in the image transfer system 7 will be described. Meanwhile, in the image transfer system 7, it is assumed that a phase adjustment unit, not shown in the drawing, which is provided in the round-trip-propagation-time measurement unit 106 included in the imaging terminal 100 in the image transfer system 1 of the first embodiment is included in the round trip propagation-time measurement unit 1202. That is, in the image transfer system 7, a configuration in which the phase adjustment unit not shown in the drawing is disposed at the same position as those in the image transfer system 2 of the second embodiment to the image transfer system 6 of the sixth embodiment is adopted. FIG. 27 is a flowchart showing a processing procedure of the image transfer system 7 in the seventh embodiment of the present invention.

In the image transfer system 7, a process of transmitting information used to adjust the period of an imaging synchronization signal which is generated by the synchronization signal generation unit 102 to the imaging terminal 6100, a process of transmitting information of a cycle adjustment execution determination result to the display terminal 6200, and a process of transmitting a cycle adjustment instruction including a cycle adjustment amount to the imaging terminal 6100 are added, in association with a change to a configuration in which the cycle adjustment unit 4101 is included in the display terminal 6200. However, an outline of the overall operation in the image transfer system 7 is the same as those of the image transfer system 1 of the first embodiment to the image transfer system 6 of the sixth embodiment. Therefore, also in the image transfer system 7, a description of an outline of the overall operation will be omitted, and a more specific operation of performing cycle adjustment for an imaging synchronization signal in the image transfer system 7 will be described.

Also in the image transfer system 7, when a cycle adjustment process is started, the display terminal 6200 transmits a round-trip-propagation-time-measurement outgoing signal to the imaging terminal 6100, and the imaging terminal 6100 transmits a round-trip-propagation-time-measurement returning signal corresponding to the round-trip-propagation-time-measurement outgoing signal to the display terminal 6200 in step S302. Meanwhile, the process of step S302 in the image transfer system 7 is the same as the process of step S302 in each of the image transfer system 2 of the second embodiment to the image transfer system 6 of the sixth embodiment.

Thereafter, also in the image transfer system 7, in step S303, the display terminal 6200 calculates a round trip propagation-time required for transmission and reception in wireless transfer between the imaging terminal 6100 and the display terminal 6200. Meanwhile, the process of step S303 in the image transfer system 7 is also the same as the process of step S303 in each of the image transfer system 2 of the second embodiment to the image transfer system 6 of the sixth embodiment.

Thereafter, also in the image transfer system 7, in step S304, the display terminal 6200 generates a phase adjustment instruction for the phase adjustment unit, not shown in the drawing, which is provided in the round trip propagation-time measurement unit 1202 to adjust the phase of an imaging synchronization signal, on the basis of the round trip propagation-time required for transmission and reception in wireless transfer between the imaging terminal 6100 and the display terminal 6200 which is calculated in step S303, and updates a round trip propagation-time determination value. Meanwhile, the process of step S304 in the image transfer system 7 is also the same as the process of step S304 in each of the image transfer system 2 of the second embodiment to the image transfer system 6 of the sixth embodiment.

Thereafter, in the image transfer system 7, in step S307, the display terminal 6200 generates a measurement notification signal including information of the calculated round trip propagation-time and transmits the generated measurement notification signal to the imaging terminal 6100. Meanwhile, the process of step S307 in the image transfer system 7 and the measurement notification signal generated in the process of step S307 and transmitted to the imaging terminal 6100 are the same as the process of step S307 and the measurement notification signal in the image transfer system 2 of the second embodiment. Thereby, the after-cycle-adjustment accuracy estimation unit 105 provided in the imaging terminal 6100 acquires information of the round trip propagation-time determination value transmitted from the display terminal 6200 through the round trip propagation-time measurement assistance unit 1106.

Thereafter, in the image transfer system 7, in step S306, the period of an imaging synchronization signal is adjusted on the basis of the information of the plurality of round trip propagation-time determination values updated in step S304. However, in the image transfer system 7, the imaging terminal 6100 estimates (calculates) a period-adjusted accuracy estimation value of an imaging synchronization signal in a case where cycle adjustment is temporarily executed, and determines whether or not cycle adjustment for an imaging synchronization signal is performed on the basis of the estimated (calculated) period-adjusted accuracy estimation value. Further, in the image transfer system 7, the display terminal 6200 calculates a cycle adjustment amount for performing cycle adjustment for an imaging synchronization signal and generates a cycle adjustment instruction.

For this reason, in the image transfer system 7, in step S305 included in step S306, the after-cycle-adjustment accuracy estimation unit 105 included in the imaging terminal 6100 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 105 determines that cycle adjustment is performed and calculates a period-adjusted accuracy estimation value in step S2106 included in step S306. Meanwhile, the process of step S305 and the process of step S2106 which are included in step S306 in the image transfer system 7 are the same as the process of step S305 and the process of step S2106 which are included in step S306 in the image transfer system 1 of the first embodiment.

Further, in the image transfer system 7, in step S1004 included in step S306, the cycle adjustment determination unit 104 included in the imaging terminal 6100 determines whether or not cycle adjustment for an imaging synchronization signal is performed on the basis of the calculated period-adjusted accuracy estimation value. Further, in a case where the cycle adjustment determination unit 104 determines that cycle adjustment for an imaging synchronization signal is performed because an estimated accuracy of the estimated imaging synchronization signal has been improved compared with the current accuracy of the imaging synchronization signal, the cycle adjustment execution determination unit generates a cycle adjustment execution determination result indicating a determination result. Meanwhile, the process of step S1004 included in step S306 in the image transfer system 7 is the same as the process of step S1004 included in step S306 in the image transfer system 1 of the first embodiment.

Thereafter, in the image transfer system 7, in step S311 included in step S306, the imaging terminal 6100 generates a determination notification signal including information of the cycle adjustment execution determination result obtained by the cycle adjustment determination unit 104 and transmits the generated determination notification signal to the display terminal 6200. Meanwhile, the process of step S311 included in step S306 in the image transfer system 7 and the determination notification signal generated in the process of step S311 and transmitted to the display terminal 6200 are the same as the process of step S311 included in step S306 and the determination notification signal in the image transfer system 6 of the sixth embodiment. Thereby, the cycle adjustment unit 4101 provided in the display terminal 6200 acquires information of the cycle adjustment execution determination result obtained by the cycle adjustment determination unit 104 provided in the imaging terminal 6100.

Further, in the image transfer system 7, in step S1206 included in step S306, the display terminal 6200 calculates a cycle adjustment amount for performing cycle adjustment for an imaging synchronization signal in accordance with the cycle adjustment execution determination result transmitted from the imaging terminal 6100, and generates a cycle adjustment instruction. Meanwhile, the process of step S1206 included in step S306 in the image transfer system 7 is the same as the process of step S1206 included in step S306 in the image transfer system 6 of the sixth embodiment.

Thereafter, in the image transfer system 7, in step S312, the display terminal 6200 generates an adjustment notification signal including information of the cycle adjustment instruction including the cycle adjustment amount calculated by the cycle adjustment unit 4101 and a phase adjustment instruction generated by the phase adjustment unit not shown in the drawing, and transmit s the generated adjustment notification signal to the imaging terminal 6100. Meanwhile, the process of step S312 in the image transfer system 7 and the adjustment notification signal generated in the process of step S312 and transmitted to the imaging terminal 6100 are the same as the process of step S312 and the adjustment notification signal in the image transfer system 6 of the sixth embodiment. Thereby, the synchronization signal generation unit 102 provided in the imaging terminal 6100 acquires information of the cycle adjustment instruction including the cycle adjustment amount transmitted from the cycle adjustment unit 4101 provided in the display terminal 6200 through the round trip propagation-time measurement assistance unit 1106. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 4101.

Meanwhile, the phase adjustment instruction transmitted from the cycle adjustment unit 4101 provided in the display terminal 6200 is also output to the synchronization signal generation unit 102 from the round trip propagation-time measurement assistance unit 1106. Thereby, the synchronization signal generation unit 102 performs phase adjustment for an imaging synchronization signal to be generated in response to the phase adjustment instruction which is output from the round trip propagation-time measurement assistance unit 1106, that is, the phase adjustment instruction generated by the phase adjustment unit, not shown in the drawing, which is provided in the round trip propagation-time measurement unit 1202 included in the display terminal 6200.

In this manner, in the image transfer system 7, the display terminal 6200 transmits a round-trip-propagation-time-measurement outgoing signal and calculates a round trip propagation-time in wireless transfer between the imaging terminal 6100 and the display terminal 6200. Further, in the image transfer system 7, the display terminal 6200 performs a process of updating a round trip propagation-time determination value and transmits information of a plurality of round trip propagation-time determination values updated, information of a round trip propagation-time, information of a scheduled transmission time of a round-trip-propagation-time-measurement outgoing signal, information of a scheduled transmission time included in a received round-trip-propagation-time-measurement returning signal, and a phase adjustment instruction to the imaging terminal 6100. Thereby, in the image transfer system 7, the imaging terminal 6100 performs a process of estimating (calculating) a period-adjusted accuracy estimation value in a case where cycle adjustment for an imaging synchronization signal is temporarily executed and a process of determining whether or not cycle adjustment for an imaging synchronization signal which is generated by the synchronization signal generation unit 102 is performed, on the basis of the pieces of information transmitted from the display terminal 6200. Further, in the image transfer system 7, the imaging terminal 6100 transmits information of a cycle adjustment execution determination result which is a determination result to the display terminal 6200. Thereby, in the image transfer system 7, the display terminal 6200 performs a process of calculating a cycle adjustment amount for performing cycle adjustment for an imaging synchronization signal to generate a cycle adjustment instruction in accordance with the information of the cycle adjustment execution determination result transmitted from the imaging terminal 6100. Further, in the image transfer system 7, the display terminal 6200 transmits information of the cycle adjustment instruction, including the calculated cycle adjustment amount, and a phase adjustment instruction to the imaging terminal 6100.

Thereby, in the image transfer system 7, the imaging terminal 6100 adjusts the periods of an imaging synchronization signal and a display synchronization signal so as not to be shifted with the elapse of time, in response to the cycle adjustment instruction transmitted from the display terminal 6200.

Meanwhile, similarly to the image transfer system 1 of the first embodiment to the image transfer system 6 of the sixth embodiment, also in the image transfer system 7, when at least a process of updating a round trip propagation-time determination value is performed in step S304, the after-cycle-adjustment accuracy estimation unit 105 included in the imaging terminal 6100 can estimate the accuracy of an imaging synchronization signal (that is, calculate a period-adjusted accuracy estimation value). Therefore, similarly to the image transfer system 1 of the first embodiment to the image transfer system 6 of the sixth embodiment, also in the image transfer system 7, the phase adjustment unit not shown in the drawing does not necessarily need to adjust the phase of an imaging synchronization signal in step S304 and may be able to update a round trip propagation-time calculated by the round trip propagation-time measurement unit 1202 as a round trip propagation-time determination value.

With such a configuration and processing procedure, in the image transfer system 7, the display terminal 6200 transmits a round-trip-propagation-time-measurement outgoing signal and measures (calculates) a round trip propagation-time in wireless transfer between the imaging terminal 6100 and the display terminal 6200 to update a round trip propagation-time determination value. Further, in the image transfer system 7, the imaging terminal 6100 estimates (calculates) a period-adjusted accuracy estimation value in a case where cycle adjustment for an imaging synchronization signal is temporarily executed and determines whether or not cycle adjustment for an imaging synchronization signal is performed. Further, in the image transfer system 7, the display terminal 6200 calculates a cycle adjustment amount for adjusting the period of an imaging synchronization signal to generate a cycle adjustment instruction in accordance with the cycle adjustment execution determination result obtained by the imaging terminal 6100. Further, in the image transfer system 7, the imaging terminal 6100 adjusts the phase or period (at least a period) of an imaging synchronization signal to be generated, in response to the phase adjustment instruction generated by the display terminal 6200. Thereby, similarly to the image transfer system 1 of the first embodiment to the image transfer system 6 of the sixth embodiment, also in the image transfer system 7, the phase or period (at least a period) of an imaging synchronization signal generated by the imaging terminal 6100 (more specifically, the synchronization signal generation unit 102) is adjusted so as to match the phase or period (at least a period) of a display synchronization signal generated by the display terminal 6200. That is, similarly to the image transfer system 1 of the first embodiment to the image transfer system 6 of the sixth embodiment, also in the image transfer system 7, a timing when the imaging terminal 6100 wirelessly transfers captured image data of an image captured by an imaging unit not shown in the drawing to the display terminal 6200 is matched to a timing when the display terminal 6200 displays an image corresponding to the captured image data on a display unit not shown in the drawing. Thereby, similarly to the image transfer system 1 of the first embodiment to the image transfer system 6 of the sixth embodiment, also in the image transfer system 7, the display terminal 6200 can stably display an image corresponding to captured image data wirelessly transferred from the imaging terminal 6100 on the display unit not shown in the drawing.

As described above, the image transfer system 7 of the seventh embodiment performs transmission and reception of a round-trip-propagation-time-measurement outgoing signal and a round-trip-propagation-time-measurement returning signal between the round trip propagation-time measurement unit 1202 included in the display terminal 6200 and the round trip propagation-time measurement assistance unit 1106 included in the imaging terminal 6100 after wireless connection between the imaging terminal 6100 and the display terminal 6200 is established. Further, in the image transfer system 7 of the seventh embodiment, the round trip propagation-time measurement unit 1202 calculates a round trip propagation-time required for transmission and reception in wireless transfer between the imaging terminal 6100 and the display terminal 6200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round trip propagation-time measurement assistance unit 1106. Further, in the image transfer system 7 of the seventh embodiment, the round trip propagation-time measurement unit 1202 (more specifically, the phase adjustment unit not shown in the drawing) updates the round trip propagation-time calculated by the round trip propagation-time measurement unit 1202 as a round trip propagation-time determination value. Further, in the image transfer system 7 of the seventh embodiment, the round trip propagation-time measurement unit 1202 transmits information for adjusting the period of an imaging synchronization signal in the imaging terminal 6100 to the imaging terminal 6100. Further, in the image transfer system 7 of the seventh embodiment, the after-cycle-adjustment accuracy estimation unit 105 included in the imaging terminal 6100 estimates (calculates) a period-adjusted accuracy estimation value of an imaging synchronization signal in a case where cycle adjustment is temporarily executed. Further, in the image transfer system 7 of the seventh embodiment, the cycle adjustment determination unit 104 included in the imaging terminal 6100 determines whether or not cycle adjustment for an imaging synchronization signal which is generated by the synchronization signal generation unit 102 is performed, on the basis of the period-adjusted accuracy estimation value calculated by the after-cycle-adjustment accuracy estimation unit 105. Further, in the image transfer system 7 of the seventh embodiment, the cycle adjustment determination unit 104 transmits information of a cycle adjustment execution determination result which is a result obtained by determining whether or not the period of an imaging synchronization signal is adjusted to the display terminal 6200. Further, in the image transfer system 7 of the seventh embodiment, in a case where the cycle adjustment execution determination result indicates that cycle adjustment for an imaging synchronization signal which is generated by the synchronization signal generation unit 102 included in the imaging terminal 6100 is performed, the cycle adjustment unit 4101 included in the display terminal 6200 calculates a cycle adjustment amount for performing cycle adjustment for an imaging synchronization signal to generate a cycle adjustment instruction. Further, in the image transfer system 7 of the seventh embodiment, the cycle adjustment unit 4101 transmits information of a cycle adjustment instruction including a cycle adjustment amount for adjusting the period of an imaging synchronization signal in the imaging terminal 6100 to the imaging terminal 6100. Thereby, in the image transfer system 7 of the seventh embodiment, the synchronization signal generation unit 102 adjusts the period of an imaging synchronization signal to be generated by an amount of cycle adjustment, in response to the cycle adjustment instruction which is transmitted from the cycle adjustment unit 4101.

Thereby, similarly to the image transfer system 1 of the first embodiment to the image transfer system 6 of the sixth embodiment, also in the image transfer system 7 of the seventh embodiment, the phase or period (at least a period) of an imaging synchronization signal can be matched to the phase or period (at least a period) of a display synchronization signal. That is, also in the image transfer system 7 of the seventh embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 7 of the seventh embodiment, the same effects as those in the image transfer system 1 of the first embodiment to the image transfer system 6 of the sixth embodiment can be obtained. That is, similarly to the image transfer system 1 of the first embodiment to the image transfer system 6 of the sixth embodiment, also in the image transfer system 7 of the seventh embodiment, it is possible to wirelessly transfer captured image data from the imaging terminal 6100 to the display terminal 6200 without exceeding a validity period of a display image and to stably display a display image corresponding to the captured image data transmitted from the imaging terminal 6100 in the display terminal 6200.

Moreover, in the image transfer system 7 of the seventh embodiment, the display terminal 6200 calculates a round trip propagation-time required for transmission and reception in wireless transfer between the imaging terminal 6100 and the display terminal 6200, calculates a cycle adjustment amount, and generates a cycle adjustment instruction. Thereby, in the image transfer system 7 of the seventh embodiment, the imaging terminal 6100 may only estimate (calculate) a period-adjusted accuracy estimation value, determine whether or not cycle adjustment for an imaging synchronization signal is performed, and perform cycle adjustment for an imaging synchronization signal in response to the cycle adjustment instruction. That is, in the image transfer system 7 of the seventh embodiment, it is not necessary to calculate a round trip propagation-time, calculate a cycle adjustment amount, and generate a cycle adjustment instruction in the imaging terminal 6100, and thus it is possible to reduce a load of processing performed in the imaging terminal 6100.

Eighth Embodiment

Figure 28:
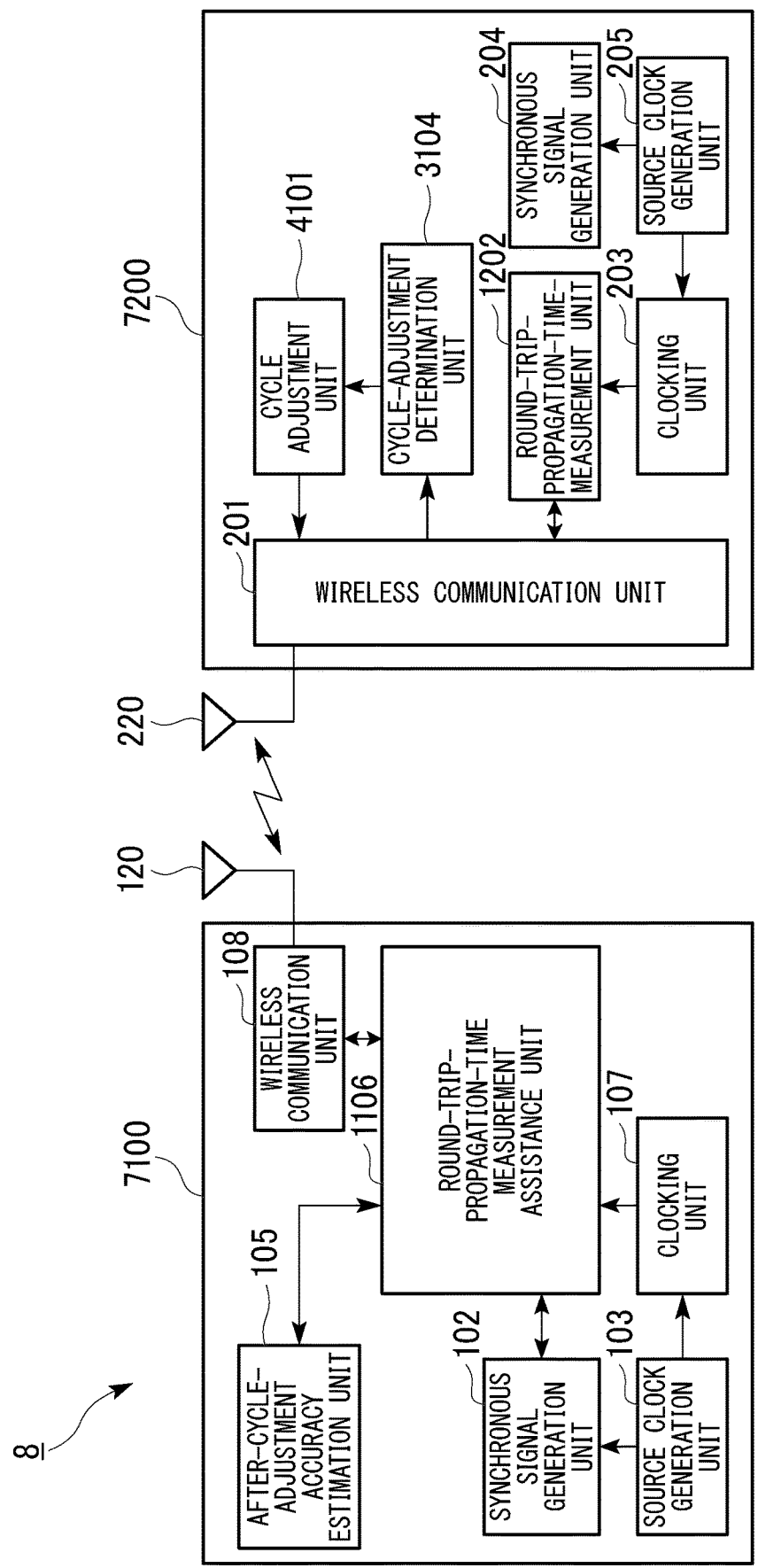
FIG. 28 is a block diagram showing a schematic configuration of an image transmission system according to an eighth embodiment of the present invention.

Hereinafter, an image transfer system of an eighth embodiment of the present invention will be described. FIG. 28 is a block diagram showing a schematic configuration of the image transfer system in the eighth embodiment of the present invention. An image transfer system 8 includes an imaging terminal 7100 and a display terminal 7200. The imaging terminal 7100 includes a synchronization signal generation unit 102, a source oscillation clock generation unit 103, a wireless communication unit 108, an after-cycle-adjustment accuracy estimation unit 105, a round trip propagation-time measurement assistance unit 1106, a clocking unit 107, and an antenna 120. In addition, the display terminal 7200 includes a synchronous signal generation unit 204, a source oscillation clock generation unit 205, a wireless communication unit 201, a round trip propagation-time measurement unit 1202, a clocking unit 203, a cycle-adjustment determination unit 3104, a cycle adjustment unit 4101, and an antenna 220.

Meanwhile, also in FIG. 28, in components of the image transfer system 8, the same components as the components included in the image transfer system 1 of the first embodiment to the image transfer system 7 of the seventh embodiment are denoted by the same reference numerals and signs.

Similarly to the image transfer system 1 of the first embodiment to the image transfer system 7 of the seventh embodiment, the image transfer system 8 is also an image transfer system configured such that transmission and reception of a round-trip-propagation-time-measurement outgoing signal and a round-trip-propagation-time-measurement returning signal are performed between the imaging terminal 7100 and the display terminal 7200, and the imaging terminal 7100 adjusts the phase or period (at least a period) of an imaging synchronization signal to be generated so as to match the phase or period (at least a period) of a display synchronization signal which is generated by the display terminal 7200. Meanwhile, similarly to the image transfer system 2 of the second embodiment to the image transfer system 7 of the seventh embodiment, the image transfer system 8 is an image transfer system in which the display terminal 7200 transmits a round-trip-propagation-time-measurement outgoing signal to the imaging terminal 7100 to calculate a round trip propagation-time in wireless transfer between the imaging terminal 7100 and the display terminal 7200, and the imaging terminal 7100 adjusts the phase or period (at least a period) of an imaging synchronization signal to be generated.

However, in the image transfer system 8, some components included in the imaging terminal 6100 in the image transfer system 7 of the seventh embodiment are moved to the display terminal 7200. More specifically, in the image transfer system 8, the cycle-adjustment determination unit 3104 that replaces the cycle adjustment determination unit 104 included in the imaging terminal 6100 in the image transfer system 7 of the seventh embodiment is included in the display terminal 7200. Meanwhile, it can be said that a configuration of the image transfer system 8 is a configuration in which the after-cycle-adjustment accuracy estimation unit 2105 included in the display terminal 4200 in the image transfer system 5 of the fifth embodiment is returned to the imaging terminal 4100 as the after-cycle-adjustment accuracy estimation unit 105.

For this reason, in the image transfer system 8, the display terminal 7200 measures (calculates) a roundtrip propagation-time required for transmission and reception at the time of performing wireless transfer between the display terminal 7200 and the imaging terminal 7100 and transmits the measured round trip propagation-time to the imaging terminal 7100. Further, in the image transfer system 8, the imaging terminal 7100 estimates (calculates) a period-adjusted accuracy estimation value in a case where the period of an imaging synchronization signal which is generated by the synchronization signal generation unit 102 is temporarily adjusted, and transmits the estimated period-adjusted accuracy estimation value to the display terminal 7200. Further, in the image transfer system 8, the display terminal 7200 determines whether or not cycle adjustment for an imaging synchronization signal is performed, on the basis of the period-adjusted accuracy estimation value transmitted from the imaging terminal 7100, calculates a cycle adjustment amount in a case where it is determined that cycle adjustment for an imaging synchronization signal is performed, and transmits the calculated cycle adjustment amount to the imaging terminal 7100 together with a cycle adjustment instruction. Further, in the image transfer system 8, the imaging terminal 7100 adjusts the period of an imaging synchronization signal to be generated, in response to the cycle adjustment instruction transmitted from the display terminal 7200.

However, also in the image transfer system 8, although there is a process of exchanging signals through wireless transfer in association with a change in the disposition of components, functions and operations of the components are the same as the functions and operations of the corresponding components in the image transfer system 1 of the first embodiment to the image transfer system 7 of the seventh embodiment. That is, the functions and operations of the components included in the imaging terminal 7100 and the display terminal 7200 in the image transfer system 8 can be easily understood from the above description of the components included in the imaging terminal and the display terminal in each of the image transfer system 1 of the first embodiment to the image transfer system 7 of the seventh embodiment. Therefore, a detailed description related to the components included in the image transfer system 8 will be omitted.

Figure 29:
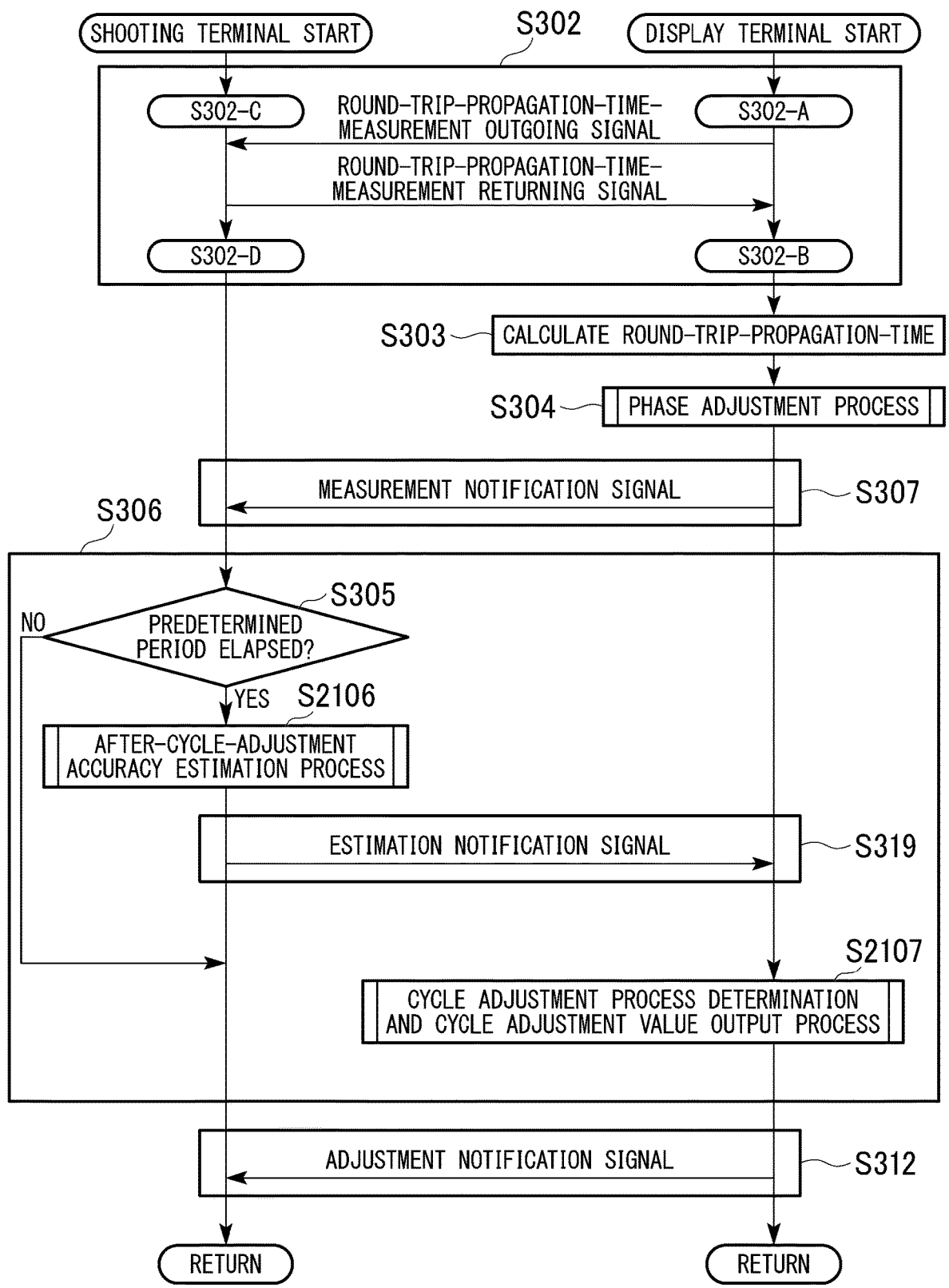
FIG. 29 is a flow chart showing processing procedures of the image transmission system according to the eighth embodiment of the present invention.

Next, operations of processing in the image transfer system 8 will be described. Meanwhile, in the image transfer system 8, it is assumed that a phase adjustment unit, not shown in the drawing, which is provided in the round-trip-propagation-time measurement unit 106 included in the imaging terminal 100 in the image transfer system 1 of the first embodiment is included in the round trip propagation-time measurement unit 1202. That is, in the image transfer system 8, a configuration in which the phase adjustment unit not shown in the drawing is disposed at the same position as those in the image transfer system 2 of the second embodiment to the image transfer system 7 of the seventh embodiment is adopted. FIG. 29 is a flowchart showing a processing procedure of the image transfer system 8 in the eighth embodiment of the present invention.

In the image transfer system 8, a process of transmitting information used to adjust the period of an imaging synchronization signal which is generated by the synchronization signal generation unit 102 to the imaging terminal 7100, a process of transmitting information of a period-adjusted accuracy estimation value to the display terminal 7200, and a process of transmitting a cycle adjustment instruction including a cycle adjustment amount to the imaging terminal 7100 are added, in association with a change to a configuration in which the cycle-adjustment determination unit 3104 and the cycle adjustment unit 4101 are included in the display terminal 7200. However, an outline of the overall operation in the image transfer system 8 is the same as those of the image transfer system 1 of the first embodiment to the image transfer system 7 of the seventh embodiment. Therefore, also in the image transfer system 8, a description of an outline of the overall operation will be omitted, and a more specific operation of performing cycle adjustment for an imaging synchronization signal in the image transfer system 8 will be described.

Also in the image transfer system 8, when a cycle adjustment process is started, the display terminal 7200 transmits a round-trip-propagation-time-measurement outgoing signal to the imaging terminal 7100, and the imaging terminal 7100 transmits a round-trip-propagation-time-measurement returning signal corresponding to the round-trip-propagation-time-measurement outgoing signal to the display terminal 7200 in step S302. Meanwhile, the process of step S302 in the image transfer system 8 is the same as the process of step S302 in each of the image transfer system. 2 of the second embodiment to the image transfer system 7 of the seventh embodiment.

Thereafter, also in the image transfer system 8, in step S303, the display terminal 7200 calculates a round trip propagation-time required for transmission and reception in wireless transfer between the imaging terminal 7100 and the display terminal 7200. Meanwhile, the process of step S303 in the image transfer system 8 is also the same as the process of step S303 in each of the image transfer system 2 of the second embodiment to the image transfer system 7 of the seventh embodiment.

Thereafter, also in the image transfer system 8, in step S304, the display terminal 7200 generates a phase adjustment instruction for the phase adjustment unit, not shown in the drawing, which is provided in the round trip propagation-time measurement unit 1202 to adjust the phase of an imaging synchronization signal, on the basis of the round trip propagation-time required for transmission and reception in wireless transfer between the imaging terminal 7100 and the display terminal 7200 which is calculated in step S303, and updates a round trip propagation-time determination value. Meanwhile, the process of step S304 in the image transfer system 8 is also the same as the process of step S304 in each of the image transfer system 2 of the second embodiment to the image transfer system 7 of the seventh embodiment.

Thereafter, in the image transfer system 8, in step S307, the display terminal 7200 generates a measurement notification signal including information of the calculated round trip propagation-time and transmits the generated measurement notification signal to the imaging terminal 7100. Meanwhile, the process of step S307 in the image transfer system 8 and the measurement notification signal generated in the process of step S307 and transmitted to the imaging terminal 7100 are the same as the process of step S307 and the measurement notification signal in each of the image transfer system 2 of the second embodiment and the image transfer system 7 of the seventh embodiment. Thereby, the after-cycle-adjustment accuracy estimation unit 105 provided in the imaging terminal 7100 acquires information of the round trip propagation-time determination value transmitted from the display terminal 7200 through the round trip propagation-time measurement assistance unit 1106.

Thereafter, in the image transfer system 8, in step S306, the period of an imaging synchronization signal is adjusted on the basis of the information of the plurality of round trip propagation-time determination values updated in step S304. However, in the image transfer system 8, the imaging terminal 7100 estimates (calculates) a period-adjusted accuracy estimation value of an imaging synchronization signal in a case where cycle adjustment is temporarily executed. Further, in the image transfer system 8, the display terminal 7200 determines whether or not cycle adjustment for an imaging synchronization signal is performed on the basis of the period-adjusted accuracy estimation value and calculates a cycle adjustment amount for performing cycle adjustment for an imaging synchronization signal to generate a cycle adjustment instruction.

For this reason, in the image transfer system 8, in step S305 included in step S306, the after-cycle-adjustment accuracy estimation unit 105 included in the imaging terminal 7100 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 105 determines that cycle adjustment is performed and calculates a period-adjusted accuracy estimation value in step S2106 included in step S306. Meanwhile, the process of step S305 and the process of step S2106 which are included in step S306 in the image transfer system 8 are the same as the process of step S305 and the process of step S2106 which are included in step S306 in the image transfer system 1 of the first embodiment.

Thereafter, in the image transfer system 8, in step S319 included in step S306, the imaging terminal 7100 generates an estimation notification signal including information of the period-adjusted accuracy estimation value calculated by the after-cycle-adjustment accuracy estimation unit 105 and transmits the generated estimation notification signal to the display terminal 7200. More specifically, the after-cycle-adjustment accuracy estimation unit 105 generates an estimation notification signal including information of the calculated period-adjusted accuracy estimation value and outputs the generated estimation notification signal to the round trip propagation-time measurement assistance unit 1106. Thereby, the round trip propagation-time measurement assistance unit 1106 outputs an estimation notification signal which is output from the after-cycle-adjustment accuracy estimation unit 105 to the wireless communication unit 108 and transmits the estimation notification signal to the cycle-adjustment determination unit 3104 provided in the display terminal 7200 through the wireless communication unit 108 and the antenna 120. Thereby, the cycle-adjustment determination unit 3104 acquires information of the period-adjusted accuracy estimation value calculated by the after-cycle-adjustment accuracy estimation unit 105 provided in the imaging terminal 7100. More specifically, the wireless communication unit 201 receives the estimation notification signal transmitted from the imaging terminal 7100 through the antenna 220. In addition, the wireless communication unit 201 outputs information of the period-adjusted accuracy estimation value included in the received estimation notification signal to the cycle-adjustment determination unit 3104.

Further, in the image transfer system 8, in step S2107 included in step S306, the display terminal 7200 determines whether or not cycle adjustment for an imaging synchronization signal is performed on the basis of the information of the period-adjusted accuracy estimation value transmitted from the imaging terminal 7100, similar to the process of step S2107 included in step S306 in the image transfer system 1 of the first embodiment, and calculates a cycle adjustment amount for performing cycle adjustment for an imaging synchronization signal to generate a cycle adjustment instruction. More specifically, the cycle-adjustment determination unit 3104 determines whether or not the cycle adjustment for an imaging synchronization signal which is generated by the synchronization signal generation unit 102 included in the imaging terminal 7100 is performed, on the basis of the period-adjusted accuracy estimation value calculated and transmitted by the after-cycle-adjustment accuracy estimation unit 105 provided in the imaging terminal 7100 (step S1004). Further, in a case where the cycle-adjustment determination unit 3104 determines that cycle adjustment for an imaging synchronization signal is performed, the cycle adjustment unit 4101 calculates a cycle adjustment amount for performing cycle adjustment for an imaging synchronization signal and generates a cycle adjustment instruction (step S1206).

Thereafter, in the image transfer system 8, in step S312, the display terminal 7200 generates an adjustment notification signal including information of the cycle adjustment instruction, including the cycle adjustment amount calculated by the cycle adjustment unit 4101, and a phase adjustment instruction generated by the phase adjustment unit not shown in the drawing, and transmits the generated adjustment notification signal to the imaging terminal 7100. Meanwhile, the process of step S312 in the image transfer system 8 and the adjustment notification signal generated in the process of step S312 and transmitted to the imaging terminal 7100 are the same as the process of step S312 and the adjustment notification signal in the image transfer system 7 of the seventh embodiment. Thereby, the synchronization signal generation unit 102 provided in the imaging terminal 7100 acquires information of the cycle adjustment instruction including the cycle adjustment amount transmitted from the cycle adjustment unit 4101 provided in the display terminal 7200 through the round trip propagation-time measurement assistance unit 1106. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 4101.

Meanwhile, the phase adjustment instruction transmitted from the cycle adjustment unit 4101 provided in the display terminal 7200 is also output to the synchronization signal generation unit 102 from the round trip propagation-time measurement assistance unit 1106. Thereby, the synchronization signal generation unit 102 performs phase adjustment for an imaging synchronization signal to be generated in response to the phase adjustment instruction which is output from the round trip propagation-time measurement assistance unit 1106, that is, the phase adjustment instruction generated by the phase adjustment unit, not shown in the drawing, which is provided in the round trip propagation-time measurement unit 1202 included in the display terminal 7200.

In this manner, in the image transfer system 8, the display terminal 7200 transmits a round-trip-propagation-time-measurement outgoing signal and calculates a round trip propagation-time in wireless transfer between the imaging terminal 7100 and the display terminal 7200. Further, in the image transfer system 8, the display terminal 7200 performs a process of updating a round trip propagation-time determination value and transmits information of a plurality of round trip propagation-time determination values updated, information of a round trip propagation-time, information of a scheduled transmission time of a round-trip-propagation-time-measurement outgoing signal, information of a scheduled transmission time included in a received round-trip-propagation-time-measurement returning signal, and a phase adjustment instruction to the imaging terminal 7100. Thereby, in the image transfer system 8, the imaging terminal 7100 performs a process of estimating (calculating) a period-adjusted accuracy estimation value in a case where cycle adjustment for an imaging synchronization signal is temporarily executed, on the basis of the pieces of information transmitted from the display terminal 7200. Further, in the image transfer system 8, the imaging terminal 7100 transmits information of the calculated period-adjusted accuracy estimation value to the display terminal 7200. Thereby, in the image transfer system 8, the display terminal 7200 performs a process of determining whether or not cycle adjustment for an imaging synchronization signal which is generated by the synchronization signal generation unit 102 included in the imaging terminal 7100 is performed, on the basis of the information of the period-adjusted accuracy estimation value transmitted from the imaging terminal 7100, and performs a process of calculating a cycle adjustment amount for performing cycle adjustment for an imaging synchronization signal to generate a cycle adjustment instruction in accordance with a cycle adjustment execution determination result. Further, in the image transfer system 8, the display terminal 7200 transmits information of the cycle adjustment instruction, including the calculated cycle adjustment amount, and a phase adjustment instruction to the imaging terminal 7100. Thereby, in the image transfer system 8, the imaging terminal 7100 adjusts the periods of an imaging synchronization signal and a display synchronization signal so as not to be shifted with the elapse of time, in response to the cycle adjustment instruction transmitted from the display terminal 7200.

Meanwhile, similarly to the image transfer system 1 of the first embodiment to the image transfer system 7 of the seventh embodiment, also in the image transfer system 8, when at least a process of updating around trip propagation-time determination value is performed in step S304, the after-cycle-adjustment accuracy estimation unit 105 included in the imaging terminal 7100 can estimate the accuracy of an imaging synchronization signal (that is, calculate a period-adjusted accuracy estimation value). Therefore, similarly to the image transfer system 1 of the first embodiment to the image transfer system 7 of the seventh embodiment, also in the image transfer system 8, the phase adjustment unit not shown in the drawing does not necessarily need to adjust the phase of an imaging synchronization signal in step S304 and may be able to update a round trip propagation-time calculated by the round trip propagation-time measurement unit 1202 as a round trip propagation-time determination value.

With such a configuration and processing procedure, in the image transfer system 8, the display terminal 7200 transmits a round-trip-propagation-time-measurement outgoing signal and measures (calculates) a round trip propagation-time in wireless transfer between the imaging terminal 7100 and the display terminal 7200 to update a round trip propagation-time determination value. Further, in the image transfer system 8, the imaging terminal 7100 estimates (calculates) a period-adjusted accuracy estimation value in a case where cycle adjustment for an imaging synchronization signal is temporarily executed. Further, in the image transfer system 8, the display terminal 7200 determines whether or not cycle adjustment for an imaging synchronization signal is performed on the basis of the period-adjusted accuracy estimation value calculated by the imaging terminal 7100, and calculates a cycle adjustment amount for adjusting the period of an imaging synchronization signal in accordance with the obtained cycle adjustment execution determination result to generate a cycle adjustment instruction. Further, in the image transfer system 8, the imaging terminal 7100 adjusts the phase or period (at least a period) of an imaging synchronization signal to be generated, in response to the phase adjustment instruction generated by the display terminal 7200. Thereby, similarly to the image transfer system 1 of the first embodiment to the image transfer system 7 of the seventh embodiment, also in the image transfer system 8, the phase or period (at least a period) of an imaging synchronization signal generated by the imaging terminal 7100 (more specifically, the synchronization signal generation unit 102) is adjusted so as to match the phase or period (at least a period) of a display synchronization signal generated by the display terminal 7200. That is, similarly to the image transfer system 1 of the first embodiment to the image transfer system 7 of the seventh embodiment, also in the image transfer system 8, a timing when the imaging terminal 7100 wirelessly transfers captured image data of an image captured by an imaging unit not shown in the drawing to the display terminal 7200 is matched to a timing when the display terminal 7200 displays an image corresponding to the captured image data on a display unit not shown in the drawing. Thereby, similarly to the image transfer system 1 of the first embodiment to the image transfer system 7 of the seventh embodiment, also in the image transfer system 8, the display terminal 7200 can stably display an image corresponding to captured image data wirelessly transferred from the imaging terminal 7100 on the display unit not shown in the drawing.

As described above, the image transfer system 8 of the eighth embodiment performs transmission and reception of a round-trip-propagation-time-measurement outgoing signal and a round-trip-propagation-time-measurement returning signal between the round trip propagation-time measurement unit 1202 included in the display terminal 7200 and the round trip propagation-time measurement assistance unit 1106 included in the imaging terminal 7100 after wireless connection between the imaging terminal 7100 and the display terminal 7200 is established. Further, in the image transfer system 8 of the eighth embodiment, the round trip propagation-time measurement unit 1202 calculates a round trip propagation-time required for transmission and reception in wireless transfer between the imaging terminal 7100 and the display terminal 7200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round trip propagation-time measurement assistance unit 1106. In addition, in the image transfer system 8 of the eighth embodiment, the round trip propagation-time measurement unit 1202 (more specifically, the phase adjustment unit not shown in the drawing) updates the round trip propagation-time calculated by the round trip propagation-time measurement unit 1202 as a round trip propagation-time determination value. Further, in the image transfer system 8 of the eighth embodiment, the round trip propagation-time measurement unit 1202 transmits information for adjusting the period of an imaging synchronization signal in the imaging terminal 7100 to the imaging terminal 7100. Further, in the image transfer system 8 of the eighth embodiment, the after-cycle-adjustment accuracy estimation unit 105 included in the imaging terminal 7100 estimates (calculates) a period-adjusted accuracy estimation value of an imaging synchronization signal in a case where cycle adjustment is temporarily executed. Further, in the image transfer system 8 of the eighth embodiment, the after-cycle-adjustment accuracy estimation unit 105 transmits information of the estimated (calculated) period-adjusted accuracy estimation value of the imaging synchronization signal to the display terminal 7200. Further, in the image transfer system 8 of the eighth embodiment, the cycle-adjustment determination unit 3104 included in the display terminal 7200 determines whether or not cycle adjustment for an imaging synchronization signal which is generated by the synchronization signal generation unit 102 is performed, on the basis of the period-adjusted accuracy estimation value calculated by the after-cycle-adjustment accuracy estimation unit 105. Further, in the image transfer system 8 of the eighth embodiment, in a case where a cycle adjustment execution determination result indicates that cycle adjustment for an imaging synchronization signal which is generated by the synchronization signal generation unit 102 included in the imaging terminal 7100 is performed, the cycle adjustment unit 4101 included in the display terminal 7200 calculates a cycle adjustment amount for performing cycle adjustment for an imaging synchronization signal to generate a cycle adjustment instruction. Further, in the image transfer system 8 of the eighth embodiment, the cycle adjustment unit 4101 transmits information of a cycle adjustment instruction including a cycle adjustment amount for adjusting the period of an imaging synchronization signal in the imaging terminal 7100 to the imaging terminal 7100. Thereby, in the image transfer system 8 of the eighth embodiment, the synchronization signal generation unit 102 adjusts the period of an imaging synchronization signal to be generated by an amount of cycle adjustment, in response to the cycle adjustment instruction which is transmitted from the cycle adjustment unit 4101.

Thereby, similarly to the image transfer system 1 of the first embodiment to the image transfer system 7 of the seventh embodiment, also in the image transfer system 8 of the eighth embodiment, the phase or period (at least a period) of an imaging synchronization signal can be matched to the phase or period (at least a period) of a display synchronization signal. That is, also in the image transfer system 8 of the eighth embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 8 of the eighth embodiment, the same effects as those in the image transfer system 1 of the first embodiment to the image transfer system 7 of the seventh embodiment can be obtained. That is, similarly to the image transfer system 1 of the first embodiment to the image transfer system 7 of the seventh embodiment, also in the image transfer system 8 of the eighth embodiment, it is possible to wirelessly transfer captured image data from the imaging terminal 7100 to the display terminal 7200 without exceeding a validity period of a display image and to stably display a display image corresponding to the captured image data transmitted from the imaging terminal 7100 in the display terminal 7200.

Moreover, in the image transfer system 8 of the eighth embodiment, the display terminal 7200 calculates a round trip propagation-time required for transmission and reception in wireless transfer between the imaging terminal 7100 and the display terminal 7200, determines whether or not cycle adjustment for an imaging synchronization signal is performed, calculates a cycle adjustment amount, and generates a cycle adjustment instruction. Thereby, in the image transfer system 8 of the eighth embodiment, the imaging terminal 7100 may only estimate (calculate) a period-adjusted accuracy estimation value and perform cycle adjustment for an imaging synchronization signal in response to the cycle adjustment instruction. That is, in the image transfer system 8 of the eighth embodiment, it is not necessary to calculate a round trip propagation-time, determine whether or not cycle adjustment for an imaging synchronization signal is performed, calculate a cycle adjustment amount, and generate a cycle adjustment instruction in the imaging terminal 7100, and thus it is possible to reduce a load of processing performed in the imaging terminal 7100.

Ninth Embodiment

Figure 30:
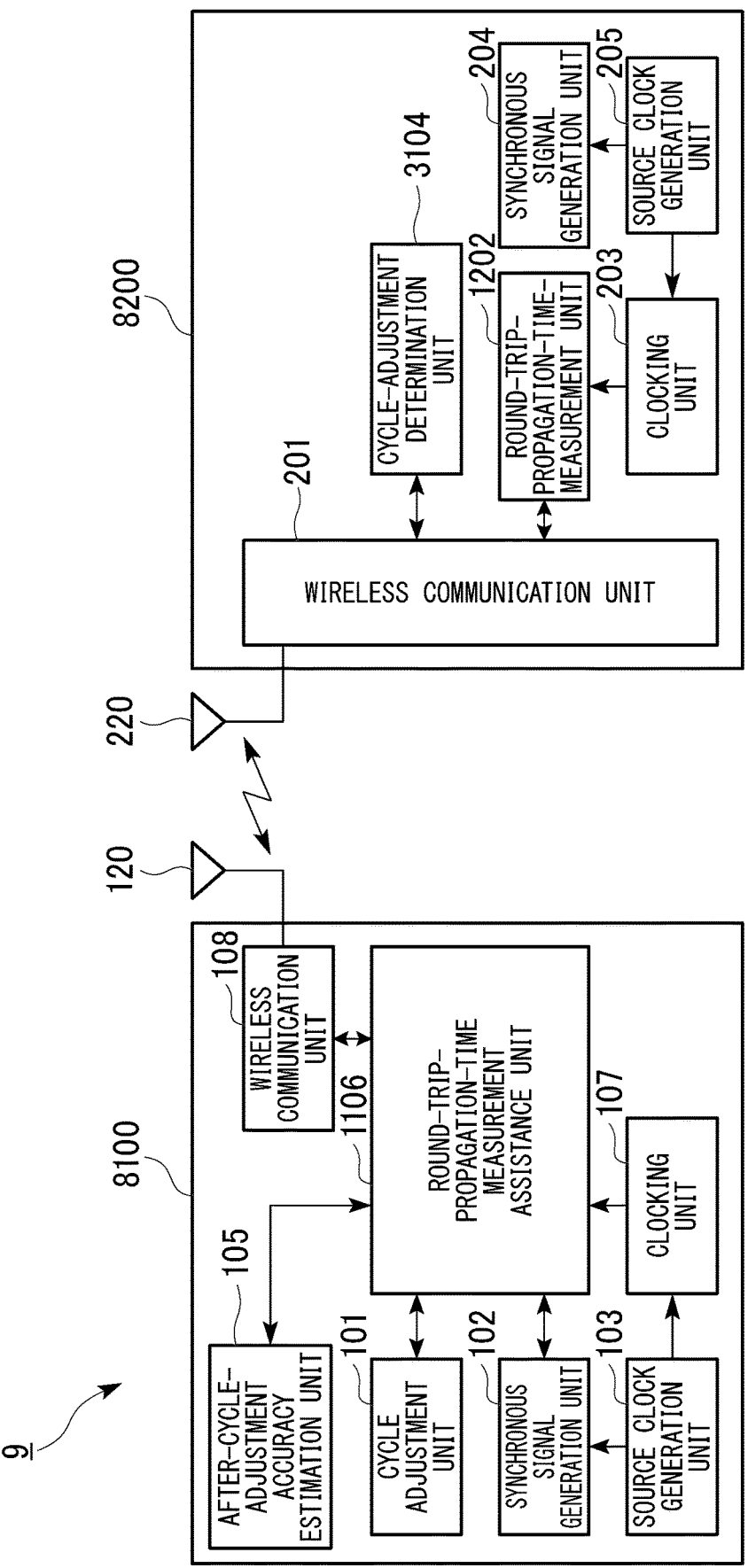
FIG. 30 is a block diagram showing a schematic configuration of an image transmission system according to a ninth embodiment of the present invention.

Hereinafter, an image transfer system of a ninth embodiment of the present invention will be described. FIG. 30 is a block diagram showing a schematic configuration of the image transfer system in the ninth embodiment of the present invention. An image transfer system 9 includes an imaging terminal 8100 and a display terminal 8200. The imaging terminal 8100 includes a synchronization signal generation unit 102, a cycle adjustment unit 101, a source oscillation clock generation unit 103, a wireless communication unit 108, an after-cycle-adjustment accuracy estimation unit 105, a round trip propagation-time measurement assistance unit 1106, a clocking unit 107, and an antenna 120. In addition, the display terminal 8200 includes a synchronous signal generation unit 204, a source oscillation clock generation unit 205, a wireless communication unit 201, a round trip propagation-time measurement unit 1202, a clocking unit 203, a cycle-adjustment determination unit 3104, and an antenna 220.

Meanwhile, also in FIG. 30, in components of the image transfer system 9, the same components as the components included in the image transfer system 1 of the first embodiment to the image transfer system 8 of the eighth embodiment are denoted by the same reference numerals and signs.

Similarly to the image transfer system 1 of the first embodiment to the image transfer system 8 of the eighth embodiment, the image transfer system 9 is also an image transfer system configured such that transmission and reception of a round-trip-propagation-time-measurement outgoing signal and a round-trip-propagation-time-measurement returning signal are performed between the imaging terminal 8100 and the display terminal 8200, and the imaging terminal 8100 adjusts the phase or period (at least a period) of an imaging synchronization signal to be generated so as to match the phase or period (at least a period) of a display synchronization signal which is generated by the display terminal 8200. Meanwhile, similarly to the image transfer system 2 of the second embodiment to the image transfer system 8 of the eighth embodiment, the image transfer system 9 is an image transfer system in which the display terminal 8200 transmits a round-trip-propagation-time-measurement outgoing signal to the imaging terminal 8100 to calculate a round trip propagation-time in wireless transfer between the imaging terminal 8100 and the display terminal 8200, and the imaging terminal 8100 adjusts the phase or period (at least a period) of an imaging synchronization signal to be generated.

However, in the image transfer system 9, some components included in the imaging terminal 1100 of the image transfer system 2 of the second embodiment are moved to the display terminal 8200. More specifically, in the image transfer system 9, the cycle-adjustment determination unit 3104 that replaces the cycle adjustment determination unit 104 included in the imaging terminal 1100 in the image transfer system 2 of the second embodiment is included in the display terminal 8200. Meanwhile, it can be said that a configuration of the image transfer system 9 is a configuration in which the cycle adjustment unit 4101 included in the display terminal 7200 in the image transfer system 8 of the eighth embodiment is returned to the imaging terminal 7100 as the cycle adjustment unit 101.

For this reason, in the image transfer system 9, the display terminal 8200 estimates (calculates) a round trip propagation-time required for transmission and reception at the time of performing wirelessly transfer between the display terminal 8200 and the imaging terminal 8100 and transmits the measured round trip propagation-time to the imaging terminal 8100. Further, in the image transfer system 9, the imaging terminal 8100 estimates (calculates) a period-adjusted accuracy estimation value in a case where the period of an imaging synchronization signal which is generated by the synchronization signal generation unit 102 is temporarily adjusted, and transmits the estimated period-adjusted accuracy estimation value to the display terminal 8200. Further, in the image transfer system 9, the display terminal 8200 transmits a cycle adjustment execution determination result indicating a result obtained by determining whether or not cycle adjustment for an imaging synchronization signal is performed on the basis of the period-adjusted accuracy estimation value transmitted from the imaging terminal 8100 to the imaging terminal 8100. Further, in the image transfer system 9, in a case where the cycle adjustment execution determination result transmitted from the display terminal 8200 indicates that cycle adjustment for an imaging synchronization signal is performed, the imaging terminal 8100 adjusts the period of an imaging synchronization signal to be generated.

However, also in the image transfer system 9, although there is a process of exchanging signals through wireless transfer in association with a change in the disposition of components, functions and operations of the components are the same as the functions and operations of the corresponding components in the image transfer system 1 of the first embodiment to the image transfer system 8 of the eighth embodiment. That is, the functions and operations of the components included in the imaging terminal 8100 and the display terminal 8200 in the image transfer system 9 can be easily understood from the above description of the components included in the imaging terminal and the display terminal in each of the image transfer system 1 of the first embodiment to the image transfer system 8 of the eighth embodiment. Therefore, a detailed description related to the components included in the image transfer system 9 will be omitted.

Figure 31:
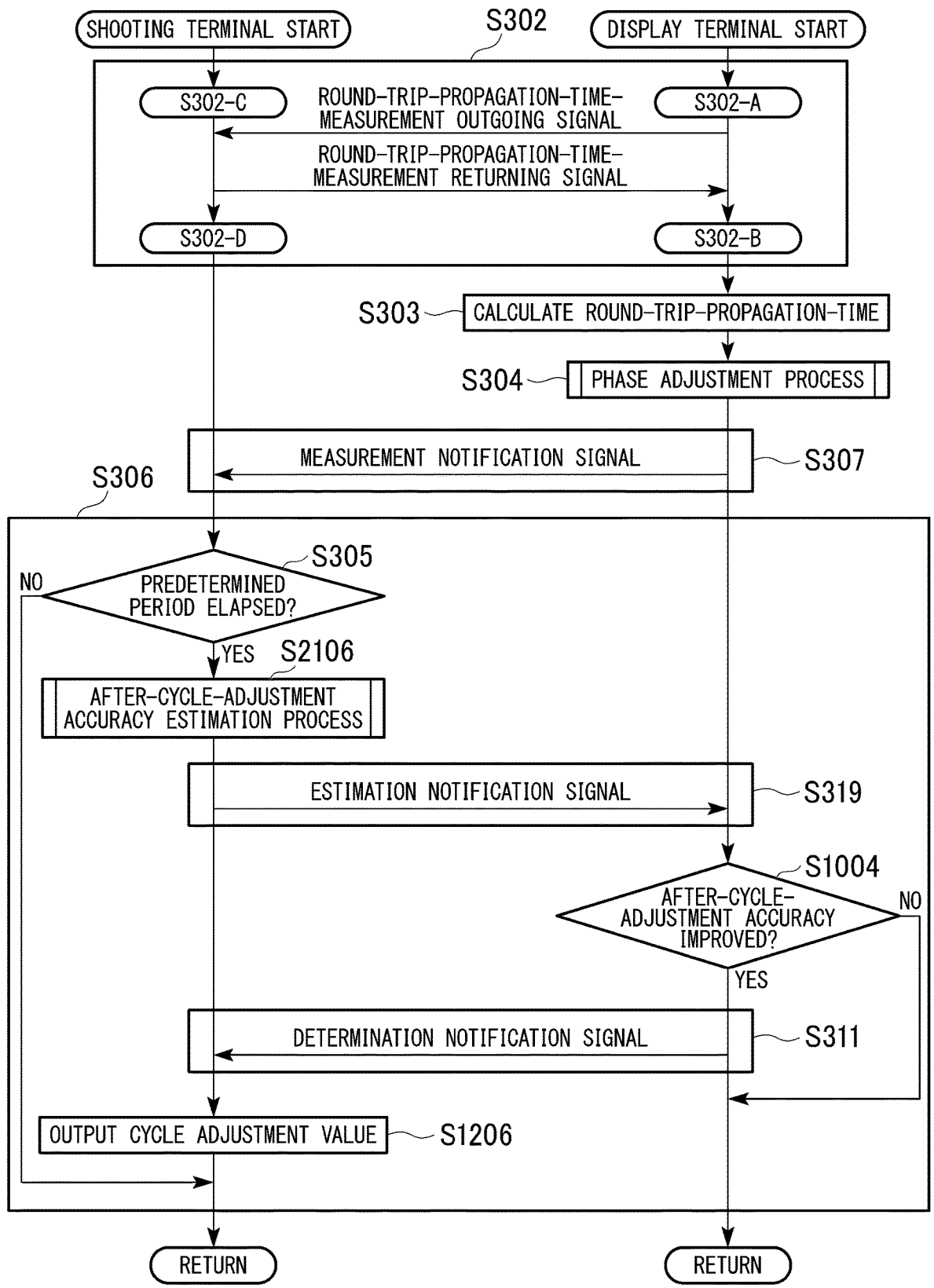
FIG. 31 is a flow chart showing processing procedures of the image transmission system according to the ninth embodiment of the present invention.

Next, operations of processing in the image transfer system 9 will be described. Meanwhile, in the image transfer system 9, it is assumed that a phase adjustment unit, not shown in the drawing, which is provided in the round-trip-propagation-time measurement unit 106 included in the imaging terminal 100 in the image transfer system 1 of the first embodiment is included in the round trip propagation-time measurement unit 1202. That is, in the image transfer system 9, a configuration in which the phase adjustment unit not shown in the drawing is disposed at the same position as those in the image transfer system 2 of the second embodiment to the image transfer system 8 of the eighth embodiment is adopted. FIG. 31 is a flowchart showing a processing procedure of the image transfer system 9 in the ninth embodiment of the present invention.

In the image transfer system 9, a process of transmitting information used to adjust the period of an imaging synchronization signal which is generated by the synchronization signal generation unit 102 to the imaging terminal 8100, a process of transmitting information of a period-adjusted accuracy estimation value to the display terminal 8200, and a process of transmitting information of a cycle adjustment execution determination result to the imaging terminal 8100 are added, in association with a change to a configuration in which the cycle-adjustment determination unit 3104 is included in the display terminal 8200. However, an outline of the overall operation in the image transfer system 9 is the same as those of the image transfer system 1 of the first embodiment to the image transfer system 8 of the eighth embodiment. Therefore, also in the image transfer system 9, a description of an outline of the overall operation will be omitted, and a more specific operation of performing cycle adjustment for an imaging synchronization signal in the image transfer system 9 will be described.

Also in the image transfer system 9, when a cycle adjustment process is started, the display terminal 8200 transmits a round-trip-propagation-time-measurement outgoing signal to the imaging terminal 8100, and the imaging terminal 8100 transmits a round-trip-propagation-time-measurement returning signal corresponding to the round-trip-propagation-time-measurement outgoing signal to the display terminal 8200 in step S302. Meanwhile, the process of step S302 in the image transfer system 9 is the same as the process of step S302 in each of the image transfer system 2 of the second embodiment to the image transfer system 8 of the eighth embodiment.

Thereafter, also in the image transfer system 9, in step S303, the display terminal 8200 calculates a round trip propagation-time required for transmission and reception in wireless transfer between the imaging terminal 8100 and the display terminal 8200. Meanwhile, the process of step S303 in the image transfer system 9 is also the same as the process of step S303 in each of the image transfer system 2 of the second embodiment to the image transfer system 8 of the eighth embodiment.

Thereafter, also in the image transfer system 9, in step S304, the display terminal 8200 generates a phase adjustment instruction for the phase adjustment unit, not shown in the drawing, which is provided in the round trip propagation-time measurement unit 1202 to adjust the phase of an imaging synchronization signal, on the basis of the round trip propagation-time required for transmission and reception in wireless transfer between the imaging terminal 8100 and the display terminal 8200 which is calculated in step S303, and updates a round trip propagation-time determination value. Meanwhile, the process of step S304 in the image transfer system 9 is also the same as the process of step S304 in each of the image transfer system 2 of the second embodiment to the image transfer system 8 of the eighth embodiment.

Thereafter, in the image transfer system 9, in step S307, the display terminal 8200 generates a measurement notification signal including information of the calculated round trip propagation-time and transmits the generated measurement notification signal to the imaging terminal 8100. Meanwhile, the process of step S307 in the image transfer system 9 and the measurement notification signal generated in the process of step S307 and transmitted to the imaging terminal 8100 are the same as the process of step S307 and the measurement notification signal in each of the image transfer system 2 of the second embodiment, the image transfer system 7 of the seventh embodiment, and the image transfer system 8 of the eighth embodiment. Thereby, the after-cycle-adjustment accuracy estimation unit 105 provided in the imaging terminal 8100 acquires information of the round trip propagation-time determination value transmitted from the display terminal 8200 through the round trip propagation-time measurement assistance unit 1106.

Thereafter, in the image transfer system 9, in step S306, the period of an imaging synchronization signal is adjusted on the basis of the information of the plurality of round trip propagation-time determination values updated in step S304. However, in the image transfer system 9, the imaging terminal 8100 estimates (calculates) a period-adjusted accuracy estimation value of an imaging synchronization signal in a case where cycle adjustment is temporarily executed. Further, in the image transfer system 9, the display terminal 8200 determines whether or not cycle adjustment for an imaging synchronization signal is performed on the basis of the period-adjusted accuracy estimation value. Further, in the image transfer system 9, the imaging terminal 8100 calculates a cycle adjustment amount for performing cycle adjustment for an imaging synchronization signal and outputs a cycle adjustment instruction to the synchronization signal generation unit 102.

For this reason, in the image transfer system 9, in step S305 included in step S306, the after-cycle-adjustment accuracy estimation unit 105 included in the imaging terminal 8100 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 105 determines that cycle adjustment is performed and calculates a period-adjusted accuracy estimation value in step S2106 included in step S306. Meanwhile, the process of step S305 and the process of step S2106 which are included in step S306 in the image transfer system 9 are the same as the process of step S305 and the process of step S2106 which are included in step S306 in the image transfer system 1 of the first embodiment.

Thereafter, in the image transfer system 9, in step S319 included in step S306, the imaging terminal 8100 generates an estimation notification signal including information of the period-adjusted accuracy estimation value calculated by the after-cycle-adjustment accuracy estimation unit 105 and transmits the generated estimation notification signal to the display terminal 8200. Meanwhile, the process of step S319 included in step S306 in the image transfer system 9 and the estimation notification signal generated in the process of step S319 and transmitted to the display terminal 8200 are the same as the process of step S319 included in step S306 and the estimation notification signal in the image transfer system 8 of the eighth embodiment. Thereby, the cycle-adjustment determination unit 3104 provided in the display terminal 8200 acquires information of the period-adjusted accuracy estimation value calculated by the after-cycle-adjustment accuracy estimation unit 105 provided in the imaging terminal 8100.

Further, in the image transfer system 9, in step S1004 included in step S306, the display terminal 8200 determines whether or not cycle adjustment for an imaging synchronization signal is performed on the basis of the period-adjusted accuracy estimation value transmitted from the imaging terminal 8100. More specifically, the cycle-adjustment determination unit 3104 included in the display terminal 8200 determines that cycle adjustment for an imaging synchronization signal is not performed in a case where the accuracy of an imaging synchronization signal indicated by the period-adjusted accuracy estimation value transmitted from the imaging terminal 8100, that is, calculated by the after-cycle-adjustment accuracy estimation unit 105 included in the imaging terminal 8100 is equal to the current accuracy of the imaging synchronization signal or has not been improved, and terminates the process of step S1004. On the other hand, in a case where the estimated accuracy of the imaging synchronization signal has been improved compared with the current accuracy of the imaging synchronization signal, the cycle-adjustment determination unit 3104 determines that cycle adjustment for an imaging synchronization signal is performed, and generates a cycle adjustment execution determination result indicating a determination result. Meanwhile, the process of step S1004 included in step S306 in the image transfer system 9 is the same as the process of step S1004 included in step S306 in the image transfer system 4 of the fourth embodiment.

Thereafter, in the image transfer system 9, in step S311 included in step S306, the display terminal 8200 generates a determination notification signal including information of the cycle adjustment execution determination result obtained by the cycle-adjustment determination unit 3104 and transmits the generated determination notification signal to the imaging terminal 8100. Meanwhile, the process of step S311 included in step S306 in the image transfer system 9 and the determination notification signal generated in the process of step S311 and transmitted to the imaging terminal 8100 are the same as the process of step S311 included in step S306 and the determination notification signal in the image transfer system 4 of the fourth embodiment. Thereby, the cycle adjustment unit 101 provided in the imaging terminal 8100 acquires information of the cycle adjustment execution determination result obtained by the cycle-adjustment determination unit 3104 provided in the display terminal 8200 through the round trip propagation-time measurement assistance unit 1106.

Further, in the image transfer system 9, in step S1206 included in step S306, the imaging terminal 8100 calculates a cycle adjustment amount for performing cycle adjustment for an imaging synchronization signal on the basis of information such as a round trip propagation-time determination value transmitted from the display terminal 8200 in accordance with the cycle adjustment execution determination result transmitted from the display terminal 8200, and outputs the calculated cycle adjustment amount to the synchronization signal generation unit 102 together with a cycle adjustment instruction. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 101. Meanwhile, the process of step S1206 included in step S306 in the image transfer system 9 is the same as the process of step S1206 included in step S306 in the image transfer system 4 of the fourth embodiment.

Meanwhile, the phase adjustment instruction transmitted from the cycle-adjustment determination unit 3104 provided in the display terminal 8200 is also output to the synchronization signal generation unit 102 from the round trip propagation-time measurement assistance unit 1106. Thereby, the synchronization signal generation unit 102 performs phase adjustment for an imaging synchronization signal to be generated in response to the phase adjustment instruction which is output from the round trip propagation-time measurement assistance unit 1106, that is, the phase adjustment instruction generated by the phase adjustment unit, not shown in the drawing, which is provided in the round trip propagation-time measurement unit 1202 included in the display terminal 8200.

In this manner, in the image transfer system 9, the display terminal 8200 transmits a round-trip-propagation-time-measurement outgoing signal and calculates a round trip propagation-time in wireless transfer between the imaging terminal 8100 and the display terminal 8200. Further, in the image transfer system 9, the display terminal 8200 performs a process of updating a round trip propagation-time determination value and transmits information of a plurality of round trip propagation-time determination values updated, information of a round trip propagation-time, information of a scheduled transmission time of a round-trip-propagation-time-measurement outgoing signal, information of a scheduled transmission time included in a received round-trip-propagation-time-measurement returning signal, and a phase adjustment instruction to the imaging terminal 8100. Thereby, in the image transfer system 9, the imaging terminal 8100 performs a process of estimating (calculating) a period-adjusted accuracy estimation value in a case where cycle adjustment for an imaging synchronization signal is temporarily executed, on the basis of the pieces of information transmitted from the display terminal 8200. Further, in the image transfer system 9, the imaging terminal 8100 transmits information of the calculated period-adjusted accuracy estimation value to the display terminal 8200. Thereby, in the image transfer system 9, the display terminal 8200 performs a process of determining whether or not cycle adjustment for an imaging synchronization signal which is generated by the synchronization signal generation unit 102 included in the imaging terminal 8100 is performed, on the basis of the information of the period-adjusted accuracy estimation value transmitted from the imaging terminal 8100. Further, in the image transfer system 9, the display terminal 8200 transmits information of a cycle adjustment execution determination result which is a determination result to the imaging terminal 8100. Thereby, in the image transfer system 9, the imaging terminal 8100 calculates a cycle adjustment amount for performing cycle adjustment for an imaging synchronization signal in accordance with the information of the cycle adjustment execution determination result transmitted from the display terminal 8200, and outputs the calculated cycle adjustment amount to the synchronization signal generation unit 102 together with a cycle adjustment instruction. Thereby, in the image transfer system 9, the imaging terminal 8100 adjusts the periods of an imaging synchronization signal and a display synchronization signal so as not to be shifted with the elapse of time.

Meanwhile, similarly to the image transfer system 1 of the first embodiment to the image transfer system 8 of the eighth embodiment, also in the image transfer system 9, when at least a process of updating a round trip propagation-time determination value is performed in step S304, the after-cycle-adjustment accuracy estimation unit 105 included in the imaging terminal 8100 can estimate the accuracy of an imaging synchronization signal (that is, calculate a period-adjusted accuracy estimation value). Therefore, similarly to the image transfer system 1 of the first embodiment to the image transfer system 8 of the eighth embodiment, also in the image transfer system 9, the phase adjustment unit not shown in the drawing does not necessarily need to adjust the phase of an imaging synchronization signal in step S304 and may be able to update a round trip propagation-time calculated by the round trip propagation-time measurement unit 1202 as a round trip propagation-time determination value.

With such a configuration and processing procedure, in the image transfer system 9, the display terminal 8200 transmits a round-trip-propagation-time-measurement outgoing signal and measures (calculates) a round trip propagation-time in wireless transfer between the imaging terminal 8100 and the display terminal 8200 to update a round trip propagation-time determination value. Further, in the image transfer system 9, the imaging terminal 8100 estimates (calculates) a period-adjusted accuracy estimation value in a case where cycle adjustment for an imaging synchronization signal is temporarily executed. Further, in the image transfer system 9, the display terminal 8200 determines whether or not cycle adjustment for an imaging synchronization signal is performed, on the basis of the period-adjusted accuracy estimation value calculated by the imaging terminal 8100. Further, in the image transfer system 9, the imaging terminal 8100 calculates a cycle adjustment amount for adjusting the period of an imaging synchronization signal in accordance with the cycle adjustment execution determination result obtained by the display terminal 8200, outputs a cycle adjustment instruction, and adjusts the phase or period (at least a period) of an imaging synchronization signal to be generated. Thereby, similarly to the image transfer system 1 of the first embodiment to the image transfer system 8 of the eighth embodiment, also in the image transfer system 9, the phase or period (at least a period) of an imaging synchronization signal generated by the imaging terminal 8100 (more specifically, the synchronization signal generation unit 102) is adjusted so as to match the phase or period (at least a period) of a display synchronization signal generated by the display terminal 8200. That is, similarly to the image transfer system 1 of the first embodiment to the image transfer system 8 of the eighth embodiment, also in the image transfer system 9, a timing when the imaging terminal 8100 wirelessly transfers captured image data of an image captured by an imaging unit not shown in the drawing to the display terminal 8200 is matched to a timing when the display terminal 8200 displays an image corresponding to the captured image data on a display unit not shown in the drawing. Thereby, similarly to the image transfer system 1 of the first embodiment to the image transfer system 8 of the eighth embodiment, also in the image transfer system 9, the display terminal 8200 can stably display an image corresponding to captured image data wirelessly transferred from the imaging terminal 8100 on the display unit not shown in the drawing.

As described above, the image transfer system 9 of the ninth embodiment performs transmission and reception of a round-trip-propagation-time-measurement outgoing signal and a round-trip-propagation-time-measurement returning signal between the round trip propagation-time measurement unit 1202 included in the display terminal 8200 and the round trip propagation-time measurement assistance unit 1106 included in the imaging terminal 8100 after wireless connection between the imaging terminal 8100 and the display terminal 8200 is established. Further, in the image transfer system 9 of the ninth embodiment, the round trip propagation-time measurement unit 1202 calculates a round trip propagation-time required for transmission and reception in wireless transfer between the imaging terminal 8100 and the display terminal 8200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round trip propagation-time measurement assistance unit 1106. Further, in the image transfer system 9 of the ninth embodiment, the round trip propagation-time measurement unit 1202 (more specifically, the phase adjustment unit not shown in the drawing) updates the round trip propagation-time calculated by the round trip propagation-time measurement unit 1202 as a round trip propagation-time determination value. Further, in the image transfer system 9 of the ninth embodiment, the round trip propagation-time measurement unit 1202 transmits information for adjusting the period of an imaging synchronization signal in the imaging terminal 8100 to the imaging terminal 8100. Further, in the image transfer system 9 of the ninth embodiment, the after-cycle-adjustment accuracy estimation unit 105 included in the imaging terminal 8100 estimates (calculates) a period-adjusted accuracy estimation value of an imaging synchronization signal in a case where cycle adjustment is temporarily executed. Further, in the image transfer system 9 of the ninth embodiment, the after-cycle-adjustment accuracy estimation unit 105 transmits information of the estimated (calculated) period-adjusted accuracy estimation value of the imaging synchronization signal to the display terminal 8200. Further, in the image transfer system 9 of the ninth embodiment, the cycle-adjustment determination unit 3104 included in the display terminal 8200 determines whether or not cycle adjustment for an imaging synchronization signal which is generated by the synchronization signal generation unit 102 is performed, on the basis of the period-adjusted accuracy estimation value calculated by the after-cycle-adjustment accuracy estimation unit 105. Further, in the image transfer system 9 of the ninth embodiment, the cycle-adjustment determination unit 3104 transmits information of a cycle adjustment execution determination result which is a result obtained by determining whether or not the period of an imaging synchronization signal is adjusted to the imaging terminal 8100. Further, in the image transfer system 9 of the ninth embodiment, in a case where the cycle adjustment execution determination result indicates that cycle adjustment for an imaging synchronization signal which is generated by the synchronization signal generation unit 102 included in the imaging terminal 8100 is performed, the cycle adjustment unit 101 included in the imaging terminal 8100 calculates a cycle adjustment amount for performing cycle adjustment for an imaging synchronization signal and outputs the calculated cycle adjustment amount to the synchronization signal generation unit 102 together with a cycle adjustment instruction. Thereby, in the image transfer system 9 of the ninth embodiment, the synchronization signal generation unit 102 adjusts the period of an imaging synchronization signal to be generated by an amount of cycle adjustment, in response to the cycle adjustment instruction which is output from the cycle adjustment unit 101.

Thereby, similarly to the image transfer system 1 of the first embodiment to the image transfer system 8 of the eighth embodiment, also in the image transfer system 9 of the ninth embodiment, the phase or period (at least a period) of an imaging synchronization signal can be matched to the phase or period (at least a period) of a display synchronization signal. That is, also in the image transfer system 9 of the ninth embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 9 of the ninth embodiment, the same effects as those in the image transfer system 1 of the first embodiment to the image transfer system 8 of the eighth embodiment can be obtained. That is, similarly to the image transfer system 1 of the first embodiment to the image transfer system 8 of the eighth embodiment, also in the image transfer system 9 of the ninth embodiment, it is possible to wirelessly transfer captured image data from the imaging terminal 8100 to the display terminal 8200 without exceeding a validity period of a display image and to stably display a display image corresponding to the captured image data transmitted from the imaging terminal 8100 in the display terminal 8200.

Moreover, in the image transfer system 9 of the ninth embodiment, the display terminal 8200 calculates a round trip propagation-time required for transmission and reception in wireless transfer between the imaging terminal 8100 and the display terminal 8200 and determines whether or not cycle adjustment for an imaging synchronization signal is performed. Thereby, in the image transfer system 9 of the ninth embodiment, the imaging terminal 8100 may only estimate (calculate) a period-adjusted accuracy estimation value, calculate a cycle adjustment amount, generate a cycle adjustment instruction, and perform cycle adjustment for an imaging synchronization signal in response to the cycle adjustment instruction. That is, in the image transfer system 9 of the ninth embodiment, it is not necessary to calculate a round trip propagation-time and determine whether or not cycle adjustment for an imaging synchronization signal is performed in the imaging terminal 8100, and thus it is possible to reduce a load of processing performed in the imaging terminal 8100.

Meanwhile, in the image transfer system 1 of the first embodiment, a description has been provided of a configuration in which a round trip propagation-time is calculated by the imaging terminal 100 transmitting a round-trip-propagation-time-measurement outgoing signal to the display terminal 200 and receiving a round-trip-propagation-time-measurement returning signal transmitted from the display terminal 200. Further, contrary to the image transfer system 1 of the first embodiment, in the image transfer system 2 of the second embodiment to the image transfer system 9 of the ninth embodiment, a description has been provided of an example of a case where some components are moved to another terminal in a configuration in which a round trip propagation-time is calculated by a display terminal transmitting a round-trip-propagation-time-measurement outgoing signal to an imaging terminal and receiving a round-trip-propagation-time-measurement returning signal transmitted from the imaging terminal. However, as described above, in the image transfer system of the present invention, even in a configuration in which components for adjusting the period of an imaging synchronization signal which is generated by an imaging terminal are included in either one of the imaging terminal or a display terminal, a function of adjusting the period of an imaging synchronization signal which is generated by the imaging terminal can be realized similarly. That is, similarly to the image transfer system 1 of the first embodiment, even when some components are moved to another terminal in a configuration in which a round trip propagation-time is calculated by an imaging terminal transmitting a round-trip-propagation-time-measurement outgoing signal to a display terminal and receiving a round-trip-propagation-time-measurement returning signal transmitted from the display terminal, a function of adjusting the period of an imaging synchronization signal which is generated by the imaging terminal can be realized similarly.

Tenth Embodiment

Figure 32:
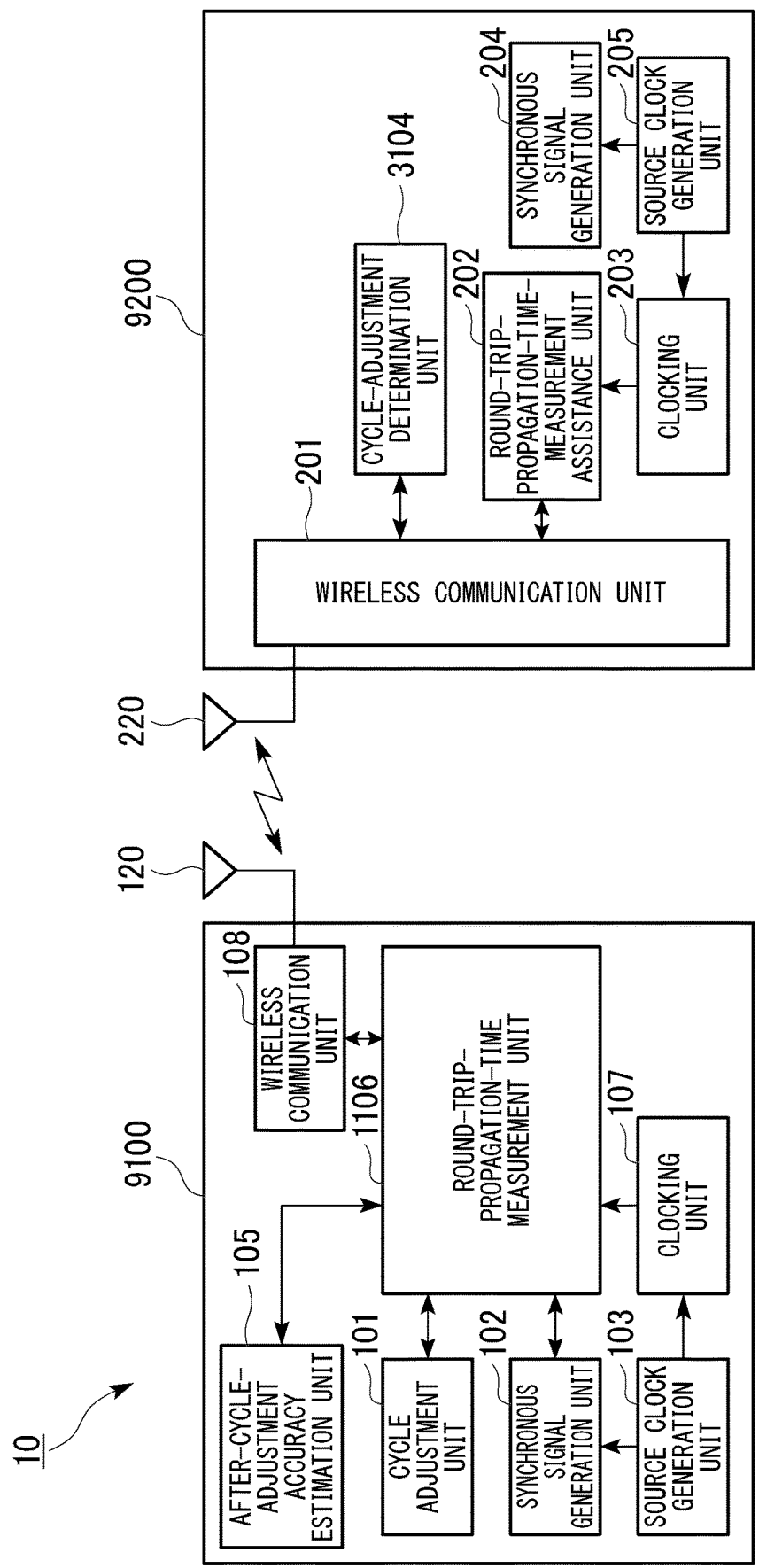
FIG. 32 is a block diagram showing a schematic configuration of an image transmission system according to a tenth embodiment of the present invention.

Hereinafter, an image transfer system of a tenth embodiment of the present invention will be described. FIG. 32 is a block diagram showing a schematic configuration of the image transfer system in the tenth embodiment of the present invention. An image transfer system 10 includes an imaging terminal 9100 and a display terminal 9200. The imaging terminal 9100 includes a synchronization signal generation unit 102, a cycle adjustment unit 101, a source oscillation clock generation unit 103, a wireless communication unit 108, an after-cycle-adjustment accuracy estimation unit 105, a round-trip-propagation-time measurement unit 106, a clocking unit 107, and an antenna 120. In addition, the display terminal 200 includes a synchronous signal generation unit 204, a source oscillation clock generation unit 205, a wireless communication unit 201, a round-trip-propagation-time-measurement assistance unit 202, a clocking unit 203, a cycle-adjustment determination unit 3104, and an antenna 220.

Meanwhile, also in FIG. 32, in the components of the image transfer system 10, the same components as the components included in the image transfer system 1 of the first embodiment to the image transfer system 9 of the ninth embodiment are denoted by the same reference numerals and signs.

Similarly to the image transfer system 1 of the first embodiment to the image transfer system 9 of the ninth embodiment, the image transfer system 10 is also an image transfer system configured such that transmission and reception of a round-trip-propagation-time-measurement outgoing signal and a round-trip-propagation-time-measurement returning signal are performed between the imaging terminal 9100 and the display terminal 9200, and the imaging terminal 9100 adjusts the phase or period (at least a period) of an imaging synchronization signal to be generated so as to match the phase or period (at least a period) of a display synchronization signal which is generated by the display terminal 9200. Meanwhile, similarly to the image transfer system 1 of the first embodiment, the image transfer system 10 is an image transfer system in which the imaging terminal 9100 transmits a round-trip-propagation-time-measurement outgoing signal to the display terminal 9200 to calculate a round trip propagation-time in wireless transfer between the imaging terminal 9100 and the display terminal 9200, and the imaging terminal 9100 adjusts the phase or period (at least a period) of an imaging synchronization signal to be generated.

However, in the image transfer system 10, some components included in the imaging terminal 100 in the image transfer system 1 of the first embodiment are moved to the display terminal 9200. More specifically, in the image transfer system 10, the cycle-adjustment determination unit 3104 that replaces the cycle adjustment determination unit 104 included in the imaging terminal 100 in the image transfer system 1 of the first embodiment is included in the display terminal 9200.

For this reason, in the image transfer system 10, the imaging terminal 9100 transmits a round-trip-propagation-time-measurement outgoing signal to the display terminal 9200, and the display terminal 9200 transmits a round-trip-propagation-time-measurement returning signal corresponding to the round-trip-propagation-time-measurement outgoing signal transmitted from the imaging terminal 9100 to the imaging terminal 9100. Further, in the image transfer system 10, the imaging terminal 9100 calculates a round trip propagation-time required for transmission and reception in wireless transfer between the imaging terminal 9100 and the display terminal 9200 on the basis of a transmission time of a round-trip-propagation-time-measurement outgoing signal and a reception time of a round-trip-propagation-time-measurement returning signal corresponding to the round-trip-propagation-time-measurement outgoing signal transmitted from the display terminal 9200. Further, in the image transfer system 10, the imaging terminal 9100 estimates (calculates) a period-adjusted accuracy estimation value in a case where the period of an imaging synchronization signal which is generated by the synchronization signal generation unit 102 is temporarily adjusted, and transmits the estimated period-adjusted accuracy estimation value to the display terminal 9200. Further, in the image transfer system 10, the display terminal 9200 determines whether or not cycle adjustment for an imaging synchronization signal which is generated by the synchronization signal generation unit 102 included in the imaging terminal 9100 is performed, on the basis of the period-adjusted accuracy estimation value transmitted from the imaging terminal 9100, and transmits a cycle adjustment execution determination result indicating a determination result to the imaging terminal 9100. Further, in the image transfer system 10, in a case where the cycle adjustment execution determination result transmitted from the display terminal 9200 indicates that cycle adjustment for an imaging synchronization signal is performed, the imaging terminal 9100 adjusts the period of an imaging synchronization signal to be generated.

However, also in the image transfer system 10, although there is a process of exchanging signals through wireless transfer in association with a change in the disposition of components, functions and operations of the components are the same as the functions and operations of the corresponding components in the image transfer system 1 of the first embodiment to the image transfer system 9 of the ninth embodiment. That is, the functions and operations of the components included in the imaging terminal 9100 and the display terminal 9200 in the image transfer system 10 can be easily understood from the above description of the components included in the imaging terminal and the display terminal in each of the image transfer system 1 of the first embodiment to the image transfer system 9 of the ninth embodiment. Therefore, a detailed description related to the components included in the image transfer system 10 will be omitted.

Figure 33:
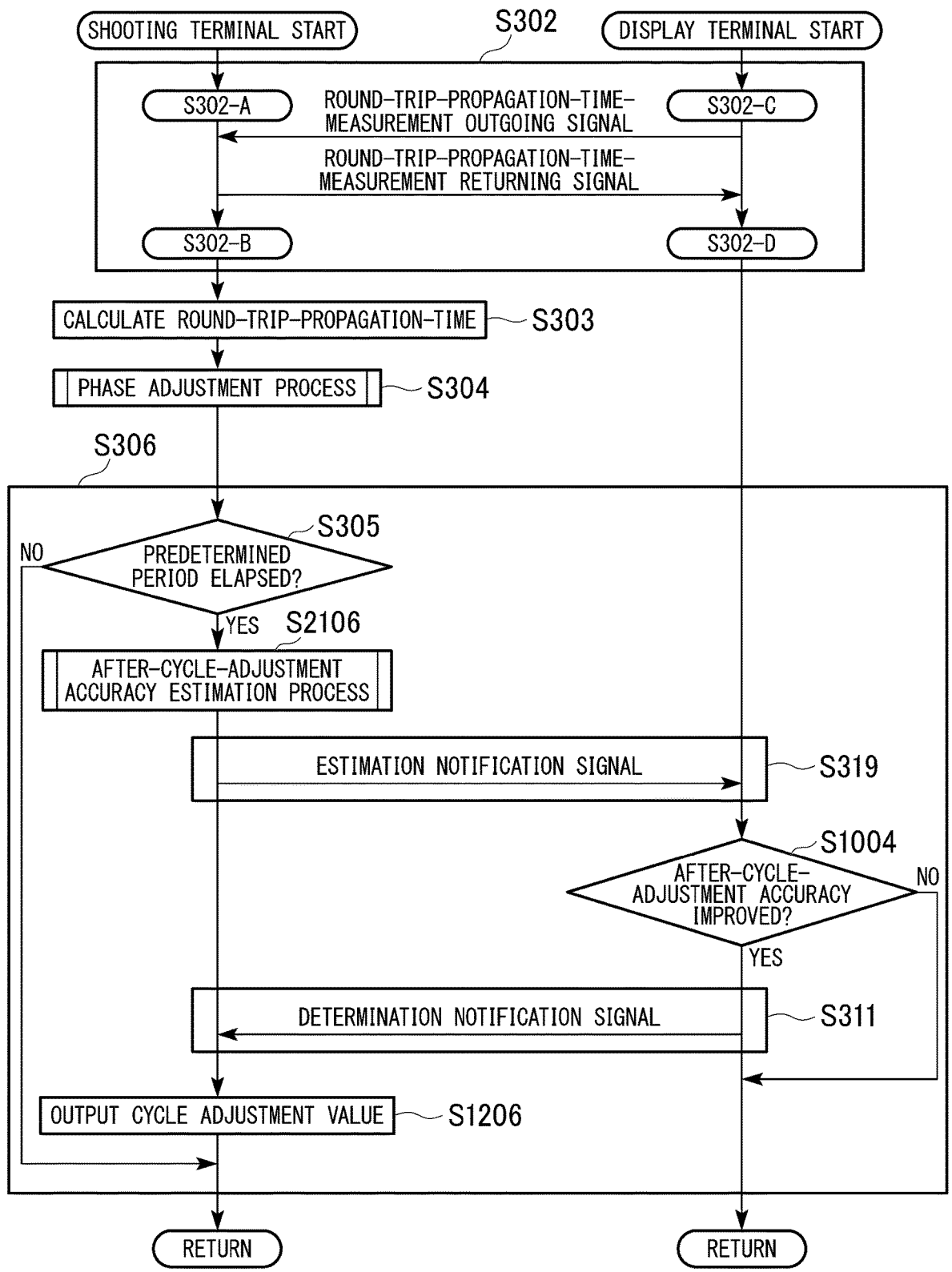
FIG. 33 is a flow chart showing processing procedures of the image transmission system according to the tenth embodiment of the present invention.

Next, operations of processing in the image transfer system 10 will be described. Meanwhile, similarly to the image transfer system 1 of the first embodiment, in the image transfer system 10, it is assumed that a configuration in which a phase adjustment unit not shown in the drawing is included in the round-trip-propagation-time measurement unit 106 included in the imaging terminal 9100 is adopted. That is, in the image transfer system 10, a configuration in which the phase adjustment unit not shown in the drawing is disposed at the same position as that in the image transfer system 1 of the first embodiment is adopted. FIG. 33 is a flowchart showing a processing procedure of the image transfer system 10 in the tenth embodiment of the present invention.

In the image transfer system 10, a process of transmitting information of a period-adjusted accuracy estimation value to the display terminal 9200 and a process of transmitting information of a cycle adjustment execution determination result to the imaging terminal 9100 are added, in association with a change to a configuration in which the cycle-adjustment determination unit 3104 is included in the display terminal 9200. However, an outline of the overall operation in the image transfer system 10 is the same as those of the image transfer system 1 of the first embodiment to the image transfer system 9 of the ninth embodiment. Therefore, also in the image transfer system 10, a description of an outline of the overall operation will be omitted, and a more specific operation of performing cycle adjustment for an imaging synchronization signal in the image transfer system 10 will be described.

In the image transfer system 10, when a cycle adjustment process is started, the imaging terminal 9100 transmits a round-trip-propagation-time-measurement outgoing signal to the display terminal 9200, and the display terminal 9200 transmits a round-trip-propagation-time-measurement returning signal corresponding to the round-trip-propagation-time-measurement outgoing signal to the imaging terminal 9100 in step S302. Meanwhile, the process of step S302 in the image transfer system 10 is the same as the process of step S302 in the image transfer system 1 of the first embodiment.

Thereafter, in the image transfer system 10, in step S303, the imaging terminal 9100 calculates a round trip propagation-time required for transmission and reception in wireless transfer between the imaging terminal 9100 and the display terminal 9200. Meanwhile, the process of step S303 in the image transfer system 10 is the same as the process of step S303 in the image transfer system 1 of the first embodiment.

Thereafter, in the image transfer system 10, in step S304, the imaging terminal 9100 generates a phase adjustment instruction for the phase adjustment unit, not shown in the drawing, which is provided in the round-trip-propagation-time measurement unit 106 to adjust the phase of an imaging synchronization signal, on the basis of the round trip propagation-time required for transmission and reception in wireless transfer between the imaging terminal 9100 and the display terminal 9200 which is calculated in step S303, and updates a round trip propagation-time determination value. Meanwhile, the process of step S304 in the image transfer system 10 is also the same as the process of step S304 in the image transfer system 1 of the first embodiment.

Thereafter, in the image transfer system 10, in step S306, the period of an imaging synchronization signal is adjusted on the basis of the information of the plurality of round trip propagation-time determination values updated in step S304. However, in the image transfer system 10, the imaging terminal 9100 estimates (calculates) a period-adjusted accuracy estimation value of an imaging synchronization signal in a case where cycle adjustment is temporarily executed. Further, in the image transfer system 10, the display terminal 9200 determines whether or not cycle adjustment for an imaging synchronization signal is performed on the basis of the period-adjusted accuracy estimation value. Further, in the image transfer system 10, the imaging terminal 9100 calculates a cycle adjustment amount for performing cycle adjustment for an imaging synchronization signal and outputs a cycle adjustment instruction to the synchronization signal generation unit 102.

For this reason, in the image transfer system 10, in step S305 included in step S306, the after-cycle-adjustment accuracy estimation unit 105 included in the imaging terminal 9100 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 105 determines that cycle adjustment is performed and calculates a period-adjusted accuracy estimation value in step S2106 included in step S306. Meanwhile, the process of step S305 and the process of step S2106 which are included in step S306 in the image transfer system 10 are the same as the process of step S305 and the process of step S2106 which are included in step S306 in the image transfer system 1 of the first embodiment.

Thereafter, in the image transfer system 10, in step S319 included in step S306, the imaging terminal 9100 generates an estimation notification signal including information of the period-adjusted accuracy estimation value calculated by the after-cycle-adjustment accuracy estimation unit 105 and transmits the generated estimation notification signal to the display terminal 9200. Meanwhile, the process of step S319 included in step S306 in the image transfer system 10 and the estimation notification signal generated in the process of step S319 and transmitted to the display terminal 9200 are the same as the process of step S319 included in step S306 and the estimation notification signal in each of the image transfer system 8 of the eighth embodiment and the image transfer system 9 of the ninth embodiment. Thereby, the cycle-adjustment determination unit 3104 provided in the display terminal 9200 acquires information of the period-adjusted accuracy estimation value calculated by the after-cycle-adjustment accuracy estimation unit 105 provided in the imaging terminal 9100.

Further, in the image transfer system 10, in step S1004 included in step S306, the display terminal 9200 determines whether or not cycle adjustment for an imaging synchronization signal is performed on the basis of the period-adjusted accuracy estimation value transmitted from the imaging terminal 9100. More specifically, the cycle-adjustment determination unit 3104 included in the display terminal 9200 determines that cycle adjustment for an imaging synchronization signal is not performed in a case where the accuracy of an imaging synchronization signal indicated by the period-adjusted accuracy estimation value transmitted from the imaging terminal 9100, that is, calculated by the after-cycle-adjustment accuracy estimation unit 105 included in the imaging terminal 9100 is equal to the current accuracy of the imaging synchronization signal or has not been improved, and terminates the process of step S1004. On the other hand, in a case where the estimated accuracy of the imaging synchronization signal has been improved compared with the current accuracy of the imaging synchronization signal, the cycle-adjustment determination unit 3104 determines that cycle adjustment for an imaging synchronization signal is performed, and generates a cycle adjustment execution determination result indicating a determination result. Meanwhile, the process of step S1004 included in step S306 in the image transfer system 10 is the same as the process of step S1004 included in step S306 in each of the image transfer system 4 of the fourth embodiment and the image transfer system 9 of the ninth embodiment.

Thereafter, in the image transfer system 10, in step S311 included in step S306, the display terminal 9200 generates a determination notification signal including information of the cycle adjustment execution determination result obtained by the cycle-adjustment determination unit 3104 and transmits the generated determination notification signal to the imaging terminal 9100. Meanwhile, the process of step S311 included in step S306 in the image transfer system 10 and the determination notification signal generated in the process of step S311 and transmitted to the imaging terminal 9100 are the same as the process of step S311 included in step S306 and the determination notification signal in each of the image transfer system 4 of the fourth embodiment and the image transfer system 9 of the ninth embodiment. Thereby, the cycle adjustment unit 101 provided in the imaging terminal 9100 acquires information of the cycle adjustment execution determination result obtained by the cycle-adjustment determination unit 3104 provided in the display terminal 9200 through the round-trip-propagation-time measurement unit 106.

Further, in the image transfer system 10, in step S1206 included in step S306, the imaging terminal 9100 calculates a cycle adjustment amount for performing cycle adjustment for an imaging synchronization signal on the basis of information such as a round trip propagation-time determination value transmitted from the display terminal 9200 in accordance with the cycle adjustment execution determination result transmitted from the display terminal 9200, and outputs the calculated cycle adjustment amount to the synchronization signal generation unit 102 together with a cycle adjustment instruction. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 101. Meanwhile, the process of step S1206 included in step S306 in the image transfer system 10 is the same as the process of step S1206 included in step S306 in each of the image transfer system 4 of the fourth embodiment and the image transfer system 9 of the ninth embodiment.

Meanwhile, the phase adjustment instruction transmitted from the phase adjustment unit, not shown in the drawing, which is provided in the round-trip-propagation-time measurement unit 106 included in the imaging terminal 9100 is also output to the synchronization signal generation unit 102. Thereby, the synchronization signal generation unit 102 adjusts the phase of an imaging synchronization signal to be generated, in response to the phase adjustment instruction output from the phase adjustment unit, not shown in the drawing, which is provided in the round-trip-propagation-time measurement unit 106.

In this manner, in the image transfer system 10, the imaging terminal 9100 transmits a round-trip-propagation-time-measurement outgoing signal and calculates a round trip propagation-time in wireless transfer between the imaging terminal 9100 and the display terminal 9200. Further, in the image transfer system 10, the imaging terminal 9100 performs a process of updating a round trip propagation-time determination value. Thereby, in the image transfer system 10, the imaging terminal 9100 performs a process of estimating (calculating) a period-adjusted accuracy estimation value in a case where cycle adjustment for an imaging synchronization signal is temporarily executed. Further, in the image transfer system 10, the imaging terminal 9100 transmits information of the calculated period-adjusted accuracy estimation value to the display terminal 9200. Thereby, in the image transfer system 10, the display terminal 9200 performs a process of determining whether or not cycle adjustment for an imaging synchronization signal which is generated by the synchronization signal generation unit 102 included in the imaging terminal 9100 is performed, on the basis of the information of the period-adjusted accuracy estimation value transmitted from the imaging terminal 9100. Further, in the image transfer system 10, the display terminal 9200 transmits information of a cycle adjustment execution determination result which is a determination result to the imaging terminal 9100. Thereby, in the image transfer system 10, the imaging terminal 9100 calculates a cycle adjustment amount for performing cycle adjustment for an imaging synchronization signal in accordance with the information of the cycle adjustment execution determination result transmitted from the display terminal 9200, and outputs the calculated cycle adjustment amount to the synchronization signal generation unit 102 together with a cycle adjustment instruction. Thereby, in the image transfer system 10, the imaging terminal 9100 adjusts the periods of an imaging synchronization signal and a display synchronization signal so as not to be shifted with the elapse of time.

Meanwhile, similarly to the image transfer system 1 of the first embodiment to the image transfer system 9 of the ninth embodiment, also in the image transfer system 10, when at least a process of updating around trip propagation-time determination value is performed in step S304, the after-cycle-adjustment accuracy estimation unit 105 included in the imaging terminal 9100 can estimate the accuracy of an imaging synchronization signal (that is, calculate a period-adjusted accuracy estimation value). Therefore, similarly to the image transfer system 1 of the first embodiment to the image transfer system 9 of the ninth embodiment, also in the image transfer system 10, the phase adjustment unit not shown in the drawing does not necessarily need to adjust the phase of an imaging synchronization signal in step S304 and may be able to update a round trip propagation-time calculated by the round-trip-propagation-time measurement unit 106 as a round trip propagation-time determination value.

With such a configuration and processing procedure, in the image transfer system 10, the imaging terminal 9100 transmits a round-trip-propagation-time-measurement outgoing signal and measures (calculates) a round trip propagation-time in wireless transfer between the imaging terminal 9100 and the display terminal 9200 to update a round trip propagation-time determination value. Further, in the image transfer system 10, the imaging terminal 9100 estimates (calculates) a period-adjusted accuracy estimation value in a case where cycle adjustment for an imaging synchronization signal is temporarily executed. Further, in the image transfer system 10, the display terminal 9200 determines whether or not cycle adjustment for an imaging synchronization signal is performed, on the basis of the period-adjusted accuracy estimation value calculated by the imaging terminal 9100. Further, in the image transfer system 10, the imaging terminal 9100 calculates a cycle adjustment amount for adjusting the period of an imaging synchronization signal in accordance with the cycle adjustment execution determination result obtained by the display terminal 9200, outputs a cycle adjustment instruction, and adjusts the phase or period (at least a period) of an imaging synchronization signal to be generated. Thereby, similarly to the image transfer system 1 of the first embodiment to the image transfer system 9 of the ninth embodiment, also in the image transfer system 10, the phase or period (at least a period) of an imaging synchronization signal generated by the imaging terminal 9100 (more specifically, the synchronization signal generation unit 102) is adjusted so as to match the phase or period (at least a period) of a display synchronization signal generated by the display terminal 9200. That is, similarly to the image transfer system 1 of the first embodiment to the image transfer system 9 of the ninth embodiment, also in the image transfer system 10, a timing when the imaging terminal 9100 wirelessly transfers captured image data of an image captured by an imaging unit not shown in the drawing to the display terminal 9200 is matched to a timing when the display terminal 9200 displays an image corresponding to the captured image data on a display unit not shown in the drawing. Thereby, similarly to the image transfer system 1 of the first embodiment to the image transfer system 9 of the ninth embodiment, also in the image transfer system 10, the display terminal 9200 can stably display an image corresponding to captured image data wirelessly transferred from the imaging terminal 9100 on the display unit not shown in the drawing.

As described above, the image transfer system 10 of the tenth embodiment performs transmission and reception of a round-trip-propagation-time-measurement outgoing signal and a round-trip-propagation-time-measurement returning signal between the round-trip-propagation-time measurement unit 106 included in the imaging terminal 9100 and the round-trip-propagation-time-measurement assistance unit 202 included in the display terminal 9200 after wireless connection between the imaging terminal 9100 and the display terminal 9200 is established. Further, in the image transfer system 10 of the tenth embodiment, the round-trip-propagation-time measurement unit 106 calculates a round trip propagation-time required for transmission and reception in wireless transfer between the imaging terminal 9100 and the display terminal 9200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round-trip-propagation-time-measurement assistance unit 202. Further, in the image transfer system 10 of the tenth embodiment, the round-trip-propagation-time measurement unit 106 (more specifically, the phase adjustment unit not shown in the drawing) updates the round trip propagation-time calculated by the round-trip-propagation-time measurement unit 106 as a round trip propagation-time determination value. Further, in the image transfer system 10 of the tenth embodiment, the after-cycle-adjustment accuracy estimation unit 105 included in the imaging terminal 9100 estimates (calculates) a period-adjusted accuracy estimation value of an imaging synchronization signal in a case where cycle adjustment is temporarily executed. Further, in the image transfer system 10 of the tenth embodiment, the after-cycle-adjustment accuracy estimation unit 105 transmits information of the estimated (calculated) period-adjusted accuracy estimation value of the imaging synchronization signal to the display terminal 9200. Further, in the image transfer system 10 of the tenth embodiment, the cycle-adjustment determination unit 3104 included in the display terminal 9200 determines whether or not cycle adjustment for an imaging synchronization signal which is generated by the synchronization signal generation unit 102 is performed, on the basis of the period-adjusted accuracy estimation value calculated by the after-cycle-adjustment accuracy estimation unit 105. Further, in the image transfer system 10 of the tenth embodiment, the cycle-adjustment determination unit 3104 transmits information of a cycle adjustment execution determination result which is a result obtained by determining whether or not the period of an imaging synchronization signal is adjusted to the imaging terminal 9100. Further, in the image transfer system 10 of the tenth embodiment, in a case where the cycle adjustment execution determination result indicates that cycle adjustment for an imaging synchronization signal which is generated by the synchronization signal generation unit 102 included in the imaging terminal 9100 is performed, the cycle adjustment unit 101 included in the imaging terminal 9100 calculates a cycle adjustment amount for performing cycle adjustment for an imaging synchronization signal and outputs the calculated cycle adjustment amount to the synchronization signal generation unit 102 together with a cycle adjustment instruction. Thereby, in the image transfer system 10 of the tenth embodiment, the synchronization signal generation unit 102 adjusts the period of an imaging synchronization signal to be generated by an amount of cycle adjustment, in response to the cycle adjustment instruction which is output from the cycle adjustment unit 101.

Thereby, similarly to the image transfer system 1 of the first embodiment to the image transfer system 9 of the ninth embodiment, also in the image transfer system 10 of the tenth embodiment, the phase or period (at least a period) of an imaging synchronization signal can be matched to the phase or period (at least a period) of a display synchronization signal. That is, also in the image transfer system 10 of the tenth embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 10 of the tenth embodiment, the same effects as those in the image transfer system 1 of the first embodiment to the image transfer system 9 of the ninth embodiment can be obtained. That is, similarly to the image transfer system 1 of the first embodiment to the image transfer system 9 of the ninth embodiment, also in the image transfer system 10 of the tenth embodiment, it is possible to wirelessly transfer captured image data from the imaging terminal 9100 to the display terminal 9200 without exceeding a validity period of a display image and to stably display a display image corresponding to the captured image data transmitted from the imaging terminal 9100 in the display terminal 9200.

Figure 34:
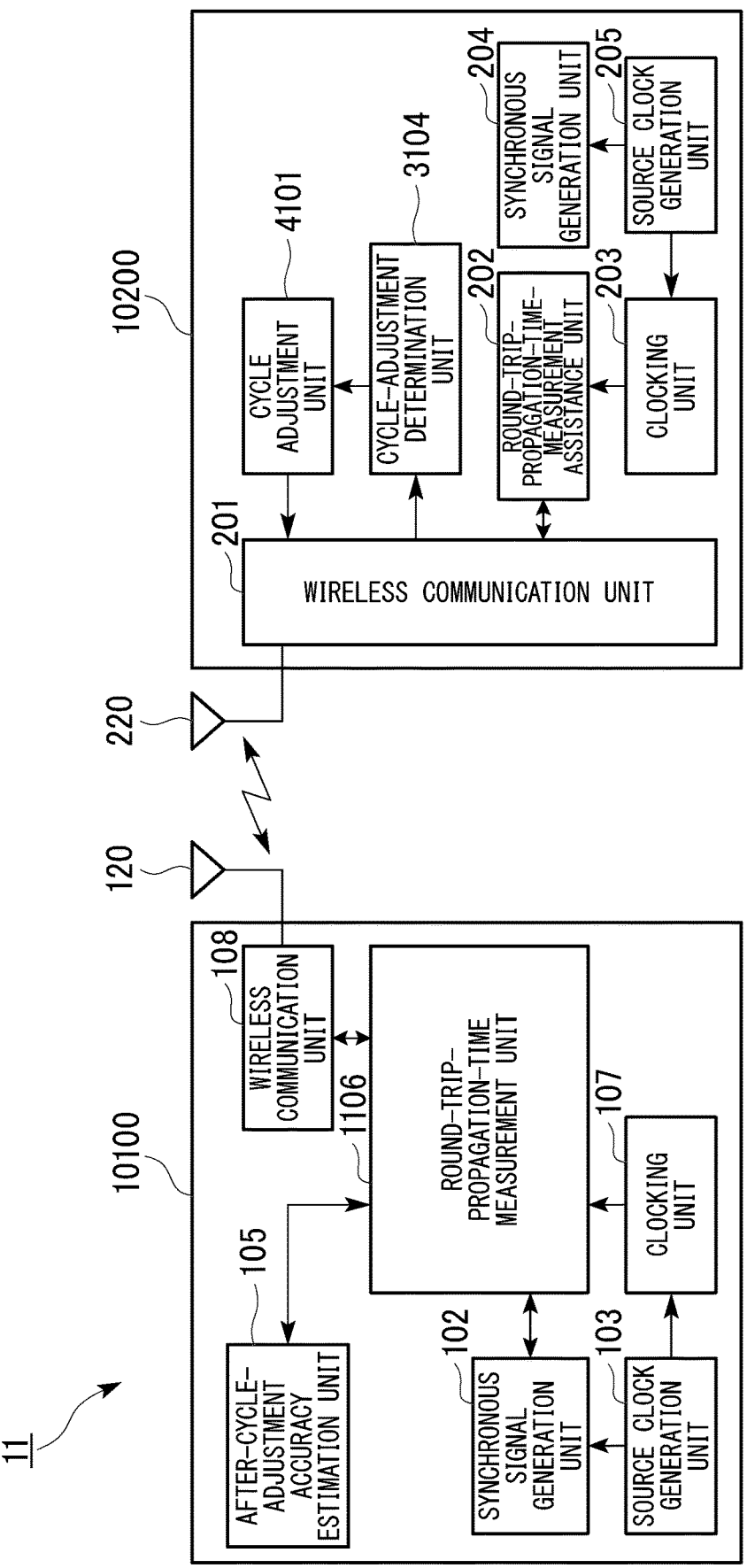
FIG. 34 is a block diagram showing a schematic configuration of an image transmission system according to an eleventh embodiment of the present invention.

Moreover, in the image transfer system 10 of the tenth embodiment, the display terminal 9200 determines whether or not cycle adjustment for an imaging synchronization signal is performed. Thereby, in the image transfer system 10 of the tenth embodiment, it is not necessary to determine whether or not cycle adjustment for an imaging synchronization signal is performed in the imaging terminal 9100, and thus it is possible to reduce a load of processing performed in the imaging terminal 9100.

Eleventh Embodiment Hereinafter, an image transfer system of an eleventh embodiment of the present invention will be described. FIG. 34 is a block diagram showing a schematic configuration of the image transfer system in the eleventh embodiment of the present invention. An image transfer system 11 includes an imaging terminal 10100 and a display terminal 10200. The imaging terminal 10100 includes a synchronization signal generation unit 102, a source oscillation clock generation unit 103, a wireless communication unit 108, an after-cycle-adjustment accuracy estimation unit 105, a round-trip-propagation-time measurement unit 106, a clocking unit 107, and an antenna 120. In addition, the display terminal 10200 includes a synchronous signal generation unit 204, a source oscillation clock generation unit 205, a wireless communication unit 201, a round-trip-propagation-time-measurement assistance unit 202, a clocking unit 203, a cycle-adjustment determination unit 3104, a cycle adjustment unit 4101, and an antenna 220.

Meanwhile, also in FIG. 34, in the components of the image transfer system 11, the same components as the components included in the image transfer system 1 of the first embodiment to the image transfer system 10 of the tenth embodiment are denoted by the same reference numerals and signs.

Similarly to the image transfer system 1 of the first embodiment to the image transfer system 10 of the tenth embodiment, the image transfer system 11 is also an image transfer system configured such that transmission and reception of a round-trip-propagation-time-measurement outgoing signal and a round-trip-propagation-time-measurement returning signal are performed between the imaging terminal 10100 and the display terminal 10200, and the imaging terminal 10100 adjusts the phase or period (at least a period) of an imaging synchronization signal to be generated so as to match the phase or period (at least a period) of a display synchronization signal which is generated by the display terminal 10200. Meanwhile, similarly to the image transfer system 1 of the first embodiment and the image transfer system 10 of the tenth embodiment, the image transfer system 11 is an image transfer system in which the imaging terminal 10100 transmits a round-trip-propagation-time-measurement outgoing signal to the display terminal 10200 to calculate a round trip propagation-time in wireless transfer between the imaging terminal 10100 and the display terminal 10200, and the imaging terminal 10100 adjusts the phase or period (at least a period) of an imaging synchronization signal to be generated.

However, in the image transfer system 11, some components included in the imaging terminal 9100 in the image transfer system 10 of the tenth embodiment are moved to the display terminal 10200. More specifically, in the image transfer system 11, the cycle adjustment unit 4101 that replaces the cycle adjustment unit 101 included in the imaging terminal 9100 in the image transfer system 10 of the tenth embodiment is included in the display terminal 10200.

For this reason, in the image transfer system 11, the imaging terminal 10100 calculates a round trip propagation-time required for transmission and reception in wireless transfer between the imaging terminal 10100 and the display terminal 10200. Further, in the image transfer system 11, the imaging terminal 10100 estimates (calculates) a period-adjusted accuracy estimation value in a case where the period of an imaging synchronization signal which is generated by the synchronization signal generation unit 102 is temporarily adjusted, and transmits the estimated period-adjusted accuracy estimation value to the display terminal 10200. Further, in the image transfer system 11, the display terminal 10200 determines whether or not cycle adjustment for an imaging synchronization signal which is generated by the synchronization signal generation unit 102 included in the imaging terminal 10100 is performed, on the basis of the period-adjusted accuracy estimation value transmitted from the imaging terminal 10100, calculates a cycle adjustment amount in a case where it is determined that cycle adjustment for an imaging synchronization signal is performed, and transmits the calculated cycle adjustment amount to the imaging terminal 10100 together with a cycle adjustment instruction. Further, in the image transfer system 11, the imaging terminal 10100 adjusts the period of an imaging synchronization signal to be generated, in response to the cycle adjustment instruction which is transmitted from the display terminal 10200.

However, also in the image transfer system 11, although there is a process of exchanging signals through wireless transfer in association with a change in the disposition of components, functions and operations of the components are the same as the functions and operations of the corresponding components in the image transfer system 1 of the first embodiment to the image transfer system 10 of the tenth embodiment. That is, the functions and operations of the components included in the imaging terminal 10100 and the display terminal 10200 in the image transfer system 11 can be easily understood from the above description of the components included in the imaging terminal and the display terminal in each of the image transfer system 1 of the first embodiment to the image transfer system 10 of the tenth embodiment. Therefore, a detailed description related to the components included in the image transfer system 11 will be omitted.

Figure 35:
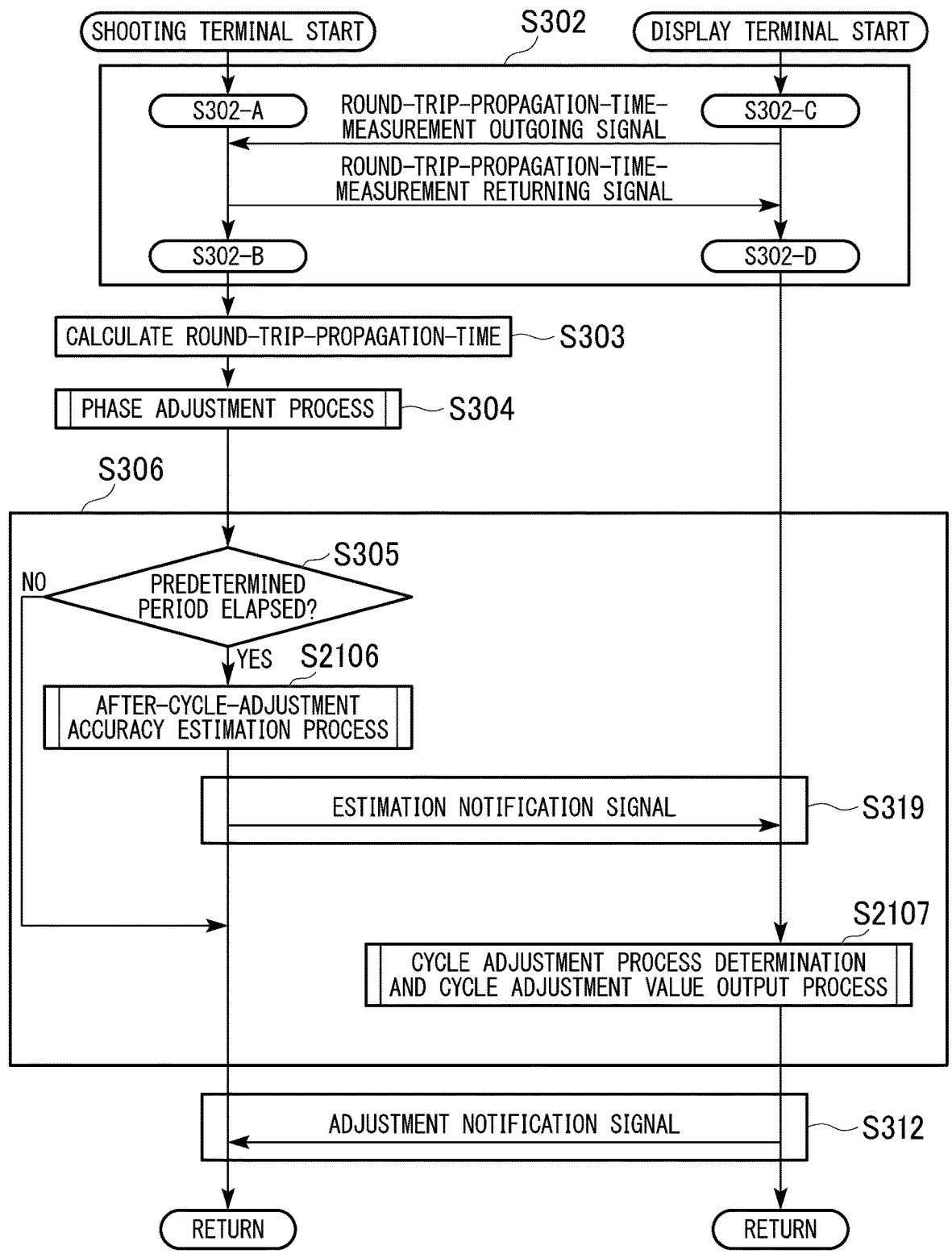
FIG. 35 is a flow chart showing processing procedures of the image transmission system according to the eleventh embodiment of the present invention.

Next, operations of processing in the image transfer system 11 will be described. Meanwhile, similarly to the image transfer system 1 of the first embodiment, in the image transfer system 11, it is assumed that a phase adjustment unit not shown in the drawing is included in the round-trip-propagation-time measurement unit 106 included in the imaging terminal 10100. That is, in the image transfer system 11, a configuration in which the phase adjustment unit not shown in the drawing is disposed at the same position as that in each of the image transfer system 1 of the first embodiment and the image transfer system 10 of the tenth embodiment is adopted. FIG. 35 is a flowchart showing a processing procedure of the image transfer system 11 in the eleventh embodiment of the present invention.

In the image transfer system 11, a process of transmitting information of a period-adjusted accuracy estimation value to the display terminal 10200, which is used to adjust the period of an imaging synchronization signal generated by the synchronization signal generation unit 102, to the display terminal 10200 and a process of transmitting a cycle adjustment instruction including a cycle adjustment amount to the imaging terminal 10100 are added, in association with a change to a configuration in which the cycle-adjustment determination unit 3104 and the cycle adjustment unit 4101 are included in the display terminal 10200. However, an outline of the overall operation in the image transfer system 11 is the same as those of the image transfer system 1 of the first embodiment to the image transfer system 10 of the tenth embodiment. Therefore, also in the image transfer system 11, a description of an outline of the overall operation will be omitted, and a more specific operation of performing cycle adjustment for an imaging synchronization signal in the image transfer system 11 will be described.

Also in the image transfer system 11, when a cycle adjustment process is started, the imaging terminal 10100 transmits a round-trip-propagation-time-measurement outgoing signal to the display terminal 10200, and the display terminal 10200 transmits a round-trip-propagation-time-measurement returning signal corresponding to the round-trip-propagation-time-measurement outgoing signal to the imaging terminal 10100 in step S302. Meanwhile, the process of step S302 in the image transfer system 11 is the same as the process of step S302 in each of the image transfer system 1 of the first embodiment and the image transfer system 10 of the tenth embodiment.

Thereafter, also in the image transfer system 11, in step S303, the imaging terminal 10100 calculates a round trip propagation-time required for transmission and reception in wireless transfer between the imaging terminal 10100 and the display terminal 10200. Meanwhile, the process of step S303 in the image transfer system 11 is the same as the process of step S303 in each of the image transfer system 1 of the first embodiment and the image transfer system 10 of the tenth embodiment.

Thereafter, also in the image transfer system 11, in step S304, the imaging terminal 10100 generates a phase adjustment instruction for the phase adjustment unit, not shown in the drawing, which is provided in the round-trip-propagation-time measurement unit 106 to adjust the phase of an imaging synchronization signal, on the basis of the round trip propagation-time required for transmission and reception in wireless transfer between the imaging terminal 10100 and the display terminal 10200 which is calculated in step S303, and updates a round trip propagation-time determination value. Meanwhile, the process of step S304 in the image transfer system 11 is also the same as the process of step S304 in each of the image transfer system 1 of the first embodiment and the image transfer system 10 of the tenth embodiment.

Thereafter, in the image transfer system 11, in step S306, the period of an imaging synchronization signal is adjusted on the basis of the information of the plurality of round trip propagation-time determination values updated in step S304. However, in the image transfer system 11, the imaging terminal 10100 estimates (calculates) a period-adjusted accuracy estimation value of an imaging synchronization signal in a case where cycle adjustment is temporarily executed. Further, in the image transfer system 11, the display terminal 10200 determines whether or not cycle adjustment for an imaging synchronization signal is performed on the basis of the period-adjusted accuracy estimation value and calculates a cycle adjustment amount for performing cycle adjustment for an imaging synchronization signal to generate a cycle adjustment instruction.

For this reason, in the image transfer system 11, in step S305 included in step S306, the after-cycle-adjustment accuracy estimation unit 105 included in the imaging terminal 10100 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 105 determines that cycle adjustment is performed and calculates a period-adjusted accuracy estimation value in step S2106 included in step S306. Meanwhile, the process of step S305 and the process of step S2106 which are included in step S306 in the image transfer system 11 are the same as the process of step S305 and the process of step S2106 which are included in step S306 in each of the image transfer system 1 of the first embodiment and the image transfer system 10 of the tenth embodiment.

Thereafter, in the image transfer system 11, in step S319 included in step S306, the imaging terminal 10100 generates an estimation notification signal including information of the period-adjusted accuracy estimation value calculated by the after-cycle-adjustment accuracy estimation unit 105 and transmits the generated estimation notification signal to the display terminal 10200. Meanwhile, the process of step S319 included in step S306 in the image transfer system 11 and the estimation notification signal generated in the process of step S319 and transmitted to the display terminal 10200 are the same as the process of step S319 included in step S306 and the estimation notification signal in each of the image transfer system 8 of the eighth embodiment to the image transfer system 10 of the tenth embodiment. Thereby, the cycle-adjustment determination unit 3104 provided in the display terminal 10200 acquires information of the period-adjusted accuracy estimation value calculated by the after-cycle-adjustment accuracy estimation unit 105 provided in the imaging terminal 10100.

Further, in the image transfer system 11, in step S2107 included in step S306, the display terminal 10200 determines whether or not cycle adjustment for an imaging synchronization signal is performed on the basis of information of the period-adjusted accuracy estimation value transmitted from the imaging terminal 10100 and calculates a cycle adjustment amount for performing cycle adjustment for an imaging synchronization signal to generate a cycle adjustment instruction. Meanwhile, the process of step S2107 included in step S306 in the image transfer system 11 is the same as the process of step S2107 included in step S306 in each of the image transfer system 1 of the first embodiment and the image transfer system 8 of the eighth embodiment.

Thereafter, in the image transfer system 11, in step S312, the display terminal 10200 generates an adjustment notification signal including information of the cycle adjustment instruction including the cycle adjustment amount calculated by the cycle adjustment unit 4101 and transmits the generated adjustment notification signal to the imaging terminal 10100. Meanwhile, the process of step S312 in the image transfer system 11 and the adjustment notification signal generated in the process of step S312 and transmitted to the imaging terminal 10100 are the same as the process of step S312 and the adjustment notification signal in the image transfer system 8 of the eighth embodiment. Thereby, the synchronization signal generation unit 102 provided in the imaging terminal 10100 acquires information of the cycle adjustment instruction including the cycle adjustment amount transmitted from the cycle adjustment unit 4101 provided in the display terminal 10200 through the round-trip-propagation-time measurement unit 106. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 4101.

Meanwhile, the phase adjustment instruction transmitted from the phase adjustment unit, not shown in the drawing, which is provided in the round-trip-propagation-time measurement unit 106 included in the imaging terminal 10100 is also output to the synchronization signal generation unit 102. Thereby, the synchronization signal generation unit 102 adjusts the phase of an imaging synchronization signal to be generated, in response to the phase adjustment instruction output from the phase adjustment unit, not shown in the drawing, which is provided in the round-trip-propagation-time measurement unit 106.

In this manner, in the image transfer system 11, the imaging terminal 10100 transmits a round-trip-propagation-time-measurement outgoing signal and calculates a round trip propagation-time in wireless transfer between the imaging terminal 10100 and the display terminal 10200. Further, in the image transfer system 11, the imaging terminal 10100 performs a process of updating a round trip propagation-time determination value. Thereby, in the image transfer system 11, the imaging terminal 10100 estimates (calculates) a period-adjusted accuracy estimation value in a case where cycle adjustment for an imaging synchronization signal is temporarily executed. Further, in the image transfer system 11, the imaging terminal 10100 transmits information of the calculated period-adjusted accuracy estimation value to the display terminal 10200. Thereby, in the image transfer system 11, the display terminal 10200 performs a process of determining whether or not cycle adjustment for an imaging synchronization signal which is generated by the synchronization signal generation unit 102 included in the imaging terminal 10100 is performed, on the basis of the information of the period-adjusted accuracy estimation value which is transmitted from the imaging terminal 10100, and performs a process of calculating a cycle adjustment amount for performing cycle adjustment for an imaging synchronization signal to generate a cycle adjustment instruction in accordance with a cycle adjustment execution determination result. Further, in the image transfer system 11, the display terminal 10200 transmits information of the cycle adjustment instruction including the calculated cycle adjustment amount to the imaging terminal 10100. Thereby, in the image transfer system 11, the imaging terminal 10100 adjusts the periods of an imaging synchronization signal and a display synchronization signal so as not to be shifted with the elapse of time, in response to the cycle adjustment instruction transmitted from the display terminal 10200.

Meanwhile, similarly to the image transfer system 1 of the first embodiment to the image transfer system 10 of the tenth embodiment, also in the image transfer system 11, when at least a process of updating a round trip propagation-time determination value is performed in step S304, the after-cycle-adjustment accuracy estimation unit 105 included in the imaging terminal 10100 can estimate the accuracy of an imaging synchronization signal (that is, calculate a period-adjusted accuracy estimation value). Therefore, similarly to the image transfer system 1 of the first embodiment to the image transfer system 10 of the tenth embodiment, also in the image transfer system 11, the phase adjustment unit not shown in the drawing does not necessarily need to adjust the phase of an imaging synchronization signal in step S304 and may be able to update a round trip propagation-time calculated by the round-trip-propagation-time measurement unit 106 as a round trip propagation-time determination value.

With such a configuration and processing procedure, in the image transfer system 11, the imaging terminal 10100 transmits a round-trip-propagation-time-measurement outgoing signal and measures (calculates) a round trip propagation-time in wireless transfer between the imaging terminal 10100 and the display terminal 10200 to update a round trip propagation-time determination value. Further, in the image transfer system 11, the imaging terminal 10100 estimates (calculates) a period-adjusted accuracy estimation value in a case where cycle adjustment for an imaging synchronization signal is temporarily executed. Further, in the image transfer system 11, the display terminal 10200 determines whether or not cycle adjustment for an imaging synchronization signal is performed on the basis of the period-adjusted accuracy estimation value calculated by the imaging terminal 10100, and calculates a cycle adjustment amount for adjusting the period of an imaging synchronization signal in accordance with the obtained cycle adjustment execution determination result to generate a cycle adjustment instruction. Further, in the image transfer system 11, the imaging terminal 10100 adjusts the phase or period (at least a period) of an imaging synchronization signal to be generated, in response to the phase adjustment instruction generated by the display terminal 10200. Thereby, similarly to the image transfer system 1 of the first embodiment to the image transfer system 10 of the tenth embodiment, also in the image transfer system 11, the phase or period (at least a period) of an imaging synchronization signal which is generated by the imaging terminal 10100 (more specifically, the synchronization signal generation unit 102) is adjusted so as to match the phase or period (at least a period) of a display synchronization signal which is generated by the display terminal 10200. That is, similarly to the image transfer system 1 of the first embodiment to the image transfer system 10 of the tenth embodiment, also in the image transfer system 11, a timing when the imaging terminal 10100 wirelessly transfers captured image data of an image captured by an imaging unit not shown in the drawing to the display terminal 10200 is matched to a timing when the display terminal 10200 displays an image corresponding to the captured image data on a display unit not shown in the drawing. Thereby, similarly to the image transfer system 1 of the first embodiment to the image transfer system 10 of the tenth embodiment, also in the image transfer system 11, the display terminal 10200 can stably display an image corresponding to captured image data wirelessly transferred from the imaging terminal 10100 on the display unit not shown in the drawing.

As described above, the image transfer system 11 of the eleventh embodiment performs transmission and reception of a round-trip-propagation-time-measurement outgoing signal and a round-trip-propagation-time-measurement returning signal between the round-trip-propagation-time measurement unit 106 included in the imaging terminal 10100 and the round-trip-propagation-time-measurement assistance unit 202 included in the display terminal 10200 after wireless connection between the imaging terminal 10100 and the display terminal 10200 is established. Further, in the image transfer system 11 of the eleventh embodiment, the round-trip-propagation-time measurement unit 106 calculates a round trip propagation-time required for transmission and reception in wireless transfer between the imaging terminal 10100 and the display terminal 10200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round-trip-propagation-time-measurement assistance unit 202. Further, in the image transfer system 11 of the eleventh embodiment, the round-trip-propagation-time measurement unit 106 (more specifically, the phase adjustment unit not shown in the drawing) updates the round trip propagation-time calculated by the round-trip-propagation-time measurement unit 106 as a round trip propagation-time determination value. Further, in the image transfer system 11 of the eleventh embodiment, the after-cycle-adjustment accuracy estimation unit 105 included in the imaging terminal 10100 estimates (calculates) a period-adjusted accuracy estimation value of an imaging synchronization signal in a case where cycle adjustment is temporarily executed. Further, in the image transfer system 11 of the eleventh embodiment, the after-cycle-adjustment accuracy estimation unit 105 transmits information of the estimate (calculated) period-adjusted accuracy estimation value of the imaging synchronization signal to the display terminal 10200. Further, in the image transfer system 11 of the eleventh embodiment, the cycle-adjustment determination unit 3104 included in the display terminal 10200 determines whether or not cycle adjustment for an imaging synchronization signal which is generated by the synchronization signal generation unit 102 is performed, on the basis of the period-adjusted accuracy estimation value calculated by the after-cycle-adjustment accuracy estimation unit 105. Further, in the image transfer system 11 of the eleventh embodiment, in a case where a cycle adjustment execution determination result indicates that cycle adjustment for an imaging synchronization signal which is generated by the synchronization signal generation unit 102 included in the imaging terminal 10100 is performed, the cycle adjustment unit 4101 included in the display terminal 10200 calculates a cycle adjustment amount for performing cycle adjustment for an imaging synchronization signal to generate a cycle adjustment instruction. Further, in the image transfer system 11 of the eleventh embodiment, the cycle adjustment unit 4101 transmits information of a cycle adjustment instruction including a cycle adjustment amount for adjusting the period of an imaging synchronization signal in the imaging terminal 10100 to the imaging terminal 10100. Thereby, in the image transfer system 11 of the eleventh embodiment, the synchronization signal generation unit 102 adjusts the period of an imaging synchronization signal to be generated by an amount of cycle adjustment, in response to the cycle adjustment instruction which is transmitted from the cycle adjustment unit 4101.

Thereby, similarly to the image transfer system 1 of the first embodiment to the image transfer system 10 of the tenth embodiment, also in the image transfer system 11 of the eleventh embodiment, the phase or period (at least a period) of an imaging synchronization signal can be matched to the phase or period (at least a period) of a display synchronization signal. That is, also in the image transfer system 11 of the eleventh embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 11 of the eleventh embodiment, the same effects as those in the image transfer system 1 of the first embodiment to the image transfer system 10 of the tenth embodiment can be obtained. That is, similarly to the image transfer system 1 of the first embodiment to the image transfer system 10 of the tenth embodiment, also in the image transfer system 11 of the eleventh embodiment, it is possible to wirelessly transfer captured image data from the imaging terminal 10100 to the display terminal 10200 without exceeding a validity period of a display image and to stably display a display image corresponding to the captured image data transmitted from the imaging terminal 10100 in the display terminal 10200.

Moreover, in the image transfer system 11 of the eleventh embodiment, the display terminal 10200 determines whether or not cycle adjustment for an imaging synchronization signal is performed, calculates a cycle adjustment amount, and generates a cycle adjustment instruction. Thereby, in the image transfer system 11 of the eleventh embodiment, the imaging terminal 10100 may only calculate a round trip propagation-time required for transmission and reception in wireless transfer between the imaging terminal 10100 and the display terminal 10200, estimate (calculate) a period-adjusted accuracy estimation value, and perform cycle adjustment for an imaging synchronization signal in response to the cycle adjustment instruction. That is, in the image transfer system 11 of the eleventh embodiment, it is not necessary to determine whether or not cycle adjustment for an imaging synchronization signal is performed, calculate a cycle adjustment amount, and generate a cycle adjustment instruction in the imaging terminal 10100, and thus it is possible to reduce a load of processing performed in the imaging terminal 10100.

Twelfth Embodiment

Figure 36:
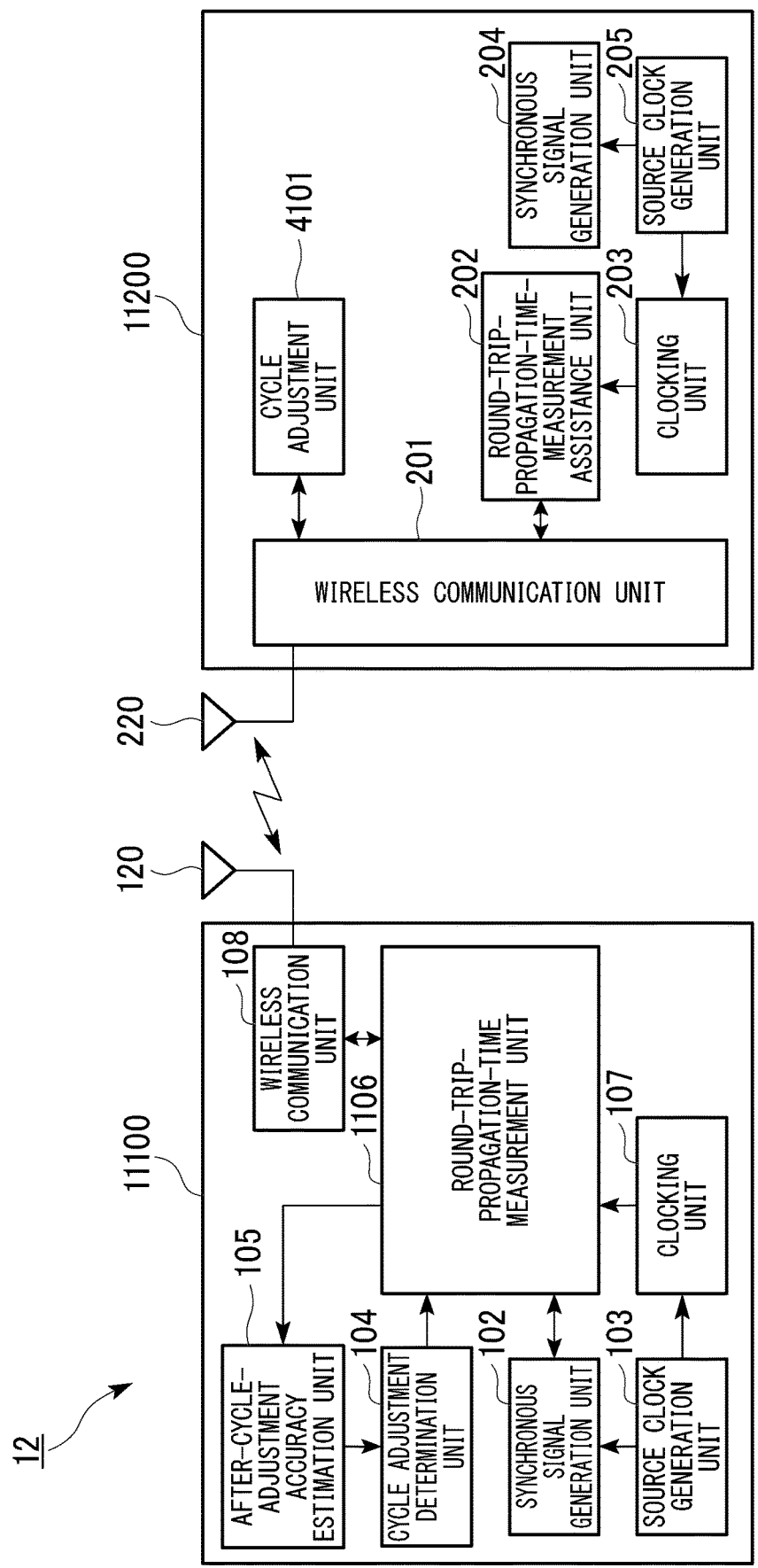
FIG. 36 is a block diagram showing a schematic configuration of an image transmission system according to a twelfth embodiment of the present invention.

Hereinafter, an image transfer system of a twelfth embodiment of the present invention will be described. FIG. 36 is a block diagram showing a schematic configuration of the image transfer system in the twelfth embodiment of the present invention. An image transfer system 12 includes an imaging terminal 11100 and a display terminal 11200. The imaging terminal 11100 includes a synchronization signal generation unit 102, a source oscillation clock generation unit 103, a wireless communication unit 108, a cycle adjustment determination unit 104, an after-cycle-adjustment accuracy estimation unit 105, a round-trip-propagation-time measurement unit 106, a clocking unit 107, and an antenna 120. In addition, the display terminal 11200 includes a synchronous signal generation unit 204, a source oscillation clock generation unit 205, a wireless communication unit 201, a round-trip-propagation-time-measurement assistance unit 202, a clocking unit 203, a cycle adjustment unit 4101, and an antenna 220.

Meanwhile, also in FIG. 36, in components of the image transfer system 12, the same components as the components included in the image transfer system 1 of the first embodiment to the image transfer system 11 of the eleventh embodiment are denoted by the same reference numerals and signs.

Similarly to the image transfer system 1 of the first embodiment to the image transfer system 11 of the eleventh embodiment, the image transfer system 12 is also an image transfer system configured such that transmission and reception of a round-trip-propagation-time-measurement outgoing signal and a round-trip-propagation-time-measurement returning signal are performed between the imaging terminal 11100 and the display terminal 11200, and the imaging terminal 11100 adjusts the phase or period (at least a period) of an imaging synchronization signal to be generated so as to match the phase or period (at least a period) of a display synchronization signal which is generated by the display terminal 11200. Meanwhile, similarly to the image transfer system 1 of the first embodiment, the image transfer system 10 of the tenth embodiment, and the image transfer system 11 of the eleventh embodiment, the image transfer system 12 is an image transfer system in which the imaging terminal 11100 transmits a round-trip-propagation-time-measurement outgoing signal to the display terminal 11200 to calculate a round trip propagation-time in wireless transfer between the imaging terminal 11100 and the display terminal 11200, and the imaging terminal 11100 adjusts the phase or period (at least a period) of an imaging synchronization signal to be generated.

However, in the image transfer system 12, some components included in the imaging terminal 100 in the image transfer system 1 of the first embodiment are moved to the display terminal 11200. More specifically, in the image transfer system 12, the cycle adjustment unit 4101 that replaces the cycle adjustment unit 101 included in the imaging terminal 100 in the image transfer system 1 of the first embodiment is included in the display terminal 11200. Meanwhile, it can be said that a configuration of the image transfer system 12 is a configuration in which the cycle-adjustment determination unit 3104 included in the display terminal 10200 in the image transfer system 11 of the eleventh embodiment is returned to the imaging terminal 11100 as a cycle adjustment determination unit 104.

For this reason, in the image transfer system 12, the imaging terminal 11100 calculates a round trip propagation-time required for wireless transfer between the imaging terminal 11100 and the display terminal 11200. Further, in the image transfer system 12, the imaging terminal 11100 estimates (calculates) a period-adjusted accuracy estimation value in a case where the period of an imaging synchronization signal which is generated by the synchronization signal generation unit 102 is temporarily adjusted, and transmits a cycle adjustment execution determination result indicating a result obtained by determining whether or not cycle adjustment for an imaging synchronization signal is performed on the basis of the period-adjusted accuracy estimation value to the display terminal 11200. Further, in the image transfer system 12, in a case where the cycle adjustment execution determination result transmitted from the imaging terminal 11100 indicates that cycle adjustment for an imaging synchronization signal is performed, the display terminal 11200 calculates a cycle adjustment amount for performing cycle adjustment for an imaging synchronization signal which is generated by the synchronization signal generation unit 102 included in the imaging terminal 11100 and transmits the calculated cycle adjustment amount to the imaging terminal 11100 together with a cycle adjustment instruction. Further, in the image transfer system 12, the imaging terminal 11100 adjusts the period of an imaging synchronization signal to be generated, in response to the cycle adjustment instruction transmitted from the display terminal 11200.

However, also in the image transfer system 12, although there is a process of exchanging signals through wireless transfer in association with a change in the disposition of components, functions and operations of the components are the same as the functions and operations of the corresponding components in the image transfer system 1 of the first embodiment to the image transfer system 11 of the eleventh embodiment. That is, the functions and operations of the components included in the imaging terminal 11100 and the display terminal 11200 in the image transfer system 12 can be easily understood from the above description of the components included in the imaging terminal and the display terminal in each of the image transfer system 1 of the first embodiment to the image transfer system 11 of the eleventh embodiment. Therefore, a detailed description related to the components included in the image transfer system 12 will be omitted.

Figure 37:
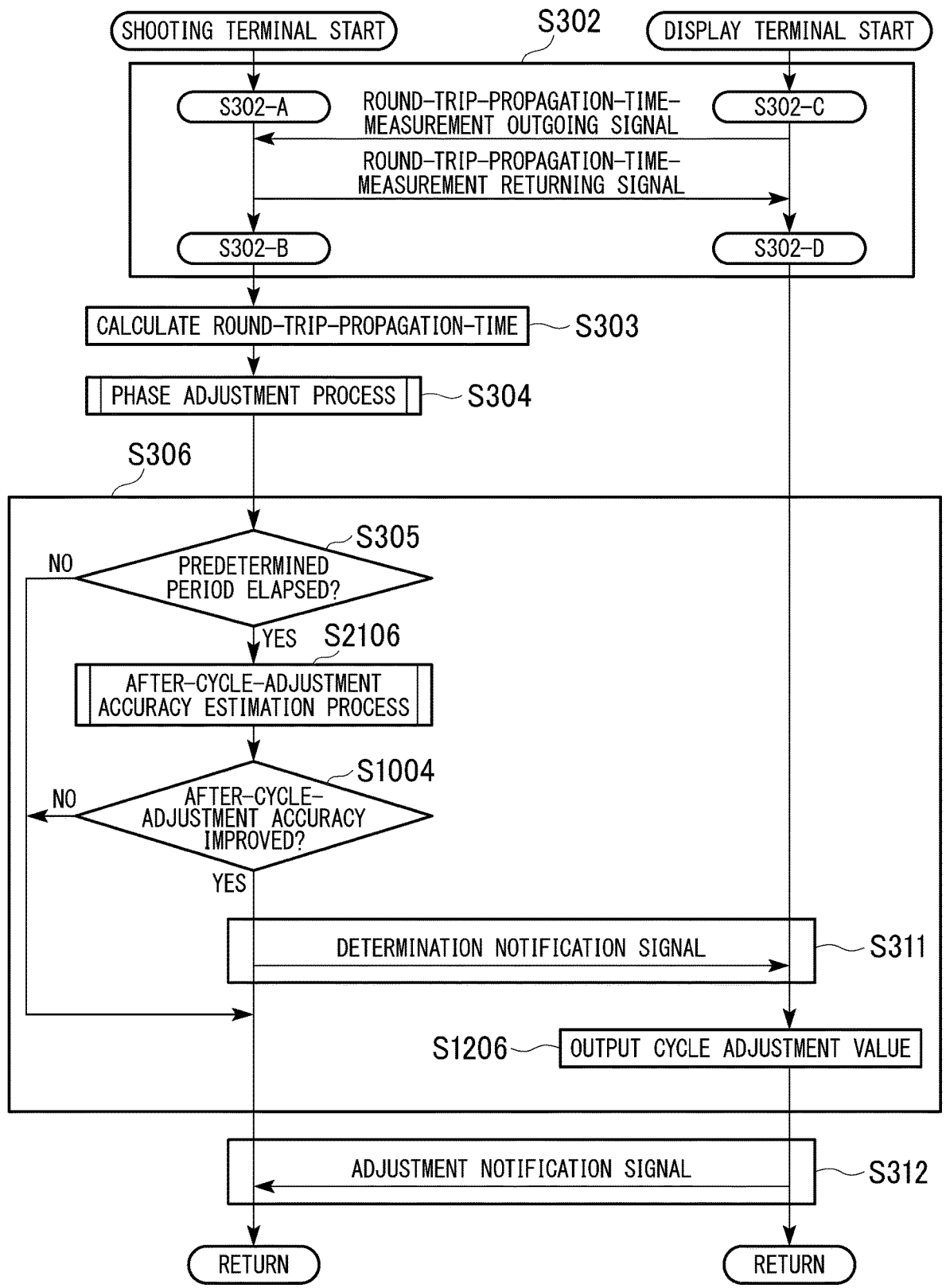
FIG. 37 is a flow chart showing processing procedures of the image transmission system according to the twelfth embodiment of the present invention.

Next, operations of processing in the image transfer system 12 will be described. Meanwhile, similarly to the image transfer system 1 of the first embodiment, in the image transfer system 12, it is assumed that a phase adjustment unit, not shown in the drawing is included in the round-trip-propagation-time measurement unit 106 included in the imaging terminal 11100. That is, in the image transfer system 12, a configuration in which the phase adjustment unit not shown in the drawing is disposed at the same position as those in the image transfer system 1 of the first embodiment, the image transfer system 10 of the tenth embodiment, and the image transfer system 11 of the eleventh embodiment. FIG. 37 is a flowchart showing a processing procedure of the image transfer system 12 in the twelfth embodiment of the present invention.

In the image transfer system 12, a process of transmitting information including a cycle adjustment execution determination result, which is used to adjust the period of an imaging synchronization signal generated by the synchronization signal generation unit 102, to the display terminal 11200 and a process of transmitting a cycle adjustment instruction including a cycle adjustment amount to the imaging terminal 11100 are added, in association with a change to a configuration in which the cycle adjustment unit 4101 is included in the display terminal 11200. However, an outline of the overall operation in the image transfer system 12 is the same as those of the image transfer system 1 of the first embodiment to the image transfer system 11 of the eleventh embodiment. Therefore, also in the image transfer system 12, a description of an outline of the overall operation will be omitted, and a more specific operation of performing cycle adjustment for an imaging synchronization signal in the image transfer system 12 will be described.

Also in the image transfer system 12, when a cycle adjustment process is started, the imaging terminal 11100 transmits a round-trip-propagation-time-measurement outgoing signal to the display terminal 11200, and the display terminal 11200 transmits a round-trip-propagation-time-measurement returning signal corresponding to the round-trip-propagation-time-measurement outgoing signal to the imaging terminal 11100 in step S302. Meanwhile, the process of step S302 in the image transfer system 12 is the same as the process of step S302 in each of the image transfer system 1 of the first embodiment, the image transfer system 10 of the tenth embodiment, and the image transfer system 11 of the eleventh embodiment.

Thereafter, also in the image transfer system 12, in step S303, the imaging terminal 11100 calculates a round trip propagation-time required for transmission and reception in wireless transfer between the imaging terminal 11100 and the display terminal 11200. Meanwhile, the process of step S303 in the image transfer system 12 is the same as the process of step S303 in each of the image transfer system 1 of the first embodiment, the image transfer system 10 of the tenth embodiment, and the image transfer system 11 of the eleventh embodiment.

Thereafter, also in the image transfer system 12, in step S304, the imaging terminal 11100 generates a phase adjustment instruction for the phase adjustment unit, not shown in the drawing, which is provided in the round-trip-propagation-time measurement unit 106 to adjust the phase of an imaging synchronization signal, on the basis of the round trip propagation-time required for transmission and reception in wireless transfer between the imaging terminal 11100 and the display terminal 11200 which is calculated in step S303, and updates a round trip propagation-time determination value. Meanwhile, the process of step S304 in the image transfer system 12 is also the same as the process of step S304 in each of the image transfer system 1 of the first embodiment, the image transfer system 10 of the tenth embodiment, and the image transfer system 11 of the eleventh embodiment.

Thereafter, in the image transfer system 12, in step S306, the period of an imaging synchronization signal is adjusted on the basis of the information of the plurality of round trip propagation-time determination values updated in step S304. However, in the image transfer system 12, the imaging terminal 11100 estimates (calculates) a period-adjusted accuracy estimation value of an imaging synchronization signal in a case where cycle adjustment is temporarily executed and determines whether or not cycle adjustment for an imaging synchronization signal is performed on the basis of the estimated (calculated) period-adjusted accuracy estimation value. Further, in the image transfer system 12, the display terminal 11200 calculates a cycle adjustment amount for performing cycle adjustment for an imaging synchronization signal and generates a cycle adjustment instruction.

For this reason, in the image transfer system 12, in step S305 included in step S306, the after-cycle-adjustment accuracy estimation unit 105 included in the imaging terminal 11100 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 105 determines that cycle adjustment is performed and calculates a period-adjusted accuracy estimation value in step S2106 included in step S306. Meanwhile, the process of step S305 and the process of step S2106 which are included in step S306 in the image transfer system 12 are the same as the process of step S305 and the process of step S2106 which are included in step S306 in each of the image transfer system 1 of the first embodiment, the image transfer system 10 of the tenth embodiment, and the image transfer system 11 of the eleventh embodiment.

Further, in the image transfer system 12, in step S1004 included in step S306, the cycle adjustment determination unit 104 included in the imaging terminal 11100 determines whether or not cycle adjustment for an imaging synchronization signal is performed on the basis of information of the calculated period-adjusted accuracy estimation value. Further, in a case where the cycle adjustment determination unit 104 determines that cycle adjustment for an imaging synchronization signal is performed because an estimated accuracy of the estimated imaging synchronization signal has been improved compared with the current accuracy of the imaging synchronization signal, the cycle adjustment execution determination unit generates a cycle adjustment execution determination result indicating a determination result.

Meanwhile, the process of step S1004 included in step S306 in image transfer system 12 is the same as the process of step S1004 included in step S306 in the image transfer system 1 of the first embodiment.

Thereafter, in the image transfer system 12, in step S311 included in step S306, the imaging terminal 11100 generates a determination notification signal including information of the cycle adjustment execution determination result obtained by the cycle adjustment determination unit 104 and transmits the generated determination notification signal to the display terminal 11200. Meanwhile, the process of step S311 included in step S306 in the image transfer system 12 and the determination notification signal generated in the process of step S311 and transmitted to the display terminal 11200 are the same as the process of step S311 included in step S306 and the determination notification signal in the image transfer system 6 of the sixth embodiment and the image transfer system 7 of the seventh embodiment. Thereby, the cycle adjustment unit 4101 provided in the display terminal 11200 acquires information of the cycle adjustment execution determination result obtained by the cycle adjustment determination unit 104 provided in the imaging terminal 11100.

Further, in the image transfer system 12, in step S1206 included in step S306, the display terminal 11200 calculates a cycle adjustment amount for performing cycle adjustment for an imaging synchronization signal in accordance with the cycle adjustment execution determination result transmitted from the imaging terminal 11100, and generates a cycle adjustment instruction. Meanwhile, the process of step S1206 included in step S306 in the image transfer system 12 is the same as the process of step S1206 included in step S306 in each of the image transfer system 6 of the sixth embodiment and the image transfer system 7 of the seventh embodiment.

Thereafter, in the image transfer system 12, in step S312, the display terminal 11200 generates an adjustment notification signal including information of a cycle adjustment instruction including the cycle adjustment amount calculated by the cycle adjustment unit 4101, and transmits the generated adjustment notification signal to the imaging terminal 11100. Meanwhile, the process of step S312 in the image transfer system 12 and the adjustment notification signal generated in the process of step S312 and transmitted to the imaging terminal 11100 are the same as the process of step S312 and the adjustment notification signal in each of the image transfer system 6 of the sixth embodiment and the image transfer system 7 of the seventh embodiment. Thereby, the synchronization signal generation unit 102 provided in the imaging terminal 11100 acquires information of the cycle adjustment instruction including the cycle adjustment amount transmitted from the cycle adjustment unit 4101 provided in the display terminal 11200 through the round-trip-propagation-time measurement unit 106. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 4101.

Meanwhile, the phase adjustment instruction transmitted from the phase adjustment unit, not shown in the drawing, which is provided in the round-trip-propagation-time measurement unit 106 included in the imaging terminal 11100 is also output to the synchronization signal generation unit 102. Thereby, the synchronization signal generation unit 102 adjusts the phase of an imaging synchronization signal to be generated, in response to the phase adjustment instruction output from the phase adjustment unit, not shown in the drawing, which is provided in the round-trip-propagation-time measurement unit 106.

In this manner, in the image transfer system 12, the imaging terminal 11100 transmits a round-trip-propagation-time-measurement outgoing signal and calculates a round trip propagation-time in wireless transfer between the imaging terminal 11100 and the display terminal 11200. Further, in the image transfer system 12, the imaging terminal 11100 performs a process of updating a round trip propagation-time determination value. Thereby, in the image transfer system 12, the imaging terminal 11100 performs a process of estimating (calculating) a period-adjusted accuracy estimation value in a case where cycle adjustment for an imaging synchronization signal is temporarily executed and a process of determining whether or not cycle adjustment for an imaging synchronization signal which is generated by the synchronization signal generation unit 102 is performed. Further, in the image transfer system 12, the imaging terminal 11100 transmits information of a cycle adjustment execution determination result which is a determination result to the display terminal 11200. Thereby, in the image transfer system 12, the display terminal 11200 performs a process of calculating a cycle adjustment amount for performing cycle adjustment for an imaging synchronization signal to generate a cycle adjustment instruction in accordance with the information of the cycle adjustment execution determination result transmitted from the imaging terminal 11100. Further, in the image transfer system 12, the display terminal 11200 transmits information of the cycle adjustment instruction including the calculated cycle adjustment amount to the imaging terminal 11100. Thereby, in the image transfer system 12, the imaging terminal 11100 adjusts the periods of an imaging synchronization signal and a display synchronization signal so as not to be shifted with the elapse of time, in response to the cycle adjustment instruction transmitted from the display terminal 11200.

Meanwhile, similarly to the image transfer system 1 of the first embodiment to the image transfer system 11 of the eleventh embodiment, also in the image transfer system 12, when at least a process of updating around trip propagation-time determination value is performed in step S304, the after-cycle-adjustment accuracy estimation unit 105 included in the imaging terminal 11100 can estimate the accuracy of an imaging synchronization signal (that is, calculate a period-adjusted accuracy estimation value). Therefore, similarly to the image transfer system 1 of the first embodiment to the image transfer system 11 of the eleventh embodiment, also in the image transfer system 12, the phase adjustment unit not shown in the drawing does not necessarily need to adjust the phase of an imaging synchronization signal in step S304 and may be able to update a round trip propagation-time calculated by the round-trip-propagation-time measurement unit 106 as a round trip propagation-time determination value.

With such a configuration and processing procedure, in the image transfer system 12, the imaging terminal 11100 transmits a round-trip-propagation-time-measurement outgoing signal and measures (calculates) a round trip propagation-time in wireless transfer between the imaging terminal 11100 and the display terminal 11200 to update a round trip propagation-time determination value. Further, in the image transfer system 12, the imaging terminal 11100 estimates (calculates) a period-adjusted accuracy estimation value in a case where cycle adjustment for an imaging synchronization signal is temporarily executed and determines whether or not cycle adjustment for an imaging synchronization signal is performed. Further, in the image transfer system 12, the display terminal 11200 calculates a cycle adjustment amount for adjusting the period of an imaging synchronization signal to generate a cycle adjustment instruction in accordance with the cycle adjustment execution determination result obtained by the imaging terminal 11100. Further, in the image transfer system 12, the imaging terminal 11100 adjusts the phase or period (at least a period) of an imaging synchronization signal to be generated, in response to the phase adjustment instruction generated by the display terminal 11200. Thereby, similarly to the image transfer system 1 of the first embodiment to the image transfer system 11 of the eleventh embodiment, also in the image transfer system 12, the phase or period (at least a period) of an imaging synchronization signal generated by the imaging terminal 11100 (more specifically, the synchronization signal generation unit 102) is adjusted so as to match the phase or period (at least a period) of a display synchronization signal generated by the display terminal 11200. That is, similarly to the image transfer system 1 of the first embodiment to the image transfer system 11 of the eleventh embodiment, also in the image transfer system 12, a timing when the imaging terminal 11100 wirelessly transfers captured image data of an image captured by an imaging unit not shown in the drawing to the display terminal 11200 is matched to a timing when the display terminal 11200 displays an image corresponding to the captured image data on a display unit not shown in the drawing. Thereby, similarly to the image transfer system 1 of the first embodiment to the image transfer system 11 of the eleventh embodiment, also in the image transfer system 12, the display terminal 11200 can stably display an image corresponding to captured image data wirelessly transferred from the imaging terminal 11100 on the display unit not shown in the drawing.

As described above, the image transfer system 12 of the twelfth embodiment performs transmission and reception of a round-trip-propagation-time-measurement outgoing signal and a round-trip-propagation-time-measurement returning signal between the round-trip-propagation-time measurement unit 106 included in the imaging terminal 11100 and the round-trip-propagation-time-measurement assistance unit 202 included in the display terminal 11200 after wireless connection between the imaging terminal 11100 and the display terminal 11200 is established. Further, in the image transfer system 12 of the twelfth embodiment, the round-trip-propagation-time measurement unit 106 calculates a round trip propagation-time required for transmission and reception in wireless transfer between the imaging terminal 11100 and the display terminal 11200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round-trip-propagation-time-measurement assistance unit 202. Further, in the image transfer system 12 of the twelfth embodiment, the round-trip-propagation-time measurement unit 106 (more specifically, the phase adjustment unit not shown in the drawing) updates the round trip propagation-time calculated by the round-trip-propagation-time measurement unit 106 as a round trip propagation-time determination value. Further, in the image transfer system 12 of the twelfth embodiment, the after-cycle-adjustment accuracy estimation unit 105 included in the imaging terminal 11100 estimates (calculates) a period-adjusted accuracy estimation value of an imaging synchronization signal in a case where cycle adjustment is temporarily executed. Further, in the image transfer system 12 of the twelfth embodiment, the cycle adjustment determination unit 104 included in the imaging terminal 11100 determines whether or not cycle adjustment for an imaging synchronization signal which is generated by the synchronization signal generation unit 102 is performed, on the basis of the period-adjusted accuracy estimation value calculated by the after-cycle-adjustment accuracy estimation unit 105. Further, in the image transfer system 12 of the twelfth embodiment, the cycle adjustment determination unit 104 transmits information of a cycle adjustment execution determination result which is a result obtained by determining whether or not the period of an imaging synchronization signal is adjusted to the display terminal 11200. Further, in the image transfer system 12 of the twelfth embodiment, in a case where the cycle adjustment execution determination result indicates that cycle adjustment for an imaging synchronization signal which is generated by the synchronization signal generation unit 102 included in the imaging terminal 11100 is performed, the cycle adjustment unit 4101 included in the display terminal 11200 calculates a cycle adjustment amount for performing cycle adjustment for an imaging synchronization signal to generate a cycle adjustment instruction. Further, in the image transfer system 12 of the twelfth embodiment, the cycle adjustment unit 4101 transmits information of a cycle adjustment instruction including a cycle adjustment amount for adjusting the period of an imaging synchronization signal in the imaging terminal 11100 to the imaging terminal 11100. Thereby, in the image transfer system 12 of the twelfth embodiment, the synchronization signal generation unit 102 adjusts the period of an imaging synchronization signal to be generated by an amount of cycle adjustment, in response to the cycle adjustment instruction which is transmitted from the cycle adjustment unit 4101.

Thereby, similarly to the image transfer system 1 of the first embodiment to the image transfer system 11 of the eleventh embodiment, also in the image transfer system 12 of the twelfth embodiment, the phase or period (at least a period) of an imaging synchronization signal can be matched to the phase or period (at least a period) of a display synchronization signal. That is, also in the image transfer system 12 of the twelfth embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 12 of the twelfth embodiment, the same effects as those in the image transfer system 1 of the first embodiment to the image transfer system 11 of the eleventh embodiment can be obtained. That is, similarly to the image transfer system 1 of the first embodiment to the image transfer system 11 of the eleventh embodiment, also in the image transfer system 12 of the twelfth embodiment, it is possible to wirelessly transfer captured image data from the imaging terminal 11100 to the display terminal 11200 without exceeding a validity period of a display image and to stably display a display image corresponding to the captured image data transmitted from the imaging terminal 11100 in the display terminal 11200.

Moreover, in the image transfer system 12 of the twelfth embodiment, the display terminal 11200 calculates a cycle adjustment amount and generates a cycle adjustment instruction. Thereby, in the image transfer system 12 of the twelfth embodiment, it is not necessary to calculate a cycle adjustment amount and generate a cycle adjustment instruction in the imaging terminal 11100, and thus it is possible to reduce a load of processing performed in the imaging terminal 11100.

Thirteenth Embodiment

Figure 38:
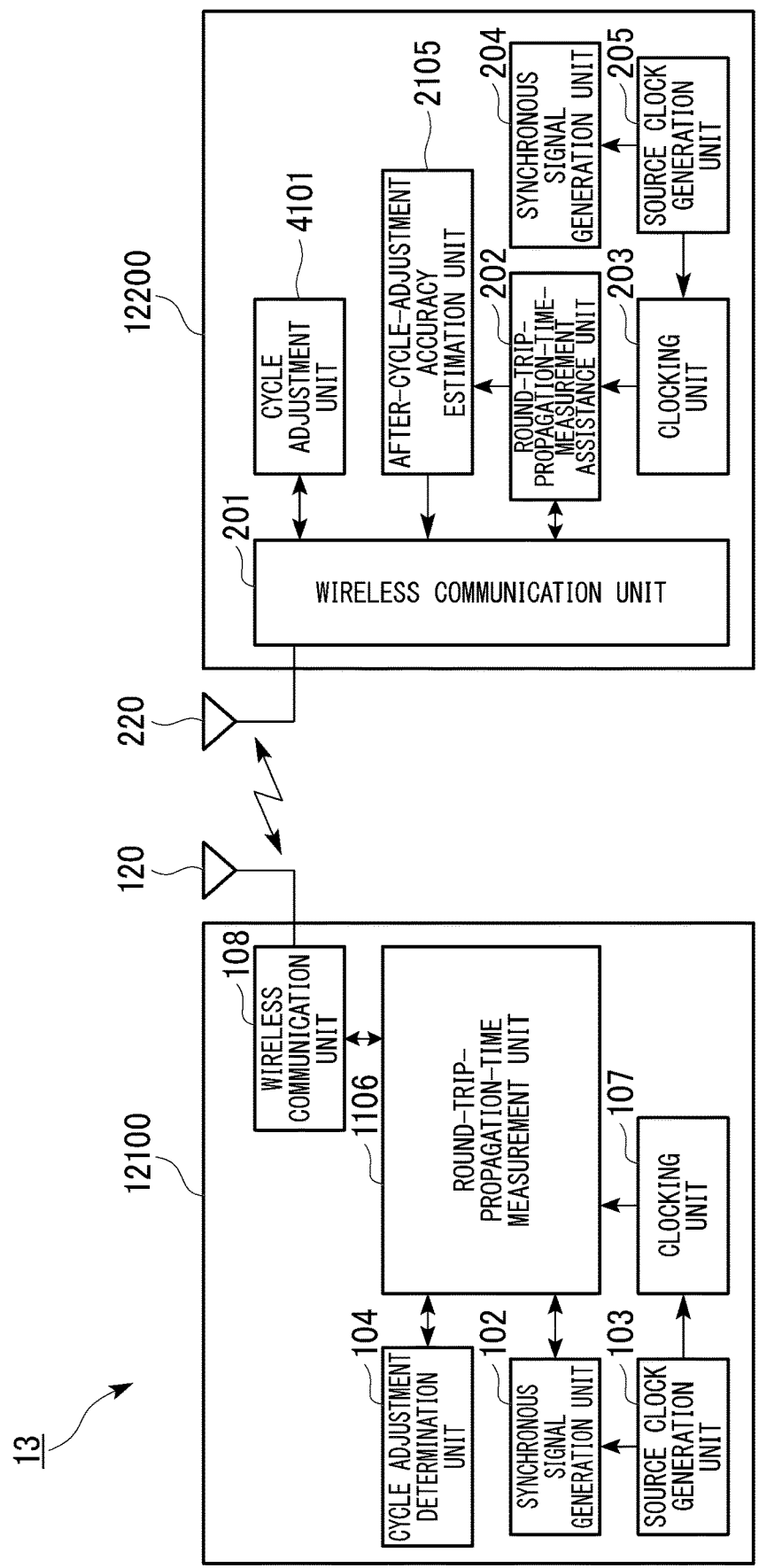
FIG. 38 is a block diagram showing a schematic configuration of an image transmission system according to a thirteenth embodiment of the present invention.

Hereinafter, an image transfer system of a thirteenth embodiment of the present invention will be described. FIG. 38 is a block diagram showing a schematic configuration of the image transfer system in the thirteenth embodiment of the present invention. An image transfer system 13 includes an imaging terminal 12100 and a display terminal 12200. The imaging terminal 12100 includes a synchronization signal generation unit 102, a source oscillation clock generation unit 103, a wireless communication unit 108, a cycle adjustment determination unit 104, a round-trip-propagation-time measurement unit 106, a clocking unit 107, and an antenna 120. In addition, the display terminal 12200 includes a synchronous signal generation unit 204, a source oscillation clock generation unit 205, a wireless communication unit 201, a round-trip-propagation-time-measurement assistance unit 202, a clocking unit 203, an after-cycle-adjustment accuracy estimation unit 2105, a cycle adjustment unit 4101, and an antenna 220.

Meanwhile, also in FIG. 38, in components of the image transfer system 13, the same components as the components included in the image transfer system 1 of the first embodiment to the image transfer system 12 of the twelfth embodiment are denoted by the same reference numerals and signs.

Similarly to the image transfer system 1 of the first embodiment to the image transfer system 12 of the twelfth embodiment, the image transfer system 13 is also an image transfer system configured such that transmission and reception of a round-trip-propagation-time-measurement outgoing signal and a round-trip-propagation-time-measurement returning signal are performed between the imaging terminal 12100 and the display terminal 12200, and the imaging terminal 12100 adjusts the phase or period (at least a period) of an imaging synchronization signal to be generated so as to match the phase or period (at least a period) of a display synchronization signal which is generated by the display terminal 12200. Meanwhile, similarly to the image transfer system 1 of the first embodiment, and the image transfer system 10 of the tenth embodiment to the image transfer system 12 of the twelfth embodiment, the image transfer system 13 is an image transfer system in which the imaging terminal 12100 transmits a round-trip-propagation-time-measurement outgoing signal to the display terminal 12200 to calculate a round trip propagation-time in wireless transfer between the imaging terminal 12100 and the display terminal 12200, and the imaging terminal 12100 adjusts the phase or period (at least a period) of an imaging synchronization signal to be generated.

However, in the image transfer system 13, some components included in the imaging terminal 11100 in the image transfer system 12 of the twelfth embodiment are moved to the display terminal 12200. More specifically, in the image transfer system 13, the after-cycle-adjustment accuracy estimation unit 2105 that replaces the after-cycle-adjustment accuracy estimation unit 105 included in the imaging terminal 11100 in the image transfer system 12 of the twelfth embodiment is included in the display terminal 12200.

For this reason, in the image transfer system 13, the imaging terminal 12100 measures (calculates) a round trip propagation-time required for transmission and reception when wireless transfer is performed between the imaging terminal 12100 and the display terminal 12200, and transmits the measured round trip propagation-time to the display terminal 12200. Further, in the image transfer system 13, the display terminal 12200 estimates (calculates) a period-adjusted accuracy estimation value in a case where the period of an imaging synchronization signal which is generated by the synchronization signal generation unit 102 included in the imaging terminal 12100 is temporarily adjusted, and transmits the estimated period-adjusted accuracy estimation value to the imaging terminal 12100. Further, in the image transfer system 13, the imaging terminal 12100 determines whether or not cycle adjustment for an imaging synchronization signal which is generated by the synchronization signal generation unit 102 is performed, on the basis of the period-adjusted accuracy estimation value transmitted from the display terminal 12200, and transmits a cycle adjustment execution determination result indicating a determination result to the display terminal 12200. Further, in the image transfer system 13, in a case where the cycle adjustment execution determination result transmitted from the imaging terminal 12100 indicates that cycle adjustment for an imaging synchronization signal is performed, the display terminal 12200 calculates a cycle adjustment amount for performing cycle adjustment for an imaging synchronization signal which is generated by the synchronization signal generation unit 102 included in the imaging terminal 12100 and transmits the calculated cycle adjustment amount to the imaging terminal 12100 together with a cycle adjustment instruction. Further, in the image transfer system 13, the imaging terminal 12100 adjusts the period of an imaging synchronization signal to be generated, in response to the cycle adjustment instruction transmitted from the display terminal 12200.

However, also in the image transfer system 13, although there is a process of exchanging signals through wireless transfer in association with a change in the disposition of components, functions and operations of the components are the same as the functions and operations of the corresponding components in the image transfer system 1 of the first embodiment to the image transfer system 12 of the twelfth embodiment. That is, the functions and operations of the components included in the imaging terminal 12100 and the display terminal 12200 in the image transfer system 13 can be easily understood from the above description of the components included in the imaging terminal and the display terminal in each of the image transfer system 1 of the first embodiment to the image transfer system 12 of the twelfth embodiment. Therefore, a detailed description related to the components included in the image transfer system 13 will be omitted.

Figure 39:
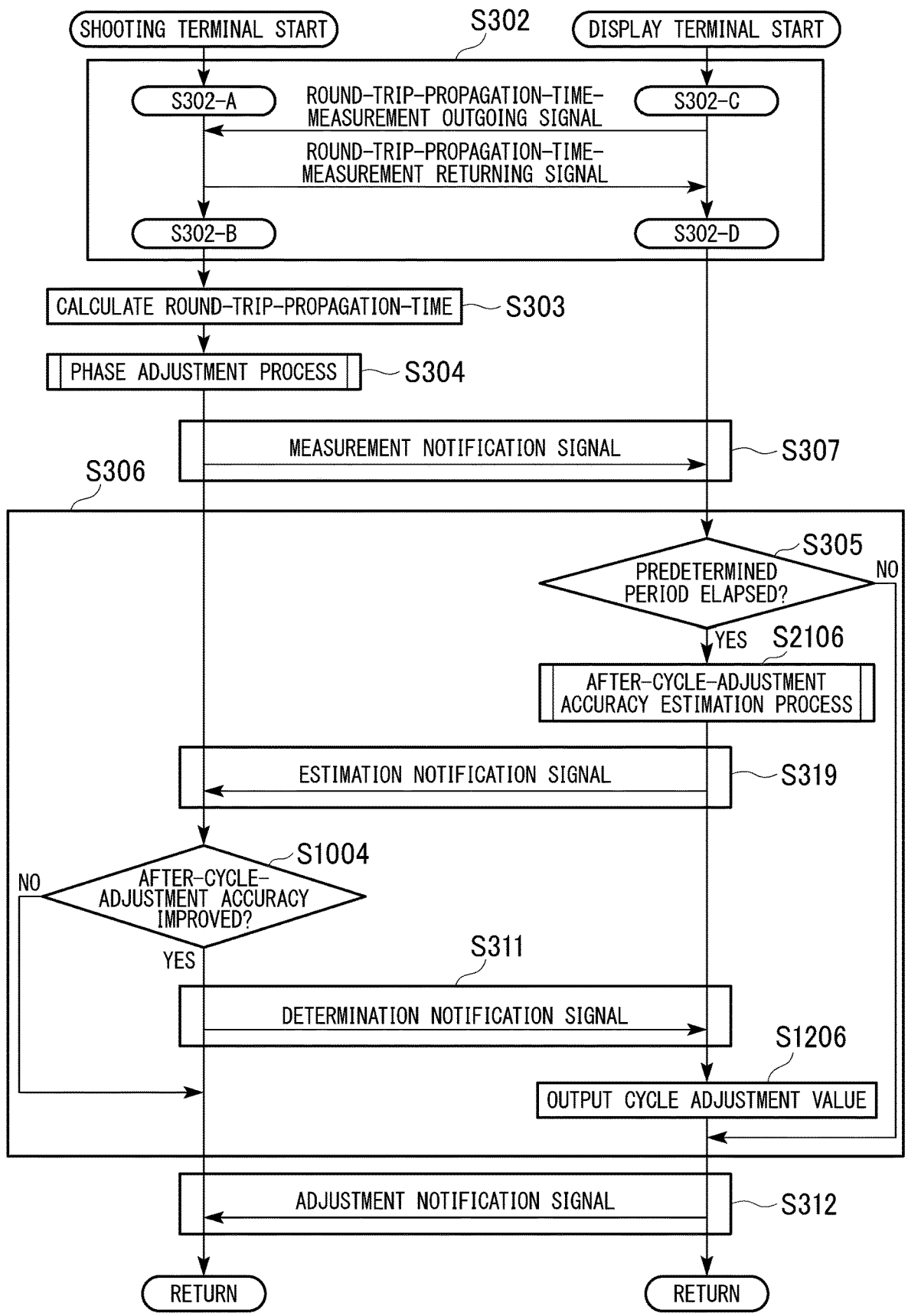
FIG. 39 is a flow chart showing processing procedures of the image transmission system according to the thirteenth embodiment of the present invention.

Next, operations of processing in the image transfer system 13 will be described. Meanwhile, similarly to the image transfer system 1 of the first embodiment, in the image transfer system 13, it is assumed that a phase adjustment unit not shown in the drawing is included in the round-trip-propagation-time measurement unit 106 included in the imaging terminal 12100. That is, in the image transfer system 13, a configuration in which the phase adjustment unit not shown in the drawing is disposed at the same position as those in the image transfer system 1 of the first embodiment, and the image transfer system 10 of the tenth embodiment to the image transfer system 12 of the twelfth embodiment is adopted. FIG. 39 is a flowchart showing a processing procedure of the image transfer system 13 in the thirteenth embodiment of the present invention.

In the image transfer system 13, a process of transmitting information used to adjust the period of an imaging synchronization signal which is generated by the synchronization signal generation unit 102 to the display terminal 12200, a process of transmitting information of a period-adjusted accuracy estimation value to the imaging terminal 12100, a process of transmitting information of a cycle adjustment execution determination result to the display terminal 12200, and a process of transmitting a cycle adjustment instruction including a cycle adjustment amount to the imaging terminal 12100 are added, in association with a change to a configuration in which the after-cycle-adjustment accuracy estimation unit 2105 and the cycle adjustment unit 4101 are included in the display terminal 12200. However, an outline of the overall operation in the image transfer system 13 is the same as those of the image transfer system 1 of the first embodiment to the image transfer system 12 of the twelfth embodiment. Therefore, also in the image transfer system 13, a description of an outline of the overall operation will be omitted, and a more specific operation of performing cycle adjustment for an imaging synchronization signal in the image transfer system 13 will be described.

Also in the image transfer system 13, when a cycle adjustment process is started, the imaging terminal 12100 transmits a round-trip-propagation-time-measurement outgoing signal to the display terminal 12200, and the display terminal 12200 transmits a round-trip-propagation-time-measurement returning signal corresponding to the round-trip-propagation-time-measurement outgoing signal to the imaging terminal 12100 in step S302. Meanwhile, the process of step S302 in the image transfer system 13 is the same as the process of step S302 in each of the image transfer system 1 of the first embodiment, and the image transfer system 10 of the tenth embodiment to the image transfer system 12 of the twelfth embodiment.

Thereafter, also in the image transfer system 13, in step S303, the imaging terminal 12100 calculates a round trip propagation-time required for transmission and reception in wireless transfer between the imaging terminal 12100 and the display terminal 12200. Meanwhile, the process of step S303 in the image transfer system 13 is also the same as the process of step S303 in each of the image transfer system 1 of the first embodiment, and the image transfer system 10 of the tenth embodiment to the image transfer system 12 of the twelfth embodiment.

Thereafter, also in the image transfer system 13, in step S304, the imaging terminal 12100 generates a phase adjustment instruction for the phase adjustment unit, not shown in the drawing, which is provided in the round-trip-propagation-time measurement unit 106 to adjust the phase of an imaging synchronization signal, on the basis of the round trip propagation-time required for transmission and reception in wireless transfer between the imaging terminal 12100 and the display terminal 12200 which is calculated in step S303, and updates a round trip propagation-time determination value. Meanwhile, the process of step S304 in the image transfer system 13 is also the same as the process of step S304 in each of the image transfer system 1 of the first embodiment, and the image transfer system 10 of the tenth embodiment to the image transfer system 12 of the twelfth embodiment.

Thereafter, in the image transfer system 13, in step S307, the imaging terminal 12100 generates a measurement notification signal including information of the calculated round trip propagation-time and transmits the generated measurement notification signal to the display terminal 12200. More specifically, the round-trip-propagation-time measurement unit 106 generates a measurement notification signal including information of the calculated round trip propagation-time, information of a scheduled transmission time of a round-trip-propagation-time-measurement outgoing signal, information of a scheduled transmission time included in a received round-trip-propagation-time-measurement returning signal, a phase adjustment instruction generated by the phase adjustment unit not shown in the drawing, and information of a plurality of round trip propagation-time determination values updated by the phase adjustment unit not shown in the drawing. In addition, the round-trip-propagation-time measurement unit 106 outputs the generated measurement notification signal to the wireless communication unit 108 and transmits the measurement notification signal to the after-cycle-adjustment accuracy estimation unit 2105 provided in the display terminal 12200 through the wireless communication unit 108 and the antenna 120. Thereby, the display terminal 12200 acquires information of the roundtrip propagation-time determination values from the imaging terminal 12100. More specifically, the wireless communication unit 201 receives the measurement notification signal transmitted from the imaging terminal 12100 through the antenna 220. In addition, the wireless communication unit 201 outputs each of the information of the round trip propagation-time included in the received measurement notification signal, the information of the scheduled transmission time of the round-trip-propagation-time-measurement outgoing signal, the information of the scheduled transmission time of the round-trip-propagation-time-measurement returning signal, the information of the phase adjustment instruction, and the information of the plurality of round trip propagation-time determination values to the round-trip-propagation-time-measurement assistance unit 202. Thereby, the after-cycle-adjustment accuracy estimation unit 2105 provided in the display terminal 12200 acquires the information of the round trip propagation-time determination values transmitted from the imaging terminal 12100 through the round-trip-propagation-time-measurement assistance unit 202.

Thereafter, in the image transfer system 13, in step S306, the period of an imaging synchronization signal is adjusted on the basis of the information of the plurality of round trip propagation-time determination values updated in step S304. However, in the image transfer system 13, the display terminal 12200 estimates (calculates) a period-adjusted accuracy estimation value of an imaging synchronization signal in a case where cycle adjustment is temporarily executed. Further, in the image transfer system 13, the imaging terminal 12100 determines whether or not cycle adjustment for an imaging synchronization signal is performed on the basis of the period-adjusted accuracy estimation value. Further, in the image transfer system 13, the display terminal 12200 calculates a cycle adjustment amount for performing cycle adjustment for an imaging synchronization signal and generates a cycle adjustment instruction.

For this reason, in the image transfer system 13, in step S305 included in step S306, the after-cycle-adjustment accuracy estimation unit 2105 included in the display terminal 12200 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 2105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 2105 determines that cycle adjustment is performed and calculates a period-adjusted accuracy estimation value in step S2106 included in step S306. Meanwhile, the process of step S305 and the process of step S2106 which are included in step S306 in the image transfer system 13 are the same as the process of step S305 and the process of step S2106 which are included in step S306 in each of the image transfer system 3 of the third embodiment, the image transfer system 4 of the fourth embodiment, and the image transfer system 6 of the sixth embodiment.

Thereafter, in the image transfer system 13, in step S319 included in step S306, the display terminal 12200 generates an estimation notification signal including information of the period-adjusted accuracy estimation value calculated by the after-cycle-adjustment accuracy estimation unit 2105 and transmits the generated estimation notification signal to the imaging terminal 12100. Meanwhile, the process of step S319 included in step S306 in the image transfer system 13 and the estimation notification signal generated in the process of step S319 and transmitted to the imaging terminal 12100 are the same as the process of step S319 included in step S306 and the estimation notification signal in each of the image transfer system 3 of the third embodiment and the image transfer system 6 of the sixth embodiment. Thereby, the cycle adjustment determination unit 104 provided in the imaging terminal 12100 acquires information of the period-adjusted accuracy estimation value calculated by the after-cycle-adjustment accuracy estimation unit 2105 provided in the display terminal 12200 through the round-trip-propagation-time measurement unit 106.

Further, in the image transfer system 13, in step S1004 included in step S306, the imaging terminal 12100 determines whether or not cycle adjustment for an imaging synchronization signal is performed on the basis of the period-adjusted accuracy estimation value transmitted from the display terminal 12200. More specifically, the cycle adjustment determination unit 104 included in the imaging terminal 12100 determines that cycle adjustment for an imaging synchronization signal is not performed in a case where the accuracy of an imaging synchronization signal indicated by the period-adjusted accuracy estimation value transmitted from the display terminal 12200, that is, calculated by the after-cycle-adjustment accuracy estimation unit 2105 included in the display terminal 12200 is equal to the current accuracy of the imaging synchronization signal or has not been improved, and terminates the process of step S1004. On the other hand, in a case where the estimated accuracy of the imaging synchronization signal has been improved compared with the current accuracy of the imaging synchronization signal, the cycle adjustment determination unit 104 determines that cycle adjustment for an imaging synchronization signal is performed, and generates a cycle adjustment execution determination result indicating a determination result. Meanwhile, the process of step S1004 included in step S306 in the image transfer system 13 is the same as the process of step S1004 included in step S306 in each of the image transfer system 1 of the first embodiment and the image transfer system 6 of the sixth embodiment.

Thereafter, in the image transfer system 13, in step S311 included in step S306, the imaging terminal 12100 generates a determination notification signal including information of the cycle adjustment execution determination result obtained by the cycle adjustment determination unit 104 and transmits the generated determination notification signal to the display terminal 12200. Meanwhile, the process of step S311 included in step S306 in the image transfer system 13 and the determination notification signal generated in the process of step S311 and transmitted to the display terminal 12200 are the same as the process of step S311 included in step S306 and the determination notification signal in each of the image transfer system 6 of the sixth embodiment, the image transfer system 7 of the seventh embodiment, and the image transfer system 12 of the twelfth embodiment. Thereby, the cycle adjustment unit 4101 provided in the display terminal 12200 acquires information of the cycle adjustment execution determination result obtained by the cycle adjustment determination unit 104 provided in the imaging terminal 12100.

Further, in the image transfer system 13, in step S1206 included in step S306, the display terminal 12200 calculates a cycle adjustment amount for performing cycle adjustment for an imaging synchronization signal in accordance with the cycle adjustment execution determination result transmitted from the imaging terminal 12100, and generates a cycle adjustment instruction. Meanwhile, the process of step S1206 included in step S306 in the image transfer system 13 is the same as the process of step S1206 included in step S306 in each of the image transfer system 6 of the sixth embodiment, the image transfer system 7 of the seventh embodiment, and the image transfer system 12 of the twelfth embodiment.

Thereafter, in the image transfer system 13, in step S312, the display terminal 12200 generates an adjustment notification signal including information of the cycle adjustment instruction including the cycle adjustment amount calculated by the cycle adjustment unit 4101, and transmits the generated adjustment notification signal to the imaging terminal 12100. Meanwhile, the process of step S312 in the image transfer system 13 and the adjustment notification signal generated in the process of step S312 and transmitted to the imaging terminal 12100 are the same as the process of step S312 and the adjustment notification signal in each of the image transfer system 6 of the sixth embodiment, the image transfer system 7 of the seventh embodiment, and the image transfer system 12 of the twelfth embodiment. Thereby, the synchronization signal generation unit 102 provided in the imaging terminal 12100 acquires information of the cycle adjustment instruction including the cycle adjustment amount transmitted from the cycle adjustment unit 4101 provided in the display terminal 12200 through the reciprocation time measurement unit 106. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 4101.

Meanwhile, the phase adjustment instruction transmitted from the phase adjustment unit, not shown in the drawing, which is provided in the round-trip-propagation-time measurement unit 106 included in the imaging terminal 12100 is also output to the synchronization signal generation unit 102. Thereby, the synchronization signal generation unit 102 adjusts the phase of an imaging synchronization signal to be generated, in response to the phase adjustment instruction output from the phase adjustment unit, not shown in the drawing, which is provided in the round-trip-propagation-time measurement unit 106.

In this manner, in the image transfer system 13, the imaging terminal 12100 transmits a round-trip-propagation-time-measurement outgoing signal and calculates a round trip propagation-time in wireless transfer between the imaging terminal 12100 and the display terminal 12200. Further, in the image transfer system 13, the imaging terminal 12100 performs a process of updating a round trip propagation-time determination value and transmits information of the plurality of round trip propagation-time determination values updated, information of a round trip propagation-time, information of a scheduled transmission time of a round-trip-propagation-time-measurement outgoing signal, information of a scheduled transmission time included in a received round-trip-propagation-time-measurement returning signal, and a phase adjustment instruction to the display terminal 12200. Thereby, in the image transfer system 13, the display terminal 12200 performs a process of estimating (calculating) a period-adjusted accuracy estimation value in a case where cycle adjustment for an imaging synchronization signal is temporarily executed, on the basis of the pieces of information transmitted from the imaging terminal 12100. Further, in the image transfer system 13, the display terminal 12200 transmits information of the calculated period-adjusted accuracy estimation value to the imaging terminal 12100. Thereby, in the image transfer system 13, the imaging terminal 12100 performs a process of determining whether or not cycle adjustment for an imaging synchronization signal which is generated by the synchronization signal generation unit 102 included in the imaging terminal 12100 is performed, on the basis of the information of the period-adjusted accuracy estimation value transmitted from the display terminal 12200. Further, in the image transfer system 13, the imaging terminal 12100 transmits information of a cycle adjustment execution determination result which is a determination result to the display terminal 12200. Thereby, in the image transfer system 13, the display terminal 12200 performs a process of calculating a cycle adjustment amount for performing cycle adjustment for an imaging synchronization signal to generate a cycle adjustment instruction in accordance with the information of the cycle adjustment execution determination result transmitted from the imaging terminal 12100. Further, in the image transfer system 13, the display terminal 12200 transmits information of the cycle adjustment instruction including the calculated cycle adjustment amount to the imaging terminal 12100. Thereby, in the image transfer system 13, the imaging terminal 12100 adjusts the periods of an imaging synchronization signal and a display synchronization signal so as not to be shifted with the elapse of time, in response to the cycle adjustment instruction transmitted from the display terminal 12200.

Meanwhile, similarly to the image transfer system 1 of the first embodiment to the image transfer system 12 of the twelfth embodiment, also in the image transfer system 13, when at least a process of updating a round trip propagation-time determination value is performed in step S304, the after-cycle-adjustment accuracy estimation unit 2105 included in the display terminal 12200 can estimate the accuracy of an imaging synchronization signal (that is, calculate a period-adjusted accuracy estimation value). Therefore, similarly to the image transfer system 1 of the first embodiment to the image transfer system 12 of the twelfth embodiment, also in the image transfer system 13, the phase adjustment unit not shown in the drawing does not necessarily need to adjust the phase of an imaging synchronization signal in step S304 and may be able to update a round trip propagation-time calculated by the round-trip-propagation-time measurement unit 106 as a round trip propagation-time determination value.

With such a configuration and processing procedure, in the image transfer system 13, the imaging terminal 12100 transmits a round-trip-propagation-time-measurement outgoing signal and measures (calculates) a round trip propagation-time in wireless transfer between the imaging terminal 12100 and the display terminal 12200 to update a round trip propagation-time determination value. Further, in the image transfer system 13, the display terminal 12200 estimates (calculates) a period-adjusted accuracy estimation value in a case where cycle adjustment for an imaging synchronization signal is temporarily executed. Further, in the image transfer system 13, the imaging terminal 12100 determines whether or not cycle adjustment for an imaging synchronization signal is performed on the basis of the period-adjusted accuracy estimation value estimated (calculated) by the display terminal 12200. Further, in the image transfer system 13, the display terminal 12200 calculates a cycle adjustment amount for adjusting the period of an imaging synchronization signal to generate a cycle adjustment instruction in accordance with the cycle adjustment execution determination result obtained by the imaging terminal 12100. Further, in the image transfer system 13, the imaging terminal 12100 adjusts the phase or period (at least a period) of an imaging synchronization signal to be generated, in response to the phase adjustment instruction generated by the display terminal 12200. Thereby, similarly to the image transfer system 1 of the first embodiment to the image transfer system 12 of the twelfth embodiment, also in the image transfer system 13, the phase or period (at least a period) of an imaging synchronization signal generated by the imaging terminal 12100 (more specifically, the synchronization signal generation unit 102) is adjusted so as to match the phase or period (at least a period) of a display synchronization signal generated by the display terminal 12200. That is, similarly to the image transfer system 1 of the first embodiment to the image transfer system 12 of the twelfth embodiment, also in the image transfer system 13, a timing when the imaging terminal 12100 wirelessly transfers captured image data of an image captured by an imaging unit not shown in the drawing to the display terminal 12200 is matched to a timing when the display terminal 12200 displays an image corresponding to the captured image data on a display unit not shown in the drawing. Thereby, similarly to the image transfer system 1 of the first embodiment to the image transfer system 12 of the twelfth embodiment, also in the image transfer system 13, the display terminal 12200 can stably display an image corresponding to captured image data wirelessly transferred from the imaging terminal 12100 on the display unit not shown in the drawing.

As described above, the image transfer system 13 of the thirteenth embodiment performs transmission and reception of a round-trip-propagation-time-measurement outgoing signal and a round-trip-propagation-time-measurement returning signal between the round-trip-propagation-time measurement unit 106 included in the imaging terminal 12100 and the round-trip-propagation-time-measurement assistance unit 202 included in the display terminal 12200 after wireless connection between the imaging terminal 12100 and the display terminal 12200 is established. Further, in the image transfer system 13 of the thirteenth embodiment, the round-trip-propagation-time measurement unit 106 calculates a round trip propagation-time required for transmission and reception in wireless transfer between the imaging terminal 12100 and the display terminal 12200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round-trip-propagation-time-measurement assistance unit 202. Further, in the image transfer system 13 of the thirteenth embodiment, the round-trip-propagation-time measurement unit 106 (more specifically, the phase adjustment unit not shown in the drawing) updates the round trip propagation-time calculated by the round-trip-propagation-time measurement unit 106 as a round trip propagation-time determination value. Further, in the image transfer system 13 of the thirteenth embodiment, the round-trip-propagation-time measurement unit 106 transmits information for adjusting the period of an imaging synchronization signal in the imaging terminal 12100 to the display terminal 12200. Further, in the image transfer system 13 of the thirteenth embodiment, the after-cycle-adjustment accuracy estimation unit 2105 included in the display terminal 12200 estimates (calculates) a period-adjusted accuracy estimation value of an imaging synchronization signal in a case where cycle adjustment is temporarily executed. Further, in the image transfer system 13 of the thirteenth embodiment, the after-cycle-adjustment accuracy estimation unit 2105 transmits information of the estimated (calculated) period-adjusted accuracy estimation value of the imaging synchronization signal to the imaging terminal 12100. Further, in the image transfer system 13 of the thirteenth embodiment, the cycle adjustment determination unit 104 included in the imaging terminal 12100 determines whether or not cycle adjustment for an imaging synchronization signal which is generated by the synchronization signal generation unit 102 is performed, on the basis of the period-adjusted accuracy estimation value calculated by the after-cycle-adjustment accuracy estimation unit 2105. Further, in the image transfer system 13 of the thirteenth embodiment, the cycle adjustment determination unit 104 transmits information of a cycle adjustment execution determination result which is a result obtained by determining whether or not the period of an imaging synchronization signal is adjusted to the display terminal 12200. Further, in the image transfer system 13 of the thirteenth embodiment, in a case where the cycle adjustment execution determination result indicates that cycle adjustment for an imaging synchronization signal which is generated by the synchronization signal generation unit 102 included in the imaging terminal 12100 is performed, the cycle adjustment unit 4101 included in the display terminal 12200 calculates a cycle adjustment amount for performing cycle adjustment for an imaging synchronization signal to generate a cycle adjustment instruction. Further, in the image transfer system 13 of the thirteenth embodiment, the cycle adjustment unit 4101 transmits information of a cycle adjustment instruction including a cycle adjustment amount for adjusting the period of an imaging synchronization signal in the imaging terminal 12100 to the imaging terminal 12100. Thereby, in the image transfer system 13 of the thirteenth embodiment, the synchronization signal generation unit 102 adjusts the period of an imaging synchronization signal to be generated by an amount of cycle adjustment, in response to the cycle adjustment instruction which is transmitted from the cycle adjustment unit 4101.

Thereby, similarly to the image transfer system 1 of the first embodiment to the image transfer system 12 of the twelfth embodiment, also in the image transfer system 13 of the thirteenth embodiment the phase or period (at least a period) of an imaging synchronization signal can be matched to the phase or period (at least a period) of a display synchronization signal. That is, also in the image transfer system 13 of the thirteenth embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 13 of the thirteenth embodiment, the same effects as those in the image transfer system 1 of the first embodiment to the image transfer system 12 of the twelfth embodiment can be obtained. That is, similarly to the image transfer system 1 of the first embodiment to the image transfer system 12 of the twelfth embodiment, also in the image transfer system 13 of the thirteenth embodiment, it is possible to wirelessly transfer captured image data from the imaging terminal 12100 to the display terminal 12200 without exceeding a validity period of a display image and to stably display a display image corresponding to the captured image data transmitted from the imaging terminal 12100 in the display terminal 12200.

Moreover, in the image transfer system 13 of the thirteenth embodiment, the display terminal 12200 estimates (calculates) a period-adjusted accuracy estimation value, calculates a cycle adjustment amount, and generates a cycle adjustment instruction. Thereby, in the image transfer system 13 of the thirteenth embodiment, the imaging terminal 12100 may only calculate a round trip propagation-time required for transmission and reception in wireless transfer between the imaging terminal 12100 and the display terminal 12200, determine whether or not cycle adjustment for an imaging synchronization signal is performed, and perform cycle adjustment for an imaging synchronization signal in response to the cycle adjustment instruction. That is, in the image transfer system 13 of the thirteenth embodiment, it is not necessary to estimate (calculate) a period-adjusted accuracy estimation value, calculate a cycle adjustment amount, and generate a cycle adjustment instruction in the imaging terminal 12100, and thus it is possible to reduce a load of processing performed in the imaging terminal 12100.

Fourteenth Embodiment

Figure 40:
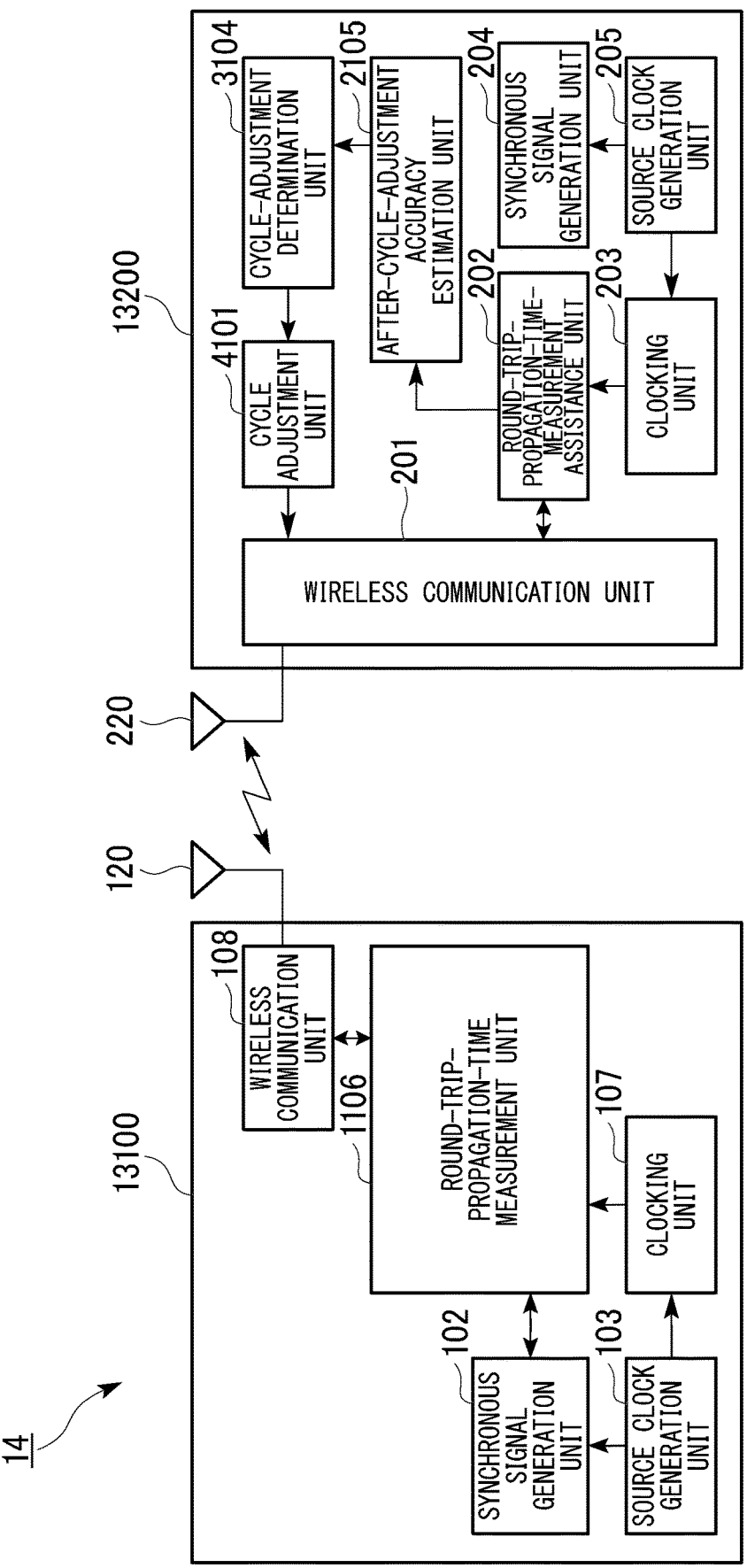
FIG. 40 is a block diagram showing a schematic configuration of an image transmission system according to a fourteenth embodiment of the present invention.

Hereinafter, an image transfer system of a fourteenth embodiment of the present invention will be described. FIG. 40 is a block diagram showing a schematic configuration of the image transfer system in the fourteenth embodiment of the present invention. An image transfer system 14 includes an imaging terminal 13100 and a display terminal 13200. The imaging terminal 13100 includes a synchronization signal generation unit 102, a source oscillation clock generation unit 103, a wireless communication unit 108, a round-trip-propagation-time measurement unit 106, a clocking unit 107, and an antenna 120. In addition, the display terminal 13200 includes a synchronous signal generation unit 204, a source oscillation clock generation unit 205, a wireless communication unit 201, a round-trip-propagation-time-measurement assistance unit 202, a clocking unit 203, an after-cycle-adjustment accuracy estimation unit 2105, a cycle-adjustment determination unit 3104, a cycle adjustment unit 4101, and an antenna 220.

Meanwhile, also in FIG. 40, in components of the image transfer system 14, the same components as the components included in the image transfer system 1 of the first embodiment to the image transfer system 13 of the thirteenth embodiment are denoted by the same reference numerals and signs.

Similarly to the image transfer system 1 of the first embodiment to the image transfer system 13 of the thirteenth embodiment, the image transfer system 14 is also an image transfer system configured such that transmission and reception of a round-trip-propagation-time-measurement outgoing signal and a round-trip-propagation-time-measurement returning signal are performed between the imaging terminal 13100 and the display terminal 13200, and the imaging terminal 13100 adjusts the phase or period (at least a period) of an imaging synchronization signal to be generated so as to match the phase or period (at least a period) of a display synchronization signal which is generated by the display terminal 13200. Meanwhile, similarly to the image transfer system 1 of the first embodiment, and the image transfer system 10 of the tenth embodiment to the image transfer system 13 of the thirteenth embodiment, the image transfer system 14 is an image transfer system in which the imaging terminal 13100 transmits a round-trip-propagation-time-measurement outgoing signal to the display terminal 13200 to calculate a round trip propagation-time in wireless transfer between the imaging terminal 13100 and the display terminal 13200, and the imaging terminal 13100 adjusts the phase or period (at least a period) of an imaging synchronization signal to be generated.

However, in the image transfer system 14, some components included in the imaging terminal 12100 in the image transfer system 13 of the thirteenth embodiment are moved to the display terminal 13200. More specifically, in the image transfer system 14, the cycle-adjustment determination unit 3104 that replaces the cycle adjustment determination unit 104 included in the imaging terminal 12100 in the image transfer system 13 of the thirteenth embodiment is included in the display terminal 13200.

For this reason, in the image transfer system 14, the imaging terminal 13100 measures (calculates) a round trip propagation-time required for transmission and reception when wireless transfer is performed between the imaging terminal 13100 and the display terminal 13200, and transmits the measured round trip propagation-time to the display terminal 13200. Further, in the image transfer system 14, the display terminal 13200 estimates (calculates) a period-adjusted accuracy estimation value in a case where the period of an imaging synchronization signal which is generated by the synchronization signal generation unit 102 included in the imaging terminal 13100 is temporarily adjusted, determines whether or not cycle adjustment for an imaging synchronization signal is performed on the basis of the period-adjusted accuracy estimation value, calculates a cycle adjustment amount in a case where it is determined that cycle adjustment for an imaging synchronization signal is performed, and transmits the calculated cycle adjustment amount to the imaging terminal 13100 together with a cycle adjustment instruction. Further, in the image transfer system 14, the imaging terminal 13100 adjusts the period of an imaging synchronization signal to be generated, in response to the cycle adjustment instruction transmitted from the display terminal 13200.

However, also in the image transfer system 14, although there is a process of exchanging signals through wireless transfer in association with a change in the disposition of components, functions and operations of the components are the same as the functions and operations of the corresponding components in the image transfer system 1 of the first embodiment to the image transfer system 13 of the thirteenth embodiment. That is, the functions and operations of the components included in the imaging terminal 13100 and the display terminal 13200 in the image transfer system 14 can be easily understood from the above description of the components included in the imaging terminal and the display terminal in each of the image transfer system 1 of the first embodiment to the image transfer system 13 of the thirteenth embodiment. Therefore, a detailed description related to the components included in the image transfer system 14 will be omitted.

Figure 41:
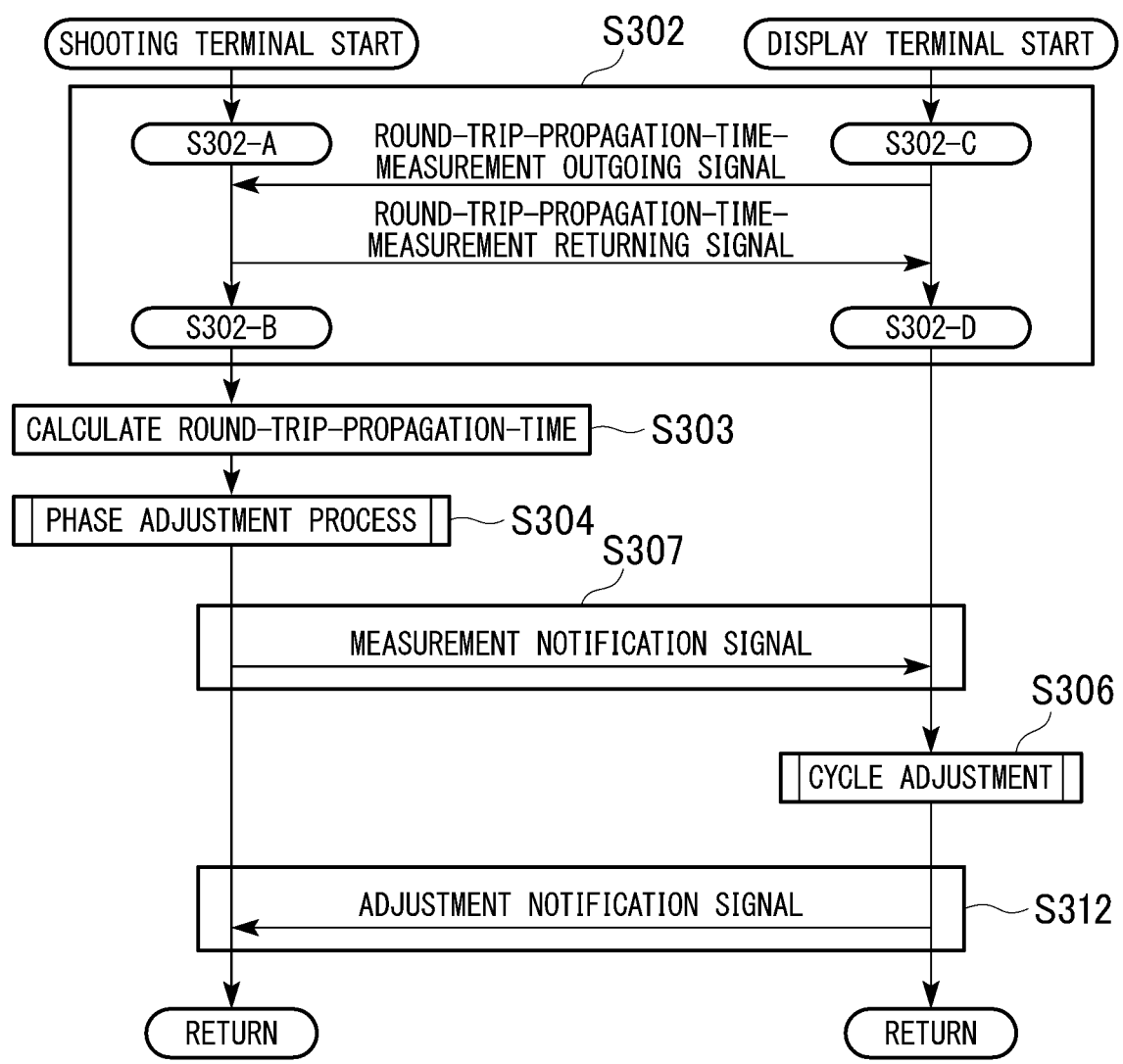
FIG. 41 is a flow chart showing processing procedures of the image transmission system according to the fourteenth embodiment of the present invention.

Next, operations of processing in the image transfer system 14 will be described. Meanwhile, similarly to the image transfer system 1 of the first embodiment, in the image transfer system 14, it is assumed that a phase adjustment unit not shown in the drawing is provided in the round-trip-propagation-time measurement unit 106 included in the imaging terminal 13100. That is, in the image transfer system 14, a configuration in which the phase adjustment unit not shown in the drawing is disposed at the same position as those in the image transfer system 1 of the first embodiment, and the image transfer system 10 of the tenth embodiment to the image transfer system 13 of the thirteenth embodiment is adopted. FIG. 41 is a flowchart showing a processing procedure of the image transfer system 14 in the fourteenth embodiment of the present invention.

In the image transfer system 14, a process of transmitting information used to adjust the period of an imaging synchronization signal which is generated by the synchronization signal generation unit 102 to the display terminal 13200 and a process of transmitting a cycle adjustment instruction including a cycle adjustment amount to the imaging terminal 13100 are added, in association with a change to a configuration in which the after-cycle-adjustment accuracy estimation unit 2105, the cycle-adjustment determination unit 3104, and the cycle adjustment unit 4101 are included in the display terminal 13200. However, an outline of the overall operation in the image transfer system 14 is the same as those of the image transfer system 1 of the first embodiment to the image transfer system 13 of the thirteenth embodiment. Therefore, also in the image transfer system 14, a description of an outline of the overall operation will be omitted, and a more specific operation of performing cycle adjustment for an imaging synchronization signal in the image transfer system 14 will be described.

Also in the image transfer system 14, when a cycle adjustment process is started, the imaging terminal 13100 transmits a round-trip-propagation-time-measurement outgoing signal to the display terminal 13200, and the display terminal 13200 transmits a round-trip-propagation-time-measurement returning signal corresponding to the round-trip-propagation-time-measurement outgoing signal to the imaging terminal 13100 in step S302. Meanwhile, the process of step S302 in the image transfer system 14 is the same as the process of step S302 in each of the image transfer system 1 of the first embodiment, and the image transfer system 10 of the tenth embodiment to the image transfer system 13 of the thirteenth embodiment.

Thereafter, also in the image transfer system 14, in step S303, the imaging terminal 13100 calculates a round trip propagation-time required for transmission and reception in wireless transfer between the imaging terminal 13100 and the display terminal 13200. Meanwhile, the process of step S303 in the image transfer system 14 is also the same as the process of step S303 in each of the image transfer system 1 of the first embodiment, and the image transfer system 10 of the tenth embodiment to the image transfer system 13 of the thirteenth embodiment.

Thereafter, also in the image transfer system 14, in step S304, the imaging terminal 13100 generates a phase adjustment instruction for the phase adjustment unit, not shown in the drawing, which is provided in the round-trip-propagation-time measurement unit 106 to adjust the phase of an imaging synchronization signal, on the basis of the round trip propagation-time required for transmission and reception in wireless transfer between the imaging terminal 13100 and the display terminal 13200 which is calculated in step S303, and updates a round trip propagation-time determination value. Meanwhile, the process of step S304 in the image transfer system 14 is also the same as the process of step S304 in each of the image transfer system 1 of the first embodiment, and the image transfer system 10 of the tenth embodiment to the image transfer system 13 of the thirteenth embodiment.

Thereafter, also in the image transfer system 14, in step S307, the imaging terminal 13100 generates a measurement notification signal including information of the calculated round trip propagation-time and transmits the generated measurement notification signal to the display terminal 13200. Meanwhile, the process of step S307 in the image transfer system 14 and the measurement notification signal generated in the process of step S307 and transmitted to the display terminal 13200 are the same as the process of step S307 and the measurement notification signal in the image transfer system 13 of the thirteenth embodiment. Thereby, the display terminal 13200 acquires information of the round trip propagation-time determination value transmitted from the imaging terminal 13100. In addition, each of the after-cycle-adjustment accuracy estimation unit 2105, the cycle-adjustment determination unit 3104, and the cycle adjustment unit 4101 which are included in the display terminal 13200 acquires the pieces of information transmitted from the imaging terminal 13100 through the round-trip-propagation-time-measurement assistance unit 202.

Thereafter, in the image transfer system 14, in step S306, the display terminal 13200 adjusts the period of an imaging synchronization signal on the basis of information transmitted from the imaging terminal 13100, that is, information of the plurality of round trip propagation-time determination values updated in step S304 by the imaging terminal 13100, similar to the processes in step S306 in the image transfer system 1 of the first embodiment. More specifically, the after-cycle-adjustment accuracy estimation unit 2105 included in the display terminal 13200 estimates (calculates) a period-adjusted accuracy estimation value of an imaging synchronization signal in a case where cycle adjustment is temporarily executed on the basis of the information of the plurality of round trip propagation-time determination values transmitted from the imaging terminal 13100 and outputs the estimated period-adjusted accuracy estimation value to the cycle-adjustment determination unit 3104 (step S2106). In addition, the cycle-adjustment determination unit 3104 included in the display terminal 13200 determines whether or not cycle adjustment for an imaging synchronization signal is performed, on the basis of the period-adjusted accuracy estimation value which is estimated (calculated) by the after-cycle-adjustment accuracy estimation unit 2105 (step S1004). Further, in a case where the cycle-adjustment determination unit 3104 determines that cycle adjustment for an imaging synchronization signal is performed, the cycle adjustment unit 4101 included in the display terminal 13200 calculates a cycle adjustment amount for performing cycle adjustment for an imaging synchronization signal which is generated by the synchronization signal generation unit 102 included in the imaging terminal 13100 and generates a cycle adjustment instruction (step S1206).

Thereafter, in the image transfer system 14, in step S312, the display terminal 13200 generates an adjustment notification signal including information of the cycle adjustment instruction including the cycle adjustment amount calculated by the cycle adjustment unit 4101 and transmits the generated adjustment notification signal to the imaging terminal 13100. Meanwhile, the process of step S312 in the image transfer system 14 and the adjustment notification signal generated in the process of step S312 and transmitted to the imaging terminal 13100 are the same as the process of step S312 and the adjustment notification signal in the image transfer system 5 of the fifth embodiment to the image transfer system 8 of the eighth embodiment, and the image transfer system 11 of the eleventh embodiment to the image transfer system 13 of the thirteenth embodiment. Thereby, the synchronization signal generation unit 102 provided in the imaging terminal 13100 acquires information of the cycle adjustment instruction including the cycle adjustment amount transmitted from the cycle adjustment unit 4101 provided in the display terminal 13200 through the round-trip-propagation-time measurement unit 106. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 4101.

Meanwhile, the phase adjustment instruction transmitted from the phase adjustment unit, not shown in the drawing, which is provided in the round-trip-propagation-time measurement unit 106 included in the imaging terminal 13100 is also output to the synchronization signal generation unit 102. Thereby, the synchronization signal generation unit 102 adjusts the phase of an imaging synchronization signal to be generated, in response to the phase adjustment instruction output from the phase adjustment unit, not shown in the drawing, which is provided in the round-trip-propagation-time measurement unit 106.

In this manner, in the image transfer system 14, the imaging terminal 13100 transmits a round-trip-propagation-time-measurement outgoing signal and calculates a round trip propagation-time in wireless transfer between the imaging terminal 13100 and the display terminal 13200. Further, in the image transfer system 14, the imaging terminal 13100 performs a process of updating a round trip propagation-time determination value and transmits information of a plurality of round trip propagation-time determination values updated, information of a round trip propagation-time, information of a scheduled transmission time of a round-trip-propagation-time-measurement outgoing signal, information of a scheduled transmission time included in a received round-trip-propagation-time-measurement returning signal, and a phase adjustment instruction to the display terminal 13200. Thereby, in the image transfer system 14, the display terminal 13200 performs a process of estimating (calculating) a period-adjusted accuracy estimation value in a case where cycle adjustment for an imaging synchronization signal is temporarily executed, a process of determining whether or not cycle adjustment for an imaging synchronization signal which is generated by the synchronization signal generation unit 102 included in the imaging terminal 13100 is performed, and a process of calculating a cycle adjustment amount for performing cycle adjustment for an imaging synchronization signal to generate a cycle adjustment instruction, on the basis of the pieces of information transmitted from the imaging terminal 13100. Further, in the image transfer system 14, the display terminal 13200 transmits information of the cycle adjustment instruction, including the calculated cycle adjustment amount, to the imaging terminal 13100. Thereby, in the image transfer system 14, the imaging terminal 13100 adjusts the periods of an imaging synchronization signal and a display synchronization signal so as not to be shifted with the elapse of time, in response to the cycle adjustment instruction transmitted from the display terminal 13200.

Meanwhile, similarly to the image transfer system 1 of the first embodiment to the image transfer system 13 of the thirteenth embodiment, also in the image transfer system 14, when at least a process of updating a round trip propagation-time determination value is performed in step S304, the after-cycle-adjustment accuracy estimation unit 2105 included in the display terminal 13200 can estimate the accuracy of an imaging synchronization signal (that is, calculate a period-adjusted accuracy estimation value). Therefore, similarly to the image transfer system 1 of the first embodiment to the image transfer system 13 of the thirteenth embodiment, also in the image transfer system 14, the phase adjustment unit not shown in the drawing does not necessarily need to adjust the phase of an imaging synchronization signal in step S304 and may be able to update a round trip propagation-time calculated by the round-trip-propagation-time measurement unit 106 as a round trip propagation-time determination value.

With such a configuration and processing procedure, in the image transfer system 14, the imaging terminal 13100 transmits a round-trip-propagation-time-measurement outgoing signal and measures (calculates) a round trip propagation-time in wireless transfer between the imaging terminal 13100 and the display terminal 13200 to update a round trip propagation-time determination value. Further, in the image transfer system 14, the display terminal 13200 estimates (calculates) a period-adjusted accuracy estimation value in a case where cycle adjustment for an imaging synchronization signal is temporarily executed, determines whether or not cycle adjustment for an imaging synchronization signal is performed in the imaging terminal 13100, and calculates a cycle adjustment amount for adjusting the period of an imaging synchronization signal to generate a cycle adjustment instruction. Further, in the image transfer system 14, the imaging terminal 13100 adjusts the phase or period (at least a period) of an imaging synchronization signal to be generated, in response to the phase adjustment instruction generated by the display terminal 13200. Thereby, similarly to the image transfer system 1 of the first embodiment to the image transfer system 13 of the thirteenth embodiment, also in the image transfer system 14, the phase or period (at least a period) of an imaging synchronization signal which is generated by the imaging terminal 13100 (more specifically, the synchronization signal generation unit 102) is adjusted so as to match the phase or period (at least a period) of a display synchronization signal which is generated by the display terminal 13200. That is, similarly to the image transfer system 1 of the first embodiment to the image transfer system 13 of the thirteenth embodiment, also in the image transfer system 14, a timing when the imaging terminal 13100 wirelessly transfers captured image data of an image captured by an imaging unit not shown in the drawing to the display terminal 13200 is matched to a timing when the display terminal 13200 displays an image corresponding to the captured image data on a display unit not shown in the drawing. Thereby, similarly to the image transfer system 1 of the first embodiment to the image transfer system 13 of the thirteenth embodiment, also in the image transfer system 14, the display terminal 13200 can stably display an image corresponding to captured image data wirelessly transferred from the imaging terminal 13100 on the display unit not shown in the drawing.

As described above, the image transfer system 14 of the fourteenth embodiment performs transmission and reception of a round-trip-propagation-time-measurement outgoing signal and a round-trip-propagation-time-measurement returning signal between the round-trip-propagation-time measurement unit 106 included in the imaging terminal 13100 and the round-trip-propagation-time-measurement assistance unit 202 included in the display terminal 13200 after wireless connection between the imaging terminal 13100 and the display terminal 13200 is established. Further, in the image transfer system 14 of the fourteenth embodiment, the round-trip-propagation-time measurement unit 106 calculates a round trip propagation-time required for transmission and reception in wireless transfer between the imaging terminal 13100 and the display terminal 13200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round-trip-propagation-time-measurement assistance unit 202. Further, in the image transfer system 14 of the fourteenth embodiment, the round-trip-propagation-time measurement unit 106 (more specifically, the phase adjustment unit not shown in the drawing) updates the round trip propagation-time calculated by the round-trip-propagation-time measurement unit 106 as a round trip propagation-time determination value. Further, in the image transfer system 14 of the fourteenth embodiment, the round-trip-propagation-time measurement unit 106 transmits information for adjusting the period of an imaging synchronization signal in the imaging terminal 13100 to the display terminal 13200. Further, in the image transfer system 14 of the fourteenth embodiment, the after-cycle-adjustment accuracy estimation unit 2105 included in the display terminal 13200 estimates (calculates) a period-adjusted accuracy estimation value of an imaging synchronization signal in a case where cycle adjustment is temporarily executed. Further, in the image transfer system 14 of the fourteenth embodiment, the cycle-adjustment determination unit 3104 included in the imaging terminal 13100 determines whether or not cycle adjustment for an imaging synchronization signal which is generated by the synchronization signal generation unit 102 included in the imaging terminal 13100 is performed, on the basis of the period-adjusted accuracy estimation value calculated by the after-cycle-adjustment accuracy estimation unit 2105. Further, in the image transfer system 14 of the fourteenth embodiment, in a case where a cycle adjustment execution determination result indicates that cycle adjustment for an imaging synchronization signal which is generated by the synchronization signal generation unit 102 included in the imaging terminal 13100 is performed, the cycle adjustment unit 4101 included in the display terminal 13200 calculates a cycle adjustment amount for performing cycle adjustment for an imaging synchronization signal to generate a cycle adjustment instruction. Further, in the image transfer system 14 of the fourteenth embodiment, the cycle adjustment unit 4101 transmits information of a cycle adjustment instruction including a cycle adjustment amount for adjusting the period of an imaging synchronization signal in the imaging terminal 13100 to the imaging terminal 13100. Thereby, in the image transfer system 14 of the fourteenth embodiment, the synchronization signal generation unit 102 adjusts the period of an imaging synchronization signal to be generated by an amount of cycle adjustment, in response to the cycle adjustment instruction which is transmitted from the cycle adjustment unit 4101.

Thereby, similarly to the image transfer system 1 of the first embodiment to the image transfer system 13 of the thirteenth embodiment, also in the image transfer system 14 of the fourteenth embodiment, the phase or period (at least a period) of an imaging synchronization signal can be matched to the phase or period (at least a period) of a display synchronization signal. That is, also in the image transfer system 14 of the fourteenth embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 14 of the fourteenth embodiment, the same effects as those in the image transfer system 1 of the first embodiment to the image transfer system 13 of the thirteenth embodiment can be obtained. That is, similarly to the image transfer system 1 of the first embodiment to the image transfer system 13 of the thirteenth embodiment, also in the image transfer system 14 of the fourteenth embodiment, it is possible to wirelessly transfer captured image data from the imaging terminal 13100 to the display terminal 13200 without exceeding a validity period of a display image and to stably display a display image corresponding to the captured image data transmitted from the imaging terminal 13100 in the display terminal 13200.

Moreover, in the image transfer system 14 of the fourteenth embodiment, the display terminal 13200 estimates (calculates) a period-adjusted accuracy estimation value, determines whether or not cycle adjustment for an imaging synchronization signal is performed, calculates a cycle adjustment amount, and generates a cycle adjustment instruction. Thereby, in the image transfer system 14 of the fourteenth embodiment, the imaging terminal 13100 may only calculate a round trip propagation-time required for transmission and reception in wireless transfer between the imaging terminal 13100 and the display terminal 13200 and perform cycle adjustment for an imaging synchronization signal in response to the cycle adjustment instruction. That is, in the image transfer system 14 of the fourteenth embodiment, it is not necessary to estimate (calculate) a period-adjusted accuracy estimation value, determine whether or not cycle adjustment for an imaging synchronization signal is performed, calculate a cycle adjustment amount, and generate a cycle adjustment instruction in the imaging terminal 13100, and thus it is possible to reduce a load of processing performed in the imaging terminal 13100.

Fifteenth Embodiment

Figure 42:
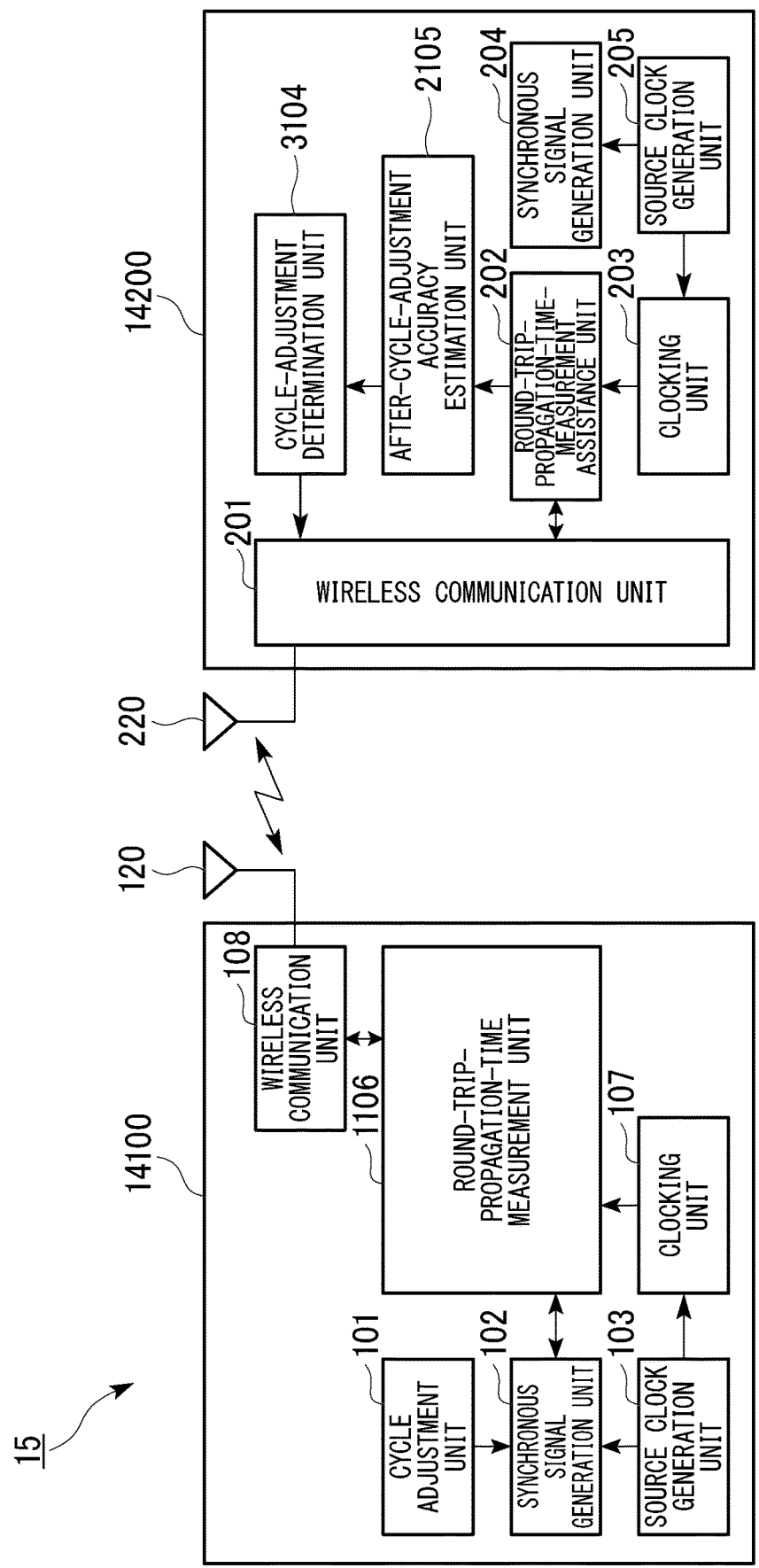
FIG. 42 is a block diagram showing a schematic configuration of an image transmission system according to a fifteenth embodiment of the present invention.

Hereinafter, an image transfer system of a fifteenth embodiment of the present invention will be described. FIG. 42 is a block diagram showing a schematic configuration of the image transfer system in the fifteenth embodiment of the present invention. An image transfer system 15 includes an imaging terminal 14100 and a display terminal 14200. The imaging terminal 14100 includes a synchronization signal generation unit 102, a cycle adjustment unit 101, a source oscillation clock generation unit 103, a wireless communication unit 108, a round-trip-propagation-time measurement unit 106, a clocking unit 107, and an antenna 120. In addition, the display terminal 14200 includes a synchronous signal generation unit 204, a source oscillation clock generation unit 205, a wireless communication unit 201, a round-trip-propagation-time-measurement assistance unit 202, a clocking unit 203, an after-cycle-adjustment accuracy estimation unit 2105, a cycle-adjustment determination unit 3104, and an antenna 220.

Meanwhile, also in FIG. 42, in components of the image transfer system 15, the same components as the components included in the image transfer system 1 of the first embodiment to the image transfer system 14 of the fourteenth embodiment are denoted by the same reference numerals and signs.

Similarly to the image transfer system 1 of the first embodiment to the image transfer system 14 of the fourteenth embodiment, the image transfer system 15 is also an image transfer system configured such that transmission and reception of a round-trip-propagation-time-measurement outgoing signal and a round-trip-propagation-time-measurement returning signal are performed between the imaging terminal 14100 and the display terminal 14200, and the imaging terminal 14100 adjusts the phase or period (at least a period) of an imaging synchronization signal to be generated so as to match the phase or period (at least a period) of a display synchronization signal which is generated by the display terminal 14200. Meanwhile, similarly to the image transfer system 1 of the first embodiment, and the image transfer system 10 of the tenth embodiment to the image transfer system 14 of the fourteenth embodiment, the image transfer system 15 is an image transfer system in which the imaging terminal 14100 transmits a round-trip-propagation-time-measurement outgoing signal to the display terminal 14200 to calculate a round trip propagation-time in wireless transfer between the imaging terminal 14100 and the display terminal 14200, and the imaging terminal 14100 adjusts the phase or period (at least a period) of an imaging synchronization signal to be generated.

However, in the image transfer system 15, some components included in the imaging terminal 9100 in the image transfer system 10 of the tenth embodiment are moved to the display terminal 14200. More specifically, in the image transfer system 15, the after-cycle-adjustment accuracy estimation unit 2105 that replaces the after-cycle-adjustment accuracy estimation unit 105 included in the imaging terminal 9100 in the image transfer system 10 of the tenth embodiment is included in the display terminal 14200. Meanwhile, it can be said that a configuration of the image transfer system 15 is a configuration in which the cycle adjustment unit 4101 included in the display terminal 13200 in the image transfer system 14 of the fourteenth embodiment is returned to the imaging terminal 14100 as the cycle adjustment unit 101.

For this reason, in the image transfer system 15, the imaging terminal 14100 measures (calculates) a reciprocation time required for transmission and reception at the time of performing wireless transfer between the imaging terminal 14100 and the display terminal 14200 and transmits the measured round trip propagation-time to the display terminal 14200. Further, in the image transfer system 15, the display terminal 14200 estimates (calculates) a period-adjusted accuracy estimation value in a case where the period of an imaging synchronization signal which is generated by the synchronization signal generation unit 102 included in the imaging terminal 14100 is temporarily adjusted, and transmits a cycle adjustment execution determination result indicating a result obtained by determining whether or not cycle adjustment for an imaging synchronization signal is performed on the basis of the period-adjusted accuracy estimation value to the imaging terminal 14100. Further, in the image transfer system 15, in a case where the cycle adjustment execution determination result transmitted from the display terminal 14200 indicates that cycle adjustment for an imaging synchronization signal is performed, the imaging terminal 14100 adjusts the period of an imaging synchronization signal to be generated.

However, also in the image transfer system 15, although there is a process of exchanging signals through wireless transfer in association with a change in the disposition of components, functions and operations of the components are the same as the functions and operations of the corresponding components in the image transfer system 1 of the first embodiment to the image transfer system 14 of the fourteenth embodiment. That is, the functions and operations of the components included in the imaging terminal 14100 and the display terminal 14200 in the image transfer system 15 can be easily understood from the above description of the components included in the imaging terminal and the display terminal in each of the image transfer system 1 of the first embodiment to the image transfer system 14 of the fourteenth embodiment. Therefore, a detailed description related to the components included in the image transfer system 15 will be omitted.

Figure 43:
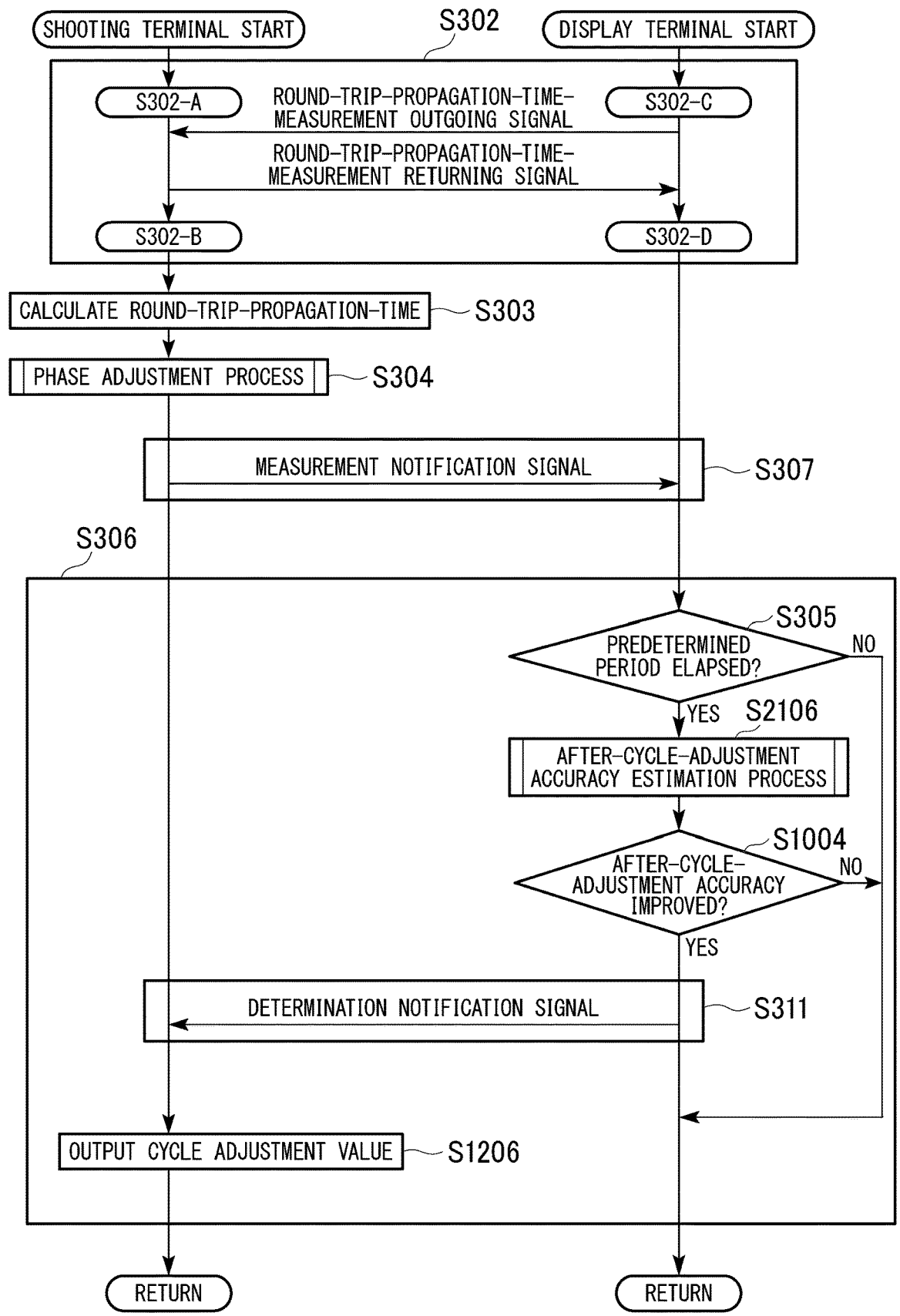
FIG. 43 is a flow chart showing processing procedures of the image transmission system according to the fifteenth embodiment of the present invention.

Next, operations of processing in the image transfer system 15 will be described. Meanwhile, similarly to the image transfer system 1 of the first embodiment, in the image transfer system 15, it is assumed that a phase adjustment unit not shown in the drawing is included in the round-trip-propagation-time measurement unit 106 included in the imaging terminal 14100. That is, in the image transfer system 15, a configuration in which the phase adjustment unit not shown in the drawing is disposed at the same position as those in the image transfer system 1 of the first embodiment, and the image transfer system 10 of the tenth embodiment to the image transfer system 14 of the fourteenth embodiment is adopted. FIG. 43 is a flowchart showing a processing procedure of the image transfer system 15 in the fifteenth embodiment of the present invention.

In the image transfer system 15, a process of transmitting information used to adjust the period of an imaging synchronization signal which is generated by the synchronization signal generation unit 102 to the display terminal 14200 and a process of transmitting information of a period-adjusted accuracy estimation value and information of a cycle adjustment execution determination result to the imaging terminal 14100 are added, in association with a change to a configuration in which the after-cycle-adjustment accuracy estimation unit 2105 and the cycle-adjustment determination unit 3104 are included in the display terminal 14200. However, an outline of the overall operation in the image transfer system 15 is the same as those of the image transfer system 1 of the first embodiment to the image transfer system 14 of the fourteenth embodiment. Therefore, also in the image transfer system 15, a description of an outline of the overall operation will be omitted, and a more specific operation of performing cycle adjustment for an imaging synchronization signal in the image transfer system 15 will be described.

Also in the image transfer system 15, when a cycle adjustment process is started, the imaging terminal 14100 transmits a round-trip-propagation-time-measurement outgoing signal to the display terminal 14200, and the display terminal 14200 transmits a round-trip-propagation-time-measurement returning signal corresponding to the round-trip-propagation-time-measurement outgoing signal to the imaging terminal 14100 in step S302. Meanwhile, the process of step S302 in the image transfer system 15 is the same as the process of step S302 in each of the image transfer system 1 of the first embodiment, and the image transfer system 10 of the tenth embodiment to the image transfer system 14 of the fourteenth embodiment.

Thereafter, also in the image transfer system 15, in step S303, the imaging terminal 14100 calculates a round trip propagation-time required for transmission and reception in wireless transfer between the imaging terminal 14100 and the display terminal 14200. Meanwhile, the process of step S303 in the image transfer system 15 is also the same as the process of step S303 in each of the image transfer system 1 of the first embodiment, and the image transfer system 10 of the tenth embodiment to the image transfer system 14 of the fourteenth embodiment.

Thereafter, also in the image transfer system 15, in step S304, the imaging terminal 14100 generates a phase adjustment instruction for the phase adjustment unit, not shown in the drawing, which is provided in the round-trip-propagation-time measurement unit 106 to adjust the phase of an imaging synchronization signal, on the basis of the round trip propagation-time required for transmission and reception in wireless transfer between the imaging terminal 14100 and the display terminal 14200 which is calculated in step S303, and updates a round trip propagation-time determination value. Meanwhile, the process of step S304 in the image transfer system 15 is also the same as the process of step S304 in each of the image transfer system 1 of the first embodiment, and the image transfer system 10 of the tenth embodiment to the image transfer system 14 of the fourteenth embodiment.

Thereafter, also in the image transfer system 15, in step S307, the imaging terminal 14100 generates a measurement notification signal including information of the calculated round trip propagation-time and transmits the generated measurement notification signal to the display terminal 14200. Meanwhile, the process of step S307 in the image transfer system 15 and the measurement notification signal generated in the process of step S307 and transmitted to the display terminal 13200 are the same as the process of step S307 and the measurement notification signal in the image transfer system 13 of the thirteenth embodiment and the image transfer system 14 of the fourteenth embodiment. Thereby, each of the after-cycle-adjustment accuracy estimation unit 2105 and the cycle-adjustment determination unit 3104 which are included in the display terminal 14200 acquires the pieces of information transmitted from the imaging terminal 14100 through the round-trip-propagation-time-measurement assistance unit 202.

Thereafter, in the image transfer system 15, in step S306, the period of an imaging synchronization signal is adjusted on the basis of the information of the plurality of round trip propagation-time determination values updated in step S304. However, in the image transfer system 15, the display terminal 14200 estimates (calculates) a period-adjusted accuracy estimation value of an imaging synchronization signal in a case where cycle adjustment is temporarily executed, and determines whether or not cycle adjustment for an imaging synchronization signal is performed on the basis of the estimated (calculated) period-adjusted accuracy estimation value. Further, in the image transfer system 15, the imaging terminal 14100 calculates a cycle adjustment amount for performing cycle adjustment for an imaging synchronization signal and outputs a cycle adjustment instruction to the synchronization signal generation unit 102.

For this reason, in the image transfer system 15, in step S305 included in step S306, the after-cycle-adjustment accuracy estimation unit 2105 included in the display terminal 14200 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 2105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 2105 determines that cycle adjustment is performed and calculates a period-adjusted accuracy estimation value in step S2106 included in step S306. Meanwhile, the process of step S305 and the process of step S2106 which are included in step S306 in the image transfer system 15 are the same as the process of step S305 and the process of step S2106 which are included in step S306 in each of the image transfer system 3 of the third embodiment, the image transfer system 4 of the fourth embodiment, the image transfer system 6 of the sixth embodiment, and the image transfer system 13 of the thirteenth embodiment.

Further, in the image transfer system 15, in step S1004 included in step S306, the cycle-adjustment determination unit 3104 included in the display terminal 14200 determines whether or not cycle adjustment for an imaging synchronization signal which is generated by the synchronization signal generation unit 102 included in the imaging terminal 14100 is performed, on the basis of the calculated period-adjusted accuracy estimation value. Further, in a case where the cycle-adjustment determination unit 3104 determines that cycle adjustment for an imaging synchronization signal is performed because an estimated accuracy of the imaging synchronization signal has been improved compared with the current accuracy of the imaging synchronization signal, the cycle adjustment execution determination unit generates a cycle adjustment execution determination result indicating a determination result. Meanwhile, the process of step S1004 included in step S306 in the image transfer system 15 is the same as the process of step S1004 included in step S306 in the image transfer system 4 of the fourth embodiment.

Thereafter, in the image transfer system 15, in step S311 included in step S306, the display terminal 14200 generates a determination notification signal including information of the cycle adjustment execution determination result obtained by the cycle-adjustment determination unit 3104 and transmits the generated determination notification signal to the display terminal 14200. Meanwhile, the process of step S311 included in step S306 in the image transfer system 15 and the determination notification signal generated in the process of step S311 and transmitted to the imaging terminal 14100 are the same as the process of step S311 included in step S306 and the determination notification signal in each of the image transfer system 4 of the fourth embodiment, the image transfer system 9 of the ninth embodiment, and the image transfer system 10 of the tenth embodiment. Thereby, the cycle adjustment unit 101 provided in the imaging terminal 14100 acquires information of the cycle adjustment execution determination result obtained by the cycle-adjustment determination unit 3104 provided in the display terminal 14200 through the round-trip-propagation-time measurement unit 106.

Further, in the image transfer system 15, in step S1206 included in step S306, the imaging terminal 14100 calculates a cycle adjustment amount for performing cycle adjustment for an imaging synchronization signal on the basis of information such as a round trip propagation-time determination value transmitted from the round-trip-propagation-time measurement unit 106 in accordance with the cycle adjustment execution determination result transmitted from the display terminal 14200, and outputs the calculated cycle adjustment amount to the synchronization signal generation unit 102 together with a cycle adjustment instruction. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 101. Meanwhile, the process of step S1206 included in step S306 in the image transfer system 15 is the same as the process of step S1206 included in step S306 in each of the image transfer system 4 of the fourth embodiment, the image transfer system 9 of the ninth embodiment, and the image transfer system 10 of the tenth embodiment.

Meanwhile, the phase adjustment instruction transmitted from the phase adjustment unit, not shown in the drawing, which is provided in the round-trip-propagation-time measurement unit 106 included in the imaging terminal 14100 is also output to the synchronization signal generation unit 102. Thereby, the synchronization signal generation unit 102 adjusts the period of an imaging synchronization signal to be generated, in response to the phase adjustment instruction transmitted from the phase adjustment unit, not shown in the drawing, which is provided in the round-trip-propagation-time measurement unit 106.

In this manner, in the image transfer system 15, the imaging terminal 14100 transmits a round-trip-propagation-time-measurement outgoing signal and calculates a round trip propagation-time in wireless transfer between the imaging terminal 14100 and the display terminal 14200. Further, in the image transfer system 15, the imaging terminal 14100 performs a process of updating a round trip propagation-time determination value and transmits information of a plurality of round trip propagation-time determination values updated, information of a round trip propagation-time, information of a scheduled transmission time of a round-trip-propagation-time-measurement outgoing signal, information of a scheduled transmission time included in a received round-trip-propagation-time-measurement returning signal, and a phase adjustment instruction to the display terminal 14200. Thereby, in the image transfer system 15, the display terminal 14200 performs a process of estimating (calculating) a period-adjusted accuracy estimation value in a case where cycle adjustment for an imaging synchronization signal is temporarily executed and performs a process of determining whether or not cycle adjustment for an imaging synchronization signal which is generated by the synchronization signal generation unit 102 included in the imaging terminal 14100, on the basis of the pieces of information transmitted from the imaging terminal 14100. Further, in the image transfer system 15, the display terminal 14200 transmits information of the calculated period-adjusted accuracy estimation value and information of a cycle adjustment execution determination result which is a determination result to the imaging terminal 14100. Thereby, in the image transfer system 15, the imaging terminal 14100 calculates a cycle adjustment amount for performing cycle adjustment for an imaging synchronization signal in accordance with the information of the cycle adjustment execution determination result transmitted from the display terminal 14200, and outputs the calculated cycle adjustment amount to the synchronization signal generation unit 102 together with a cycle adjustment instruction. Thereby, in the image transfer system 15, the imaging terminal 14100 adjusts the periods of an imaging synchronization signal and a display synchronization signal so as not to be shifted with the elapse of time.

Meanwhile, similarly to the image transfer system 1 of the first embodiment to the image transfer system 14 of the fourteenth embodiment, also in the image transfer system 15, when at least a process of updating a round trip propagation-time determination value is performed in step S304, the after-cycle-adjustment accuracy estimation unit 2105 included in the display terminal 14200 can estimate the accuracy of an imaging synchronization signal (that is, calculate a period-adjusted accuracy estimation value). Therefore, similarly to the image transfer system 1 of the first embodiment to the image transfer system 14 of the fourteenth embodiment, also in the image transfer system 15, the phase adjustment unit not shown in the drawing does not necessarily need to adjust the phase of an imaging synchronization signal in step S304 and may be able to update a round trip propagation-time calculated by the round-trip-propagation-time measurement unit 106 as a round trip propagation-time determination value.

With such a configuration and processing procedure, in the image transfer system 15, the imaging terminal 14100 transmits a round-trip-propagation-time-measurement outgoing signal and measures (calculates) a round trip propagation-time in wireless transfer between the imaging terminal 14100 and the display terminal 14200 to update a round trip propagation-time determination value. Further, in the image transfer system 15, the display terminal 14200 estimates (calculates) a period-adjusted accuracy estimation value in a case where cycle adjustment for an imaging synchronization signal is temporarily executed, and determines whether or not cycle adjustment for an imaging synchronization signal is performed in the imaging terminal 14100. Further, in the image transfer system 15, the imaging terminal 14100 calculates a cycle adjustment amount for adjusting the period of an imaging synchronization signal in accordance with the cycle adjustment execution determination result obtained by the display terminal 14200, outputs a cycle adjustment instruction, and adjusts the phase or period (at least a period) of an imaging synchronization signal to be generated. Thereby, similarly to the image transfer system 1 of the first embodiment to the image transfer system 14 of the fourteenth embodiment, also in the image transfer system 15, the phase or period (at least a period) of an imaging synchronization signal generated by the imaging terminal 14100 (more specifically, the synchronization signal generation unit 102) is adjusted so as to match the phase or period (at least a period) of a display synchronization signal generated by the display terminal 14200. That is, similarly to the image transfer system 1 of the first embodiment to the image transfer system 14 of the fourteenth embodiment, also in the image transfer system 15, a timing when the imaging terminal 14100 wirelessly transfers captured image data of an image captured by an imaging unit not shown in the drawing to the display terminal 14200 is matched to a timing when the display terminal 14200 displays an image corresponding to the captured image data on a display unit not shown in the drawing. Thereby, similarly to the image transfer system 1 of the first embodiment to the image transfer system 14 of the fourteenth embodiment, also in the image transfer system 15, the display terminal 14200 can stably display an image corresponding to captured image data wirelessly transferred from the imaging terminal 14100 on the display unit not shown in the drawing.

As described above, the image transfer system 15 of the fifteenth embodiment performs transmission and reception of a round-trip-propagation-time-measurement outgoing signal and a round-trip-propagation-time-measurement returning signal between the round-trip-propagation-time measurement unit 106 included in the imaging terminal 14100 and the round-trip-propagation-time-measurement assistance unit 202 included in the display terminal 14200 after wireless connection between the imaging terminal 14100 and the display terminal 14200 is established. Further, in the image transfer system 15 of the fifteenth embodiment, the round-trip-propagation-time measurement unit 106 calculates a round trip propagation-time required for transmission and reception in wireless transfer between the imaging terminal 14100 and the display terminal 14200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round-trip-propagation-time-measurement assistance unit 202. Further, in the image transfer system 15 of the fifteenth embodiment, the round-trip-propagation-time measurement unit 106 (more specifically, the phase adjustment unit not shown in the drawing) updates the round trip propagation-time calculated by the round-trip-propagation-time measurement unit 106 as a round trip propagation-time determination value. Further, in the image transfer system 15 of the fifteenth embodiment, the round-trip-propagation-time measurement unit 106 transmits information for adjusting the period of an imaging synchronization signal in the imaging terminal 14100 to the display terminal 14200. Further, in the image transfer system 15 of the fifteenth embodiment, the after-cycle-adjustment accuracy estimation unit 2105 included in the display terminal 14200 estimates (calculates) a period-adjusted accuracy estimation value of an imaging synchronization signal in a case where cycle adjustment is temporarily executed. Further, in the image transfer system 15 of the fifteenth embodiment, the cycle-adjustment determination unit 3104 included in the display terminal 14200 determines whether or not cycle adjustment for an imaging synchronization signal which is generated by the synchronization signal generation unit 102 included in the imaging terminal 14100 is performed, on the basis of the period-adjusted accuracy estimation value calculated by the after-cycle-adjustment accuracy estimation unit 2105. Further, in the image transfer system 15 of the fifteenth embodiment, the cycle-adjustment determination unit 3104 transmits information for adjusting the period of an imaging synchronization signal in the imaging terminal 14100 to the imaging terminal 14100, inclusive of a cycle adjustment execution determination result and a period-adjusted accuracy estimation value calculated by the after-cycle-adjustment accuracy estimation unit 2105. Further, in the image transfer system 15 of the fifteenth embodiment, the cycle adjustment unit 101 included in the imaging terminal 14100 calculates a cycle adjustment amount for performing cycle adjustment for an imaging synchronization signal in a case where the cycle adjustment execution determination result indicates that cycle adjustment for an imaging synchronization signal is performed, and outputs the calculated cycle adjustment amount to the synchronization signal generation unit 102 together with a cycle adjustment instruction. Thereby, in the image transfer system 15 of the fifteenth embodiment, the synchronization signal generation unit 102 adjusts the period of an imaging synchronization signal to be generated by an amount of cycle adjustment, in response to the cycle adjustment instruction which is output from the cycle adjustment unit 101.

Thereby, similarly to the image transfer system 1 of the first embodiment to the image transfer system 14 of the fourteenth embodiment, also in the image transfer system 15 of the fifteenth embodiment, the phase or period (at least a period) of an imaging synchronization signal can be matched to the phase or period (at least a period) of a display synchronization signal. That is, also in the image transfer system 15 of the fifteenth embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 15 of the fifteenth embodiment, the same effects as those in the image transfer system 1 of the first embodiment to the image transfer system 14 of the fourteenth embodiment can be obtained. That is, similarly to the image transfer system 1 of the first embodiment to the image transfer system 14 of the fourteenth embodiment, also in the image transfer system 15 of the fifteenth embodiment, it is possible to wirelessly transfer captured image data from the imaging terminal 14100 to the display terminal 14200 without exceeding a validity period of a display image and to stably display a display image corresponding to the captured image data transmitted from the imaging terminal 14100 in the display terminal 14200.

Moreover, in the image transfer system 15 of the fifteenth embodiment, the display terminal 14200 estimates (calculates) a period-adjusted accuracy estimation value and determines whether or not cycle adjustment for an imaging synchronization signal is performed. Thereby, in the image transfer system 15 of the fifteenth embodiment, the imaging terminal 14100 may only calculate a roundtrip propagation-time required for transmission and reception in wireless transfer between the imaging terminal 14100 and the display terminal 14200, calculate a cycle adjustment amount, and generate a cycle adjustment instruction. That is, in the image transfer system 15 of the fifteenth embodiment, it is not necessary to estimate (calculate) a period-adjusted accuracy estimation value and determine whether or not cycle adjustment for an imaging synchronization signal is performed in the imaging terminal 14100, and thus it is possible to reduce a load of processing performed in the imaging terminal 14100.

Sixteenth Embodiment

Figure 44:
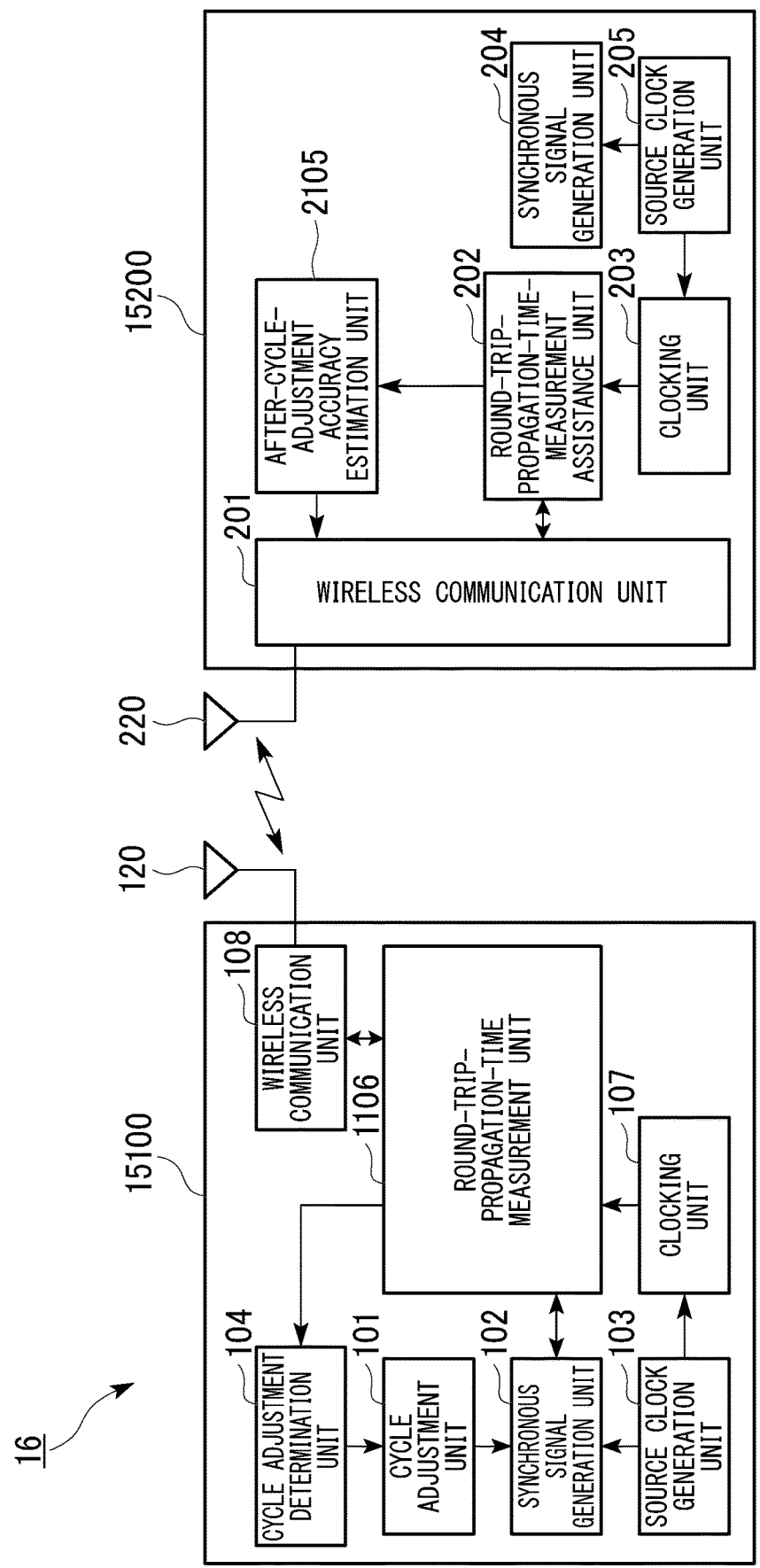
FIG. 44 is a block diagram showing a schematic configuration of an image transmission system according to a sixteenth embodiment of the present invention.

Hereinafter, an image transfer system of a sixteenth embodiment of the present invention will be described. FIG. 44 is a block diagram showing a schematic configuration of the image transfer system in the sixteenth embodiment of the present invention. An image transfer system 16 includes an imaging terminal 15100 and a display terminal 15200. The imaging terminal 15100 includes a synchronization signal generation unit 102, a cycle adjustment unit 101, a source oscillation clock generation unit 103, a wireless communication unit 108, a cycle adjustment determination unit 104, a round-trip-propagation-time measurement unit 106, a clocking unit 107, and an antenna 120. In addition, the display terminal 15200 includes a synchronous signal generation unit 204, a source oscillation clock generation unit 205, a wireless communication unit 201, a round-trip-propagation-time-measurement assistance unit 202, a clocking unit 203, an after-cycle-adjustment accuracy estimation unit 2105, and an antenna 220.

Meanwhile, also in FIG. 44, in components of the image transfer system 16, the same components as the components included in the image transfer system 1 of the first embodiment to the image transfer system 15 of the fifteenth embodiment are denoted by the same reference numerals and signs.

Similarly to the image transfer system 1 of the first embodiment to the image transfer system 15 of the fifteenth embodiment, the image transfer system 16 is also an image transfer system configured such that transmission and reception of a round-trip-propagation-time-measurement outgoing signal and a round-trip-propagation-time-measurement returning signal are performed between the imaging terminal 15100 and the display terminal 15200, and the imaging terminal 15100 adjusts the phase or period (at least a period) of an imaging synchronization signal to be generated so as to match the phase or period (at least a period) of a display synchronization signal which is generated by the display terminal 15200. Meanwhile, similarly to the image transfer system 1 of the first embodiment, and the image transfer system 10 of the tenth embodiment to the image transfer system 15 of the fifteenth embodiment, the image transfer system 16 is an image transfer system in which the imaging terminal 15100 transmits a round-trip-propagation-time-measurement outgoing signal to the display terminal 15200 to calculate a round trip propagation-time in wireless transfer between the imaging terminal 15100 and the display terminal 15200, and the imaging terminal 15100 adjusts the phase or period (at least a period) of an imaging synchronization signal to be generated.

However, in the image transfer system 16, some components included in the imaging terminal 100 in the image transfer system 1 of the first embodiment are moved to the display terminal 15200. More specifically, in the image transfer system 16, the after-cycle-adjustment accuracy estimation unit 2105 that replaces the after-cycle-adjustment accuracy estimation unit 105 included in the imaging terminal 100 in the image transfer system 1 of the first embodiment is included in the display terminal 15200. Meanwhile, it can be said that a configuration of the image transfer system 16 is a configuration in which the cycle-adjustment determination unit 3104 included in the display terminal 14200 in the image transfer system 15 of the fifteenth embodiment is returned to the imaging terminal 15100 as the cycle adjustment determination unit 104.

For this reason, in the image transfer system 16, the imaging terminal 15100 measures (calculates) a round trip propagation-time required for transmission and reception at the time of performing wireless transfer between the imaging terminal 15100 and the display terminal 15200 and transmits the measured round trip propagation-time to the display terminal 15200. Further, in the image transfer system 16, the display terminal 15200 estimates (calculates) a period-adjusted accuracy estimation value in a case where the period of an imaging synchronization signal which is generated by the synchronization signal generation unit 102 included in the imaging terminal 15100 is temporarily adjusted, and transmits the estimated period-adjusted accuracy estimation value to the imaging terminal 15100. Further, in the image transfer system 16, the imaging terminal 15100 determines whether or not cycle adjustment for an imaging synchronization signal which is generated by the synchronization signal generation unit 102 is performed on the basis of the period-adjusted accuracy estimation value transmitted from the display terminal 15200, and adjusts the period of an imaging synchronization signal to be generated.

However, also in the image transfer system 16, although there is a process of exchanging signals through wireless transfer in association with a change in the disposition of components, functions and operations of the components are the same as the functions and operations of the corresponding components in the image transfer system 1 of the first embodiment to the image transfer system 15 of the fifteenth embodiment. That is, the functions and operations of the components included in the imaging terminal 15100 and the display terminal 15200 in the image transfer system 16 can be easily understood from the above description of the components included in the imaging terminal and the display terminal in each of the image transfer system 1 of the first embodiment to the image transfer system 15 of the fifteenth embodiment. Therefore, a detailed description related to the components included in the image transfer system 16 will be omitted.

Figure 45:
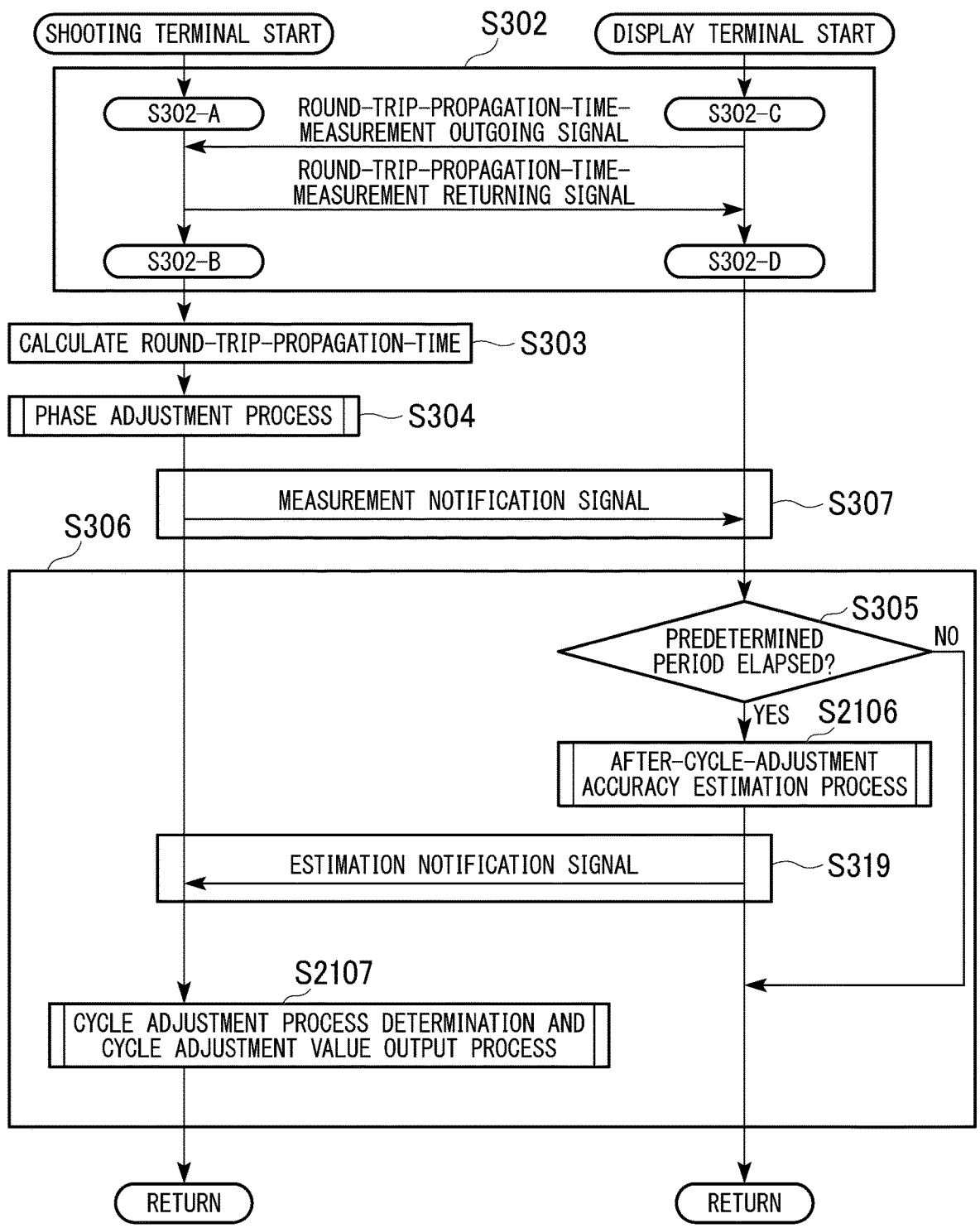
FIG. 45 is a flow chart showing processing procedures of the image transmission system according to the sixteenth embodiment of the present invention.

Next, operations of processing in the image transfer system 16 will be described. Meanwhile, similarly to the image transfer system 1 of the first embodiment, in the image transfer system 16, it is assumed that a phase adjustment unit not shown in the drawing is provided in the round-trip-propagation-time measurement unit 106 included in the imaging terminal 15100. That is, in the image transfer system 16, a configuration in which the phase adjustment unit not shown in the drawing is disposed at the same position as those in the image transfer system 1 of the first embodiment, and the image transfer system 10 of the tenth embodiment to the image transfer system 15 of the fifteenth embodiment is adopted. FIG. 45 is a flowchart showing a processing procedure of the image transfer system 16 in the sixteenth embodiment of the present invention.

In the image transfer system 16, a process of transmitting information used to adjust the period of an imaging synchronization signal which is generated by the synchronization signal generation unit 102 to the display terminal 15200 and a process of transmitting information of a period-adjusted accuracy estimation value to the imaging terminal 15100 are added, in association with a change to a configuration in which the after-cycle-adjustment accuracy estimation unit 2105 is included in the display terminal 15200. However, an outline of the overall operation in the image transfer system 16 is the same as those of the image transfer system 1 of the first embodiment to the image transfer system 15 of the fifteenth embodiment. Therefore, also in the image transfer system 16, a description of an outline of the overall operation will be omitted, and a more specific operation of performing cycle adjustment for an imaging synchronization signal in the image transfer system 16 will be described.

Also in the image transfer system 16, when a cycle adjustment process is started, the imaging terminal 15100 transmits a round-trip-propagation-time-measurement outgoing signal to the display terminal 15200, and the display terminal 15200 transmits a round-trip-propagation-time-measurement returning signal corresponding to the round-trip-propagation-time-measurement outgoing signal to the imaging terminal 15100 in step S302. Meanwhile, the process of step S302 in the image transfer system 16 is the same as the process of step S302 in each of the image transfer system 1 of the first embodiment, and the image transfer system 10 of the tenth embodiment to the image transfer system 15 of the fifteenth embodiment.

Thereafter, also in the image transfer system 16, in step S303, the imaging terminal 15100 calculates a round trip propagation-time required for transmission and reception in wireless transfer between the imaging terminal 15100 and the display terminal 15200. Meanwhile, the process of step S303 in the image transfer system 16 is also the same as the process of step S303 in each of the image transfer system 1 of the first embodiment, and the image transfer system 10 of the tenth embodiment to the image transfer system 15 of the fifteenth embodiment.

Thereafter, also in the image transfer system 16, in step S304, the imaging terminal 15100 generates a phase adjustment instruction for the phase adjustment unit, not shown in the drawing, which is provided in the round-trip-propagation-time measurement unit 106 to adjust the phase of an imaging synchronization signal, on the basis of the round trip propagation-time required for transmission and reception in wireless transfer between the imaging terminal 15100 and the display terminal 15200 which is calculated in step S303, and updates a round trip propagation-time determination value. Meanwhile, the process of step S304 in the image transfer system 16 is also the same as the process of step S304 in each of the image transfer system 1 of the first embodiment, and the image transfer system 10 of the tenth embodiment to the image transfer system 15 of the fifteenth embodiment.

Thereafter, also in the image transfer system 16, in step S307, the imaging terminal 15100 generates a measurement notification signal including information of the calculated round trip propagation-time and transmits the generated measurement notification signal to the display terminal 15200. Meanwhile, the process of step S307 in the image transfer system 16 and the measurement notification signal generated in the process of step S307 and transmitted to the display terminal 15200 are the same as the process of step S307 and the measurement notification signal in each of the image transfer system 13 of the thirteenth embodiment to the image transfer system 15 of the fifteenth embodiment. Thereby, the after-cycle-adjustment accuracy estimation unit 2105 provided in the display terminal 15200 acquires information of the round trip propagation-time determination value transmitted from the imaging terminal 15100 through the round-trip-propagation-time-measurement assistance unit 202.

Thereafter, in the image transfer system 16, in step S306, the period of an imaging synchronization signal is adjusted on the basis of the information of the plurality of round trip propagation-time determination values updated in step S304. However, in the image transfer system 16, the display terminal 15200 estimates (calculates) a period-adjusted accuracy estimation value of an imaging synchronization signal in a case where cycle adjustment is temporarily executed. Further, in the image transfer system 16, the imaging terminal 15100 determines whether or not cycle adjustment for an imaging synchronization signal is performed on the basis of the period-adjusted accuracy estimation value, calculates a cycle adjustment amount for performing cycle adjustment for an imaging synchronization signal, and outputs a cycle adjustment instruction to the synchronization signal generation unit 102.

For this reason, in the image transfer system 16, in step S305 included in step S306, the after-cycle-adjustment accuracy estimation unit 2105 included in the display terminal 15200 determines whether or not a predetermined period of time determined in advance has elapsed after the period of a previous imaging synchronization signal is adjusted. In a result of the determination in step S305, in a case where a predetermined period of time determined in advance has not elapsed after the period of the previous imaging synchronization signal is adjusted ("NO" in step S305), the after-cycle-adjustment accuracy estimation unit 2105 determines that cycle adjustment is not performed and terminates the process of step S305.

On the other hand, in a result of the determination in step S305, in a case where a predetermined period of time determined in advance has elapsed after the period of the previous imaging synchronization signal is adjusted ("YES" in step S305), the after-cycle-adjustment accuracy estimation unit 2105 determines that cycle adjustment is performed and calculates a period-adjusted accuracy estimation value in step S2106 included in step S306. Meanwhile, the process of step S305 and the process of step S2106 which are included in step S306 in the image transfer system 16 are the same as the process of step S305 and the process of step S2106 which are included in step S306 in each of the image transfer system 3 of the third embodiment, the image transfer system 4 of the fourth embodiment, the image transfer system 6 of the sixth embodiment, the image transfer system 13 of the thirteenth embodiment, and the image transfer system 15 of the fifteenth embodiment.

Thereafter, in the image transfer system 16, in step S319 included in step S306, the display terminal 15200 generates an estimation notification signal including information of the period-adjusted accuracy estimation value calculated by the after-cycle-adjustment accuracy estimation unit 2105 and transmits the generated estimation notification signal to the imaging terminal 15100. Meanwhile, the process of step S319 included in step S306 in the image transfer system 16 and the estimation notification signal generated in the process of step S319 and transmitted to the imaging terminal 15100 are the same as the process of step S319 included in step S306 and the estimation notification signal in each of the image transfer system 3 of the third embodiment, the image transfer system 6 of the sixth embodiment, and the image transfer system 13 of the thirteenth embodiment. Thereby, the cycle adjustment determination unit 104 provided in the imaging terminal 15100 acquires information of the period-adjusted accuracy estimation value calculated by the after-cycle-adjustment accuracy estimation unit 2105 provided in the display terminal 15200 through the round-trip-propagation-time measurement unit 106.

Further, in the image transfer system 16, in step S2107 included in step S306, the imaging terminal 15100 determines whether or not cycle adjustment for an imaging synchronization signal is performed on the basis of information of the period-adjusted accuracy estimation value transmitted from the display terminal 15200 and information such as a round trip propagation-time determination value which is output from the round-trip-propagation-time measurement unit 106, calculates a cycle adjustment amount for performing cycle adjustment for an imaging synchronization signal, and outputs the calculated cycle adjustment amount to the synchronization signal generation unit 102 together with a cycle adjustment instruction. Thereby, the synchronization signal generation unit 102 performs cycle adjustment for adjusting the period of an imaging synchronization signal to be generated by an amount of cycle adjustment, in response to the cycle adjustment instruction which is output from the cycle adjustment unit 101. Meanwhile, the process of step S2107 included in step S306 in the image transfer system 16 is the same as the process of step S2107 included in step S306 in each of the image transfer system 1 of the first embodiment and the image transfer system 3 of the third embodiment.

Meanwhile, the phase adjustment instruction transmitted from the phase adjustment unit, not shown in the drawing, which is provided in the round-trip-propagation-time measurement unit 106 included in the imaging terminal 15100 is also output to the synchronization signal generation unit 102. Thereby, the synchronization signal generation unit 102 adjusts the phase of an imaging synchronization signal to be generated, in response to the phase adjustment instruction output from the phase adjustment unit, not shown in the drawing, which is provided in the round-trip-propagation-time measurement unit 106.

In this manner, in the image transfer system 16, the imaging terminal 15100 transmits a round-trip-propagation-time-measurement outgoing signal and calculates a round trip propagation-time in wireless transfer between the imaging terminal 15100 and the display terminal 15200. Further, in the image transfer system 16, the imaging terminal 15100 performs a process of updating a round trip propagation-time determination value and transmits information of a plurality of round trip propagation-time determination values updated, information of a round trip propagation-time, information of a scheduled transmission time of a round-trip-propagation-time-measurement outgoing signal, information of a scheduled transmission time included in a received round-trip-propagation-time-measurement returning signal, and a phase adjustment instruction to the display terminal 15200. Thereby, in the image transfer system 16, the display terminal 15200 performs a process of estimating (calculating) a period-adjusted accuracy estimation value in a case where cycle adjustment for an imaging synchronization signal is temporarily executed on the basis of the pieces of information transmitted from the imaging terminal 15100. Further, in the image transfer system 16, the display terminal 15200 transmits information of the calculated period-adjusted accuracy estimation value to the imaging terminal 15100. Thereby, in the image transfer system 16, the imaging terminal 15100 determines whether or not cycle adjustment for an imaging synchronization signal which is generated by the synchronization signal generation unit 102 included in the imaging terminal 15100 is performed, on the basis of the period-adjusted accuracy estimation value transmitted from the display terminal 15200, calculates a cycle adjustment amount for performing cycle adjustment for an imaging synchronization signal, and outputs the calculated cycle adjustment amount to the synchronization signal generation unit 102 together with a cycle adjustment instruction. Thereby, in the image transfer system 16, the imaging terminal 15100 adjusts the periods of an imaging synchronization signal and a display synchronization signal so as not to be shifted with the elapse of time.

Meanwhile, similarly to the image transfer system 1 of the first embodiment to the image transfer system 15 of the fifteenth embodiment, also in the image transfer system 16, when at least a process of updating a round trip propagation-time determination value is performed in step S304, the after-cycle-adjustment accuracy estimation unit 2105 included in the display terminal 15200 can estimate the accuracy of an imaging synchronization signal (that is, calculate a period-adjusted accuracy estimation value). Therefore, similarly to the image transfer system 1 of the first embodiment to the image transfer system 15 of the fifteenth embodiment, also in the image transfer system 16, the phase adjustment unit not shown in the drawing does not necessarily need to adjust the phase of an imaging synchronization signal in step S304 and may be able to update a round trip propagation-time calculated by the round-trip-propagation-time measurement unit 106 as a round trip propagation-time determination value.

With such a configuration and processing procedure, in the image transfer system 16, the imaging terminal 15100 transmits a round-trip-propagation-time-measurement outgoing signal and measures (calculates) a round trip propagation-time in wireless transfer between the imaging terminal 15100 and the display terminal 15200 to update a round trip propagation-time determination value. Further, in the image transfer system 16, the display terminal 15200 estimates (calculates) a period-adjusted accuracy estimation value in a case where cycle adjustment for an imaging synchronization signal is temporarily executed. Further, in the image transfer system 16, the imaging terminal 15100 adjusts the phase or period (at least a period) of an imaging synchronization signal to be generated, on the basis of the period-adjusted accuracy estimation value estimated (calculated) by the display terminal 15200. Thereby, similarly to the image transfer system 1 of the first embodiment to the image transfer system 15 of the fifteenth embodiment, also in the image transfer system 16, the phase or period (at least a period) of an imaging synchronization signal generated by the imaging terminal 15100 (more specifically, the synchronization signal generation unit 102) is adjusted so as to match the phase or period (at least a period) of a display synchronization signal generated by the display terminal 15200. That is, similarly to the image transfer system 1 of the first embodiment to the image transfer system 15 of the fifteenth embodiment, also in the image transfer system 16, a timing when the imaging terminal 15100 wirelessly transfers captured image data of an image captured by an imaging unit not shown in the drawing to the display terminal 15200 is matched to a timing when the display terminal 15200 displays an image corresponding to the captured image data on a display unit not shown in the drawing. Thereby, similarly to the image transfer system 1 of the first embodiment to the image transfer system 15 of the fifteenth embodiment, also in the image transfer system 16, the display terminal 15200 can stably display an image corresponding to captured image data wirelessly transferred from the imaging terminal 15100 on the display unit not shown in the drawing.

As described above, the image transfer system 16 of the sixteenth embodiment performs transmission and reception of a round-trip-propagation-time-measurement outgoing signal and a round-trip-propagation-time-measurement returning signal between the round-trip-propagation-time measurement unit 106 included in the imaging terminal 15100 and the round-trip-propagation-time-measurement assistance unit 202 included in the display terminal 15200 after wireless connection between the imaging terminal 15100 and the display terminal 15200 is established. Further, in the image transfer system 16 of the sixteenth embodiment, the round-trip-propagation-time measurement unit 106 calculates a round trip propagation-time required for transmission and reception in wireless transfer between the imaging terminal 15100 and the display terminal 15200, on the basis of a transmission time of a round-trip-propagation-time-measurement outgoing signal and a reception time of a round-trip-propagation-time-measurement returning signal corresponding to the round-trip-propagation-time-measurement outgoing signal transmitted from the round-trip-propagation-time-measurement assistance unit 202. Further, in the image transfer system 16 of the sixteenth embodiment, the round-trip-propagation-time measurement unit 106 (more specifically, the phase adjustment unit not shown in the drawing) updates the round trip propagation-time calculated by the round-trip-propagation-time measurement unit 106 as a round trip propagation-time determination value. Further, in the image transfer system 16 of the sixteenth embodiment, the round-trip-propagation-time measurement unit 106 transmits information for adjusting the period of an imaging synchronization signal in the imaging terminal 15100 to the display terminal 15200. Further, in the image transfer system 16 of the sixteenth embodiment, the after-cycle-adjustment accuracy estimation unit 2105 included in the display terminal 15200 estimates (calculates) a period-adjusted accuracy estimation value of an imaging synchronization signal in a case where cycle adjustment is temporarily executed. Further, in the image transfer system 16 of the sixteenth embodiment, the after-cycle-adjustment accuracy estimation unit 2105 transmits information of the estimated (calculated) period-adjusted accuracy estimation value of the imaging synchronization signal to the imaging terminal 15100. Further, in the image transfer system 16 of the sixteenth embodiment, the cycle adjustment determination unit 104 included in the imaging terminal 15100 determines whether or not cycle adjustment for an imaging synchronization signal which is generated by the synchronization signal generation unit 102 included in the imaging terminal 15100 is performed, on the basis of the period-adjusted accuracy estimation value. Further, in the image transfer system 16 of the sixteenth embodiment, in a case where the cycle adjustment determination unit 104 determines that cycle adjustment for an imaging synchronization signal is performed, the cycle adjustment unit 101 included in the imaging terminal 15100 calculates a cycle adjustment amount for performing cycle adjustment for an imaging synchronization signal and outputs the calculated cycle adjustment amount to the synchronization signal generation unit 102 together with a cycle adjustment instruction. Thereby, in the image transfer system 16 of the sixteenth embodiment, the synchronization signal generation unit 102 adjusts the period of an imaging synchronization signal to be generated by an amount of cycle adjustment, in response to the cycle adjustment instruction which is transmitted from the cycle adjustment unit 101.

Thereby, similarly to the image transfer system 1 of the first embodiment to the image transfer system 15 of the fifteenth embodiment, also in the image transfer system 16 of the sixteenth embodiment, the phase or period (at least a period) of an imaging synchronization signal can be matched to the phase or period (at least a period) of a display synchronization signal. That is, also in the image transfer system 16 of the sixteenth embodiment, even when the periods of an imaging synchronization signal and a display synchronization signal are shifted with the elapse of time due to an error of a phase or a period between an imaging reference clock signal and a display reference clock signal, the phase or period (at least a period) of the imaging synchronization signal can be matched to the phase or period (at least a period) of the display synchronization signal. Thus, also in the image transfer system 16 of the sixteenth embodiment, the same effects as those in the image transfer system 1 of the first embodiment to the image transfer system 15 of the fifteenth embodiment can be obtained. That is, similarly to the image transfer system 1 of the first embodiment to the image transfer system 15 of the fifteenth embodiment, also in the image transfer system 16 of the sixteenth embodiment, it is possible to wirelessly transfer captured image data from the imaging terminal 15100 to the display terminal 15200 without exceeding a validity period of a display image and to stably display a display image corresponding to the captured image data transmitted from the imaging terminal 15100 in the display terminal 15200.

Moreover, in the image transfer system 16 of the sixteenth embodiment, the display terminal 15200 estimates (calculates) a period-adjusted accuracy estimation value. Thereby, in the image transfer system 16 of the sixteenth embodiment, it is not necessary to estimate (calculate) a period-adjusted accuracy estimation value in the imaging terminal 15100, and thus it is possible to reduce a load of processing performed in the imaging terminal 15100.

According to the embodiments of the present invention, an image transfer system (for example, the image transfer system 1) is an image transfer system including an imaging terminal (for example, the imaging terminal 100) transmitting captured image data at a period of an imaging timing (a timing signal, for example, an imaging synchronization signal) and a display terminal (for example, the display terminal 200) receiving captured image data and displaying the captured image data at a period of a display timing (a timing signal, for example, a display synchronization signal). The image transfer system includes a communication delay time calculation function (for example, the function of the round-trip-propagation-time measurement unit 106), a communication delay time calculation assistance function (for example, the function of the round-trip-propagation-time-measurement assistance unit 202), an accuracy estimation function (for example, the function of the after-cycle-adjustment accuracy estimation unit 105), an adjustment execution determination function (for example, the function of the cycle adjustment determination unit 104), and a cycle adjustment function (for example, the function of the cycle adjustment unit 101). The communication delay time calculation function, which is included in any one terminal out of the imaging terminal and the display terminal, is a function of generating a first signal for measurement (round-trip-propagation-time-measurement outgoing signal) in synchronization with the period of an imaging timing (for example, an imaging synchronization signal), transmitting the generated first signal to the other terminal, receiving a second signal for measurement (round-trip-propagation-time-measurement returning signal) corresponding to the round-trip-propagation-time-measurement outgoing signal transmitted from the other terminal, and calculating a communication delay time (round trip propagation-time=round trip propagation-time determination value) on the basis of a transmission timing of the round-trip-propagation-time-measurement outgoing signal, a reception timing of the round-trip-propagation-time-measurement returning signal, and elapsed time data (receiver elapsed time), included in the round-trip-propagation-time-measurement returning signal, which indicates an elapsed time from a reception timing of the round-trip-propagation-time-measurement outgoing signal in the other terminal to a transmission timing of the round-trip-propagation-time-measurement returning signal. The communication delay time calculation assistance function, which is included in the other terminal, is a function of receiving a round-trip-propagation-time-measurement outgoing signal, generating a round-trip-propagation-time-measurement returning signal including a receiver elapsed time, and transmitting the generated round-trip-propagation-time-measurement returning signal to one terminal. The accuracy estimation function, which is included in any one terminal out of the imaging terminal and the display terminal, is a function of setting any one of an imaging timing (for example, an imaging synchronization signal) and a display timing (for example, a display synchronization signal) to be an adjustment target timing (for example, an imaging synchronization signal) and calculating an accuracy estimation value (period-adjusted accuracy estimation value) obtained by estimating an accuracy after adjusting the period (cycle adjustment) of the adjustment target timing (for example, the imaging synchronization signal), on the basis of a plurality of communication delay times (round trip propagation-times=round trip propagation-time determination values) calculated for a period of time determined in advance and transmission timings of a plurality of outward path signals for round trip propagation-time measurement corresponding to the respective communication delay times (round trip propagation-times=round trip propagation-time determination values). The adjustment execution determination function, which is included in any one terminal out of the imaging terminal and the display terminal, is a function of determining whether or not a period-adjusted accuracy estimation value has been improved compared with the current accuracy of the adjustment target timing (for example, an imaging synchronization signal) on the basis of the period-adjusted accuracy estimation value and the current accuracy of the adjustment target timing (for example, the imaging synchronization signal) and determining whether or not the adjustment of the period (cycle adjustment) of an adjustment target timing (for example, an imaging synchronization signal) is performed in accordance with a determination result. The cycle adjustment function, which is included in any one terminal out of the imaging terminal and the display terminal, is a function of performing the adjustment of the period (cycle adjustment) of an adjustment target timing (for example, an imaging synchronization signal) in a case where it is determined that the adjustment of the period (cycle adjustment) of the adjustment target timing (for example, the imaging synchronization signal) is performed.

In addition, according to the embodiments of the present invention, the image transfer system (for example, the image transfer system 1) is configured such that the cycle adjustment function is a function of calculating an adjustment amount (cycle adjustment amount) for adjusting the period (cycle adjustment) of an adjustment target timing (for example, an imaging synchronization signal) on the basis of a period-adjusted accuracy estimation value, a transmission timing of a round-trip-propagation-time-measurement outgoing signal, and a transmission timing of a round-trip-propagation-time-measurement returning signal in a case where it is determined that the adjustment of the period (cycle adjustment) of the adjustment target timing (for example, the imaging synchronization signal) is performed, and adjusting the period (cycle adjustment) of the adjustment target timing (for example, the imaging synchronization signal) on the basis of the calculated cycle adjustment amount.

In addition, according to the embodiments of the present invention, the image transfer system (for example, the image transfer system 1) is configured such that the accuracy estimation function is a function of extracting a minimum communication delay time (minimum determination value) for each population by setting a plurality of communication delay times (round trip propagation-times=round trip propagation-time determination values) calculated within a period of time determined in advance to be a population, and calculating a period-adjusted accuracy estimation value on the basis of a difference between two minimum determination values extracted from a plurality of minimum determination values extracted from a plurality of populations and a difference between transmission timings of two outward path signals for round trip propagation-time measurement transmitted to respectively calculate the extracted two minimum determination values, the adjustment execution determination function is a function of determining that the period of an adjustment target timing (for example, an imaging synchronization signal) is adjusted in a case where the period-adjusted accuracy estimation value has been improved compared with the current accuracy of the adjustment target timing (for example, the imaging synchronization signal) and determining that the period of the adjustment target timing (for example, the imaging synchronization signal) is not adjusted in a case where the period-adjusted accuracy estimation value has not been improved compared with the current accuracy of the adjustment target timing (for example, the imaging synchronization signal), and the cycle adjustment function is a function of calculating a cycle adjustment amount on the basis of a period-adjusted accuracy estimation value, a difference between transmission timings of two outward path signals for round trip propagation-time measurement transmitted to respectively calculate two minimum determination values extracted at the time of calculating the period-adjusted accuracy estimation value, and a difference between transmission timings of two return path signals for round trip propagation-time measurement corresponding to the two outward path signals for roundtrip propagation-time measurement.

In addition, according to the embodiments of the present invention, the image transfer system (for example, the image transfer system 1) is configured such that the cycle adjustment function is a function of multiplying a ratio of a difference between transmission timings of two outward path signals for round trip propagation-time measurement to a difference between transmission timings of two return path signals for round trip propagation-time measurement by a period-adjusted accuracy estimation value to calculate a cycle adjustment amount.

In addition, according to the embodiments of the present invention, the image transfer system (for example, the image transfer system 1) is configured such that the accuracy estimation function is a function of calculating a period-adjusted accuracy estimation value by increasing the number of communication delay times (round trip propagation-times=round trip propagation-time determination values) included in a population in a case where it is determined that the period of an adjustment target timing (for example, an imaging synchronization signal) is not adjusted.

In addition, according to the embodiments of the present invention, the image transfer system (for example, the image transfer system 1) is configured such that the accuracy estimation function is a function of including communication delay times (round trip propagation-times=round trip propagation-time determination values), which are included in a population before increasing the number of communication delay times (round trip propagation-times=round trip propagation-time determination values), in the population including the increased number of communication delay times (round trip propagation-times=round trip propagation-time determination values).

In addition, according to the embodiments of the present invention, the image transfer system (for example, the image transfer system 1) is configured to further include a phase adjustment execution determination function (for example, the function of a phase adjustment unit not shown in the drawing) of determining whether or not the adjustment of a phase shift (phase adjustment) between an imaging timing (for example, an imaging synchronization signal) and a display timing (for example, a display synchronization signal) is performed on the basis of a communication delay time (round trip propagation-time=round trip propagation-time determination value).

In addition, according to the embodiments of the present invention, the image transfer system (for example, the image transfer system 1) is configured to further include a phase adjustment function (for example, the function of a phase adjustment unit not shown in the drawing) of calculating a phase adjustment amount for adjusting a phase shift (phase adjustment) between an imaging timing (for example, an imaging synchronization signal) and a display timing (for example, a display synchronization signal) on the basis of a communication delay time (round trip propagation-time=round trip propagation-time determination value) and adjusting the phase shift (phase adjustment) between the imaging timing (for example, he imaging synchronization signal) and the display timing (for example, the display synchronization signal) on the basis of the calculated phase adjustment amount.

In addition, according to the embodiments of the present invention, an imaging terminal (for example, the imaging terminal 100) is an imaging terminal in an image transfer system (for example, the image transfer system 1) including the imaging terminal (for example, the imaging terminal 100) transmitting captured image data at a period of an imaging timing (a timing signal, for example, an imaging synchronization signal) and a display terminal (for example, the display terminal 200) receiving captured image data and displaying the captured image data at a period of a display timing (a timing signal, for example, a display synchronization signal). The imaging terminal is configured to include a communication delay time calculation function (for example, the function of the round-trip-propagation-time measurement unit 106), an accuracy estimation function (for example, the function of the after-cycle-adjustment accuracy estimation unit 105), an adjustment execution determination function (for example, the function of the cycle adjustment determination unit 104), and a cycle adjustment function (for example, the function of the cycle adjustment unit 101). The communication delay time calculation function is a function of generating a first signal for measurement in synchronization with the period of an imaging timing (for example, an imaging synchronization signal), transmitting the generated first signal to a display terminal, receiving a second signal for measurement (round-trip-propagation-time-measurement returning signal) corresponding to the round-trip-propagation-time-measurement outgoing signal transmitted from the display terminal, and calculating a communication delay time (round trip propagation-time=round trip propagation-time determination value) on the basis of a transmission timing of the round-trip-propagation-time-measurement outgoing signal, a reception timing of the round-trip-propagation-time-measurement returning signal, and elapsed time data (receiver elapsed time), included in the round-trip-propagation-time-measurement returning signal, which indicates an elapsed time from a reception timing of the round-trip-propagation-time-measurement outgoing signal in the terminal to a transmission timing of the round-trip-propagation-time-measurement returning signal. The accuracy estimation function is a function of calculating an accuracy estimation value (period-adjusted accuracy estimation value) obtained by estimating an accuracy after adjusting the period (cycle adjustment) of the imaging timing (for example, the imaging synchronization signal), on the basis of a plurality of communication delay times (round trip propagation-times=round trip propagation-time determination values) calculated for a period of time determined in advance and transmission timings of a plurality of outward path signals for round trip propagation-time measurement corresponding to the respective communication delay times (round trip propagation-times=round trip propagation-time determination values). The adjustment execution determination function is a function of determining whether or not a period-adjusted accuracy estimation value has been improved compared with the current accuracy of the imaging timing (for example, the imaging synchronization signal) on the basis of the period-adjusted accuracy estimation value and the current accuracy of the imaging timing (for example, the imaging synchronization signal) and determining whether or not the adjustment of the period (cycle adjustment) of an imaging timing (for example, an imaging synchronization signal) is performed in accordance with a determination result. The cycle adjustment function is a function of adjusting the period (cycle adjustment) of an imaging timing (for example, an imaging synchronization signal) in a case where it is determined that the adjustment of the period (cycle adjustment) of the imaging timing (for example, the imaging synchronization signal) is performed.

In addition, according to the embodiments of the present invention, a display terminal (for example, the display terminal 200) is a display terminal in an image transfer system (for example, the image transfer system 1) that includes an imaging terminal (for example, the imaging terminal 100) transmitting captured image data at a period of an imaging timing (a timing signal, for example, an imaging synchronization signal) and the display terminal (for example, the display terminal 200) receiving captured image data and displaying the captured image data at a period of a display timing (a timing signal, for example, a display synchronization signal). The display terminal is configured to include a communication delay time calculation assistance function (for example, the function of the round-trip-propagation-time-measurement assistance unit 202) of receiving a first signal for measurement (round-trip-propagation-time-measurement outgoing signal) transmitted from the imaging terminal in synchronization with the period of an imaging timing (for example, an imaging synchronization signal), generating a second signal for measurement (round-trip-propagation-time-measurement returning signal) including elapsed time data indicating an elapsed time from a reception timing of the round-trip-propagation-time-measurement outgoing signal to a transmission timing of the second signal for measurement corresponding to the round-trip-propagation-time-measurement outgoing signal, and transmitting the generated second signal for measurement to the imaging terminal.

In addition, according to the embodiments of the present invention, an adjustment method is a method of adjusting periods of an imaging timing (for example, an imaging synchronization signal) and a display timing (for example, a display synchronization signal) so as to match each other (cycle adjustment) in an image transfer system (for example, the image transfer system 1) that includes an imaging terminal (for example, the imaging terminal 100) transmitting captured image data at a period of an imaging timing (a timing signal, for example, an imaging synchronization signal) and a display terminal (for example, the display terminal 200) receiving captured image data and displaying the captured image data at a period of a display timing (a timing signal, for example, a display synchronization signal). The adjustment method includes a process of generating a first signal for measurement (round-trip-propagation-time-measurement outgoing signal) in synchronization with the period of an imaging timing (for example, an imaging synchronization signal) and transmitting the generated first signal for measurement from any one terminal out of the imaging terminal and the display terminal to the other terminal, a process of receiving a round-trip-propagation-time-measurement outgoing signal in the other terminal, a process of generating a round-trip-propagation-time-measurement returning signal including elapsed time data (receiver elapsed time) indicating an elapsed time from a reception timing of the round-trip-propagation-time-measurement outgoing signal in the other terminal to a transmission timing of a second signal for measurement (round-trip-propagation-time-measurement returning signal) in the other terminal and transmitting the generated round-trip-propagation-time-measurement returning signal to one terminal, a process of receiving a round-trip-propagation-time-measurement returning signal in one terminal and calculating a communication delay time (round trip propagation-time=round trip propagation-time determination value) on the basis of a transmission timing of a round-trip-propagation-time-measurement outgoing signal, a reception timing of a round-trip-propagation-time-measurement returning signal, and a receiver elapsed time, a process of setting any one of an imaging timing (for example, an imaging synchronization signal) and a display timing (for example, a display synchronization signal) to be an adjustment target timing (for example, an imaging synchronization signal) in any one terminal out of the imaging terminal and the display terminal and calculating an accuracy estimation value (period-adjusted accuracy estimation value) obtained by estimating an accuracy after adjusting the period (cycle adjustment) of the adjustment target timing (for example, the imaging synchronization signal), on the basis of a plurality of communication delay times (round trip propagation-times=round trip propagation-time determination values) calculated for a period of time determined in advance and transmission timings of a plurality of outward path signals for round trip propagation-time measurement corresponding to the respective communication delay times (round trip propagation-times=round trip propagation-time determination values), a process of determining whether or not a period-adjusted accuracy estimation value has been improved compared with the current accuracy of the adjustment target timing (for example, an imaging synchronization signal) on the basis of the period-adjusted accuracy estimation value and the current accuracy of the adjustment target timing (for example, the imaging synchronization signal) in any one terminal out of the imaging terminal and the display terminal and determining whether or not the adjustment of the period (cycle adjustment) of an adjustment target timing (for example, an imaging synchronization signal) is performed in accordance with a determination result, and a process of adjusting the period (cycle adjustment) of an adjustment target timing (for example, an imaging synchronization signal) in any one terminal out of the imaging terminal and the display terminal in a case where it is determined that the adjustment of the period (cycle adjustment) of the adjustment target timing (for example, the imaging synchronization signal) is performed.

In addition, according to the embodiments of the present invention, an adjustment method is a method of adjusting periods of an imaging timing (for example, an imaging synchronization signal) and a display timing (for example, a display synchronization signal) so as to match each other (cycle adjustment) in an imaging terminal of an image transfer system (for example, the image transfer system 1) that includes the imaging terminal (for example, the imaging terminal 100) transmitting captured image data at a period of an imaging timing (a timing signal, for example, an imaging synchronization signal) and a display terminal (for example, the display terminal 200) receiving captured image data and displaying the captured image data at a period of a display timing (a timing signal, for example, a display synchronization signal). The adjustment method includes a process of generating a first signal for measurement (round-trip-propagation-time-measurement outgoing signal) in synchronization with the period of an imaging timing (for example, an imaging synchronization signal) and transmitting the generated first signal for measurement to the display terminal, a process of receiving a round-trip-propagation-time-measurement returning signal including elapsed time data (receiver elapsed time) indicating an elapsed time, transmitted from the display terminal, from a reception timing of a round-trip-propagation-time-measurement outgoing signal to a transmission timing of a second signal for measurement (round-trip-propagation-time-measurement returning signal) corresponding to the round-trip-propagation-time-measurement outgoing signal, a process of calculating a communication delay time (round trip propagation-time=round trip propagation-time determination value) on the basis of a transmission timing of a round-trip-propagation-time-measurement outgoing signal, a reception timing of a round-trip-propagation-time-measurement returning signal, and a receiver elapsed time, a process of calculating an accuracy estimation value (period-adjusted accuracy estimation value) obtained by estimating an accuracy after adjusting the period (cycle adjustment) of an imaging timing (for example, an imaging synchronization signal) on the basis of a plurality of communication delay times (round trip propagation-times=round trip propagation-time determination values) calculated for a period of time determined in advance and transmission timings of a plurality of outward path signals for round trip propagation-time measurement corresponding to the respective communication delay times (round trip propagation-times=round trip propagation-time determination values), a process of determining whether or not a period-adjusted accuracy estimation value has been improved compared with the current accuracy of the imaging timing (for example, the imaging synchronization signal) on the basis of the period-adjusted accuracy estimation value and the current accuracy of the adjustment target timing (for example, the imaging synchronization signal) and determining whether or not the adjustment of the period (cycle adjustment) of an imaging timing (for example, an imaging synchronization signal) is performed in accordance with a determination result, and a process of adjusting the period (cycle adjustment) of an imaging timing (for example, an imaging synchronization signal) in a case where it is determined that the adjustment of the period (cycle adjustment) of the imaging timing (for example, the imaging synchronization signal) is performed.

In addition, according to the embodiments of the present invention, an adjustment assistance method is a method of assisting adjustment (cycle adjustment) for matching periods of an imaging timing (for example, an imaging synchronization signal) and a display timing (for example, a display synchronization signal) in a display terminal of an image transfer system (for example, the image transfer system 1) that includes an imaging terminal (for example, the imaging terminal 100) transmitting captured image data at a period of an imaging timing (a timing signal, for example, an imaging synchronization signal) and the display terminal (for example, the display terminal 200) receiving captured image data and displaying the captured image data at a period of a display timing (a timing signal, for example, a display synchronization signal). The adjustment assistance method includes a process of receiving a first signal for measurement (round-trip-propagation-time-measurement outgoing signal) transmitted from the imaging terminal in synchronization with the period of an imaging timing (for example, an imaging synchronization signal), generating a round-trip-propagation-time-measurement returning signal including elapsed time data (receiver elapsed time) indicating an elapsed time from a reception timing of a round-trip-propagation-time-measurement outgoing signal to a transmission timing of a second signal for measurement (round-trip-propagation-time-measurement returning signal) corresponding to the round-trip-propagation-time-measurement outgoing signal, and transmitting the generated round-trip-propagation-time-measurement returning signal to the imaging terminal.

In addition, according to the embodiments of the present invention, an adjustment program is a program causing a computer to execute an adjustment method, an adjustment method is an adjustment method of adjusting periods of an imaging timing (for example, an imaging synchronization signal) and a display timing (for example, a display synchronization signal) so as to match each other (cycle adjustment) in an imaging terminal of an image transfer system (for example, the image transfer system 1) that includes the imaging terminal (for example, the imaging terminal 100) transmitting captured image data at a period of an imaging timing (a timing signal, for example, an imaging synchronization signal) and a display terminal (for example, the display terminal 200) receiving captured image data and displaying the captured image data at a period of a display timing (a timing signal, for example, a display synchronization signal). The adjustment program causes the computer to execute a process of generating a first signal for measurement (round-trip-propagation-time-measurement outgoing signal) in synchronization with the period of an imaging timing (for example, an imaging synchronization signal) and transmitting the generated first signal for measurement to the display terminal, a process of receiving a round-trip-propagation-time-measurement returning signal including elapsed time data (receiver elapsed time) indicating an elapsed time, transmitted from the display terminal, from a reception timing of a round-trip-propagation-time-measurement outgoing signal to a transmission timing of a second signal for measurement (round-trip-propagation-time-measurement returning signal) corresponding to the round-trip-propagation-time-measurement outgoing signal, a process of calculating a communication delay time (round trip propagation-time=round trip propagation-time determination value) on the basis of a transmission timing of a round-trip-propagation-time-measurement outgoing signal, a reception timing of a round-trip-propagation-time-measurement returning signal, and a receiver elapsed time, a process of calculating an accuracy estimation value (period-adjusted accuracy estimation value) obtained by estimating an accuracy after adjusting the period (cycle adjustment) of an imaging timing (for example, an imaging synchronization signal) on the basis of a plurality of communication delay times (round trip propagation-times=round trip propagation-time determination values) calculated for a period of time determined in advance and transmission timings of a plurality of outward path signals for round trip propagation-time measurement corresponding to the respective communication delay times (round trip propagation-times=round trip propagation-time determination values), a process of determining whether or not a period-adjusted accuracy estimation value has been improved compared with the current accuracy of the imaging timing (for example, the imaging synchronization signal) on the basis of the period-adjusted accuracy estimation value and the current accuracy of the imaging timing (for example, the imaging synchronization signal) and determining whether or not the adjustment of the period (cycle adjustment) of an imaging timing (for example, an imaging synchronization signal) is performed in accordance with a determination result, and a process of adjusting the period (cycle adjustment) of an imaging timing (for example, an imaging synchronization signal) in a case where it is determined that the adjustment of the period (cycle adjustment) of the imaging timing (for example, the imaging synchronization signal) is performed.

In addition, according to the embodiments of the present invention, an adjustment support program is a program causing a computer to execute an adjustment assistance method of assisting adjustment (cycle adjustment) for matching periods of an imaging timing (for example, an imaging synchronization signal) and a display timing (for example, a display synchronization signal) in a display terminal of an image transfer system (for example, the image transfer system 1) that includes an imaging terminal (for example, the imaging terminal 100) transmitting captured image data at a period of an imaging timing (a timing signal, for example, an imaging synchronization signal) and the display terminal (for example, the display terminal 200) receiving captured image data and displaying the captured image data at a period of a display timing (a timing signal, for example, a display synchronization signal). The adjustment support program causes the computer to execute a process of receiving a first signal for measurement (round-trip-propagation-time-measurement outgoing signal) transmitted from the imaging terminal in synchronization with the period of an imaging timing (for example, an imaging synchronization signal), generating a round-trip-propagation-time-measurement returning signal including elapsed time data (receiver elapsed time) indicating an elapsed time from a reception timing of a round-trip-propagation-time-measurement outgoing signal to a transmission timing of a second signal for measurement (round-trip-propagation-time-measurement returning signal) corresponding to the round-trip-propagation-time-measurement outgoing signal, and transmitting the generated round-trip-propagation-time-measurement returning signal to the imaging terminal.

As described above, according to the embodiments of the present invention, in an image transfer system in which captured image data is wirelessly transferred between an imaging terminal and a display terminal, a round-trip-propagation-time-measurement outgoing signal and a round-trip-propagation-time-measurement returning signal are transmitted and received between the imaging terminal and the display terminal. Further, in the embodiments of the present invention, one terminal transmitting a round-trip-propagation-time-measurement outgoing signal and receiving a round-trip-propagation-time-measurement returning signal out of the imaging terminal and the display terminal calculates a round trip propagation-time required for transmission and reception of a signal in wireless transfer between the imaging terminal and the display terminal on the basis of a transmission time of the round-trip-propagation-time-measurement outgoing signal and a reception time of the round-trip-propagation-time-measurement returning signal corresponding to the transmitted round-trip-propagation-time-measurement outgoing signal. Thereafter, in the embodiments of the present invention, the accuracy of a timing signal in a case where the period of the timing signal (in the embodiments, an imaging synchronization signal) generated by the imaging terminal is temporarily adjusted is estimated on the basis of the calculated round trip propagation-time whenever a period of time determined in advance elapses. Thereafter, in the embodiments of the present invention, it is determined whether or not cycle adjustment for a timing signal generated by the imaging terminal is performed by comparing the estimated accuracy of the timing signal with the current accuracy of the timing signal, and the period of the timing signal is adjusted in a case where it is determined that cycle adjustment is performed. Thereby, in the embodiments of the present invention, even when the period of each of a timing signal generated by the imaging terminal and a timing signal (in the embodiments, a display synchronization signal) generated by the display terminal is shifted with the elapse of time due to an error of a phase or a period in a reference clock signal of each of the imaging terminal and the display terminal, the period of the timing signal generated by the imaging terminal can be matched to the period of the timing signal generated by the display terminal. Thus, in the embodiments of the present invention, even when a variation in a transmission time or a significant delay occurs in wireless transfer between the imaging terminal and the display terminal, the wireless transfer can be performed in a state where a delay in wireless transmission exceeding a predetermined range is excluded. Thereby, in the embodiments of the present invention, it is possible to wirelessly transfer captured image data from the imaging terminal to the display terminal without exceeding a validity period of a display image and to stably display a display image corresponding to the captured image data transmitted from the imaging terminal in the display terminal.

Meanwhile, in the embodiments of the present invention, an image transfer system configured such that the period of an imaging synchronization signal generated by an imaging terminal is adjusted so as to match the period of a display synchronization signal generated by a display terminal has been described. That is, in the embodiments of the present invention, a case where a timing signal to be subjected to cycle adjustment is an imaging synchronization signal generated by the imaging terminal has been described. However, the timing signal to be subjected to cycle adjustment is not limited to the timing signals generated by the imaging terminals described in the embodiments of the present invention. For example, the timing signal to be subjected to cycle adjustment may be a timing signal generated by the display terminal. That is, the image transfer system may be configured such that the period of a display synchronization signal generated by the display terminal is adjusted so as to match the period of an imaging synchronization signal generated by the imaging terminal. Even in this case, it is possible to easily configure an image transfer system configured to adjust a period using a timing signal generated by the display terminal as a target timing signal by applying the concept of the present invention.

Meanwhile, the above-described various processes according to the image transfer system 1 of the present embodiment, the round-trip-propagation-time measurement unit 106 included in the imaging terminal 100, the after-cycle-adjustment accuracy estimation unit 105, the cycle adjustment determination unit 104, the cycle adjustment unit 101, and the round-trip-propagation-time-measurement assistance unit 202 included in the display terminal 200 may be performed by recording programs for realizing the processes performed by, for example, the image transfer system 1 shown in FIG. 2 or a portion thereof, for example, the round-trip-propagation-time measurement unit 106 included in the imaging terminal 100, the after-cycle-adjustment accuracy estimation unit 105, the cycle adjustment determination unit 104, the cycle adjustment unit 101, and the round-trip-propagation-time-measurement assistance unit 202 included in the display terminal 200 in a computer-readable recording medium and causing a computer system to read the programs recorded on the recording medium to execute the programs. Meanwhile, the "computer system" as mentioned herein may be a computer system including hardware such as OS and peripheral devices. In addition, it is assumed that the "computer system" also includes a homepage providing environment (or a display environment) as long as a WWW system is used. In addition, the "computer-readable recording medium" refers to a writable non-volatile memory such as a flexible disc, a magneto-optical disc, a ROM, or a flash memory, a portable medium such as a CD-ROM, or a storage device such as a hard disk built into the computer system.

Further, it is assumed that the "computer-readable recording medium" also includes a computer-readable recording medium that stores programs for a fixed time like a non-volatile memory (for example, a dynamic random access memory (DRAM)) inside the computer system serving as a server or a client in a case where a program is transmitted through a network such as the Internet or a communication line such as a telephone line. In addition, the above-described program may be transmitted from the computer system in which the program is stored in a storage device or the like to another computer system through a transmission medium or by transmitted waves in the transmission medium. Here, the "transmission medium" transmitting the program refers to a medium having a function of transmitting information like a network (communication network) such as the Internet or a communication line (communication wire) such as a telephone line. In addition, the above-described program may be a program for realizing a portion of the above-described function. Further, the above-described program may be a so-called differential file (differential program) capable of realizing the above-described function in combination with a program which is recorded in advance in the computer system.

The embodiments of the invention have been described above with reference to the drawings, but specific structures of the invention are not limited to the embodiments and may include various modifications without departing from the scope of the invention. The invention is not limited to the above-mentioned embodiments and is limited only by the accompanying claims.

What is claimed is:

1. An image transmission system, comprising:
  an imaging terminal configured to transmit image data at a cycle of imaging timing; and
  a display terminal configured to receive the image data and display the image data at a cycle of display timing,
  wherein the image transmission system further has a communication-delay-time calculation circuit, an accuracy estimation circuit, an adjustment-determination circuit, and a cycle adjustment circuit provided in either of the imaging terminal or the display terminal, and a communication-delay-time-calculation-assistance circuit provided in the other terminal of the imaging terminal and the display terminal,
  wherein the communication-delay-time calculation circuit is configured to generate a first measurement signal and transmit the first measurement signal to the other terminal at a timing synchronized to the display timing, receive a second measurement signal transmitted from the other terminal in accordance with the first measurement signal, and calculate communication delay time according to the transmission timing of the first measurement signal, the reception timing of the second measurement signal, and lapse time data included in the second measurement signal, wherein the lapse time data indicates lapse time from reception timing of the first measurement signal by the other terminal until transmission timing of the second measurement signal, wherein the communication-delay-time-calculation-assistance circuit is configured to receive the first measurement signal, generate the second measurement signal including the lapse time data, and transmit the second measurement signal to either of the imaging terminal or the display terminal having the communication-delay-time calculation circuit, wherein the accuracy estimation circuit is configured to define either of the imaging timing and the display timing as an adjustment target timing and calculate an accuracy estimation value to estimate an accuracy after the adjustment of the cycle of the adjustment target timing, wherein the accuracy estimation value is calculated in accordance with a plurality of the communication delay time calculated in a predetermined period and a plurality of the transmission timing of the first measurement signal corresponding to the plurality of the communication delay time, wherein the adjustment-determination circuit is configured to determine whether the accuracy estimation value is improved compared to the accuracy at the current adjustment target timing in accordance with the accuracy estimation value and the current accuracy at the adjustment target timing, and the adjustment-determination circuit is configured to determine whether to perform a cycle adjustment of the adjustment target timing in accordance with the determination result, and wherein the cycle adjustment circuit is configured to adjust the cycle of the adjustment target timing when it is determined to perform the cycle adjustment of the adjustment target timing.

2. The image transmission system according to claim 1, wherein the cycle adjustment circuit is configured to calculate an adjustment amount for adjusting the cycle of the adjustment target timing and perform the cycle adjustment of the adjustment target timing according to the calculated adjustment amount, when it is determined to perform the cycle adjustment of the adjustment target timing, and wherein the adjustment amount is calculated in accordance with the accuracy estimation value, the transmission timing of the first measurement signal, and the transmission timing of the second signal.

3. The image transmission system according to claim 2, wherein the accuracy estimation circuit is configured to define the plurality of the communication delay time calculated during the predetermined period as a population, extract a minimum communication delay time per each population, and calculate the accuracy estimation value in accordance with a difference between two minimum communication delay time among the plurality of the communication delay time extracted from the plurality of populations and a difference between two transmission timing of the two first measurement signals which are transmitted to calculate the two extracted minimum communication delay time, wherein the adjustment-determination circuit is configured to determine to perform the cycle adjustment of the adjustment target timing when the accuracy estimation value is improved compared to the accuracy at the current adjustment target timing, and the adjustment-determination circuit is configured to not to perform the cycle adjustment of the adjustment target timing when the accuracy estimation value is not improved compared to the accuracy at the current adjustment target timing, and wherein the cycle adjustment circuit is configured to calculate the adjustment amount according to a difference between the transmission timing of the two first measurement signals transmitted to calculate the two minimum communication delay time extracted to calculate the accuracy estimation value and a difference between the transmission timing of the tow second measurement signals corresponding to the two first measurement signals.

4. The image transmission system according to claim 3, wherein the cycle adjustment circuit is configured to calculate the adjustment amount by multiplying the accuracy estimation value by a ratio of the difference between the transmission timing of the two first measurement signals to the difference between the transmission timing of the two second measurement signals.

5. The image transmission system according to claim 3, wherein the accuracy estimation circuit is configured to calculate the accuracy estimation value by increasing a number of the communication delay time included in the population when it is determined to not perform the cycle adjustment of the adjustment target timing.

6. The image transmission system according to claim 5, wherein the accuracy estimation circuit is configured to include the communication delay time included in the population before the number of the communication delay time is increased into the population in which the number of the communication delay time is increased.

7. The image transmission system according to claim 3, further comprises a phase-adjustment-determination circuit configured to determine whether to perform an adjustment of a phase shift between the imaging timing and the display timing according to the communication delay time.

8. The image transmission system according to claim 3, further comprises a phase adjustment circuit configured to calculate a phase-adjustment amount for adjusting the phase shift between the imaging timing and the display timing according to the communication delay time and adjust the phase shift between the imaging timing and the display timing according to the calculated phase-adjustment amount.

9. An imaging terminal included in an image transmission system, wherein the image transmission system has the imaging terminal configured to transmit image data at a cycle of imaging timing; and a display terminal configured to receive the image data and display the image data at a cycle of display timing, comprising:

a communication-delay-time calculation circuit configured to generate a first measurement signal and transmit the first measurement signal to the other terminal of the imaging terminal and the display terminal at a timing synchronized to the display timing, receive a second measurement signal transmitted from the other terminal in accordance with the first measurement signal, and calculate communication delay time according to the transmission timing of the first measurement signal, the reception timing of the second measurement signal, and lapse time data included in the second measurement signal, wherein the lapse time data indicates lapse time from reception timing of the first measurement signal by the other terminal until transmission timing of the second measurement signal;

an accuracy estimation circuit configured to calculate an accuracy estimation value to estimate an accuracy after adjusting the cycle of the imaging timing in accordance with a plurality of the communication delay time calculated in a predetermined period and a plurality of the transmission timing of the first measurement signal corresponding to the plurality of the communication delay time;

an adjustment-determination circuit configured to determine whether the accuracy estimation value is improved compared to the accuracy at the current imaging timing in accordance with the accuracy estimation value and the current accuracy at the imaging timing, and the adjustment-determination circuit is configured to determine whether to perform a cycle adjustment of the imaging timing in accordance with the determination result, and a cycle adjustment circuit configured to adjust the cycle of the imaging timing when it is determined to perform the cycle adjustment of the imaging timing.

10. An adjustment method for adjusting an imaging timing and a displaying timing in an image transmission system so as to match the imaging timing with the display imaging, wherein the image transmission system has an imaging terminal configured to transmit image data at a cycle of the imaging timing; and a display terminal configured to receive the image data and display the image data at a cycle of the display timing, comprising:

a process of generating a first measurement signal by either of the imaging terminal or the display terminal and transmitting the first measurement signal to the other terminal of the imaging terminal and the display terminal at a timing synchronized to the display timing;

a process of receiving the first measurement signal in the other terminal;

a process of generating a second measurement signal in the other terminal in accordance with the first measurement signal and transmitting the second measurement signal to either of the imaging terminal and the display terminal, wherein the second measurement signal includes lapse time data indicating lapse time from reception timing of the first measurement signal by the other terminal until transmission timing of the second measurement signal;

a process of receiving the second measurement signal to calculate communication delay time according to the transmission timing of the first measurement signal, the reception timing of the second measurement signal, and lapse time data included in the second measurement signal by either of the imaging terminal and the display terminal;

a process of defining either of the imaging timing and the display timing as an adjustment target timing and calculating an accuracy estimation value to estimate an accuracy after the adjustment of the cycle of the adjustment target timing by either of the imaging terminal and the display terminal, wherein the accuracy estimation value is calculated in accordance with a plurality of the communication delay time calculated in a predetermined period and a plurality of the transmission timing of the first measurement signal corresponding to the plurality of the communication delay time;

a process of determining whether the accuracy estimation value is improved compared to the accuracy at the current adjustment target timing in accordance with the accuracy estimation value and the current accuracy at the adjustment target timing, and determining whether to perform a cycle adjustment of the adjustment target timing in accordance with the determination result by either of the imaging terminal and the display terminal; and a process of adjusting the cycle of the adjustment target timing by either of the imaging terminal and the display terminal, when it is determined to perform the cycle adjustment of the adjustment target timing.

* * * * *